US008400530B2

(12) United States Patent
Ikeda et al.

(10) Patent No.: US 8,400,530 B2
(45) Date of Patent: Mar. 19, 2013

(54) COMMUNICATION DEVICE, COMMUNICATION SYSTEM, IMAGE PRESENTATION METHOD, AND PROGRAM

(75) Inventors: Yoichi Ikeda, Osaka (JP); Mitsuaki Oshima, Kyoto (JP); Masaru Yamaoka, Osaka (JP); Tsutomu Mukai, Osaka (JP); Takahiro Sato, Osaka (JP); Ikuo Fuchigami, Fukuoka (JP); Tadanori Tezuka, Fukuoka (JP); Shohji Ohtsubo, Osaka (JP); Yosuke Matsushita, Osaka (JP)

(73) Assignee: Panasonic Corporation, Osaka (JP)

( * ) Notice: Subject to any disclaimer, the term of this patent is extended or adjusted under 35 U.S.C. 154(b) by 392 days.

(21) Appl. No.: 12/810,985

(22) PCT Filed: Dec. 27, 2008

(86) PCT No.: PCT/JP2008/004042
§ 371 (c)(1),
(2), (4) Date: Jun. 28, 2010

(87) PCT Pub. No.: WO2009/084243
PCT Pub. Date: Jul. 9, 2009

(65) Prior Publication Data
US 2010/0283586 A1 Nov. 11, 2010

(30) Foreign Application Priority Data
Dec. 28, 2007 (JP) .................................. 2007-338854

(51) Int. Cl.
*H04N 5/76* (2006.01)
(52) U.S. Cl. ................. 348/231.99; 340/10.42; 340/5.2; 340/3.1; 340/3.7; 235/375; 348/231.1; 348/232.2
(58) Field of Classification Search .............. 340/10.42, 340/3.1, 3.7, 5.2; 235/375; 348/231.1, 231.2, 348/231.99
See application file for complete search history.

(56) References Cited

U.S. PATENT DOCUMENTS 7,668,533 B2  2/2010  Hagiwara
7,764,308 B2  7/2010  Kusaka et al.
(Continued)

FOREIGN PATENT DOCUMENTS

CN  2659039  11/2004
CN  1701560  11/2005
(Continued)

OTHER PUBLICATIONS

International Search Report issued Mar. 24, 2009 in International (PCT) Application No. PCT/JP2008/004042.
(Continued)

*Primary Examiner* — George Bugg
*Assistant Examiner* — Sharmin Akhter
(74) *Attorney, Agent, or Firm* — Wenderoth, Lind & Ponack, L.L.P.

(57) ABSTRACT

A communication device that can simplify various settings of a display device, such as a TV, that provides information regarding an object (communication device) is provided. An image capturing device (1) has a RF-ID unit (47) for performing proximity wireless communication with a RF-ID reader/writer (46) connected via an infrared communication path to a TV (45). The image capturing device (1) includes: an antenna (21) for the proximity wireless communication; a data receiving unit (105) receiving an input signal from the RF-ID reader/writer (46); a nonvolatile second memory (52) storing at least UID (75) and an execution program (116); and a data transmission unit (108) transmitting the UID (75) and the execution program (116) to the RF-ID reader/writer (46) via the antenna (21) according to the input signal. The UID (75) is used to identify the communication device, and the execution program (116) is executed by the TV (45) with reference to the UID (75). The transmitted UID (75) and execution program (116) are transferred to the TV (45) via the RF-ID reader/writer (46).

6 Claims, 93 Drawing Sheets

U.S. PATENT DOCUMENTS

| | | | |
|---|---|---|---|
| 7,769,867 B2* | 8/2010 | Fukuda | 348/231.9 |
| 2004/0109063 A1 | 6/2004 | Kusaka et al. | |
| 2005/0001024 A1* | 1/2005 | Kusaka et al. | 235/375 |
| 2005/0027828 A1 | 2/2005 | Yamazaki | |
| 2005/0242925 A1 | 11/2005 | Zaretsky et al. | |
| 2006/0025957 A1 | 2/2006 | Lind et al. | |
| 2006/0148402 A1 | 7/2006 | Hagiwara | |
| 2007/0070218 A1* | 3/2007 | Meijer et al. | 348/231.99 |
| 2008/0298808 A1 | 12/2008 | Fukuda | |
| 2008/0316319 A1 | 12/2008 | Nomoto | |

FOREIGN PATENT DOCUMENTS

| | | |
|---|---|---|
| CN | 101035250 | 9/2007 |
| EP | 1 763 149 | 3/2007 |
| JP | 6-119262 | 4/1994 |
| JP | 2004-48139 | 2/2004 |
| JP | 2005-63427 | 3/2005 |
| JP | 2005-277669 | 10/2005 |
| JP | 2007-148967 | 6/2007 |
| JP | 2008-9642 | 1/2008 |
| JP | 2008-16874 | 1/2008 |
| KR | 10-2007-0058205 | 6/2007 |

OTHER PUBLICATIONS

A Reply (Second) submitted in International Application No. PCT/JP2008/004042 and its English translation.

Extended European Search Report (in English language) mailed on Jun. 27, 2011 in corresponding European Patent Application No. 08865957.8.

* cited by examiner

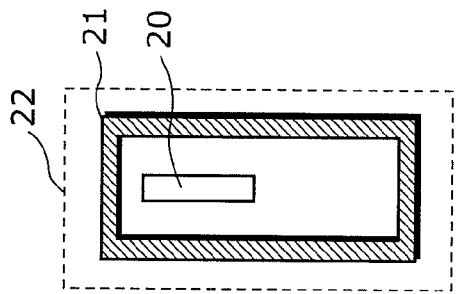
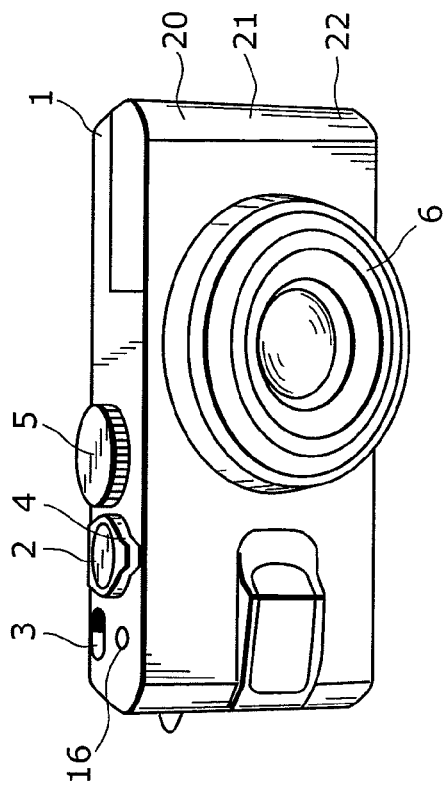
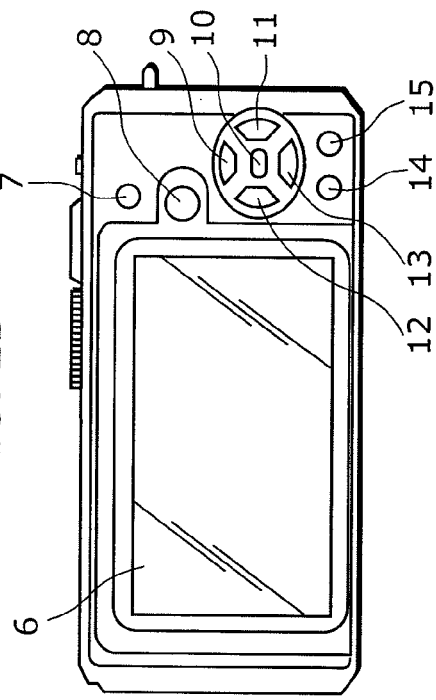

FIG. 21A

164a: Second RF-ID unit, on which URLs of relay servers are recorded, is attached to or embedded in medium such as post card. On outer surface of second RF-ID unit, (a) UID of second RF-ID unit and (b) information for identifying first URL of a certain relay server are printed to be displayed by two-dimensional bar-code.

164b: There is camera capable of being connected to main server. The camera has first RF-ID unit on which first URL of main server is recorded. Optically read two-dimensional bar-code, and convert readout information to information for identifying (a) UID of second RF-ID unit in post card and (b) second URL of different relay serve

164c: Record converted information onto memory in camera

164d: Select specific set of images from images captured by camera, and store set of images into specific first directory in main server. At the same time, upload information of first directory (first directory information) as well as first URL of main server, specific second directory in relay server having second URL. Upload information for associating UID of second RF-ID unit with second directory, to relay server having second URL.

164e: Mail medium such as a post card to specific person

FIG. 21B

164f: The person receiving post card moves RF-ID unit of post card into proximity RF-ID reader of TV or the like. Thereby, read second URL of relay server and UID of post card

164g: (i) Access relay server having second URL, (ii) read (a) program in second directory associated with UID and/or (b) first URL and first directory information of main server on which specific image data is recorded, (iii) download image data from main server, and (iv) display image data on screen

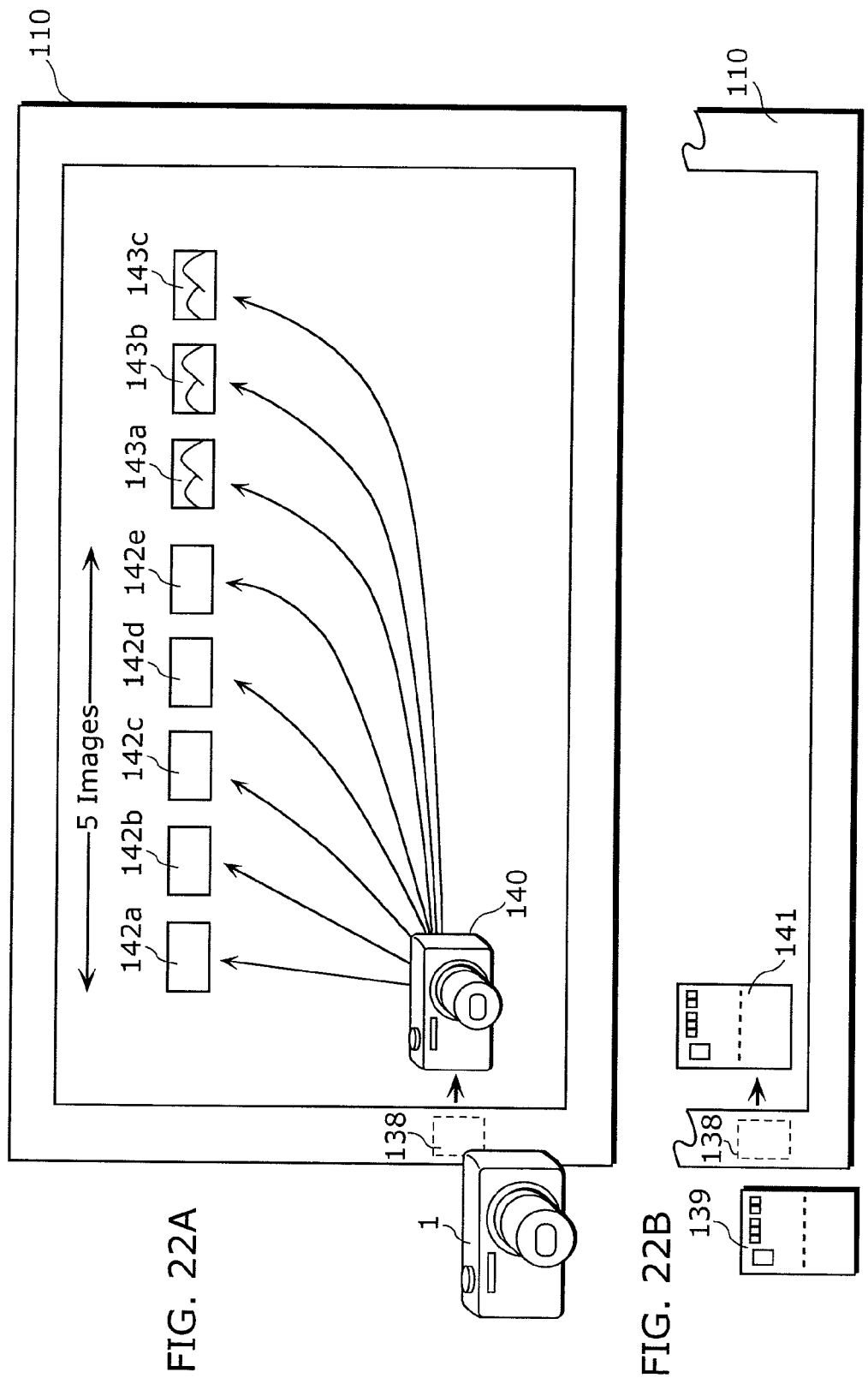

FIG. 25

```
array picArray;
                                    6006
Main(void){
        Bool cn = ConnectServer(URL);
        if(cn!=false){        6007
                SetDownloaded(DLcomplete);
                picArray = DownloadedData(cn);
        }                                    6008
        return;
}       6009    6010
void DLcomplete(void){
        StartSlideShow(picArray);
        return
}
```

FIG. 30

Authentication Program — 6521a

45 — TV ← Image Capturing Device (Camera) — 1

DVD Recorder — 6504
Refrigerator — 6506
Air Conditioner — 6505

6512a — Kc,K1

TV — 6511
Image Capturing Device (Camera) K1 — 6511
DVD Recorder
Air Conditioner Obtain MAC address and K1 from RF-ID unit Transmit data cryptography key encrypted by K1 (K1<Kc>)

Decrypt K1<Kc> by K1

Kc

K1,K2: Authentication Cryptography Key
Kc: Data Cryptography Key

Second Memory Updating Process:
Case 1

Second Memory Updating Process:
Case 2

Second Memory Updating Process: Case 3

Second Memory Updating Process: Case 4

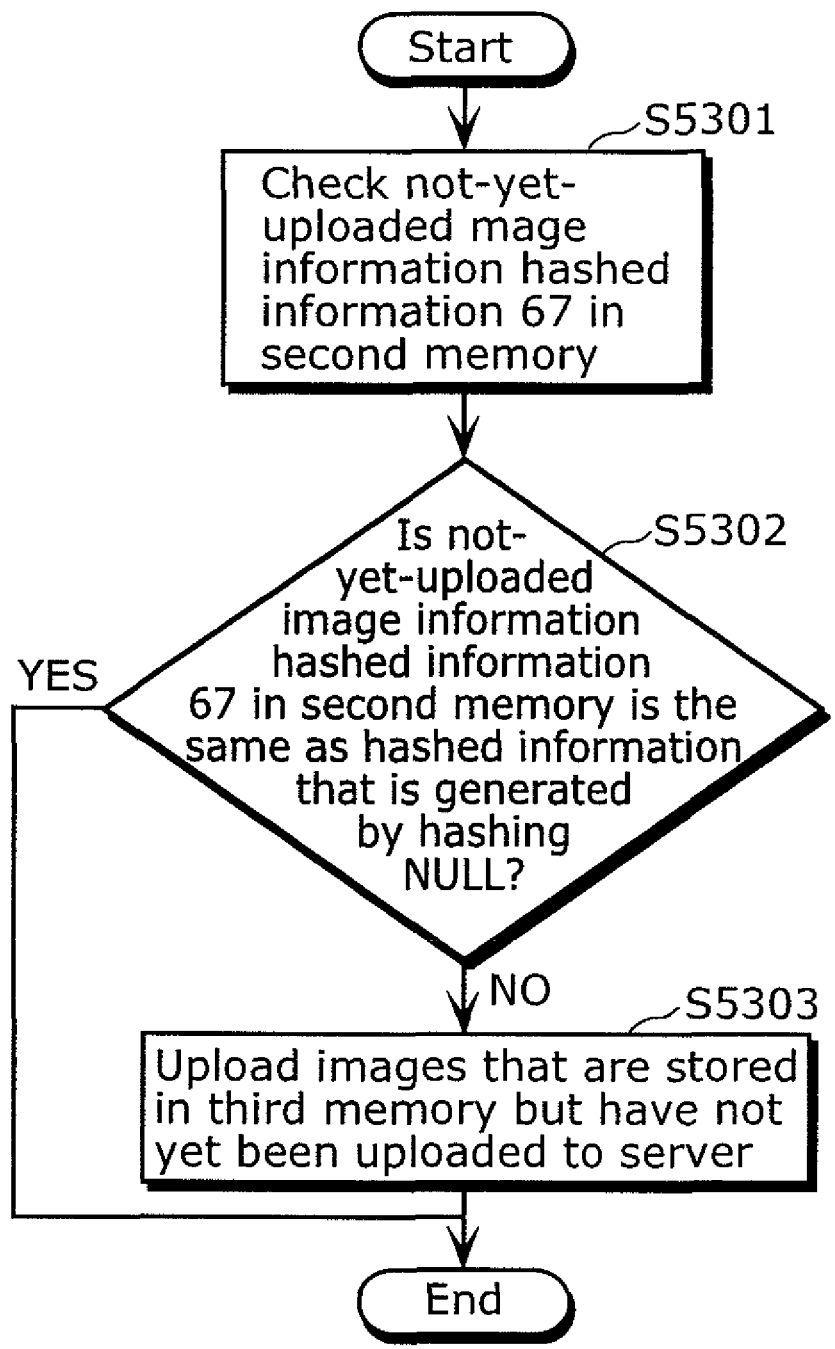

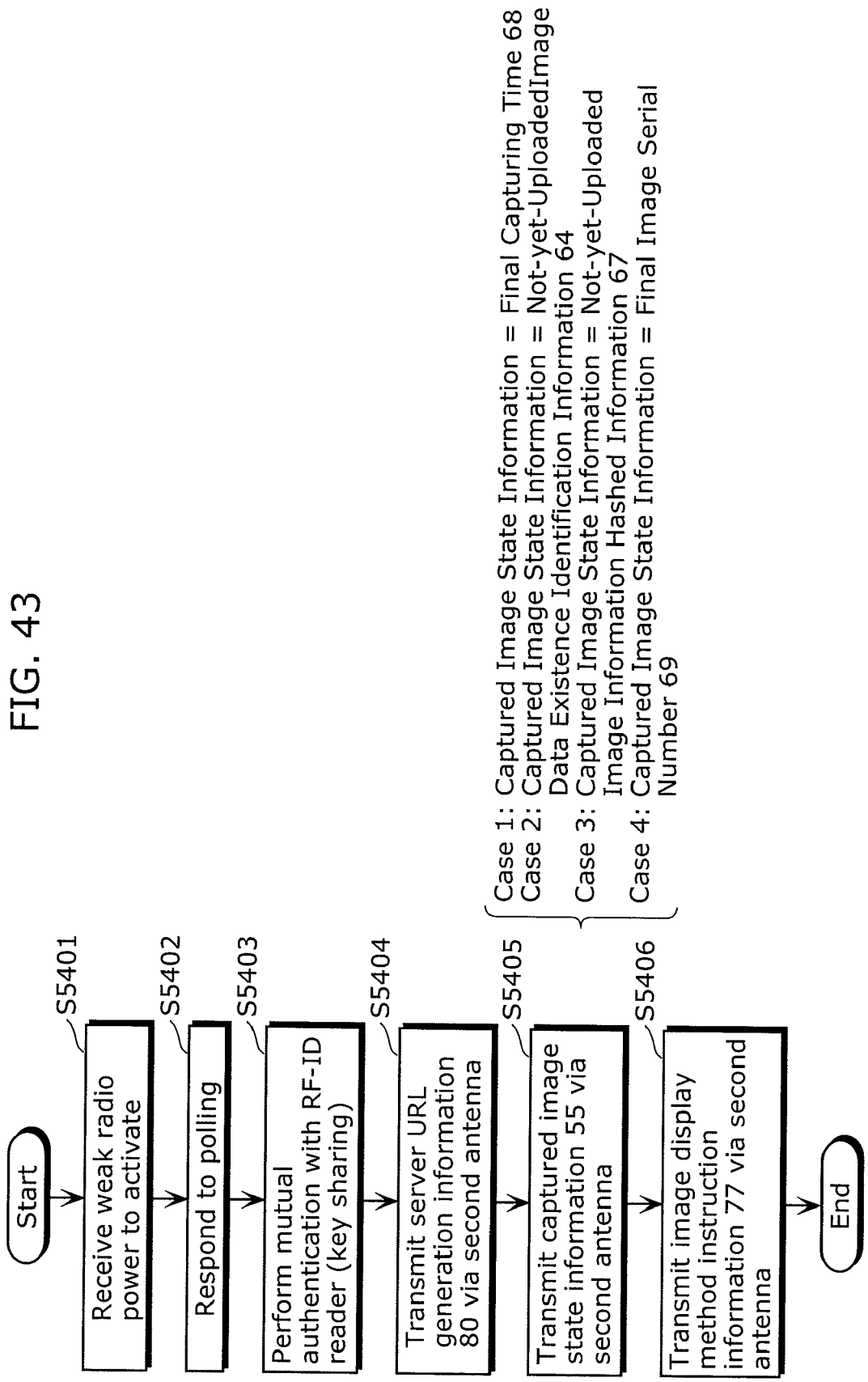

Server Synchronization Examination: Case 1

Server Synchronization Examination: Case 2

Server Synchronization Examination: Case 3

Server Synchronization Examination: Case 4

FIG. 47A (1) Uploading from Image Capturing Device (camera)  — 5940

| Camera ID 5901 | Sever Address(www.panasonic-server.com) 5902 |
|---|---|
| Server Login ID 5903 | Server Login Password 5904 |
| Uploading-Image Number 5906 | |

FIG. 47B (2) RF-ID Communication — 5950

| Camera ID 5911 | Sever Address(www.panasonic-server.com) 5912 |
|---|---|
| Server Login ID 5913 | Server Login Password 5914 |
| Final Capturing Time (Case 1) 5915 | |
| Not-yet-Uploaded Image Data Existence Identifiers (Case 2) 5916 | |
| Not-yet-Uploaded Image Information Hashed Information (Case 3) 5917 | |
| Final Image Serial Number (Case 4) 5918 | |
| Captured Image Display Method Instruction Information 5919 | |

| Image ID 5927 | List Display 5920 | Slide Show 5921 | Print 5922 | Video Reproduction 5923 | Download 5924 | Security Password 5925 |
|---|---|---|---|---|---|---|
| Sample1.jpg | yes | automatic | disable | disable | disable | ×××××× |
| Sample2.jpg | no | manual | allow | allow | allow | ×××××× |
| Sample3.jpg | no | disable | allow | manual | disable | ○○○○○○ |

| Image ID 5928 | Upload 5926 |
|---|---|
| Sample1.jpg | Done |
| Sample2.jpg | Done |
| Sample3.jpg | Not yet |

FIG. 57

Customer Attribute Database 508

| ID | Gender | Age | Product/Service Genre | Price Range |
|---|---|---|---|---|
| 01 | Female | 20's to 30's | Reasonable Trip | ¥150,000 to ¥250,000 |
| 02 | Female | 30's to 40's | Childhood Products, Gourmet | less than ¥100,000 |
| 03 | Female | 50's to 60's | Fashion, Family Trip | ¥300,000 or more |
| 04 | Male | 20's to 30's | Reasonable Trip | ¥100,000 to ¥200,000 |
| 05 | Male | 30's to 40's | Childhood Products, Home Products | less than ¥50,000 |
| 06 | Male | 50's to 60's | Hobby, Family Trip | ¥400,000 or more |

FIG. 58

Customer Attribute Database 507

| ID | Product/Service Genre | Price | Product/Service Data |
|----|----------------------|--------|---------------------|
| 01 | Reasonable Trip | ¥50,000 | Korea, 3 days and 2 nights with Gourmet |
| 02 | Reasonable Trip | ¥150,000 | Hawaii, 5 days with various optional activities |
| 03 | Reasonable Trip | ¥300,000 | 3 European countries, 8 days and 7 nights, A-level hotel |
| 04 | Fashion | ¥10,000 | Apparel on Bargain Sale, limited time only |
| 05 | Fashion | ¥30,000 | Direct imported bag from Italy |
| 06 | Fashion | ¥100,000 | Jewelry selected by buyer this year |

FIG. 64A

| Mailing Object UID | Image server address or URL indicating Image server address |

FIG. 64B

| Mailing Object UID | Relay server address or URL indicating Relay server address |

FIG. 64C

| Mailing Object UID |

FIG. 80

| UID | Target Apparatus Information | Setting Information |
|---|---|---|
| UID0001 | REC-0001 | Recorder Setting Information A |
| UID0001 | TV-0005 | TV Setting Information A |
| UID0002 | NPC-0002 | Laptop Setting Information A |
| UID0003 | DSC-0125 | DSC Setting Information A |
| UID0003 | REC-0001 | Recorder Setting Information B |
| UID0005 | TV-0083 | TV Setting Information A |
| UID0005 | DSC-0008 | DSC Setting Information B |
| UID0010 | DPC-0001 | Desktop Setting Information A |

FIG. 81

Memory — 75

| UID | Medium Identification Information |
|---|---|
| UID0001 | Card |

Apparatus Operation Information — 2101, 2103, 111

| Index | Operation Apparatus Identification Information (2104) | Target Apparatus Information (2105) | Operation Instruction Information (2106) | | Communication Execution Information (2262) | Communication Information (2107) |
|---|---|---|---|---|---|---|
| | | | Instruction Detail Information (2260) | Instruction Target Information (2261) | | |
| 1 | Recorder | REC-0001 | Setting Information Change | Change Target Information A | Communication is executed. | Communication Information A |
| 2 | TV | TV-0005 | Setting Information Change | Change Target Information B | Communication is executed. | Communication Information A |
| 3 | Laptop | NPC-0002 | Setting Information Change | Change Target Information C | Communication is executed. | Communication Information B |
| 4 | Camera | DSC-0008 | Setting Information Change | Change Target Information D | Communication is executed. | Communication Information C |
| 5 | Recorder | REC-0002 | Setting Information Change | Change Target Information A | Communication is not executed. | None |

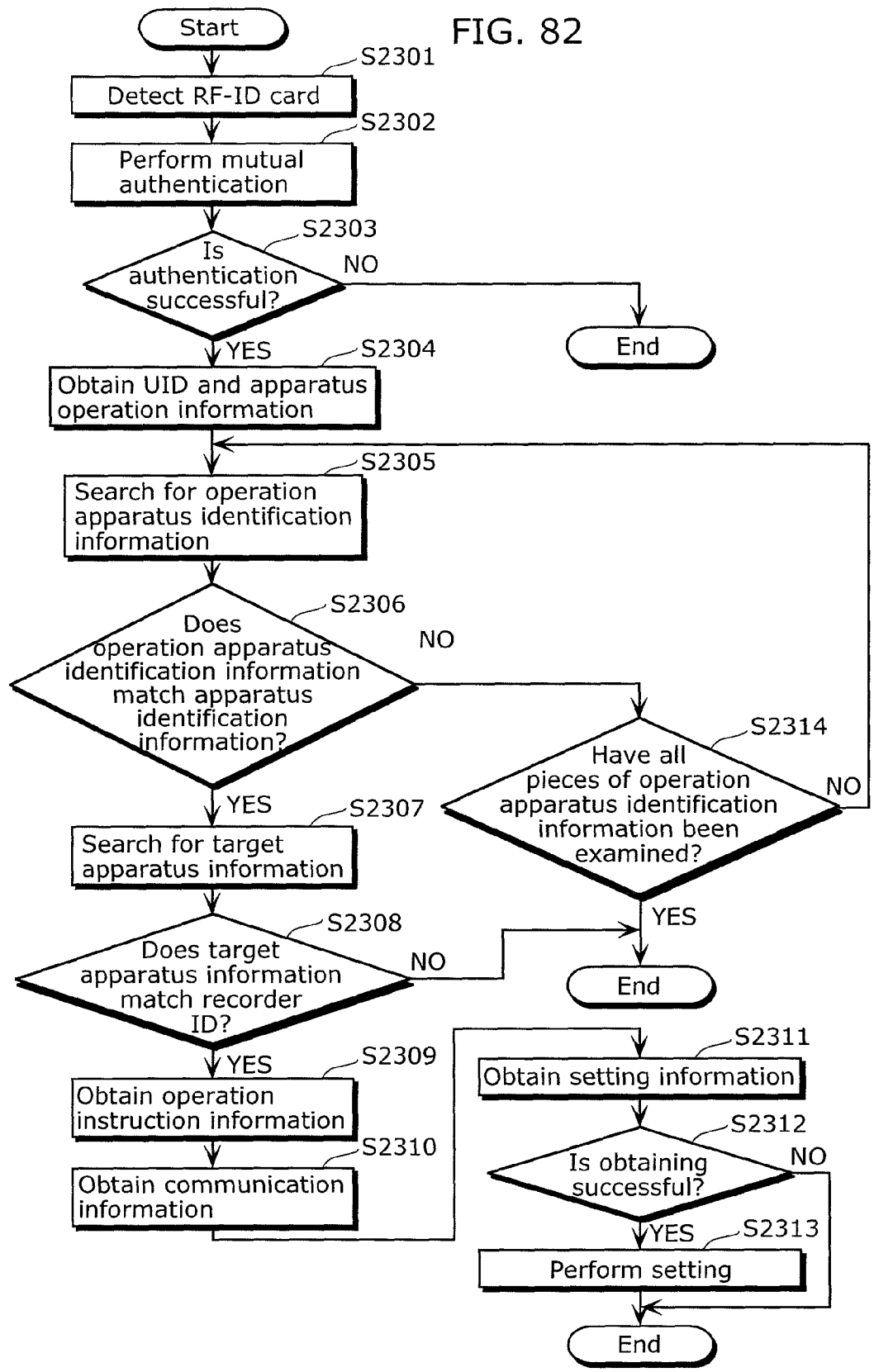

FIG. 84

Memory

| UID | Medium Identification Information |
|---|---|
| UID0002 | Card |

Apparatus Operation Information

| Index | Operation Apparatus Identification Information | Target Apparatus Information | Operation Instruction Information | | | |
|---|---|---|---|---|---|---|
| | | | Instruction Detail Information | Instruction Target Information | Communication Execution Information | Communication Information |
| 1 | Recorder | All apparatuses | Setting Information Change (Timer Recording) | TV Program ID, Recording Mode | Communication is not executed. | None |
| 2 | Recorder | All apparatuses | Setting Information Change (Timer Recording) | TV Program Code, Recording Mode | Communication is executed. | URL, Login ID, Password |

FIG. 85

Memory

| UID |
|---|
| UID0003 |

| Medium Identification Information |
|---|
| Card |

Apparatus Operation Information

| Index | Operation Apparatus Identification Information | Target Apparatus Information | Operation Instruction Information ||| Communication Information |
|---|---|---|---|---|---|---|
| | | | Instruction Detail Information | Instruction Target Information | Communication Execution Information | |
| 1 | Vehicle Navigation Device | All apparatuses | Setting Information Change (Highlighted Display) | Landmark Information A (Map No. A, coordinates: xxx, yyy) | Communication is not executed. | None |
| 2 | Vehicle Navigation Device | All apparatuses | Setting Information Change (Highlighted Display) | Landmark Information B (Map No. B, coordinates: zzz, www) | Communication is not executed. | None |

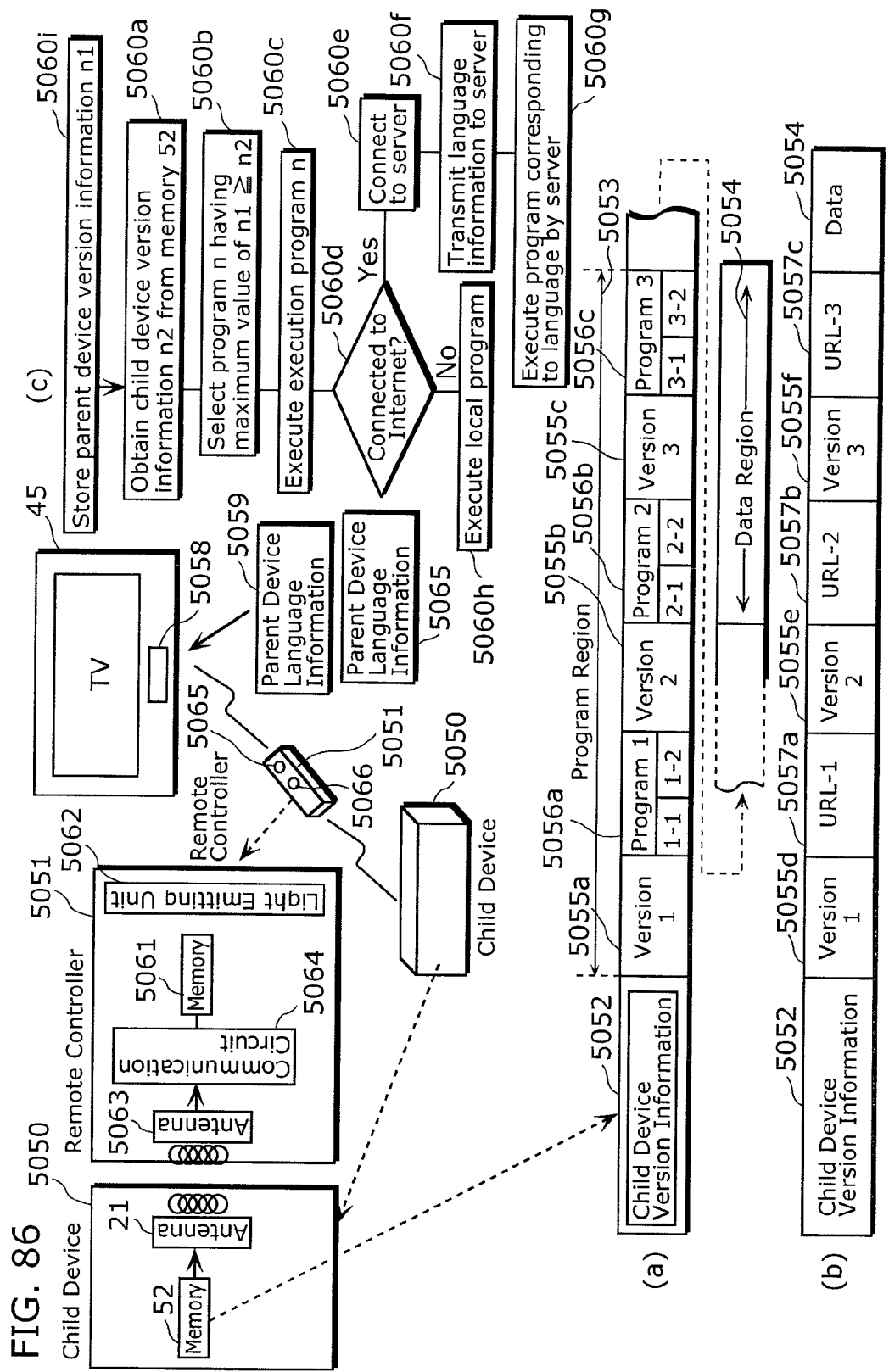

COMMUNICATION DEVICE, COMMUNICATION SYSTEM, IMAGE PRESENTATION METHOD, AND PROGRAM

TECHNICAL FIELD

The present invention relates to a communication device or the like performing proximity wireless communication with a device (apparatus) having a reader.

BACKGROUND ART

In recent years, services provided via the Internet have been increasingly prevalent. As servers manage text information, images, videos, and the like created by users as well as news, weather forecast, movie information, and other contents created by companies, services for supplying these contents any time via the Internet have also been rapidly increased.

One of the services is photograph sharing service. A user can upload photographs taken by the user himself/herself to a server, and later view the photographed images any time by accessing the server from a personal computer or the like via the Internet.

In order to upload photographed images to a server, products have recently been developed to facilitate the uploading procedure. Digital cameras, memory cards, and the like have wireless LAN function to automatically upload photographed images directly to a server by simple procedures.

On the other hand, in order to download and display images uploaded to a server, the following television sets (hereinafter, TVs) are currently on the market. The TVs are connectable to the Internet. A user uses such a TV to access a server and logins with, for example, a user ID and a password, thereby obtaining images from the server.

However, the downloading procedures still use conventional interface techniques of personal computers. Therefore, the operability is not improved. The TVs with Internet function, which are recently on the market, require pressing buttons of a remote controller some dozens times to download data such as photographs. A user needs to read a manual to follow the complicated procedures. This would not be a high obstacle for young generations and those having high computer skills. However, such procedures requiring relatively high skills are complicated and bothersome for middle-aged and elderly people and general women. Users not familiar with computer operations find difficult to enjoy the services. The problem in operability has been examined to be improved, but the improved techniques are not different from the conventional computer operation methods. The operability is not significantly improved.

Patent Reference 1 discloses the following technique. A display device connected to a server has a Radio Frequency IDentification (RF-ID) reader. An object (commodity, merchandise, or the like) is provided with a RF-ID tag including a non-rewritable memory in which object Unique IDentification (UID) is stored. A server has a database in which the object ID (UID) is associated with an image such as a user's face photograph. When the object approaches to the RF-ID reader, the RF-ID reader reads the UID from the tag, and the image, such as a user's face photograph, associated with the UID is retrieved from the database to be displayed on the display device. Thereby, the owner of the object is determined.

Patent Reference 1: Japanese Unexamined Patent Application Publication No. 2005-63427

DISCLOSURE OF INVENTION

Problems that Invention is to Solve

As described earlier, the system for providing the photograph sharing service by using a TV has a problem. Since a TV is generally operated by a remote controller, it is quite bothersome to access a server and to enter a user ID and a password.

Patent Reference 1 discloses that the display device having a RF-ID reader and an object applied with a RF-ID tag make it possible to easily display image data, such as a face photograph of an owner of the object. However, the RF-ID tag merely holding UID does not exchange information to facilitate access between the TV terminal and the server. The RF-ID tag fails to facilitate the operation procedures. Since a RF-ID tag applied to an object holds only UID, it is not possible to obtain image information associated with UID when each object is connected to a different server.

In addition, the above-described Patent Reference 1 has another problem. The TV terminal needs to hold various different application programs (programs for downloading images, for example) compliant to various items, item kinds, or application systems of the objects applied with RF-ID. Therefore, the TV terminal needs a storage device to store these application programs. Moreover, it is burdensome to follow version-up of the programs.

In order to solve the above problems, an object of the present invention is to provide a communication device or the like capable of facilitating various settings for a display device such as a TV which provides information regarding the object (the communication device), for example, by uploading an image to a server and allowing a user to view the uploaded image on the TV.

Means to Solve the Problems

In accordance with an aspect of the present invention for achieving the object, there is provided A communication device that performs proximity wireless communication with a reader device connected via a communication path to an apparatus, the communication device including: an antenna unit configured to be used for the proximity wireless communication; a receiving unit configured to receive an input signal from the reader device via the antenna unit; a memory unit which is nonvolatile and configured to store at least identification information and a program, the identification information being used to identify the communication device, and the program being executed by the apparatus with reference to the identification information; and a transmission unit configured to transmit the identification information and the program from the memory unit to the reader device via the antenna unit according to the input signal received by the receiving unit, wherein the identification information and the program transmitted by the transmission unit are transferred from the transmission unit to the apparatus via the antenna unit, the reader device, and the communication path.

With the above structure, a program to be executed by the apparatus is embedded in the communication device. When the communication device is in proximity of the reader device, the program and the like in the communication device are transferred to the apparatus via the reader device and thereby the apparatus executes the program. Thus, the simple operation of moving the communication device into proximity of the reader device causes the apparatus to perform an operation depending on the communication device (or the identification information). As a result, it is possible to simplify various settings of the display device such as a TV which provides information regarding the object (communication device). For example, if images captured by a camera are uploaded to a server, a simple operation of bringing the camera into proximity of a TV allows the TV to download the images from the server and thereby to display the images.

The present invention can be implemented not only as the single communication device such as a camera, but also as a communication system including: an apparatus; a reader device connected to the device via a communication path; and a communication device performing proximity wireless communication with the reader device, wherein the communication device includes: an antenna unit configured to be used for the proximity wireless communication; a receiving unit configured to receive an input signal from the reader device via the antenna unit; a memory unit which is nonvolatile and configured to store at least identification information and a program, the identification information being used to identify the communication device, and the program being executed by the device with reference to the identification information; and a transmission unit configured to transmit the identification information and the program from the memory unit to the reader device via the antenna unit according to the input signal received by the receiving unit, the reader device receives the identification information and the program from the transmission unit and transfers the identification information and the program to the device, and the device receives the identification information and the program from the reader device and executes the program.

Furthermore, the present invention can be implemented as an image presentation method of presenting image related to a communication device on an apparatus having a display screen, in a communication system having (a) the apparatus having the display screen, (b) a reader device connected to the apparatus via a communication path, and (c) the communication device performing proximity wireless communication with the reader device, the image presentation method including: detecting that the communication device is in proximity of the reader device so that the proximity wireless communication is possible; (i) transferring identification information and a program which are stored in the communication device from the communication device to the reader device using the proximity wireless communication, when it is detected that the communication device is in proximity of the reader device, the identification information being used to identify the communication device, and the program being executed by the apparatus with reference to the identification information, and (ii) further transferring the identification information and the program from the reader device to the apparatus via the communication path; and displaying the image related to the communication device on the display screen, by executing the program with reference to the identification information transferred in the further transferring. Still further, the present invention can be implemented as a program stored with identification information in a communication device, the program being described by a code executed by a virtual machine included in an apparatus performing proximity wireless communication with the communication device, and the program executing: accessing a server device connected via a communication network; downloading, form the server device, image associated with the identification information from among image stored in the server device accessed in the accessing; and displaying the image downloaded in the downloading. Still further, the present invention can be imple- mented as a computer-readable recording medium, such as a Compact Disc-Read Only Memory (CD-ROM), on which the above program is recorded.

Effects of the Invention

The communication device according to the aspect of the present invention is capable of facilitating various settings for a display device such as a TV providing information regarding the object (the communication device). For example, the communication device enables a user to easily upload images captured by the user to a server and view the images from the server on the TV, without any complicated procedures.

BRIEF DESCRIPTION OF DRAWINGS

FIG. 2A is an external view of the image capturing device according to the first embodiment of the present invention.

FIG. 2B is an external view of the image capturing device according to the first embodiment of the present invention.

FIG. 2C is an external view of the image capturing device according to the first embodiment of the present invention.

FIG. 21A is a flowchart of the processing performed by the image capturing device and the TV, according to the first embodiment of the present invention.

FIG. 21B is a flowchart of the processing performed by the image capturing device and the TV, according to the first embodiment of the present invention.

FIG. 22 is a diagram presenting a display method of the image capturing device and the TV, according to the first embodiment of the present invention.

FIG. 25 presents an example of description of the operation program for downloading image and executing slide show.

FIG. 30 presents an example of an authentication method using RF-ID unit.

FIG. 43 is a flowchart of operation steps of a RF-ID unit in the camera according to the second embodiment of the present invention.

FIG. 47A presents a data format of the RF-ID communication between the camera and the TV.

FIG. 47B presents a data format of the RF-ID communication between the camera and the TV.

FIG. 57 is a table of a data structure of a customer attribute database.

FIG. 58 is a table of a data structure of an electronic catalog database.

FIG. 64A is a diagram illustrating an example of fixed information of a mailing object according to the fifth embodiment of the present invention.

FIG. 64B is a diagram illustrating an example of fixed information of the mailing object according to the fifth embodiment of the present invention.

FIG. 64C is a diagram illustrating an example of fixed information of the mailing object according to the fifth embodiment of the present invention.

FIG. 80 is a table of pieces of setting information registered in the server.

FIG. 81 is a table of pieces of apparatus operation information registered in the RF-ID card.

FIG. 82 is a flowchart of steps of updating setting information of a recorder by the RF-ID card.

FIG. 84 is a table of apparatus operation information registered in the RF-ID card used in the recorder.

FIG. 85 is a table of apparatus operation information registered in the RF-ID card used in a vehicle navigation device.

FIG. 86 is a block diagram of a configuration where a remote controller of a TV or the like has a RF-ID reader, according to an embodiment of the present invention.

Figure 1:
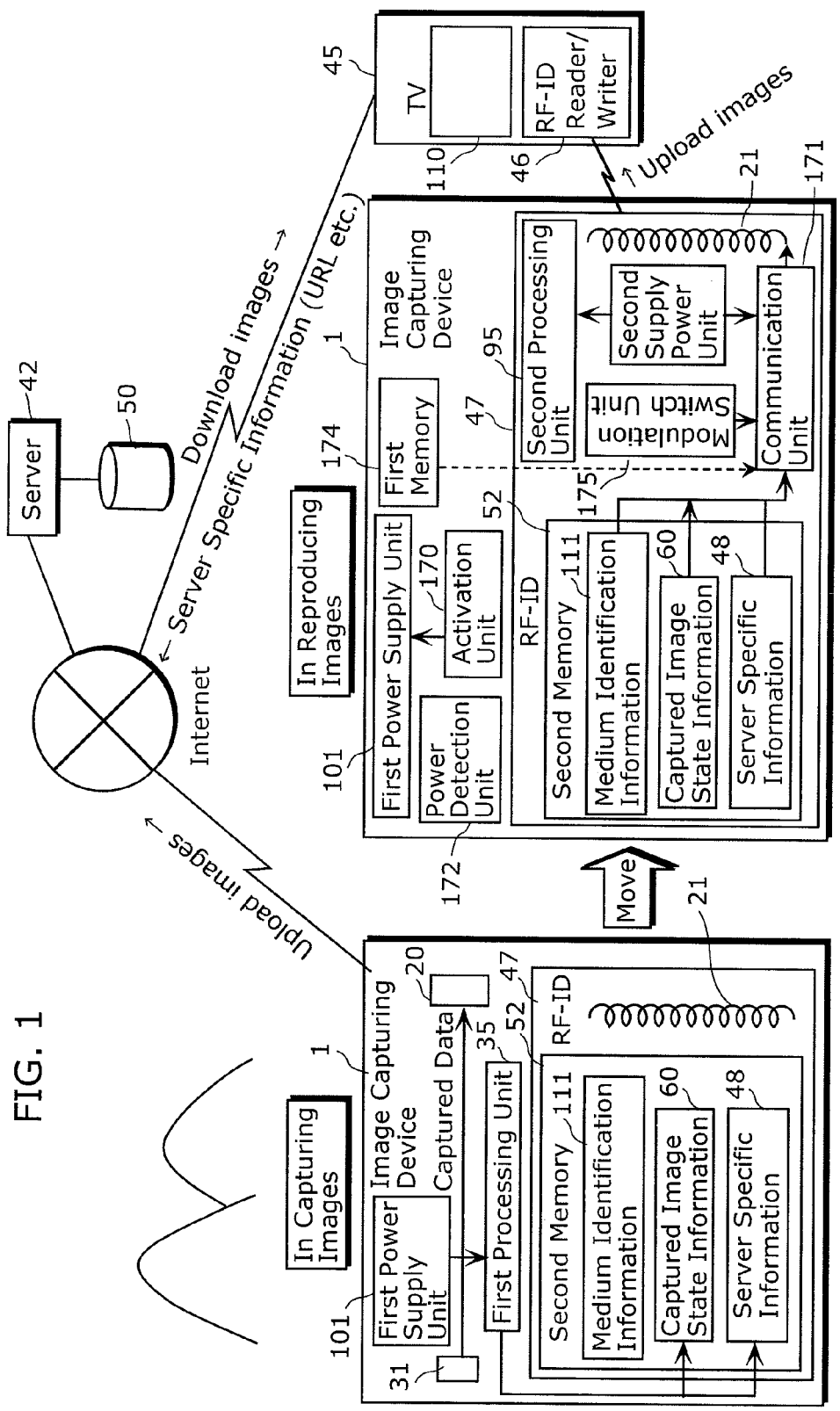
FIG. 1 illustrates an entire system of an image capturing device according to a first embodiment of the present invention.

NUMERICAL REFERENCES 1 image capturing device
3 power switch
6 lens
6a display unit
20 first antenna
21 second antenna
22 antenna cover
30 image capturing unit
31 video processing unit
32 recording/reproducing unit
33 third memory
34 IC card
35 first processing unit
36 encryption unit
37 communication unit
38 transmission unit
40 Internet
42 server
45 TV
46 RF-ID reader/writer
47 RF-ID unit
51 recording/reproducing unit
52 second memory
90 URL generation unit
91 second power supply unit
95 second processing unit
100 battery
101 first power supply unit
102 third power supply unit
105 data receiving unit
106 recording unit
107 reproducing unit
108 data transfer unit
110 display unit (TV)
111 medium identification information
115 service detail identification information
116 operation program
117 directory information on a server in which operation program is recorded
118 operation program selection information
119 operation program existence identifier
120 directory information on a server in which image display method instruction information is recorded
121 identifier indicating whether or not image display method instruction information is in a server
122 display order identifier
123 all-image display identifier
124 information of partial image of specific directory
125 list display identifier
126 slide show identifier
127 image quality prioritization
128 speed prioritization
129 directory of display audio
130 directory of display audio
131 partial-image display identifier
132 image of specific user
133 password of specific user
134 directory having images
135 camera model information
136 forced print instruction
137 directory of to-be-printed image data 138 antenna of RF-ID reader/writer of TV
139 post card
140 camera icon
141 post card icon
142 blank image
143 actual image
170 activation unit
171 communication unit
172 power detection unit
173 modulation unit
174 first memory
175 modulation switch unit
500 electronic catalog server information input device
502 electronic catalog notification card
504 RF-ID reader
506 electronic catalog server
507 electronic catalog database
508 customer attribute database
520 key input receiving unit
521 RF-ID transmission input receiving unit
573 URL generation unit
584 image selection unit
588 user information input unit
589 operation mode determination unit
601 customer attribute data obtainment unit
602 electronic catalog data obtainment unit
650 electronic catalog display screen
651 product/service data
652 highlighted electronic catalog operation option
800 printer
801 RF-ID-attached post card
810 post card destination information input unit
820 display screen on which post card registration image is selected
821 display screen on which post card print image is selected
822 display screen on which post card insertion message is inputted
823 display screen on which post card destination information is inputted
824 display screen on which post card destination decision is confirmed
825 thumbnail image
826 selecting thumbnail image
827 remote controller
2000 recorder
2001 tuner
2002 input signal processing unit
2003 output signal processing unit
2004 system control unit
2005 memory
2006 operation input unit
2007 communication unit
2008 HDD
2009 optical disk drive
2010 bus
2011 setting information processing unit
2012 recorder ID
2013 setting information
2100 RF-ID card
2101 memory
2102 processing unit
2103 apparatus operation information
2104 operation apparatus identification information
2105 target apparatus information
2106 operation instruction information
2107 communication information
2109, 2110, 2111 operation instruction information data
2112 URL
2113 login ID
2114 password
2250 setting information
2260 instruction detail information
2261 instruction target information
2262 communication execution information
2560 image server
2561 Internet
2562 image capturing device
2563 TV
2564 mailing object
2565 RF-ID unit
3001 mailing object
3002 RF-ID unit
3003 memory unit
3045 TV
3046 RF-ID reader/writer
3047 display unit
5501 wireless antenna
5502 communicable device search unit
5503 receiving unit
5504 decryption unit
5505 URL generation unit
5506 communication unit
5507 transmission unit
5508 communication interface
5509 receiving unit
5510 data processing unit
5511 memory unit
5512 display unit
5513 CPU
5940 data format used when a captured image is uploaded from the image capturing device 1 to a server 42
5950 data format of RF-ID communication between the image capturing device 1 and the TV 45
6005 TV program execution circumstance
6006 server connection instruction
6007 download-completion-time processing set instruction
6008 download instruction
6009 download-completion-time instruction
6010 slide show display instruction
6512 wireless communication device
6520 remote controller with display function
6521 wireless communication transmission unit
6522 RF-ID reader
6523 display unit
6524 input unit
6525 program execution virtual machine
6530 remote controller without display function
6531 wireless communication transmission unit
6532 RF-ID reader
6533 input device
6534 LED
6535 memory
7000 forced display instruction storage unit
7001 format identification information storage unit
7002 program storage unit
7003 second memory reading unit
7004 URL generation unit
7005 program generation unit
7006 program part storage unit
7007 program writing unit
7008 product serial number
7009 language code storage unit
7010 program execution virtual machine
7020 use status detection unit
7021 trouble detection unit
7022 power consumption detection unit

BEST MODE FOR CARRYING OUT THE INVENTION

The following describes the communication device, the communication system, the image presentation method, and the program according to embodiments of the present invention in detail with reference to the drawings.

First Embodiment

The first embodiment according to the present invention is described below. FIG. 1 is a schematic diagram of the first embodiment of the present invention. Here, a communication system including an image capturing device (camera) 1, a TV 45, and a server 42 is illustrated. In FIG. 1, the image capturing device 1 capturing images is illustrated on a left-hand side, while the image capturing device 1 reproducing the captured images is illustrated on a right-hand side.

The image capturing device 1 is an example of the communication device according to the aspect of the present invention. Here, the image capturing device 1 is implemented as a digital camera. For units used in capturing images, the image capturing device 1 includes a first power supply unit 101, a video processing unit 31, a first antenna 20, a first processing unit 35, a second memory 52, and a RF-ID antenna (second antenna) 21. The second memory 52 holds medium identification information 111, captured image state information 60, and server specific information 48. The RF-ID antenna 21 is used for a RF-ID unit. For units used in reproducing images, the image capturing device 1 includes the first power supply unit 101, a first memory 174, a power detection unit 172, an activation unit 170, the second memory 52, a second processing unit 95, a modulation switch unit 179, a communication unit 171, a second power supply unit 91, and the RF-ID antenna 21. The second memory 52 holds medium identification information 111, captured image state information 60, and the server specific information 48.

The TV 45 is an example of an apparatus (device) connected to a reader via a communication path. In more detail, the TV 45 is a television receiving apparatus used to display image data captured by the image capturing device 1. The TV 45 includes a display unit 110 and a RF-ID reader/writer 46.

The server 42 is a computer that holds image data uploaded from the image capturing device 1 and that downloads the image data to the TV 45. The server 42 has a storage device in which data 50 is stored.

When images of objects such as scenery are captured, the images are converted to captured data (image data) by the video processing unit 31 data. Then, in communicable conditions, the image data is transmitted to an access point using the first antenna 20 for a wireless Local Area Network (LAN) or Worldwide Interoperability for Microwave Access (WiMAX), and eventually recorded as the data 50 via the Internet to the predetermined server 42.

Here, the first processing unit 35 records the captured image state information 60 regarding the captured image data onto the second memory 52 in a RF-ID unit 47. The captured image state information 60 indicates at least one of (a) date of time of capturing each of the images, (b) the number of the captured images, (c) date and time of finally transmitting (uploading) an image, (d) the number of transmitted (uploaded) images, and (e) date and time of finally capturing an image. In addition, the captured image state information 60 includes (f) serial numbers of images that have already been uploaded or images that have not yet been uploaded; (g) a serial number of a finally captured image; and the like.

In addition, the first processing unit 35 generates a Uniform Resource Locator (URL) of the data 50 that is uploaded to the server 42. The first processing unit 35 records the server specific information 48 onto the second memory 52. The server specific information 48 is used to access the image data. The medium identification information 111 is also recorded on the second memory 52. The medium identification information 111 is used to determine whether the device embedded with the RF-ID (RF-ID unit) is a camera, a card, or a post card.

When a main power of the camera (the first power supply unit 101 such as a battery) is ON, the second memory 52 receives power from the main power. Even if the main power of the camera is OFF, the external RF-ID reader/writer is located outside supplies power to the RF-ID antenna 21. This enables the passive second power supply unit 91 without any power like a battery to adjust a voltage to provide power to respective units in a RF-ID circuit unit including the second memory. Thereby, it is possible to supply power to the second memory 52 so that the data is exchanged between the second memory 52 and the external device to be recorded and reproduced. Here, the second power supply unit 91 is a circuit generating power from radio waves received by the second antenna (RF-ID antenna) 21. The second power supply unit 91 includes a rectifier circuit and the like. Whenever the main power is ON or OFF, the data in the second memory 52 is read and written by the second processing unit 95. When the main power is ON, the data in the second memory 52 can be read and written also by the first processing unit 35. In other words, the second memory 52 is implemented as a nonvolatile memory, and both the first processing unit 35 and the second processing unit 95 can read and write data from and to the second memory 52.

When the image capturing device 1 completes capturing images of a trip or the like and then the captured images are to be reproduced, the image capturing device 1 is moved into proximity of the RF-ID reader/writer 46 of the TV 45, as illustrated on the right side of FIG. 1 as being the situation of reproducing images. Then, the RF-ID reader/writer 46 supplies power to the RF-ID unit 47 via the second antenna 21, and thereby the second power supply unit 91 provides power to the units in the RF-ID unit 47, even if the main power (the first power supply unit 101) of the image capturing device 1 is OFF. The captured image state information 60 and the server specific information 48 are read by the second processing unit 95 from the second memory 52, and transmitted to the TV 45 via the second antenna 21. The TV 45 generates a URL based on the server specific information 48, then downloads the image data of the data 50 from the server 42, and eventually displays, on the display unit 110, thumbnails or the like of images in the image data. If it is determined based on the captured image state information 60 that there is any captured image not yet been uploaded to the server 42, the determination result is displayed on the display unit 110. If necessary, the image capturing device 1 is activated to upload, to the server 42, image data of the captured image not yet been uploaded.

FIGS. 2A, 2B, and 2C are an external front view, an external back view, and an external right side view, respectively, of the image capturing device 1 according to the first embodiment of the present invention.

As illustrated in FIG. 2C, the first antenna 20 used for a wireless LAN and the second antenna 21 used for the RF-ID unit are embedded in a right side of the image capturing device 1. The antennas are covered with an antenna cover 22 made of a material not shielding radio waves. The RF-ID unit operates at a frequency of 13.5 MHz, while the wireless LAN operates at a frequency of 2.5 GHz. The significant difference in frequency prevents interference between them. Therefore, the two antennas 20 and 21 are seen overlapping with each other from the outside, as illustrated in FIG. 2C. The structure decreases an installation area of the antennas, eventually reducing a size of the image capturing device 1. The structure also enables the single antenna cover 22 to cover both of the two antennas as illustrated in FIG. 2C, so that the part made of the material not shielding radio waves is minimized. The material not shielding radio waves, such as plastic, has a strength lower than that of a metal. Therefore, the minimization of the material can reduce a decrease in a strength of a body of the image capturing device 1. The image capturing device 1 further includes a lens 6 and a power switch 3. The units assigned with numeral references 2 to 16 will be described later.

Figure 3:
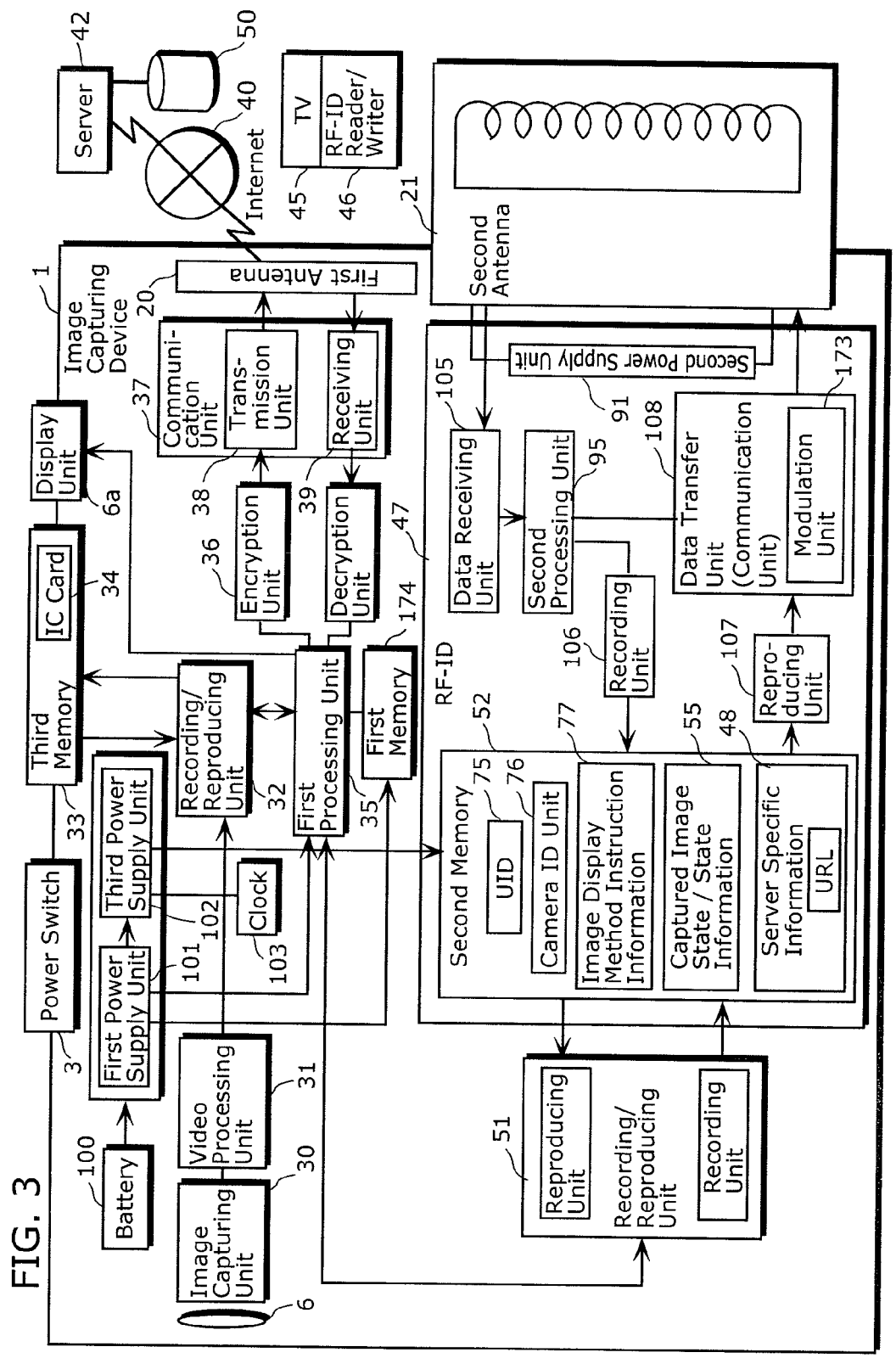
FIG. 3 is a block diagram of the image capturing device according to the first embodiment of the present invention.

FIG. 3 is a detailed block diagram of the image capturing device 1.

Image data captured by an image capturing unit 30 is provided to a recording/reproducing unit 32 via the video processing unit 31 and then recorded onto a third memory 33. The image data is eventually recorded onto an Integrated Circuit (IC) card 34 that is removable from the image capturing device 1.

The above processing is instructed by the first processing unit 35 that is, for example, a Central Processing Unit (CPU). The image data, such as captured photographs or video, is provided to an encryption unit 36, a transmission unit 38 in a communication unit 37, and then the first antenna 20, in order to be transmitted to an access point or the like by radio via a wireless LAN, WiMAX, or the like. From the access point or the like, the image data is transmitted to the server 42 via the Internet 40. In the above manner, the image data such as photographs is uploaded.

There is a situation where a part of the image data fails to be uploaded because, for example, the communication state is not good or there is no nearby access point or base station. In the situation, some images have already been uploaded to the server 42, and the other images have not yet been uploaded. Therefore, the image data in the server 42 is different from the image data captured by the image capturing device 1. In the first embodiment of the present invention, the RF-ID reader/writer 46 of the TV 45 reads the server specific information 48 and the like from the second memory 52 in the RF-ID unit 47 of the image capturing device 1. Then, based on the readout information, a URL or the like of the server 42 is generated. According to the URL, the TV 45 accesses the server 42 to access the data 50 such as a file, folder, or the like uploaded by the image capturing device 1. Then, the TV 45 downloads the uploaded images from among the images captured by the image capturing device 1, and displays the downloaded images. The above method will be described in more detail later.

If a part or all of the captured images is not uploaded as image data of the data 50 in the server 42, a problem would occur that a user downloading the images to the TV 45 cannot watch a part of the images on the TV 45.

In order to solve the problem, in the first embodiment of the present invention, the first processing unit 35 causes a recording/reproducing unit 32 to indicate information regarding a state of captured images, such as information of uploading state, to the captured image state information 55 in the second memory 52.

The above is described in more detail with reference to FIG. 4. In the second memory 52, synchronization information 56 is recorded. The synchronization information 56 indicates whether or not image data in the server 42 matches image data captured by the camera, in other words, whether or not the image data in the server 42 is in synchronization with the image data captured by the camera. In the first embodiment of the present invention, the TV 45 reads the captured image state information 55 from the second memory 52 via the second antenna 21. The captured image state information 55 makes it possible to instantly determine whether or not the data 50 in the server lacks any image. If the determination is made that there is any image that has not yet been uploaded, then the determination result is displayed on the display unit of the TV 45. Here, the TV 45 also displays a message of "Please upload images" to a viewer. Or, the TV 45 issues an instruction to the camera via the RF-ID antenna 21 to transmit an activation signal to the activation unit 170, thereby supplying power to the first power supply unit 101 of the image capturing device 1. Thereby, the TV 45 causes the image capturing device 1 to upload, to the server 42, the images in the first memory 174 or the like of the image capturing device 1, which have not yet been uploaded, via a wireless LAN, a wired LAN, the second antenna (RF-ID antenna) 21, or the like.

Since transmission via the RF-ID antenna 21 has a small transfer amount, transmission of the image data as originally captured takes a considerable time to upload and display the image data. This causes a user to feel unpleasant. In order to avoid this, according to the first embodiment of the present invention, when the image data is transmitted via the RF-ID antenna 21, thumbnails of the images not yet been uploaded are transmitted instead. The thumbnails can shorten apparent upload time and display time, suppressing unpleasant feeling of the user. Most of current RF-ID having a high communication ability has a transfer amount of several hundreds kbps. However, development of RF-ID having a quad-speed has been examined. The quad-speed RF-ID has a possibility of achieving a transfer amount of several Mbps. If thumbnails of images not yet been uploaded are transmitted, it is possible to transmit several dozens of thumbnails in one second. If thumbnails are displayed in a list, thumbnails of all images including images not yet been uploaded can be displayed on the TV within a time period a general user can tolerate. The above is one of practical solutions.

If the image capturing device is forced to be activated to upload images not yet been uploaded as described above, the most speedy and stable path is selected from a wireless LAN, the RF-ID antenna 21, and a wired LAN, to be used for uploading and displaying on the TV. In the situation where the image capturing device 1 receives power from the outside via the second antenna 21, the communication unit 71 transmitting signals to the second antenna 21 performs communication with the outside by a low-speed modulation method. On the other hand, in the situation where the image capturing device 1 can receive power from the first power supply unit 101 or the like, the communication unit 171 switches the modulation method to a modulation method having a large signal point, such as Quadrature Phase Shift Keying (QPSK), 16-Quadrature Amplitude Modulation (QAM), or 64-QAM, as needed, in order to achieve high-speed transfer to upload the image data not yet been uploaded in a short time. Furthermore, when the power detection unit 172 detects, for example, that the first power supply unit 101 or the like does not have enough power or that the image capturing device 1 is not connected to an external power, the first power supply unit 101 stops supplying power and a modulation switch unit 175 switches the modulation method employed by the communication unit 171 to a modulation method having a smaller signal point or less transfer rate. As a result, it is possible to prevent that the capacity of the first power supply unit 101 is reduced to be equal to or less than a set value.

There is another solution for power. When power is not enough, the second processing unit 95, the communication unit 171, or the like sends a power increase request signal to the RF-ID reader/writer 46 of the TV 45 via the second antenna 21, to request for power support. In response to the request, the RF-ID reader/writer 46 increases providing power to have a value greater than the set value for the power used in reading data from the RF-ID unit. Since the RF-ID unit receives more power via the second antenna 21, the RF-ID unit can provide power to the communication unit 171 or the first processing unit 35. Thereby, a power amount of a battery 100 for the first power supply unit 101 is not reduced. Or, without the battery 100, the image capturing device 1 can practically and unlimitedly continue transmission.

Figure 4:
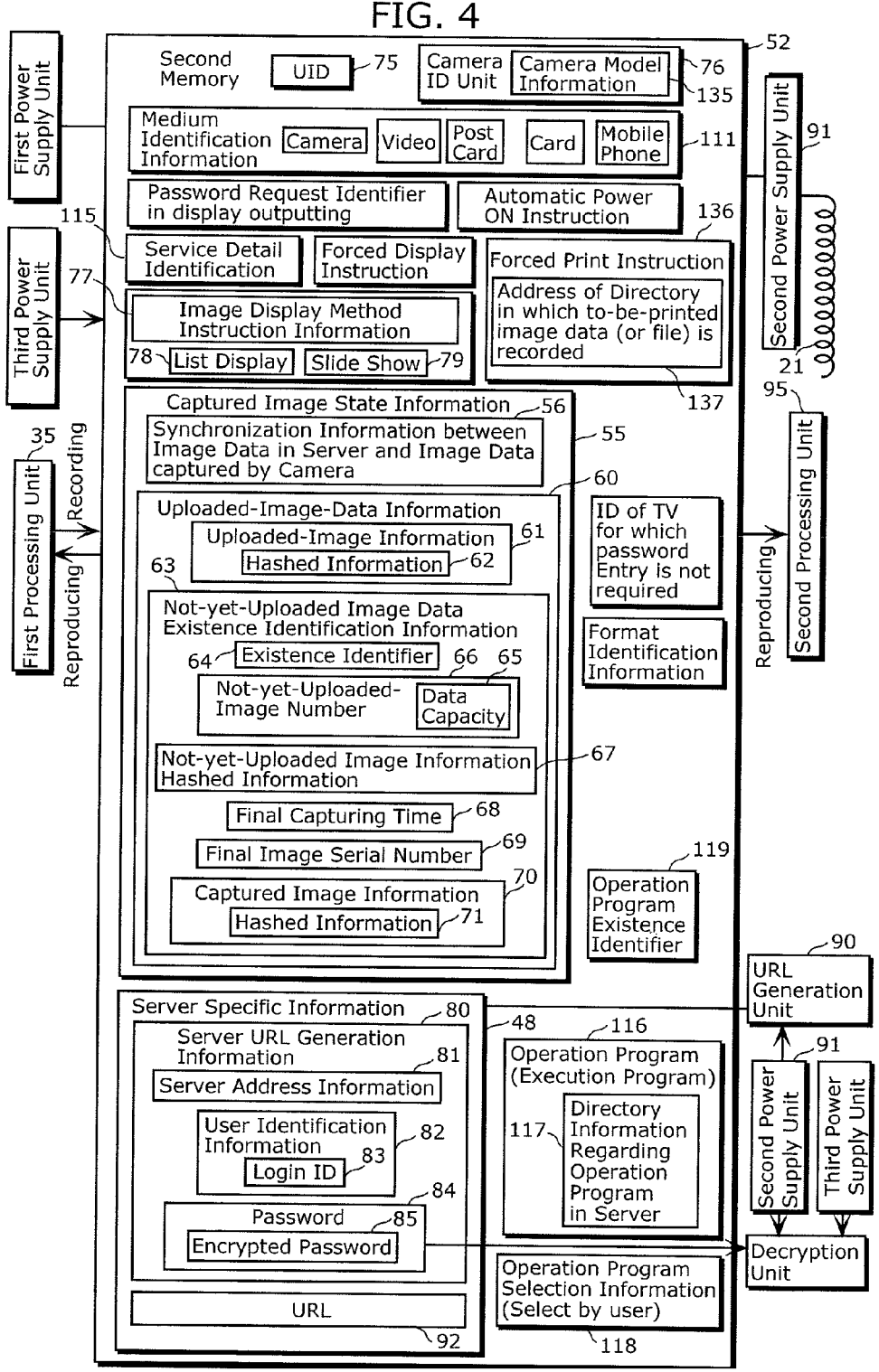
FIG. 4 is a block diagram of a second memory in the image capturing device according to the first embodiment of the present invention.

As still another method, uploaded-image-data information 60 in FIG. 4 can be used. In uploaded-image-data information 60, uploaded-image information 61 such as serial numbers of photographs, is recorded. It is also possible to use hashed information 62 generated by hashing the information 61. As a result, a data amount is reduced.

The TV 45 can read the above information to be compared to information of images captured by the camera, thereby obtaining information of images not yet been uploaded.

As still another method, not-yet-uploaded image data existence identification information 63 can be used. The not-yet-uploaded image data existence identification information 63 includes an existence identifier 64 indicating whether or not there is any image not yet been uploaded. Since existence of images not yet been uploaded is notified, data in the second memory 52 can be significantly reduced.

It is also possible to use not-yet-uploaded-image number 65 indicating the number of images not yet been uploaded. Since the image capturing device 1 allows the TV 45 to read the information, a viewer can be informed of the number of images to be uploaded. In this case, a data capacity in addition to the number is recorded as the captured image state information 55. Thereby, the image capturing device 1 enables the TV 54 to display a more exact prediction time required to upload images not yet been uploaded.

It is also possible to use not-yet-uploaded image information hashed information 76 that is generated by hashing information regarding images not yet been uploaded.

In addition, it is also possible to record a final capturing time (final capturing date/time) 68 in the second memory 52. Later, the TV 45 reads the final capturing time 68. The TV 45 is connected to the server 42 to compare the final capturing time 68 to a capturing date of an image that has been finally uploaded to the server 42. Thereby, it is possible to easily determine whether or not there is any image not yet been uploaded. If images are captured and assigned with serial numbers sequentially from an older image, it is possible to record only a final image serial number 69. The final image serial number 69 is compared to a serial number of an image that has been finally uploaded to the server 42. Thereby, it is possible to determine whether or not there is any image not yet been uploaded. It is also possible to record, onto the second memory 52, captured image information 70 that is, for example, serial numbers of all captured images. Thereby, the TV 45 later accesses the server 42 to match the serial numbers to images uploaded to the server 42. As a result, it is possible to determine whether or not there is any image not yet uploaded. When the captured image information 70 is used, use of hashed information 71 generated by hashing the captured image information 70 can compress the captured image information 70.

The second memory 52 further stores Unique IDentification (UID) 75 of the RF-ID unit, camera ID 76, and the medium identification information 111. Even if the main power of the camera (except a sub-power for backup etc. of a clock) is OFF, these pieces of information can be read by the TV 45 via the second antenna 21 to be used for identifying the camera or the user or authenticating a device (apparatus). When the user comes back from an overseas trip or the like, the camera is likely to have a small charge amount of the battery. However, according to the first embodiment of the present invention, the camera can be operated to transmit information without battery, which is highly convenient for the user. The medium identification information 111 includes an identifier or the like indicating whether the medium or device embedded with the RF-ID unit is a camera, a camcorder, a post card, a card, or a mobile phone. The identifier enables the TV 45 to identify the medium or device. Thereby, the TV 45 can display a mark or icon of the camera or postcard on a screen as illustrated in FIG. 22, as will be described. The TV 45 can also change processing depending on the identifier.

Figure 5:
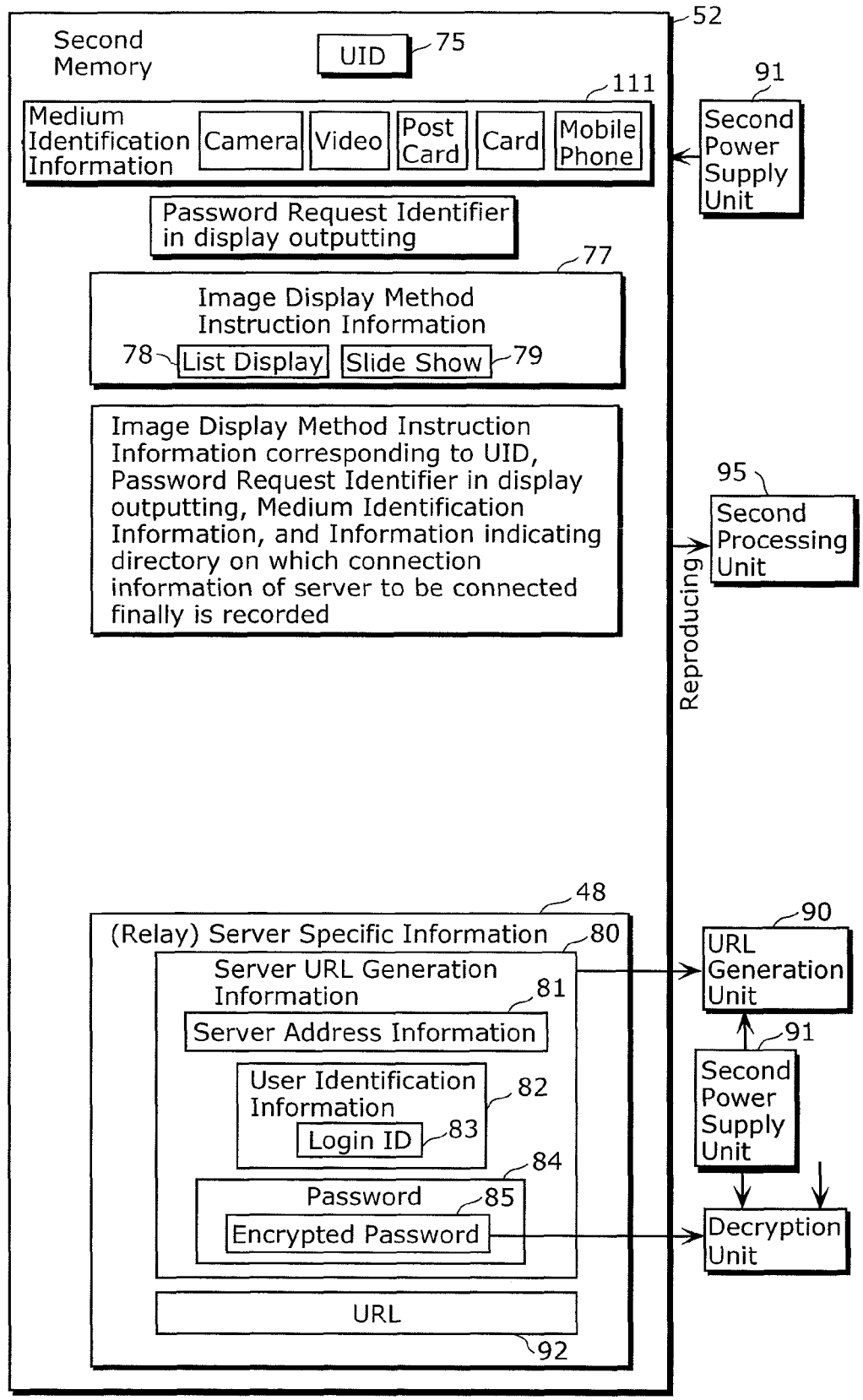
FIG. 5 is a block diagram of the second memory in the image capturing device according to the first embodiment of the present invention.

The second memory 52 also stores image display method instruction information 77. For example, in the situation where a list display 78 in FIG. 5 is selected, when the second antenna 21 is moved into proximity of the RF-ID reader/writer 46 of the TV 45, the image capturing device 1 (camera) causes the TV 45 to display a list of thumbnails of images, such as photographs.

In the situation where slide show 79 is selected, the image capturing device 1 causes the TV 45 to sequentially display images from a newer one or an older one.

In a lower part of the second memory 52 in FIG. 4, there is a region for recording the server specific information 48.

The server specific information 48 allows a camera operator to display images on the TV screen by a preferred method.

The server specific information 48 includes server URL generation information 80 that is source information from which a server URL is generated. An example of the server URL generation information 80 is login ID 183. The server specific information 48 has a region in which server address information 81 and user identification information 82 are recorded. In practical, login ID 83 and the like are recorded. In addition, there is a region for storing a password 84. An encrypted password 85 may be stored in the region. The above pieces of information are used to generate an URL by a URL generation unit 90 that is provided in the image capturing device 1, the RF-ID unit, the camera function used for capturing images in the image capturing device 1, or the TV 45. The URL is used for accessing a group of images corresponding to the image capturing device 1 or the user in the server 42. If the URL generation unit 90 is provided in the RF-ID unit 47, the URL generation unit 90 receives power from the second power supply unit 91.

It is also possible to generate URL 92 without using the above pieces of information and store the generated URL 92 directly to the second memory 52.

It is characterized in that the above-described pieces of information stored in the second memory 52 can be read by both the second processing unit 95 in the RF-ID unit and the first processing unit 35 in the camera function.

The above structure allows the TV 45 reading the RF-ID unit 47 in the camera to instantly obtain the pieces of information regarding uploading state, the sever address information, the login ID, the password, and the like. Thereby, the TV 45 can download image data corresponding to the camera from the server 42, and display the image data at a high speed.

In the above situation, even if the main power of the image capturing device 1 is OFF, the RF-ID reader/writer supplies power to the second power supply unit 91 to activate (operate) the image capturing device 1. Therefore, power of the battery 100 in the image capturing device 1 is not reduced.

Referring back to FIG. 3, the first power supply unit 101 receives power from the battery 100 to provide power to the units in the camera. In a quiescent state, however, a third power supply unit 102 provides weak power to the clock 103 and the like. In some cases, the third power supply unit 102 supplies backup power to a part of the second memory 52.

The RF-ID unit 47 receives power from the second antenna to provide power to the second power supply unit 91, thereby operating the second processing unit 95, or operating a data receiving unit 105, a recording unit 106, a reproducing unit 107, a data transfer unit 108 (the communication unit 171), and the second memory 52.

Therefore, in a quiescent state of the camera, no power is consumed. As a result, it is possible to keep the battery 100 of the camera longer.

The processing performed by the image capturing device 1 (referred to also as a "medium" such as a camera or card) and the processing performed by the TV and the RF-ID reader/writer are explained with reference to a flowchart of FIG. 7.

Figure 7:
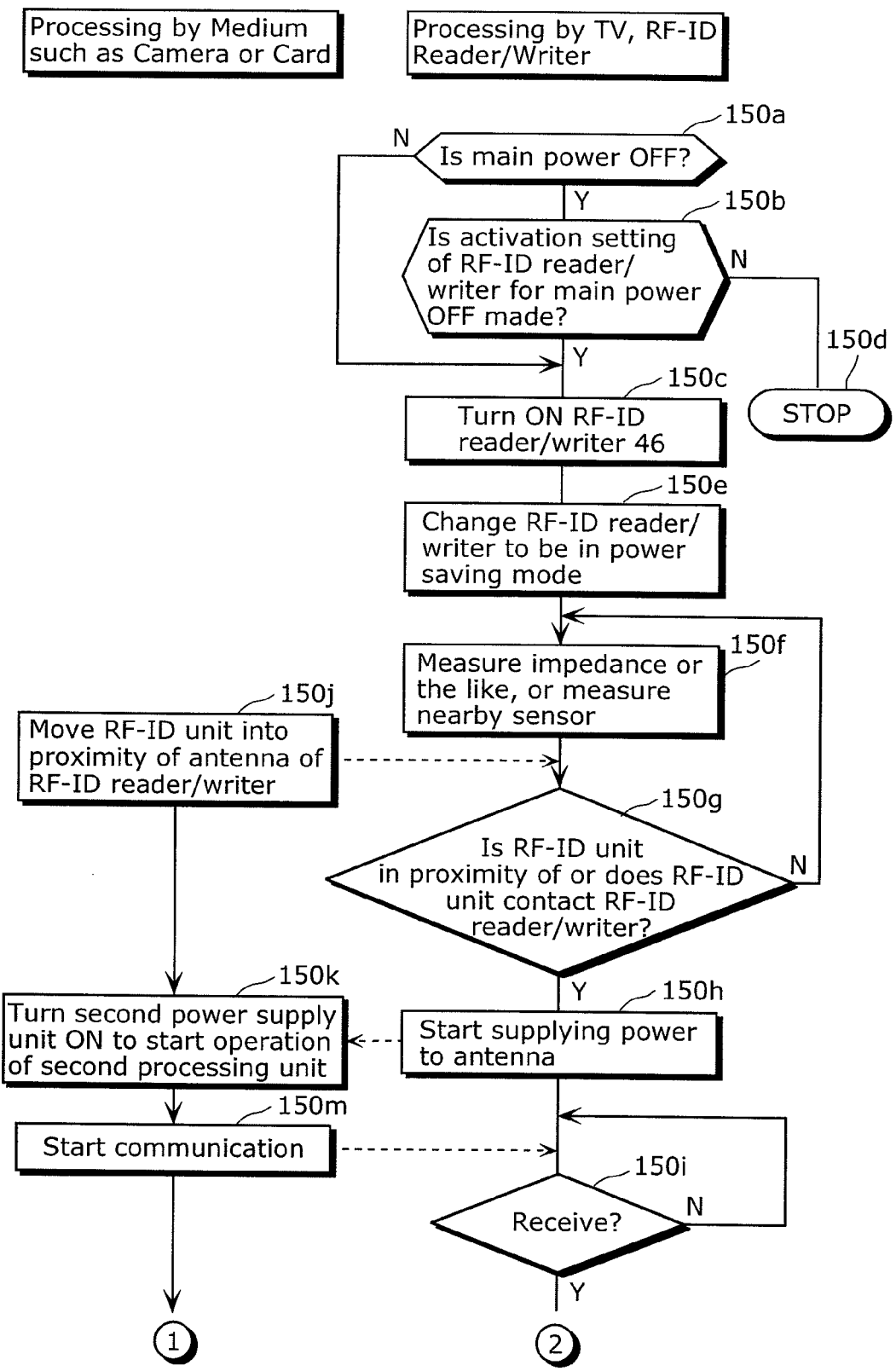
FIG. 7 is a flowchart of processing performed by the image capturing device and a TV, according to the first embodiment of the present invention.

If the main power is OFF at Step 150a in FIG. 7, it is determined at Step 150b whether or not activation setting of the RF-ID reader/writer for the main power OFF is made. If the activation setting is made, then the RF-ID reader/writer 46 is turned ON at Step 150c and changed to be in a power saving mode at Step 150e.

At Step 150f, impedance or the like of an antenna unit is measured, or a nearby sensor is measured. When the RF-ID unit is moved into proximity of an antenna of the RF-ID reader/writer 46 at Step 150j, it is detected at Step 150g whether or not the RF-ID unit is in proximity of or contacts the antenna. If it is detected that the RF-ID unit is in proximity of or contacts the antenna, then the RF-ID reader/writer 46 starts supplying power to the antenna of the medium at Step 150h. At Step 150k, in the medium, the second power supply unit is turned ON and thereby the second processing unit starts operating. As Step 150m, communication between the medium (camera or card) and the RF-ID reader/writer 46 starts.

When At Step 150i, the TV determines whether or not the RF-ID reader/writer 46 receives communication from the medium. If the RF-ID reader/writer 46 receives communication, then mutual authentication starts at Steps 151a and 151f in FIG. 8. If it is determined at Steps 151b and 151g that the mutual authentication is successful, information is read out from the second memory at Step 151d. At Step 151e, the readout information is transmitted to the RF-ID reader/writer 46. At Step 151i, the RF-ID reader/writer 46 receives the information. At Step 151j, the TV 45 side makes a determination as to whether or not the identification information or the like of the second memory is correct. If the identification information or the like is correct, then it is determined at Step 151p whether or not the TV 45 has identification information indicating automatic power ON. If the TV 45 has identification information, then it is determined at Step 151r whether or not a main power of the TV is OFF. If the main power of the TV is OFF, the main power of the TV is turned ON at Step 152a of FIG. 9. At Step 152b, the TV 45 side makes a determination as to whether or not the second memory has forced display instruction. If the second memory has the forced display instruction, then the TV 45 side changes an input signal of the TV to a screen display signal for displaying the RF-ID at Step 152a. At Step 152e, the RF-ID reader/writer 46 reads format identification information. At Step 152f, the RF-ID reader/writer 46 reads information from the second memory by changing a format of the information to a format according to the format identification information. At Step 152g, the TV 45 side makes a determination as to whether or not the second memory has a "password request flag". If the second memory has the "password request flag", then the RF-ID reader/writer 46 reads an "ID of TV not requesting password entry" from the second memory. At Step 152i, the TV 45 side makes a determination as to whether or not ID of the TV 45 matches the "ID of TV not requesting password entry". If the ID of the TV 45 does not match the "ID of TV not requesting password entry", then the medium reads out a password from the second memory at Step 152q. At Step 152v, the medium decrypts the password that has been encrypted. At Step 152s, the medium transmits the decrypted password to the TV 45 side. Here, at Steps 152q, 152r, and 152s, it is also possible to store the password in a storage device in the server 42 as the data 50 in the server 42.

At Step 152j, the RF-ID reader/writer 46 receives the password. At Step 152k, the TV 45 displays a password entry screen. At Step 152m, the TV 45 determines whether or not the input password is correct. The determination may be made by the server 42. If the determination is made that the input password is correct, then the TV 45 performs display based on the information and program read from the second memory in the RF-ID unit at Step 152p.

Figure 10:
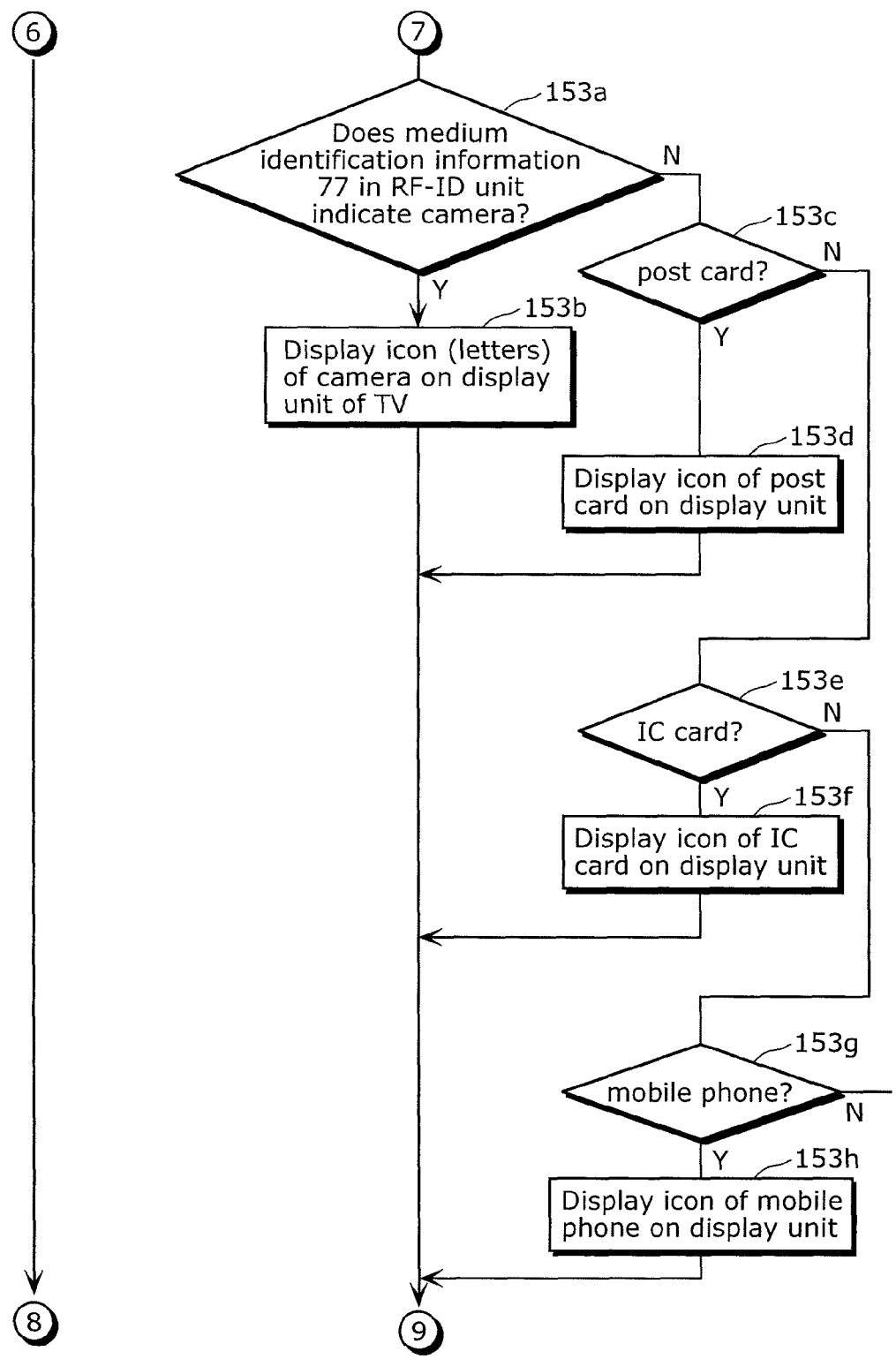
FIG. 10 is a flowchart of the processing performed by the image capturing device and the TV, according to the first embodiment of the present invention.

At Step 153a of FIG. 10, the TV 45 side determines whether or not the medium identification information 111 in the RF-ID unit in the second memory indicates that the medium is a camera. If the medium identification information 111 indicates a camera, then the TV 45 displays an icon (characters) of a camera (camera icon) on the display unit at Step 153b. On the other hand, if the medium identification information 111 does not indicate a camera, then it is determined at Step 153c whether or not the medium identification information 111 indicates a post card. If the medium identification information 111 indicates a post card, then the TV 45 displays an icon of a post card (post-card icon) at Step 153d. On the other hand, if the medium identification information 111 does not indicate a post card, the TV 45 further determines at Step 153e whether or not the medium identification information 111 indicates an IC card. If the medium identification information 111 indicates an IC card, then the TV 45 displays an icon of an IC card at Step 153f. On the other hand, if the medium identification information 111 does not indicate an IC card, the TV 45 still further determines at Step 153g whether or not the medium identification information 111 indicates a mobile phone. If the medium identification information 111 indicates a mobile phone, then the TV 45 displays an icon of a mobile phone on a corner of the TV screen at Step 153h.

Figure 11:
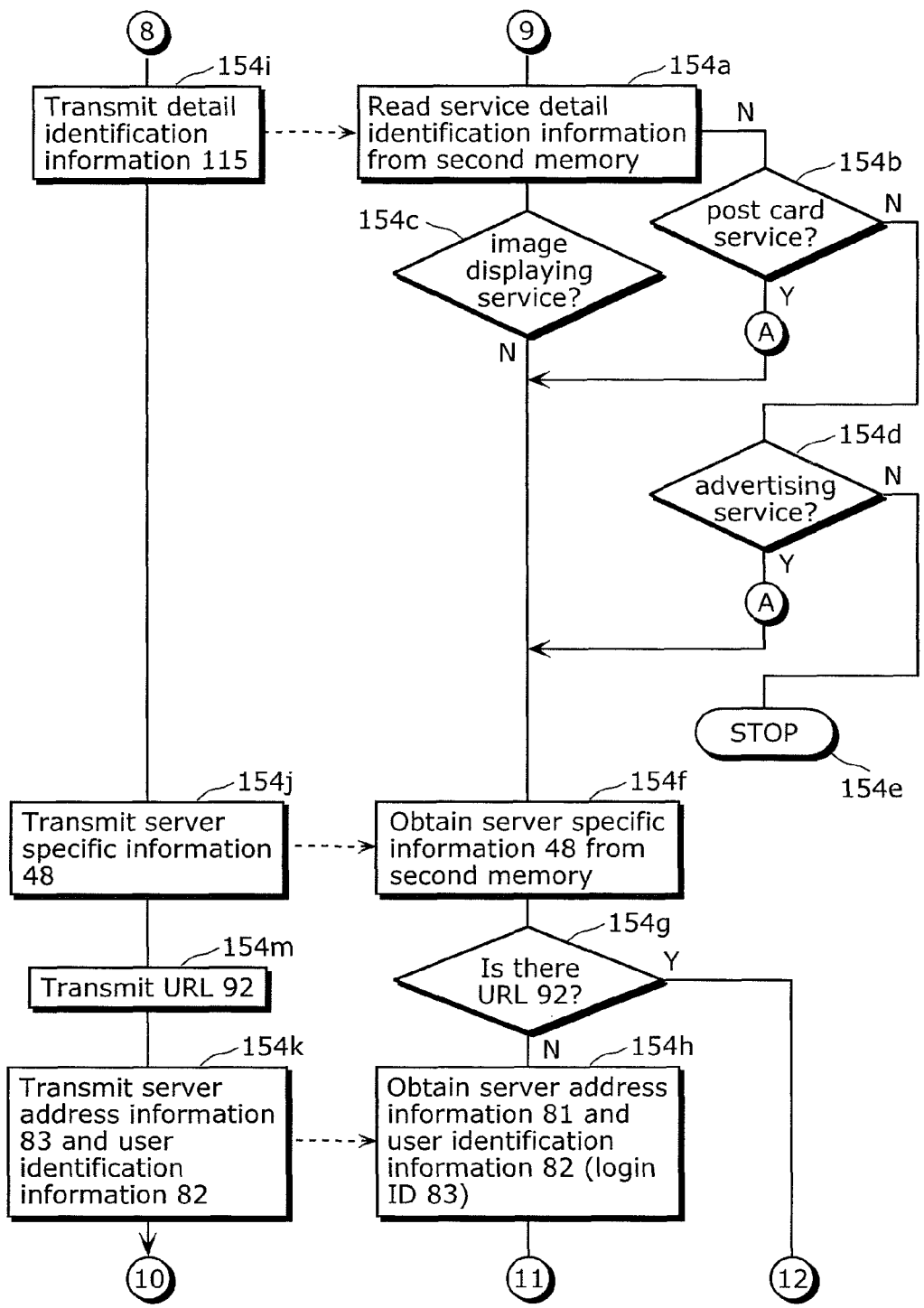
FIG. 11 is a flowchart of the processing performed by the image capturing device and the TV, according to the first embodiment of the present invention.
Figure 12:
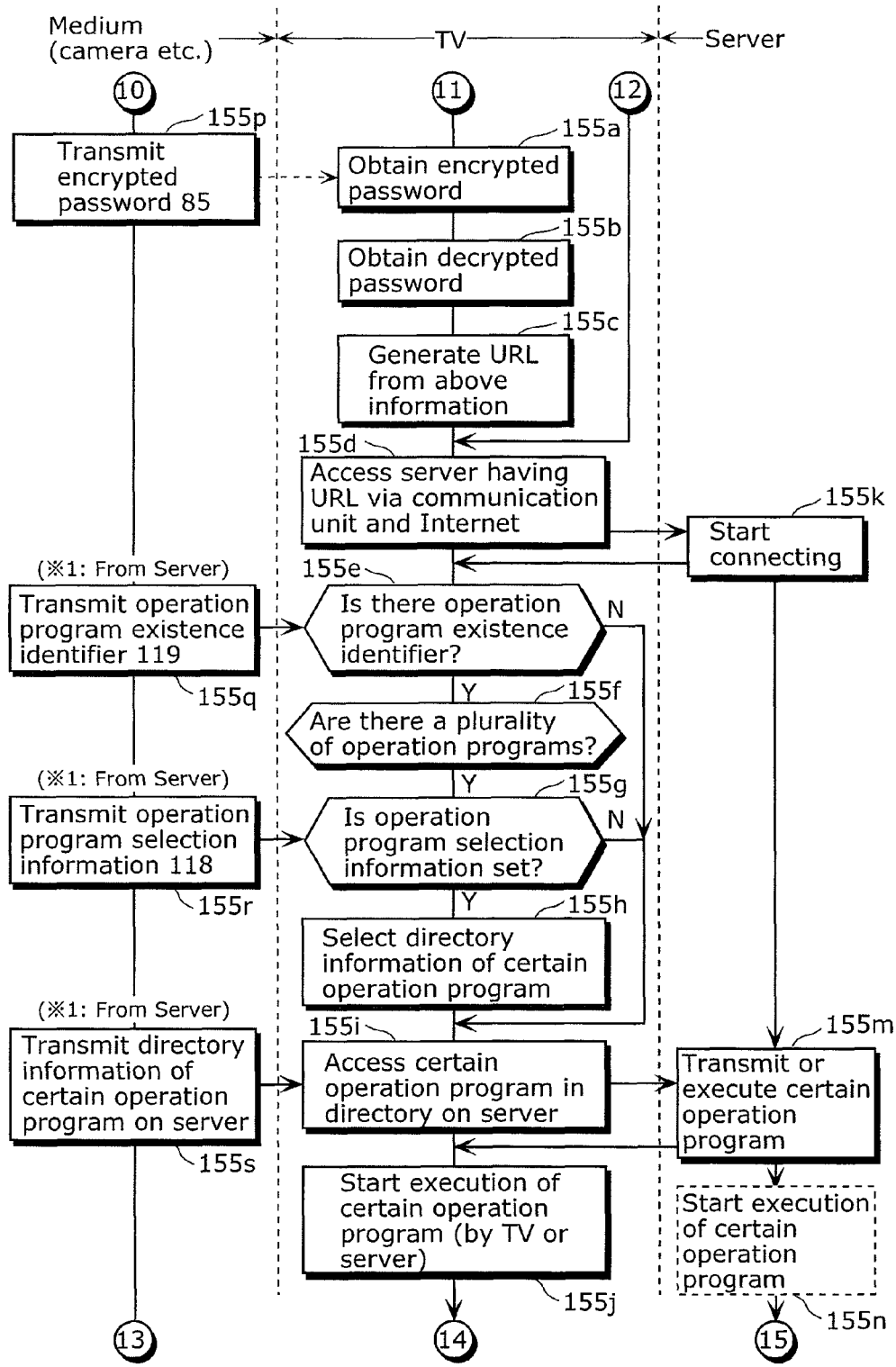
FIG. 12 is a flowchart of the processing performed by the image capturing device and the TV, according to the first embodiment of the present invention.
Figure 13:
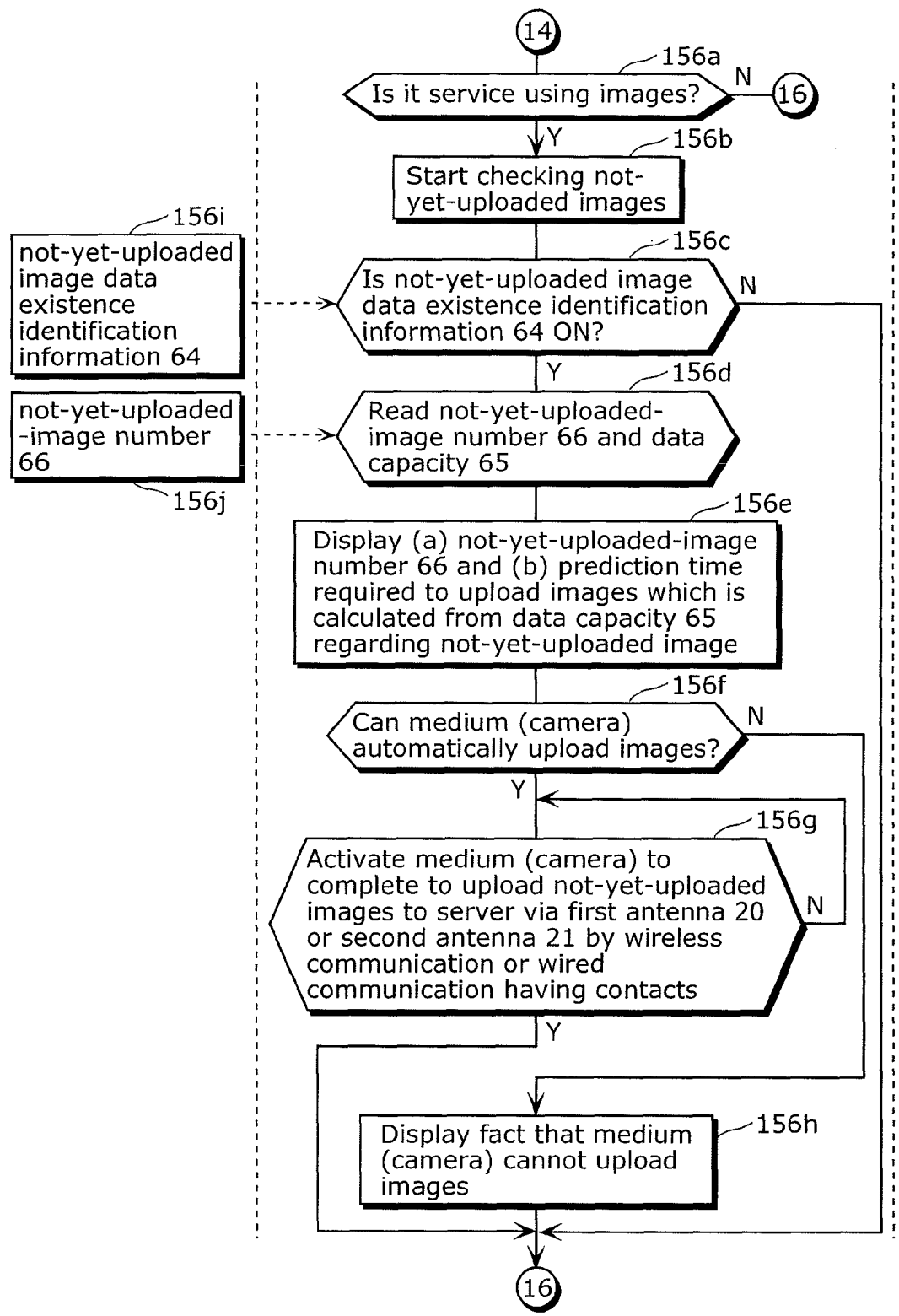
FIG. 13 is a flowchart of the processing performed by the image capturing device and the TV, according to the first embodiment of the present invention.

At Steps 154a and 154i of FIG. 11, the RF-ID reader/writer 46 reads service detail identification information from the server or the second memory. At Step 154c, the TV 45 side determines whether or not the service detail identification information indicates image display service. At Step 154b, the TV 45 side determines whether or not the service detail identification information indicates a post card service such as direct mail. At Step 154d, the TV 45 side determines whether or not the service detail identification information indicates advertising service. At Steps 154f and 154j, the RF-ID reader/writer 46 obtains the server specific information 48 from the second memory of the medium. At Step 154g, the TV 45 side determines whether or not the second memory stores the URL 92. If the second memory does not store the URL 92, then the processing proceeds to Steps 154h and 154k at which the TV 45 obtains the server address information 81 and the user identification information 82 from the second memory. At Steps 155a and 155p, the TV obtains an encrypted password from the second memory. At Steps 155b, the TV decrypts the encrypted password. At Step 155c, the TV generates URL from the above pieces of information. At Step 155d, even if the second memory stores the URL 92, the TV accesses the server having the URL via the communication unit and the Internet. At Step 155k, the TV starts being connected to the server 42. At Step 155q, the medium reads out operation program existence identifier 119 from the second memory. At Step 155e, the TV determines whether or not the TV has any operation program existence identifier. If the TV has any operation program existence identifier, it is further determined at Step 155f whether or not there are plurality of operation programs. If there are a plurality of operation programs, then the TV reads operation program selection information 118 from the second memory. At Step 155g, the TV determines whether or not the operation program selection information 118 is set. If the operation program selection information 118 is set, the TV selects directory information of a specific operation program at Step 155h. At Step 155s, the medium reads out directory information 117 of the specific operation program from the server and provides the directory information 117 to the TV. At Step 155i, the TV accesses the specific operation program in the directory on the server. At Step 155m, the server provides the specific operation program to the TV or executes the specific operation program on the server at Step 155n. At Step 155j, the TV (or the server) starts execution of the specific operation program. At Step 156a of FIG. 13, the TV determines whether or not the specific operation program is service using images. If the specific operation program is service using images, then the TV starts checking images not yet been uploaded at Step 156b.

Figure 6:
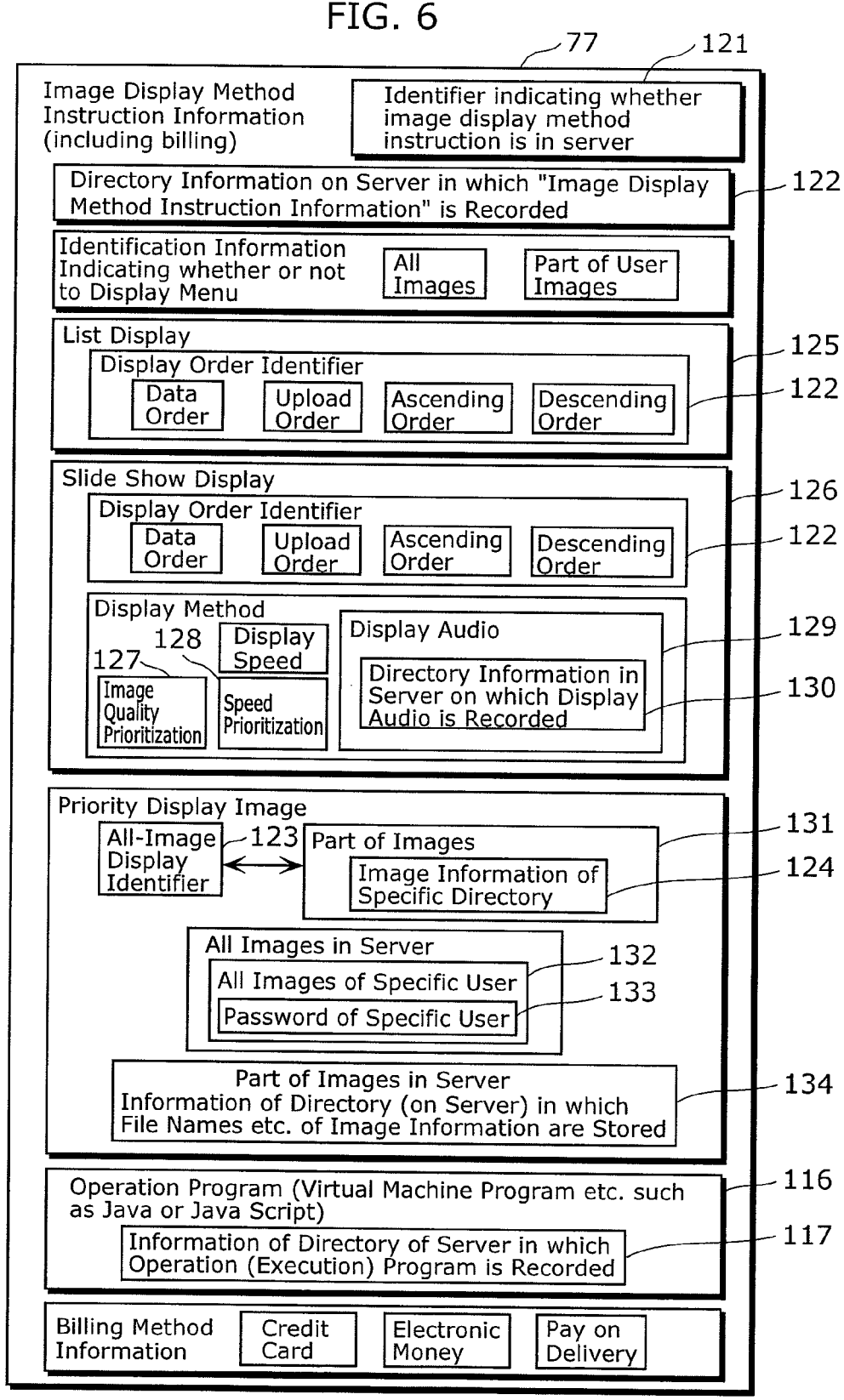
FIG. 6 is a block diagram of image display method instruction information of the image capturing device according to the first embodiment of the present invention.
Figure 14:
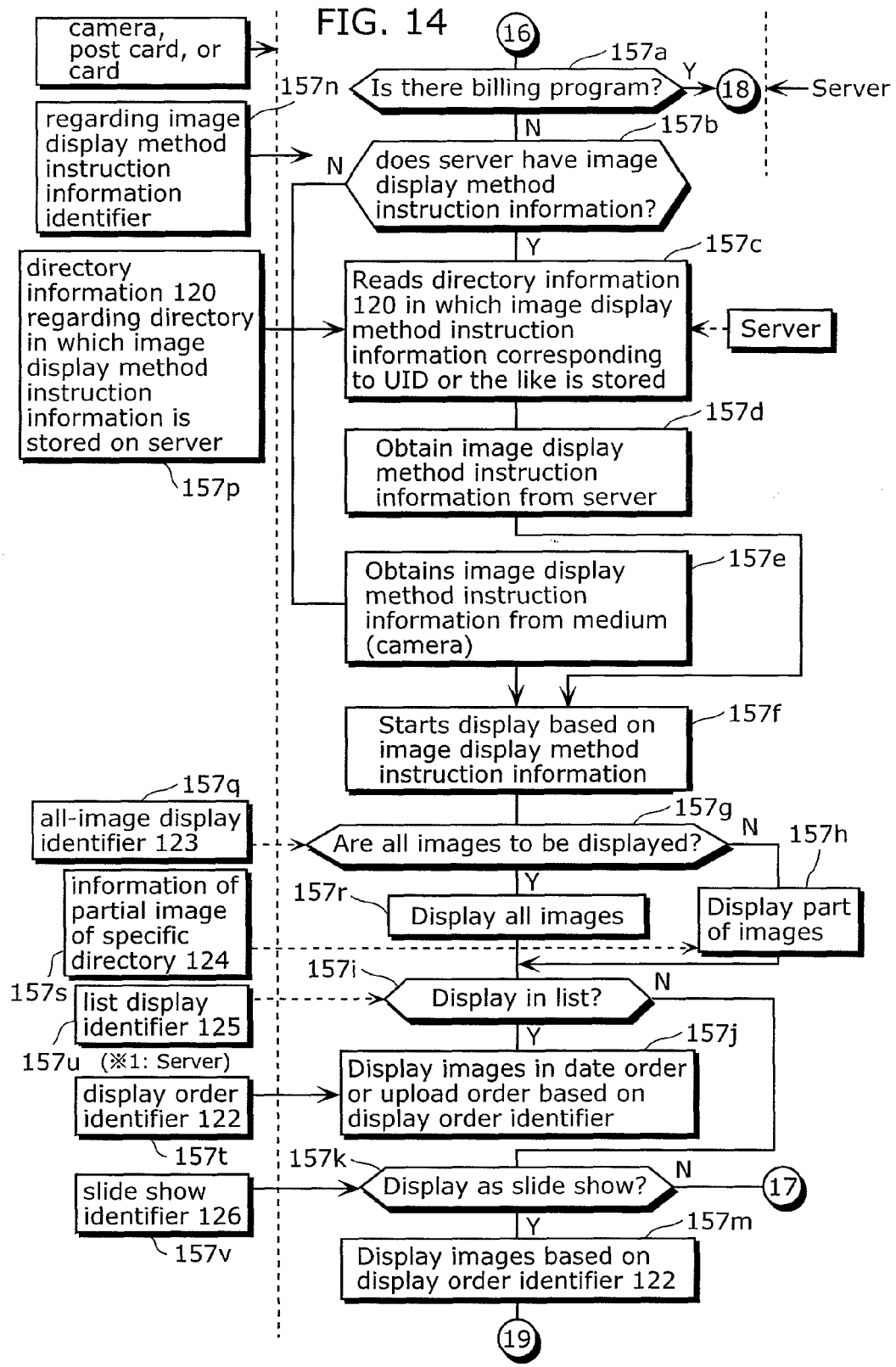
FIG. 14 is a flowchart of the processing performed by the image capturing device and the TV, according to the first embodiment of the present invention.

At Step 156i, the TV reads the not-yet-uploaded image data existence identification information 64 from the medium. At Step 156c, the TV determines whether or not the not-yet-uploaded image data existence identification information 64 indicates that there is any image not yet been uploaded. If there is any image not yet been uploaded, the TV reads the not-yet-uploaded-image number 66 and the data capacity 65 from the medium at Step 156d. At Step 156e, the TV displays (a) the not-yet-uploaded-image number 66 and (b) a prediction time required to upload images which is calculated from the data capacity 65 regarding image not yet been uploaded. At Step 156f, the TV determines whether or not the medium (camera) is in a state where the medium can automatically upload images. If the medium can automatically upload images, then at Step 156g, the TV activates the medium (camera) to upload images not yet been uploaded to the server via the first antenna 20 or the second antenna by wireless communication or wired communication having contacts. When Step 156g is completed, the processing proceeds to Step 157a of FIG. 14. At Step 157a, the TV determines whether or not there is a billing program. If there is no billing program, then at Step 157n, the TV reads identifier 121 regarding the image display method instruction information which is shown in FIG. 6. At Step 157b, the TV determines whether or not the server has the image display method instruction information. If the server has image display method instruction information, then at Step 157p, the TV reads, from the medium, directory information 120 regarding a directory in which image display method instruction information is stored on the server. At Step 157c, the TV reads, from the medium, the directory information 120 in which the image display method instruction information corresponding to UID or the like is stored. At step 157d, the TV obtains the image display method instruction information from the server. Then, the processing proceeds to Step 157f.

On the other hand, if the determination is made at Step 157b that the server does not have the image display method instruction information, then the processing proceeds to Step 157e. At Step 157e, the TV obtains the image display method instruction information from the medium (such as a camera). Then, the processing proceeds to Step 157f.

Figure 15:
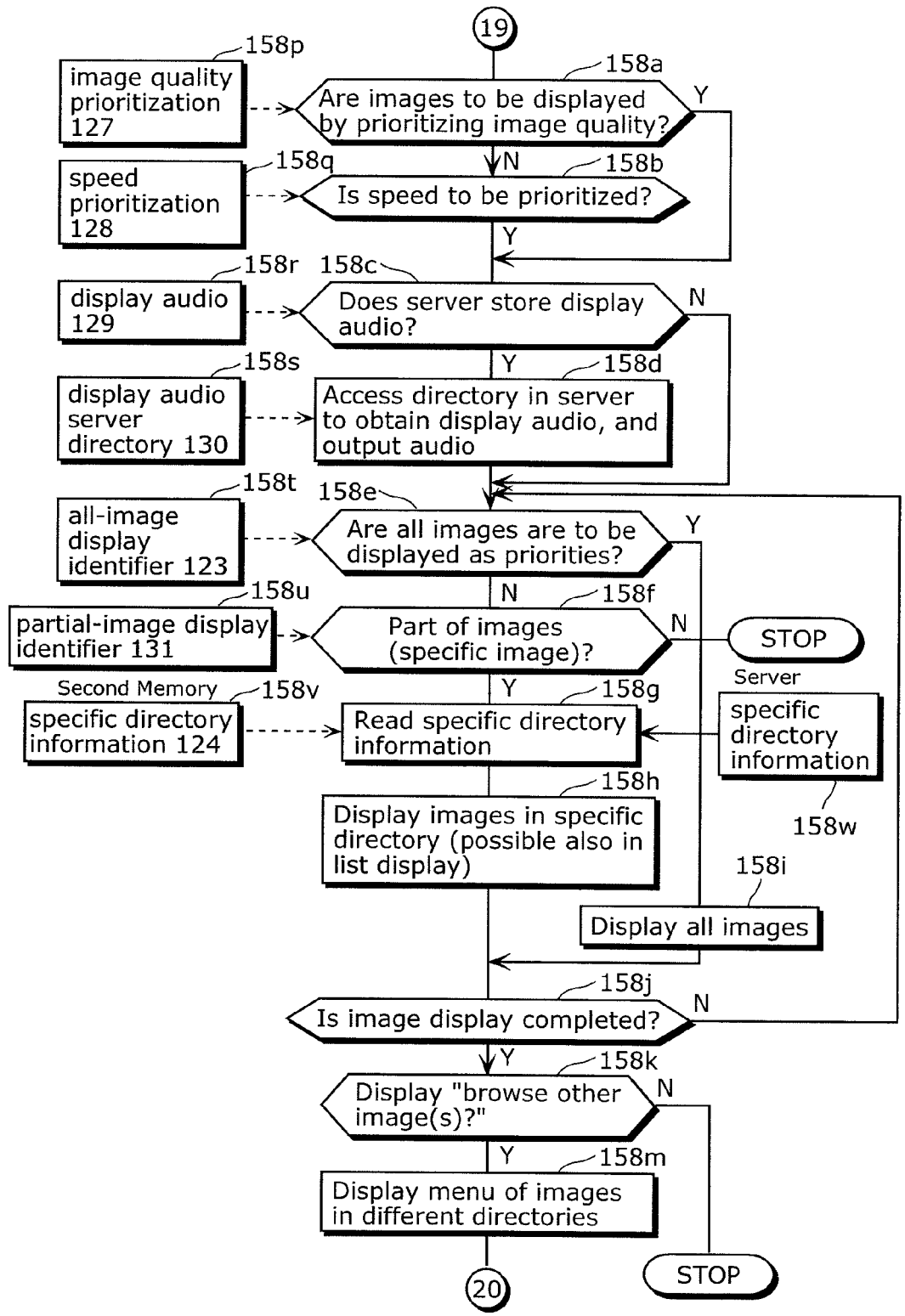
FIG. 15 is a flowchart of the processing performed by the image capturing device and the TV, according to the first embodiment of the present invention.

At Step 157f, the TV starts display of images based on the image display method instruction information. At Step 157q, the TV reads an all-image display identifier 123 from the medium. At Step 157g, the TV determines whether or not the all-image display identifier 123 indicates that all images are to be displayed. If all images are to be displayed, the TV displays all images at Step 157r. On the other hand, if all images are not to be displayed, then at Step 157h, the TV displays a part of images in a specific directory identified by the directory information 124 that is read at Step 157s from the medium. At Step 157i, the TV determines whether or not a list display identifier 125 indicates that images to be displayed in a list. If the images are to be displayed in a list, then the TV reads a display order identifier 122 at Step 157t. At Step 157j, the TV displays the images in a list in a date order or an upload order based on the display order identifier. At Step 157v, the TV reads a slide show identifier 126 from the medium. At Step 157k, the TV determines whether or not the slide show identifier 126 indicates that images are to be displayed as slide show. If the images are to be displayed as a slide show, then at Step 157m, the TV displays the images as slide show based on the display order identifier 122. Then, the TV reads image quality prioritization 127 from the second memory of the medium. At Step 158a of FIG. 15, the TV determines whether or not the image quality prioritization 127 indicates that the images are to be displayed by prioritizing image quality. If the images are not to be displayed by prioritizing image quality, the TV reads speed prioritization 128 from the medium at Step 158q and further determines at Step 158b whether or not the speed prioritization 128 indicates that the images are to be displayed by prioritizing a speed. If a speed is to be prioritized, then the TV determines at Step 158c whether or not the server stores display audio. At Step 158s, the TV reads and checks display audio server directory 130 from the medium. At Step 158d, the TV accesses the directory in the server to obtain the display audio and outputs the audio.

At Step 158e, the TV determines whether or not all images are to be displayed as priorities. If all images are not to be displayed as priorities, then at Step 158f, the TV selects a part of the images. At Steps 158g, the TV reads specific directory information 124 from the medium at Step 158v, and receives images in the specific directory from the server at Step 158w. At Step 158h, the TV displays the images in the specific directory. On the other hand, if it is determined at Step 158e that all images are to be displayed as priorities, then the TV may display all images at Step 158i. At Step 158j, the TV determines whether or not the image display is completed. If the image display is completed, then the TV displays a message "view other image(s)?" at Step 158k. If the user agrees, then the TV displays a menu of images in different directories at Step 158m.

Figure 16:
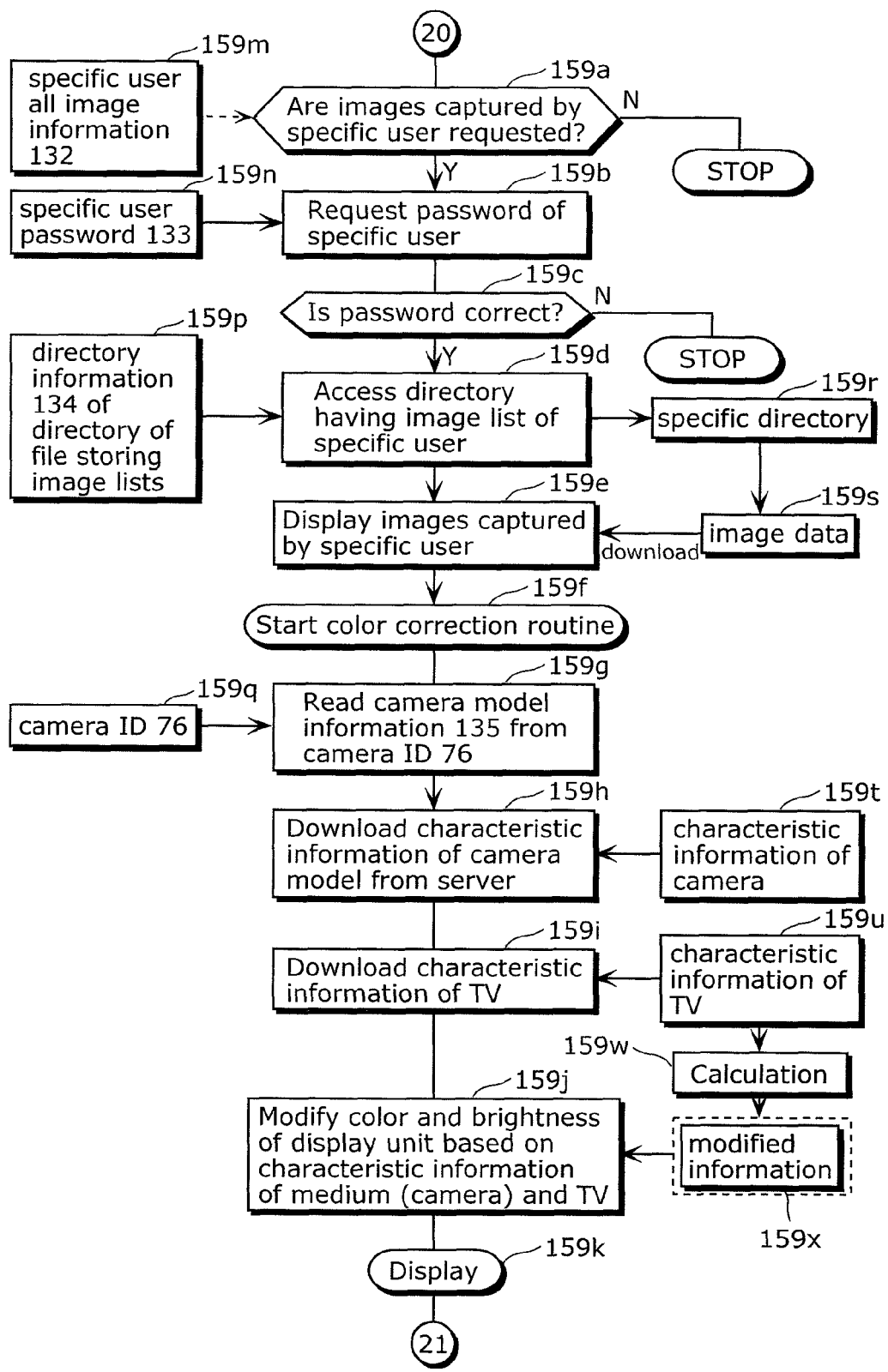
FIG. 16 is a flowchart of the processing performed by the image capturing device and the TV, according to the first embodiment of the present invention.

At Step 159a of FIG. 16, the TV determines whether or not images captured by a specific user are requested. If images captured by a specific user are requested, then at Step 159b, the TV requests the medium to provide (a) specific user all image information 132 at Step 159m and (b) a specific user password 133 that is a password of the specific user. At Step 159c, the TV determines whether or not the password is correct. If the password is correct, then at Step 159*p*, the TV reads directory information 134 of a directory of a file storing an image list from the medium. At Step 159*d*, the TV accesses the server to access a directory having an image list of the specific user. At Step 159*r*, the TV downloads image data in the directory from the server. At Step 159*e*, the TV displays the images captured by the specific user.

At Step 159*f*, the TV starts color correction routine. At Step 159*g*, the TV reads camera model information from the camera ID 76. At Steps 159*h* and 159*t*, the TV downloads characteristic information of the camera model from the server. Then, at Steps 159*i* and 159*u*, the TV downloads characteristic information of the TV from the server. At Step 159*w*, the server calculates the characteristic information to generate modified information. At Step 159*j*, the TV modifies color and brightness of the display unit based on the pieces of characteristic information of the medium (camera) and the TV. At Step 159*k*, the TV displays the images with the modified color and brightness.

Figure 17:
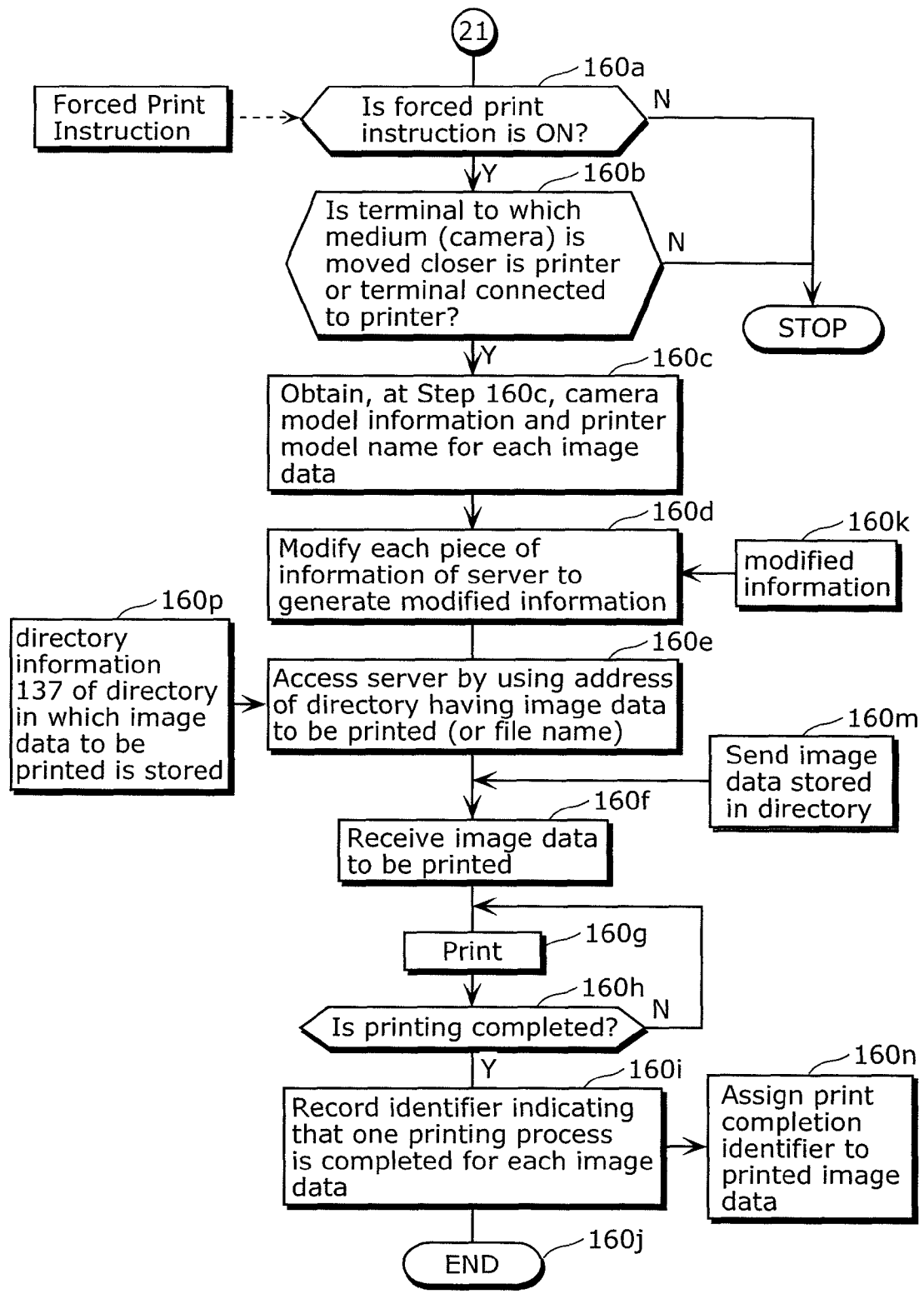
FIG. 17 is a flowchart of the processing performed by the image capturing device and the TV, according to the first embodiment of the present invention.

At Step 160*a* of FIG. 17, the TV determines whether or not forced print instruction is selected. Here, if forced print instruction is selected, it is determined at Step 160*b* whether or not the terminal (the TV in the above example) to which the medium (camera) is moved closer is a printer or a terminal connected to the printer. If the terminal is a printer or a terminal connected to the printer, then the terminal obtains, at Step 160*c*, camera model information of the medium (camera) and a model name of the printer for each image data. At Step 160*d*, the terminal modifies each piece of information of the server to generate modified information. At Step 160*p*, the terminal receives directory information 137 of a directory in which the image data to be printed is stored. At 160*e*, the terminal accesses the server by using an address of the directory having the image data to be printed (or file name). At Step 160*m*, the server sends the image data stored in the directory to the terminal. At Step 160*f*, the TV receives the image data to be printed. At Step 160*g*, the terminal prints the image data. At Step 160*h*, the printing is completed. At Step 160*i*, for each image data, the terminal records, onto the server, an identifier indicating that one printing process is completed. At Step 160*n*, the server assigns a print completion identifier to the image data that is stored in the server and has been printed.

Next, the following describes the situation where the medium such as a camera or a post card does not have a memory for storing data.

Figure 8:
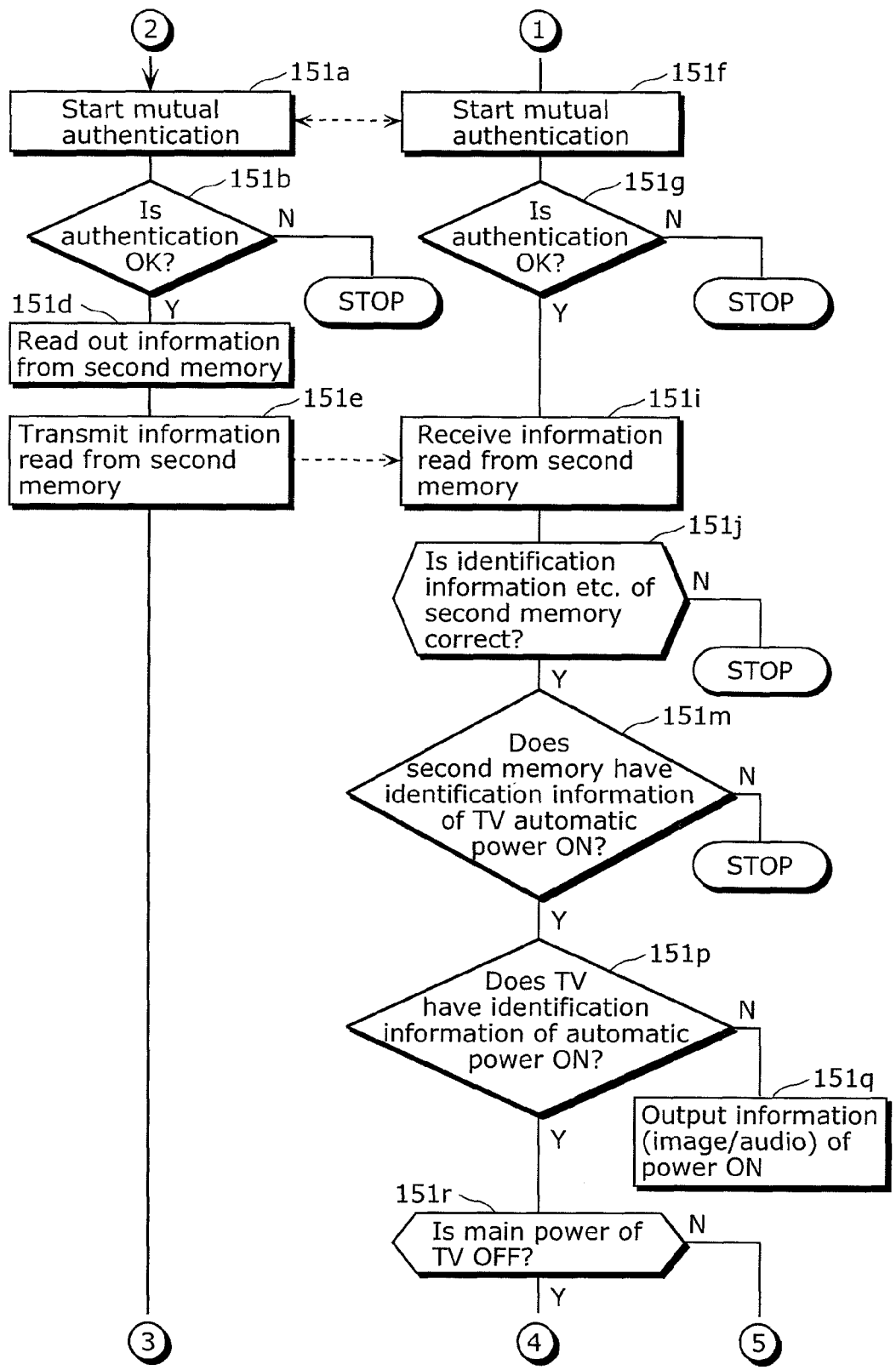
FIG. 8 is a flowchart of the processing performed by the image capturing device and the TV, according to the first embodiment of the present invention.
Figure 9:
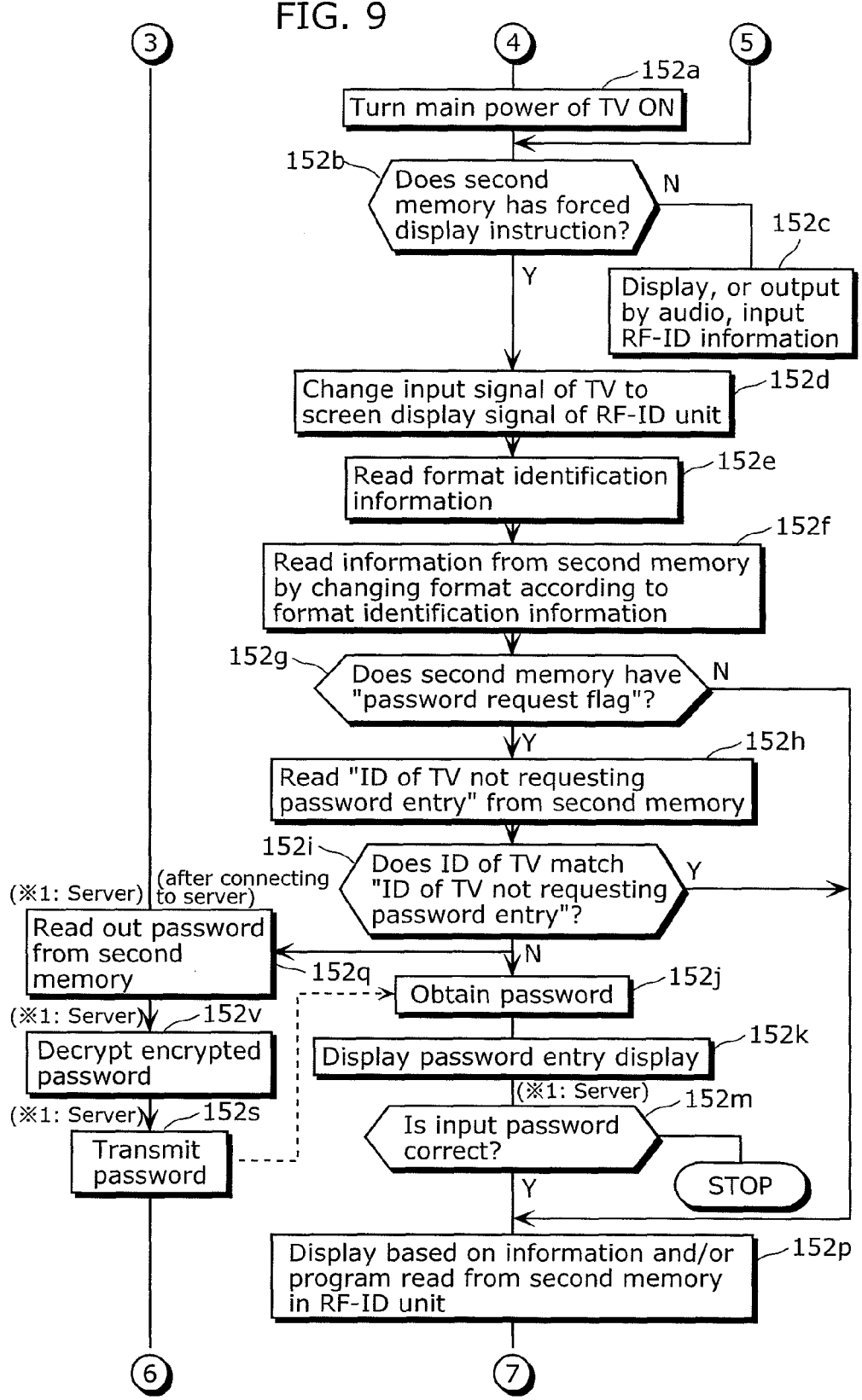
FIG. 9 is a flowchart of the processing performed by the image capturing device and the TV, according to the first embodiment of the present invention.
Figure 18:
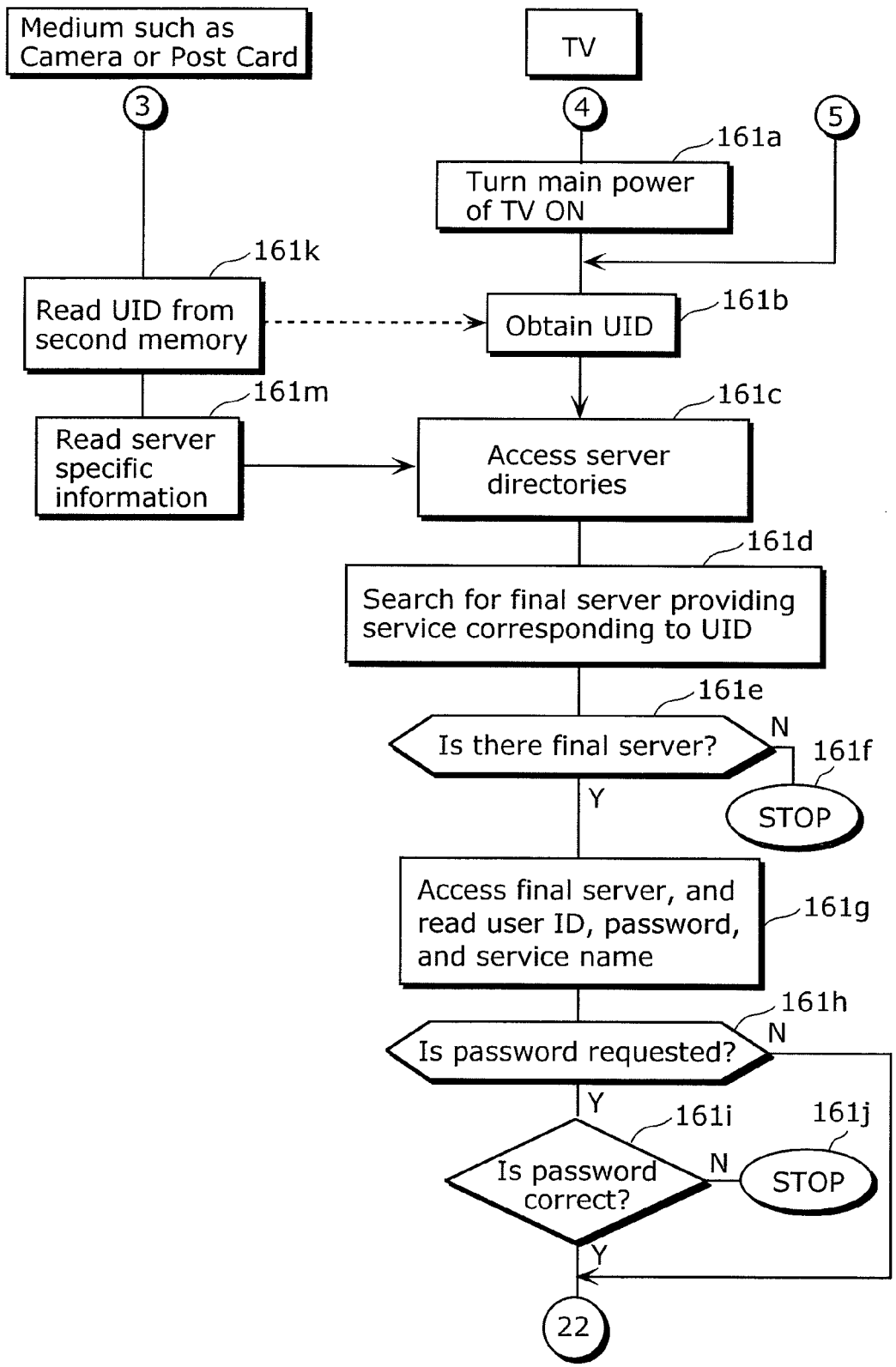
FIG. 18 is a flowchart of the processing performed by the image capturing device and the TV, according to the first embodiment of the present invention.

Steps of FIG. 18 follow the numbers 3, 4, and 5 in circles in FIG. 8. At Step 161*a* of FIG. 18, a main power of the TV is turned ON. At Step 161*k*, the TV reads UID of the RF-ID unit from the second memory. At Step 161*b*, the TV obtains the UID. At Step 161*m*, the TV reads the server specific information 48 from the second memory. At Step 161*c*, the TV accesses a server directory. At Step 161*d*, the TV searches the server directories for a final server providing service corresponding to the UID. At Step 161*e*, the TV determines whether or not such a final server exists. If there is such a final server, then at Step 161*g*, the TV accesses the final server and reads a user ID, a password, and a service name from a UID list at Step 161*g*. At Step 161*h*, the TV determines whether or not a password is requested. If the password is requested, then the TV determines at Step 161*i* whether or not the readout password is correct. At Step 162*a* of FIG. 19, the TV determines whether or not the service is regarding photographs or video. If the service is regarding photographs or video, then at Step 162*b*, the TV reads (i) reads, from a specific directory in the server associated with the UID, (a) a corresponding program such as a billing program, (b) a list including an address or a file name of image data to be displayed, (c) image display instruction information, (d) forced display instruction, (e) forced print instruction, and (f) camera ID, and (ii) automatically displays the image data or causes the image data to be printed, based on the above pieces of information and procedure.

Figure 20A:
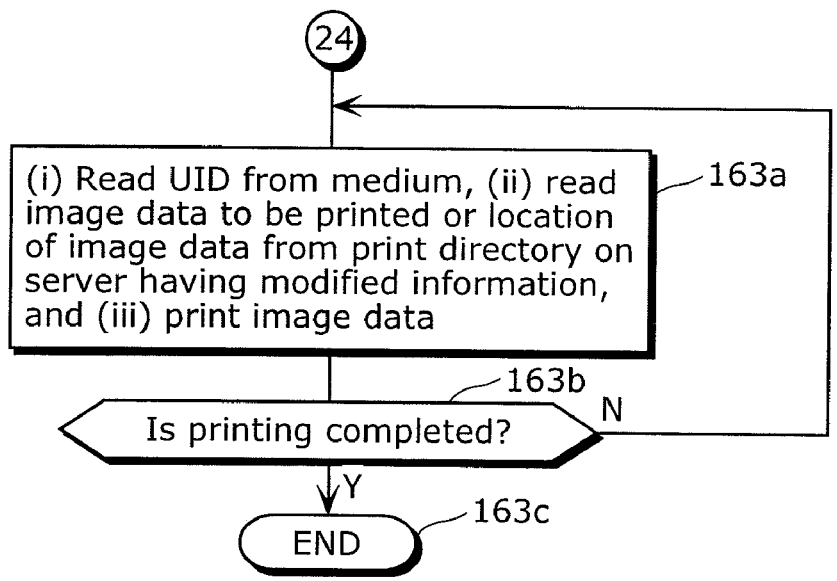
FIG. 20A is a flowchart of the processing performed by the image capturing device and the TV, according to the first embodiment of the present invention.

If needed, password entry is requested at Step 162*b*. At Step 162*c*, the TV determines whether or not the user desires to print a specific image. If the user desires to print a specific image, then at Step 162*d*, the TV adds data of the specific image to the server associated with the UID or to a print directory of the TV. At Step 162*e*, the TV determines whether or not the TV is connected to a printer and there is an independent printer. If so, then, at Step 162*f*, the RF-ID unit of the medium such as a post card is moved into proximity of a RF-ID reader/writer of the printer. At Step 163*a* of FIG. 20A, the printer (i) reads UID of the RF-ID from the medium, (ii) thereby reads image data to be printed or a location of the image data from the print directory on the server having the modified information, and (iii) prints the image data. At Step 163*b*, the printing is completed. Thereby, the above processing is completed.

Figure 19:
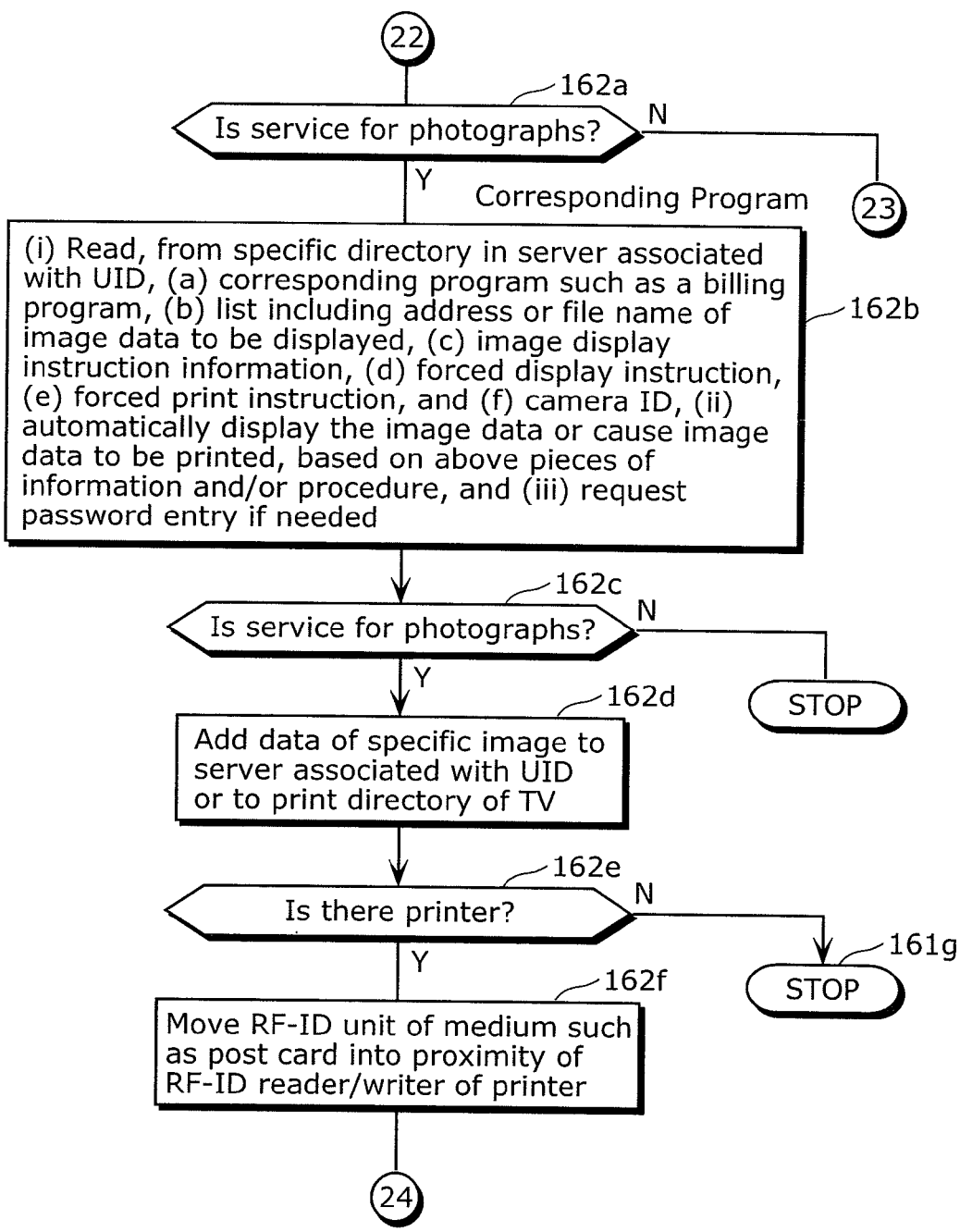
FIG. 19 is a flowchart of the processing performed by the image capturing device and the TV, according to the first embodiment of the present invention.
Figure 20B:
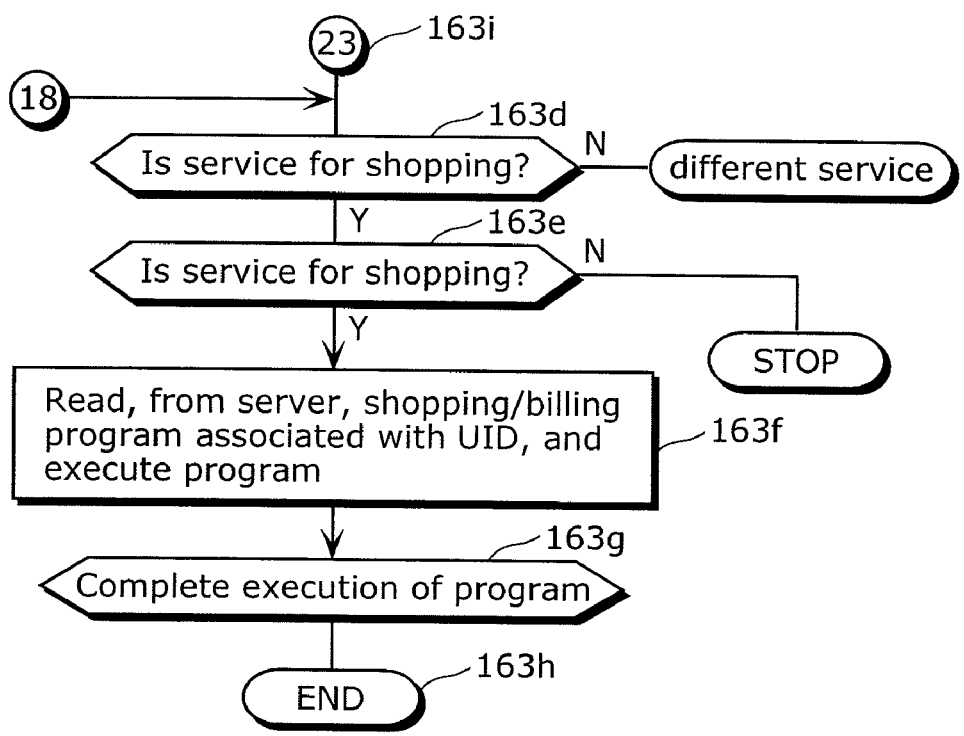
FIG. 20B is a flowchart of the processing performed by the image capturing device and the TV, according to the first embodiment of the present invention.

Step 163*i* of FIG. 20B is the number 23 in FIG. 19. At Step 163*d*, the TV determines whether or not the service is for shopping. If the service is for shopping, then the TV determines at Step 163*e* whether or not authentication is successful. If the authentication is successful, then at Step 163*f*, the TV reads, from the server, a shopping/billing program associated with the UID, and executes the program. At Step 163*g*, the execution of the program is completed. Thereby, the above processing is completed.

Next, the following describes a method of reading information from a RF-ID unit embedded in a postcard without a RF-ID reader.

At Step 164*a* of FIG. 21A, a second RF-ID unit, on which URLs of relay servers are recorded, is attached to or embedded in the medium such as a post card. On the outer surface of the second RF-ID unit, (a) UID of the second RF-ID unit and (b) information for identifying a first URL of a certain relay server are printed to be displayed by a two-dimensional barcode.

At Step 164*b*, there is a camera capable of being connected to a main server. The camera has a first RF-ID unit on which a first URL of the main server is recorded. An image capturing unit in the camera optically reads the two-dimensional barcode, and converts the readout information to information for identifying (a) the UID of a second RF-ID unit in the post card and (b) a second URL of a relay server.

At Step 164*c*, the converted information is recorded onto a memory in the camera.

At Step 164*d*, the camera selects a specific set of images from images captured by the camera, and stores the set of images into a specific first directory in the main server. At the same time, the camera uploads information of first directory (first directory information) as well as the first URL of the main server, a specific second directory in the relay server having the second URL. The camera uploads information for associating the UID of the second RF-ID unit with the second directory, to the relay server having the second URL. At Step 164*e*, the medium such as a post card is mailed to a specific person.

At Step 164*f* of FIG. 21B, the person receiving the post card moves the RF-ID unit of the post card into proximity of a RF-ID reader of a TV or the like. Thereby, the TV reads, from the RF-ID unit, the second URL of the relay server and the UID of the post card.

At Step 164*g*, the TV accesses the relay server having the second URL. Then, the TV reads, from the relay server, (a) a program in the second directory associated with the UID and/or (b) the first URL and the first directory information of the main server on which specific image data is recorded. The TV downloads the image data from the main server. The TV displays the image data on a screen. In the above case, the image capturing unit in the image capturing device according to the first embodiment of the present invention reads information from the two-dimensional bar-code that is generally printed in a product or post card to record server information. Then, the image capturing device records the information read from the two-dimensional bar-code, as digital information, onto the second memory of the RF-ID unit. Thereby, the image capturing device allows a RF-ID reader of a TV to read the information. As a result, even a TV without an optical sensor for two-dimensional bar-codes can indirectly read information of two-dimensional bar-codes and automatically access a server or the like.

FIG. 22A illustrates the situation where display is presented when the image capturing device 1 is moved into proximity of a RF-ID antenna 138 of the TV 45.

When the image capturing device 1 is moved into proximity of the antenna 138, the TV 45 displays a camera icon 140 for notifying of that the medium is a camera in the manner described previously.

Next, since the number (for example, five) of images not yet been uploaded is detected, the TV 45 displays five blank images 142a, 142b, 142c, 142d, and 142e as if these images were taken out from the camera icon 140.

Thereby, the TV 45 displays "tangible" information of images by changing "materials to information". As a result, the user can perceive the information of images by more natural sense.

Regarding images that have been already uploaded to the server, actual images 143a, 143b, and 143c are displayed as tangible data in the same manner as described above.

FIG. 22B illustrates the situation where RF-ID is embedded in a post card 139. Since the RF-ID reader/writer 46 of the TV 45 reads attribute information of the post card from the RF-ID. Thereby, the TV 45 displays a post-card icon 141 at a bottom left corner of the display unit of the TV 45 as illustrated in FIG. 22B. The TV 45 also displays images stored in the server or a menu screen as tangible data in the same manner as described with reference to FIG. 22A.

Next, the following processing is described in detail. By the processing, an operation program 116 illustrated in FIG. 4 is transmitted to the TV 45 illustrated in FIG. 3 that is an apparatus (device) communicating with the RF-ID unit 47 of the image capturing device 1. The communicating device (TV 45) executes the transmitted program.

Figure 23:
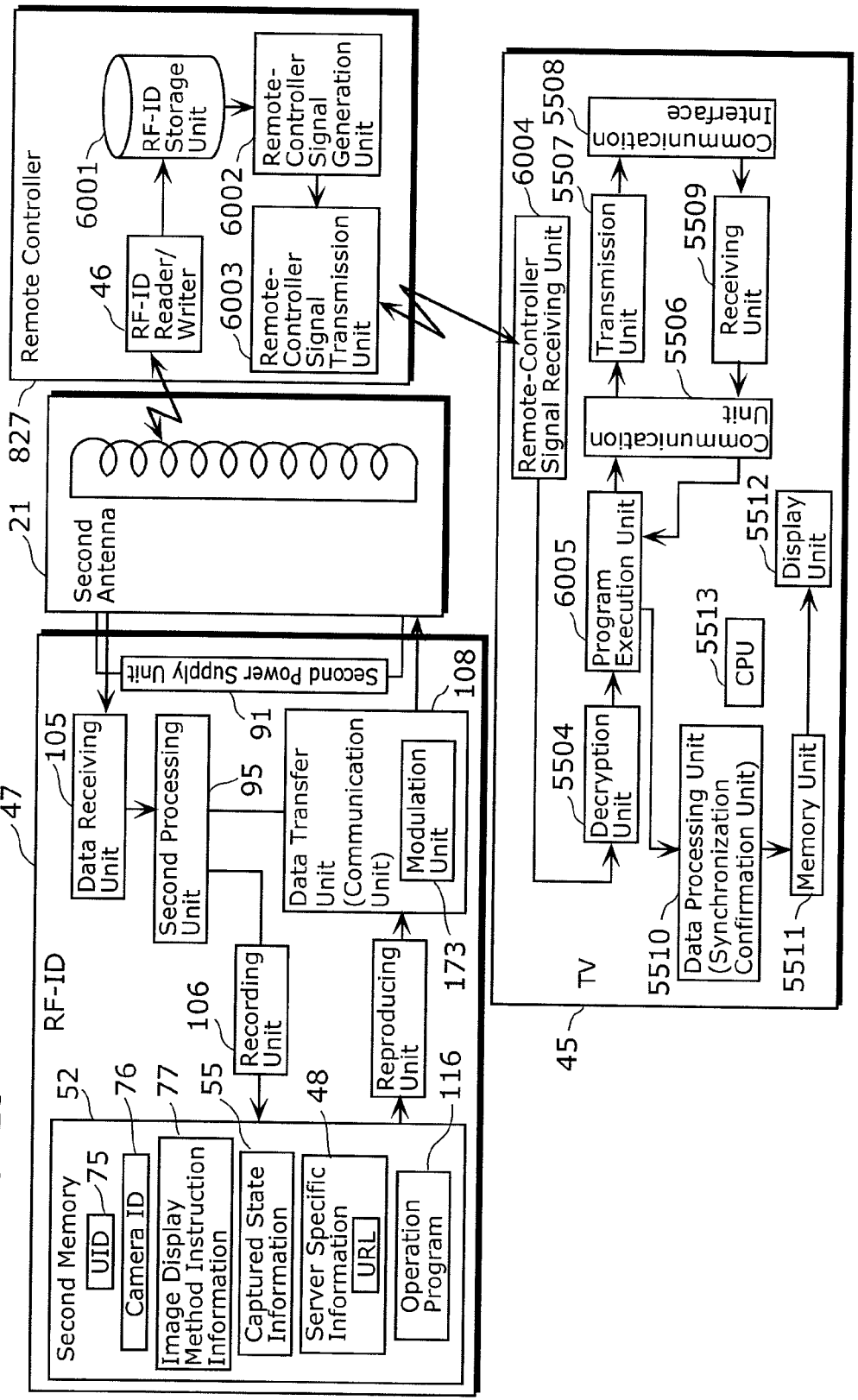
FIG. 23 is a block diagram of a RF-ID unit in the image capturing device for storing an operation program, a remote controller of the TV, and the TV.

FIG. 23 is a block diagram of a configuration in which the apparatus communicating with the RF-ID unit 47 in the image capturing device 1 executes the transmitted program. FIG. 23 illustrates a communication system including a part of the image capturing device 1 (the RF-ID 47 and the second antenna 21), the TV 45, and a remote controller 827 of the TV 45. Here, the image capturing device 1 is implemented as a camera which has the RF-ID unit 47 to perform proximity wireless communication with the RF-ID reader/writer 46. The RF-ID reader/writer 46 is connected to the TV 45 by an infrared communication path. The camera includes the second antenna 21, the data receiving unit 105, the second memory 52, and the data transfer unit 108. The second antenna 21 is used for the proximity wireless communication. The data receiving unit 105 receives, via the second antenna 21, an input signal provided from the RF-ID reader/writer 46. The second memory 52 is a nonvolatile memory holding at least (a) the UID unit 75 that is identification information for identifying the image capturing device 1, and (b) the operation program 116 that is to be executed by the TV 45 with reference to the UID unit 75. The data transfer unit 108 transmits the UID unit 75 and the operation program 116 stored in the second memory 52 to the RF-ID reader/writer 46 via the second antenna 21, according to the input signal received by the data receiving unit 105. The UID unit 75 and the operation program 116 transmitted from the data transfer unit 108 are transmitted to the TV 45 via the data transfer unit 108, the second antenna 21, the RF-ID reader/writer 46, and then the infrared communication path. The following explains the above units in more detail.

The RF-ID unit 47 in the image capturing device 1 has the second memory 52. The second memory 52 holds the operation program 116. The operation program 116 can be executed by the TV 45 communicating with the RF-ID unit. In more detail, the operation program 116 is an example of the program executed by the TV 45 with reference to the identification information of the image capturing device 1. The operation program 116 is, for example, an execution program such as Java™ program, a virtual-machine script program such as Javascript™ program, or the like.

The reproducing unit in the RF-ID unit 47 reads necessary information and the operation program 116 from the second memory 52. The necessary information is required to execute the operation program 116. The necessary information includes the UID unique to the image capturing device 1, the server specific information including the URL of the server, and the like. The necessary information and the operation program 116 are transmitted to the RF-ID reader/writer 46 in the remote controller 827 via the data transfer unit 108 and the second antenna 21. The remote controller 827 remotely controls the TV 45.

The RF-ID reader/writer 46 of the remote controller 827 receives the necessary information and the operation program from the RF-ID unit 47 of the image capturing device 1 and stores them into a RF-ID storage unit 6001.

A remote-controller signal generation unit 6002 in the remote controller 827 converts the necessary information and the operation program, which are transmitted from the RF-ID unit 47 of the image capturing device 1 and stored in the RF-ID storage unit 6001, to remote-controller signals. The remote-controller signals, such as infrared signals, are widely used in communication for present remote controllers.

To the TV 45, a remote-controller signal transmission unit 6003 transmits the remote-controller signals including the operation program which are generated by the remote-controller signal generation unit 6002.

A remote-controller signal receiving unit 6004 in the TV 45 receives the remote-controller signals from the remote controller 827. A program execution unit 6005, such as a Java™ virtual machine, retrieves the necessary information and the operation program in the RF-ID unit 47 of the image capturing device 1, from the remote-controller signals by using a decryption unit 5504. Thereby, the program execution unit 6005 executes the operation program.

Figure 24:
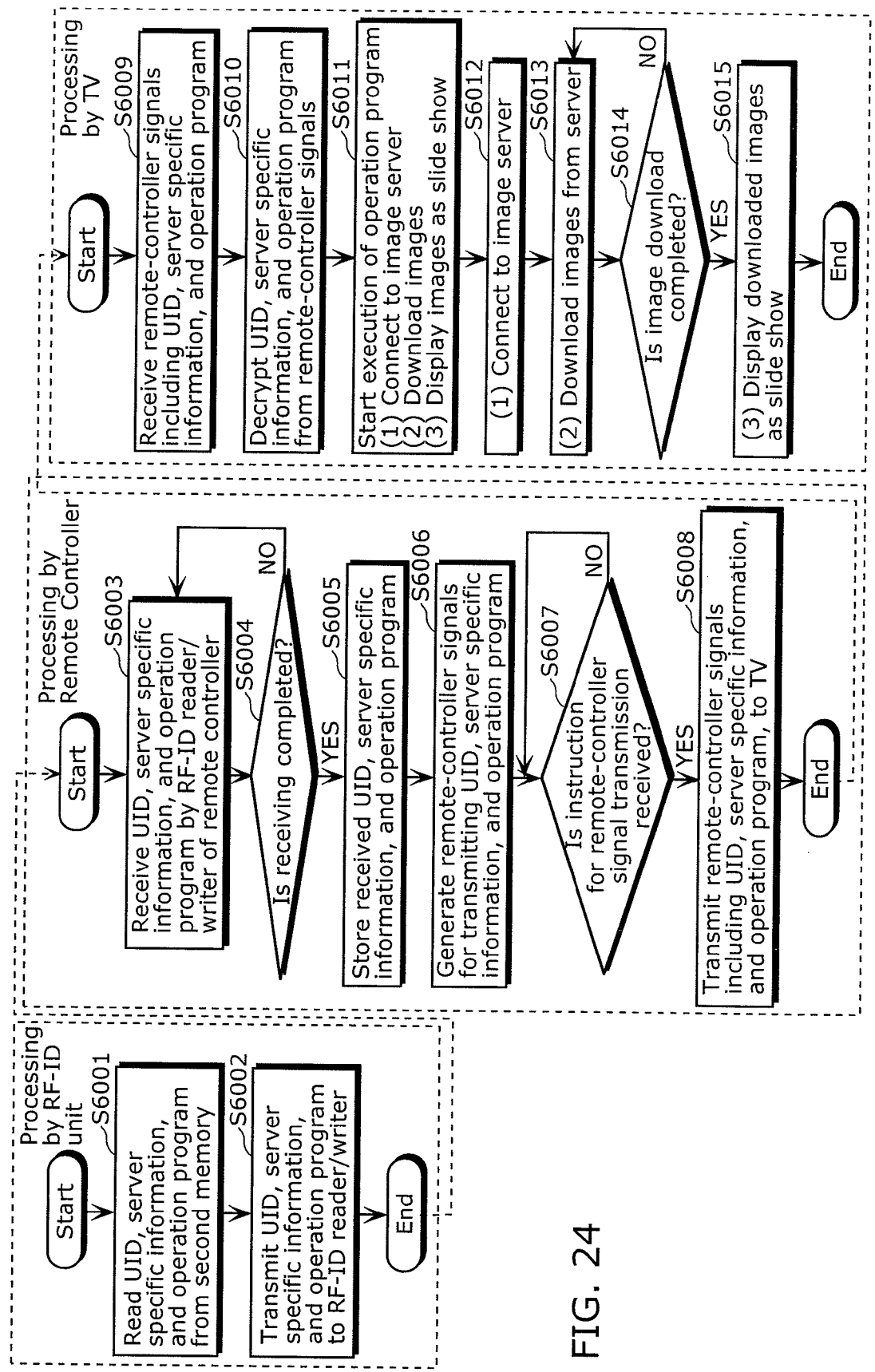
FIG. 24 is a flowchart of processing for transferring and executing the operation program stored in the RF-ID unit.

FIG. 24 is a flowchart of execution of the operation program for "downloading data of images from an image server with reference to identification information (UID in this example) of the image capturing device 1, and displaying the images as a slide show".

When the remote controller is moved into proximity of the image capturing device 1, the RF-ID reader/writer 46 of the remote controller provides power to the RF-ID unit 47 in the image capturing device 1 via RF-ID communication. Thereby, the UID 75 unique to the image capturing device 1, the URL 48 of the image server (image server URL), and the operation program 116 are read from the second memory (S6001). The readout UID, image server URL, and operation program are transmitted to the remote controller 827 via the data transfer unit 108 and the second antenna 21 (S6002). Here, as presented in FIG. 25, the operation program includes server connection instruction 6006, download instruction 6008, slide show display instruction 6010, download-completion-time processing set instruction 6007, and download-completion-time instruction 6009.

The remote controller 827 receives the UID, the image server URL, and the operation program from the image capturing device 1 via the RF-ID reader/writer 46 (S6003). A determination is made as to whether or not receiving is completed (S6004). If receiving is completed, then the UID, the image server URL, and the operation program are stored in the RF-ID storage unit 6001 (S6005). Then, the UID, the image server URL, and the operation program are converted to remote-controller signals transmittable by infrared ray (S6006). A determination is made as to whether or not the user performs a predetermined input operation by the remote controller 827 to instruct to transmit the remote-controller signals to the TV 45 (S6007). If the instruction is received by from user, then the remote-controller signal transmission unit 6003 transmits the remote-controller signals including the image server URL and the operation program to the TV 45 (S6008). In other words, serving as a common remote controller, the remote controller 827 serves also as a relay device that transfers the UID, the image server URL, and the operation program from the image capturing device 1 to the TV 45 by using the embedded RF-ID reader/writer 46.

Next, the TV 45 receives the remote-controller signals from the remote controller 827 (S6009). The decryption unit 5504 in the TV 45 retrieves (decrypts) the UID, the image server URL, and the operation program from the remote-controller signals (S6010). Then, the program execution unit 6005 executes the operation program with reference to the image server URL (S6011 to S6015). More specifically, by the operation program, connection between the TV 45 and the image server 42 on a communication network is established with reference to the image server URL (S6012, and 6006 in FIG. 25). Then, with reference to the UID unique to a corresponding image capturing unit, image data captured by a specific image capturing unit is selected from the image data 50 stored in the storage device of the image server 42, and the selected image data is downloaded to the TV 45 (S6013, and 6008 in FIG. 25). In other words, the UID is used to select image data associated with the image capturing device 1 indicated by the UID, from among pieces of image data stored in the image server 42. A determination is made as to whether or not the image download is completed (S6014). If the image download is completed, the downloaded images are sequentially displayed as a slide show (S6015, and 6007, 6009, and 6010 in FIG. 25). The download-completion-time processing set instruction 6007 in FIG. 25 is instruction for setting processing to be performed when image downloading is completed. In the example of FIG. 25, the download-completion-time processing set instruction 6007 instructs the download-completion-time instruction 6009 as the processing to be performed when image downloading is completed. Moreover, the download-completion-time instruction 6009 calls the slide show display instruction 6010 for performing a slide show of the images.

It should be noted that, referring to FIGS. 23 and 24, it has been described that the operation program and the necessary information for the operation program are transferred from the image capturing device 1 to the TV 45 via the remote controller 827. However, the RF-ID reader/writer 46 of the remote controller 827 may be provided to the TV 45. In other words, the RF-ID reader/writer 46 may be embedded in the TV 45. Furthermore, the communication path connecting the reader (RF-ID reader/writer 46) to the apparatus may be a wireless communication path such as infrared communication path, or a wired signal cable.

It should also be noted that, in the above-described execution example, the UID is used to select image data associated with the image capturing device 1 from among pieces of image data stored in the image server 42. However, it is also possible to use the UID to identify the image server storing the image data. Here, it is assumed that, in a communication system including a plurality of image servers, UID is associated with an image server storing image data captured by an image capturing device identified by the UID. Under the assumption, if the operation program is created so that a URL of the image server can be identified with reference to the UID, the TV 45 executing the operation program can identify, by using the UID, the image server associated with the UID from the plurality of image servers and thereby download the image data from the identified image server.

It should also be noted that the identification information for identifying the image capturing device 1 is not limited to UID. The identification information may be any other information regarding the image capturing device 1, such as a serial number, a product serial number, a Media Access Control (MAC) address, or information equivalent to the MAC address, for example, an Internet Protocol (IP) address. Moreover, if the image capturing device 1 serves as an access point on a wireless LAN, the identification information may be a Service Set Identifier (SSID) or any information equivalent to SSID. It should also be noted that, in the above-described second memory 52, the identification information (UID unit 75) for identifying the image capturing device 1 has been described to be stored separately from the operation program. However, the identification information may be stored (described) in the operation program.

It should also be noted that the remote-controller signals (in other words, the communication path connecting the reader to the apparatus) are described to employ infrared ray. However, the remote-controller signals are limited to the above, but may employ a wireless communication method such as Bluetooth. The use of wireless communication that is generally speedier than infrared communication can shorten a time required to transfer an operation program and/or the like.

It should be noted that the operation program is not limited to the program in the format presented in FIG. 25. The operation program may be described in any other programming language. For example, the operation program described in Java™ can be easily executed by various apparatuses (devices), because the program execution circumstances called JavaVM™ have broad versatility. The operation program may be described in a compact programming language in a script format represented by Javascript™ so as to be stored in a small storage capacity. The operation program in such a compact programming language can be stored in the RF-ID unit 47 in the second memory 52 even if the RF-ID unit 47 has a small storage capacity. Moreover, the operation program may be in an executable format applied with processing such as compiling, rather than a source code presented in FIG. 25. The program can reduce a processing load on apparatuses having program execution environments.

Figure 26:
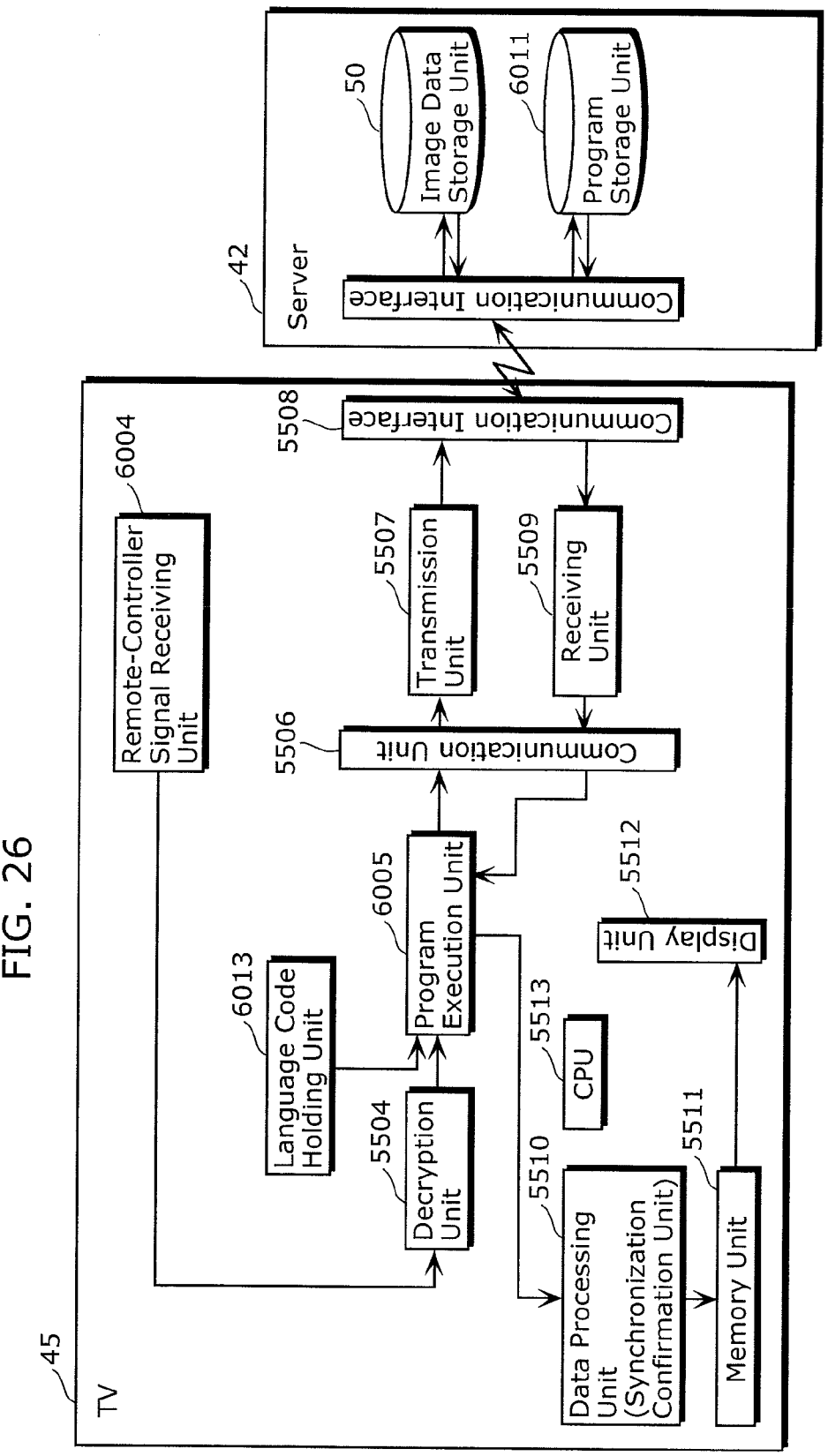
FIG. 26 is a block diagram of (a) the TV changing processing of the operation program according to a language code, and (b) a server storing the program.
Figure 27:
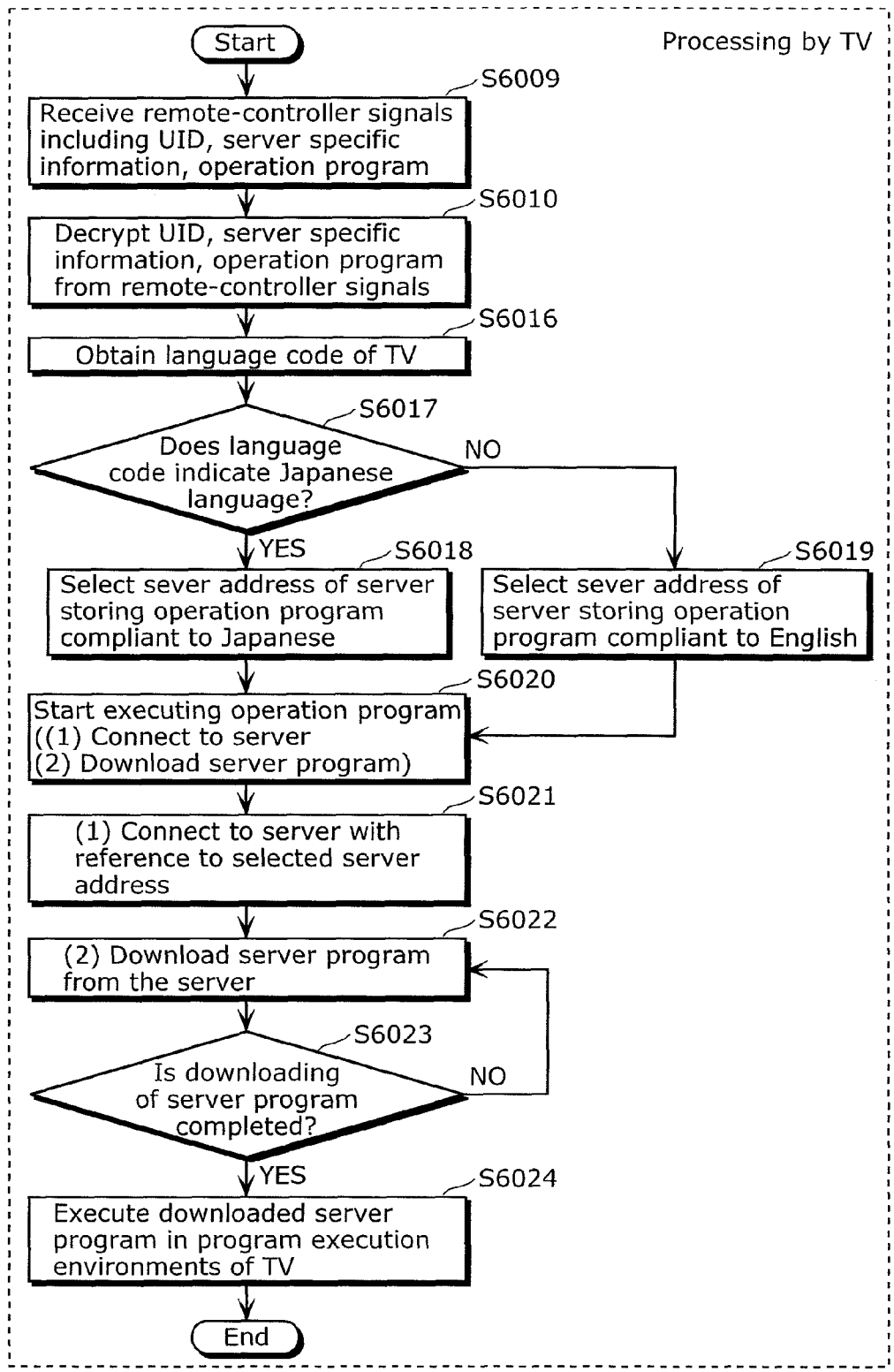
FIG. 27 is a flowchart of processing for changing processing of the operation program according to a language code.

The following describes, in detail, the processing of changing execution of a program depending on information unique to a display device (such as the TV 45) having a RF-ID reader, with reference to FIGS. 26 and 27.

The TV 45 illustrated in FIG. 26 further includes a language code holding unit 6013. When the operation program received as remote-controller signals is executed to connect the TV 45 to the server 42, the program execution unit 6005 reads a language code from the language code holding unit 6013 to connect the TV 45 to the server 42 compliant to the language code. Then, the operation program is executed to download a server program from the server 42, and executes the downloaded server program. For example, if the language code indicates Japanese language, the TV 45 is connected to the server 42 having a program storage unit 6011 in which a server program compliant to Japanese language is stored, and then the server program is obtained from the program storage unit 6011 to be executed in the TV 45. More specifically, the operation program stored in the RF-ID unit 47 of the image capturing device 1 as illustrated in FIG. 23 executes only connection to the server 42, while other processing such as image display is executed by the server program downloaded from the server 42.

The steps in the above processing are described with reference to FIG. 27. The processing by which the TV 45 receives the operation program and the necessary information for the operation program from the RF-ID unit 47 of the image capturing device 1 is the same as the processing described previously with reference to FIG. 24. In FIG. 27, it is assumed that the server specific information which the TV 45 receives as remote-controller signals includes two different server addresses which are (a) a sever address of a server 42 compliant to English and (a) a server address of a different server 42 compliant to Japanese. It is also assumed that the operation program which the TV 45 receives as remote-controller signals includes instruction for connecting the TV 45 to a server indicated by the server connection instruction 6006 in FIG. 25.

In the execution environments, the TV 45 obtains a language code of the TV 45 (S6016). The TV 45 determines whether or not the language code indicates Japanese language (S6017). If the language code indicates Japanese language, then the TV 45 selects, from the server specific information, a sever address of a server having a program storage unit 6011 storing an operation program for processing compliant to Japanese (S6018). On the other hand, if the language code does not indicate Japanese language, then the TV 45 selects, from the server specific information, a server address of a server having a program storage unit 6011 storing an operation program for processing compliant to English (S6019). Next, the TV 45 is connected to the server 42 with reference to the selected server address (S6021). The TV 45 downloads a server program from the server 42 (S6022, S6023). The TV 45 executes the downloaded server program in the program execution environments (for example, a virtual machine) of the TV 45 (S6024).

It should be noted that the use of the language code has been described in FIGS. 26 and 27, but the language code may be replaced by other information. Examples are a product serial number, a serial number of the display device (TV 45), and the like each of which indicates a country where the display device is on the market or equipped.

Figure 28:
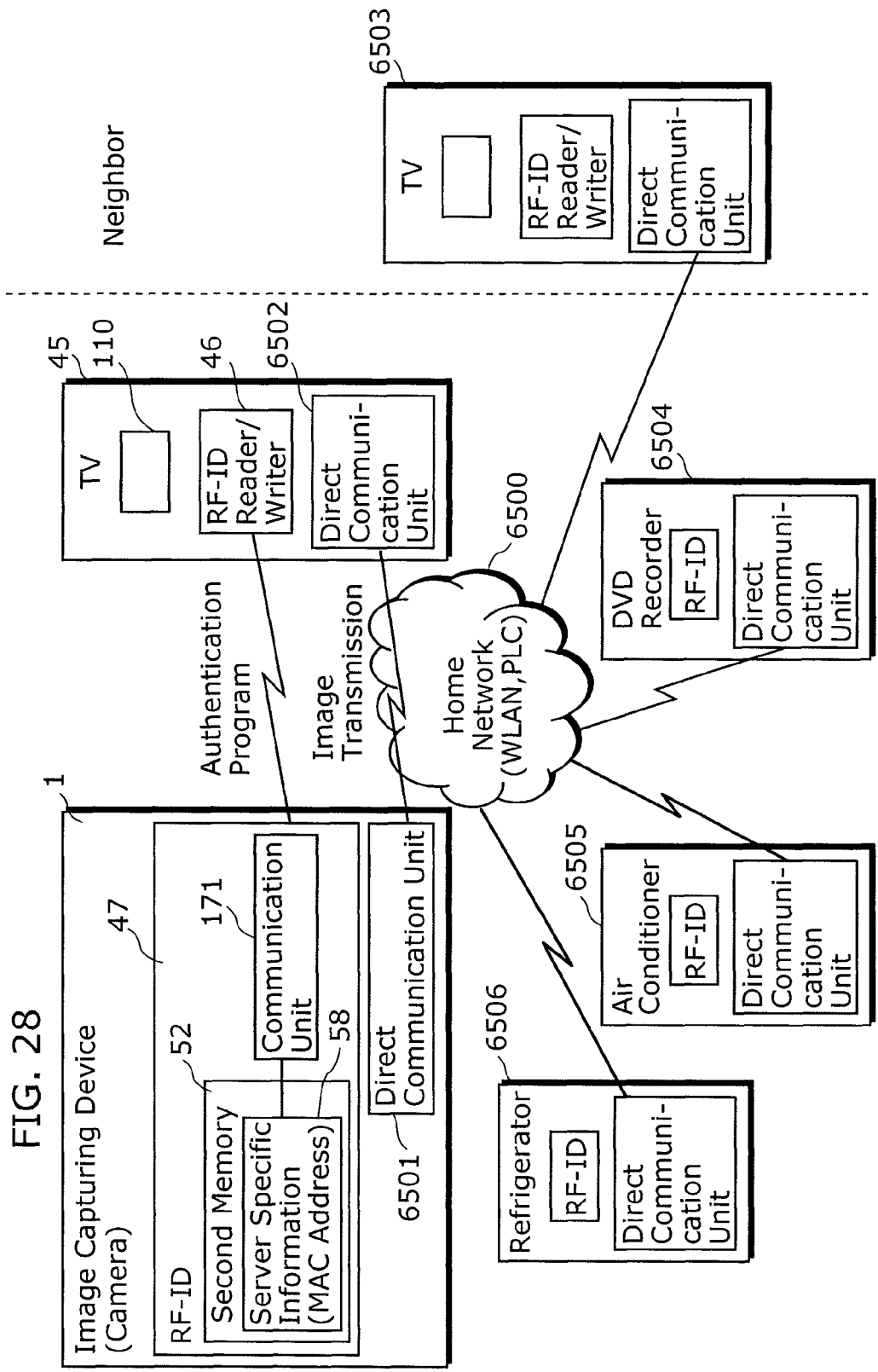
FIG. 28 is a block diagram of a home network 6500 connecting the image capturing device 1 to the TV 45 by a wireless LAN.
Figure 29:
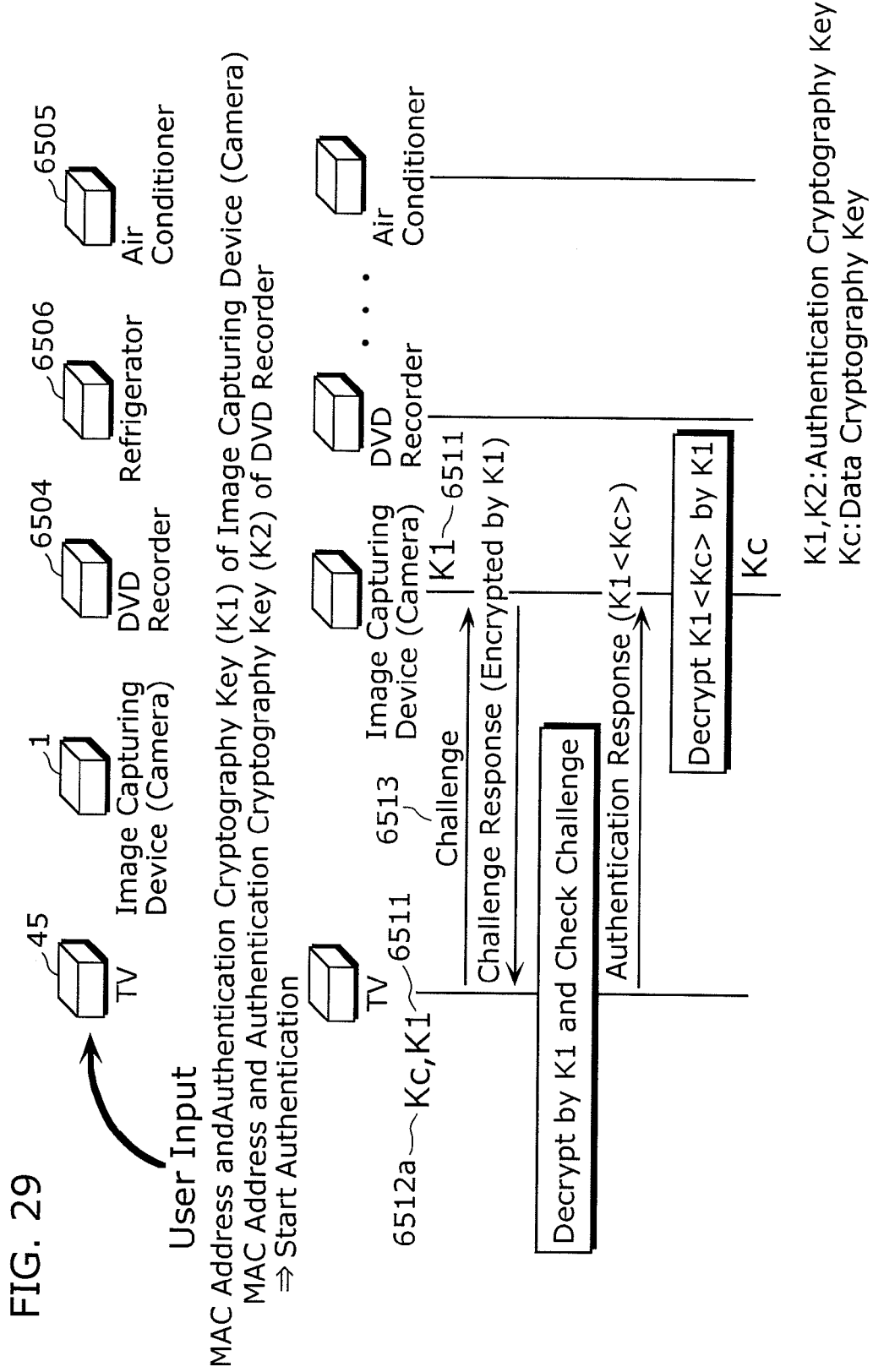
FIG. 29 presents an example of an authentication method without using RF-ID unit.

FIG. 28 illustrates a configuration of a home network 6500 in which the image capturing device 1 and the TV 45 are connected to each other via a wireless LAN or Power Line Communication (PLC). When the image capturing device 1 has a direct communication unit 6501 and the TV 45 has a direct communication unit 6502 so that the image capturing device 1 and the TV 45 can communicate directly with each other via the wireless LAN, the image capturing device 1 can transmit images to the TV 45 without using the server on the Internet. In other words, the image capturing device 1 serves also as a server. In this case, however, some communication mediums such as the wireless LAN used in the home network 6500 is easily intercepted by others. Therefore, safe data communication requires mutual authentication and exchange of encrypted data. For example, for existing wireless-LAN terminals (devices), access points serve as authentication terminals. If such an existing terminal is to authenticate its communication party, the terminal displays all connectable access points on its screen. The user selects one of the displayed access points from the screen. Then, the user presses a Wired Equivalent Privacy (WEP) key to perform encrypted communication. However, the above processing bothers general users. In addition, if a wireless LAN is embedded in home appliances such as a TV, there are so many terminals with which the existing terminal can communicate with authentication. If the user lives in an apartment house, the user can communicate even with terminals in neighbors. As a result, it is difficult for the user to select a terminal to be authenticated. For instance, if a neighbor has a TV 6503 that is the same model of the user's TV 45, the user has difficulty in distinguishing the TV 45 in the user's house from the TV 6503 based on the information displayed on the screen of the existing device.

The first embodiment of the present invention can solve the above problem. In the first embodiment of the present invention, RF-ID is used to perform authentication. In more detail, an authentication program including a MAC address 58 is recorded, as an operation program, in the second memory 52 in the RF-ID unit 47 of the image capturing device 1. When the image capturing device 1 is moved into proximity of the RF-ID reader/writer 46 of the TV 45, the image capturing device 1 provides the authentication program to the TV 45. The authentication program includes not only the MAC address but also a cryptography key for authentication (hereinafter, "authentication cryptography key") and an authentication command. When the TV 45 recognizes that the information provided from the RF-ID unit 47 includes the authentication command, the TV 45 performs authentication processing. The communication unit 171 in the RF-ID unit 47 cannot communicate with the TV 45, until the image capturing device 1 is physically located in proximity of the RF-ID reader/writer 46. Therefore, it is extremely difficult to intercept the communication between the image capturing device 1 and the TV 45 which is performed in a house. In addition, since the image capturing device 1 is moved into proximity of the TV 45 to exchange data, it is possible to prevent that the image capturing device 1 authenticates a wrong device (apparatus), such as the TV 6503 in a neighbor or a DVD recorder 6504 in the user's house.

The following is an example of an authentication method without using RF-ID. A user inputs, to the TV 45, (a) MAC addresses of terminals to be authenticated, such as the camera (the image capturing device 1) and the DVD recorder 6504, which the user intends to authenticate for communication, and (b) authentication cryptography keys 6511 for the terminals. The TV 45 receiving the inputs transmits an appropriate message called a challenge 6513, to a target terminal having the MAC address. When the image capturing device 1 receives the challenge 6513, the image capturing device 1 encrypts the challenge 6513 using the authentication cryptography key 6511, and returns the encrypted challenge 6513 to the TV 45 that is a terminal from which the challenge 6513 has been provided. In receiving the encrypted challenge 6513, the TV 45 decrypts the encrypted challenge 6513 using the authentication cryptography key 6511. Thereby, the TV 45 can authenticate the authentication cryptography key 6511 to prevent user's error and intervention of other malicious users. Next, the TV 45 encrypts a cryptography key 6512*a* for data (hereinafter, a "data cryptography key 6512*a*") using the authentication cryptography key 6511. Then, the TV 45 transmits the encrypted data cryptography key 6512*a* to the image capturing device 1. Thereby, it is possible to perform the encrypted data communication between the TV 45 and the image capturing device 1. The TV 45 performs the above-described processing also with the DVD recorder 6504 and other apparatuses (terminals) 6505 and 6506 in order to share the data cryptography key 6512*a* among them. Thereby, the TV 45 can perform encrypted communication with all terminals (devices, apparatuses, or the like) connected in the home network.

On the other hand, FIG. 30 illustrates an authentication method using RF-ID. In the authentication method using RF-ID, the image capturing device 1 (camera) generates an authentication program 6521*a*. The camera provides the generated authentication program 6521*a* from the RF-ID unit 47 in the camera to a RF-ID unit 46 in the TV 45. The authentication program 6521*a* includes an authentication command, a MAC address of the camera, and an authentication cryptography key 6511 for the camera. When the TV 45 receives the authentication program 6521*a* with the authentication command, the TV 45 retrieves the MAC address and the authentication cryptography key 6511 from the RF-ID unit 46. The TV 45 encrypts a data cryptography key 6512*a* using the retrieved authentication cryptography key 6511 and transmits the encrypted data cryptography key 6512*a* to the retrieved MAC address. The transmission is performed by a wireless-LAN device (terminal). In the authentication method using RF-ID, the authentication is performed automatically without any user's input. Therefore, there is no problem caused by user's input errors. In addition, since the image capturing device 1 (camera) needs to moved into proximity of the TV 45, it is possible to prevent intervention of other malicious users. This authentication method using RF-ID can eliminate pre-processing such as the above-described challenge. Moreover, the action of physically moving the image capturing device 1 (camera) into proximity of the TV 45 enables the user to easily recognize which terminals the camera has authenticated. Furthermore, if the authentication cryptography key 6511 is not included in the authentication program, the authentication may be performed by a technique of general public key authentication. In addition, the communication device (medium) is not limited to a wireless LAN, but may be any medium, such as PLC or Ethernet™ included in the home network. Moreover, the MAC address may be any identification information for uniquely identifying a communication terminal in the home network.

Figure 31:
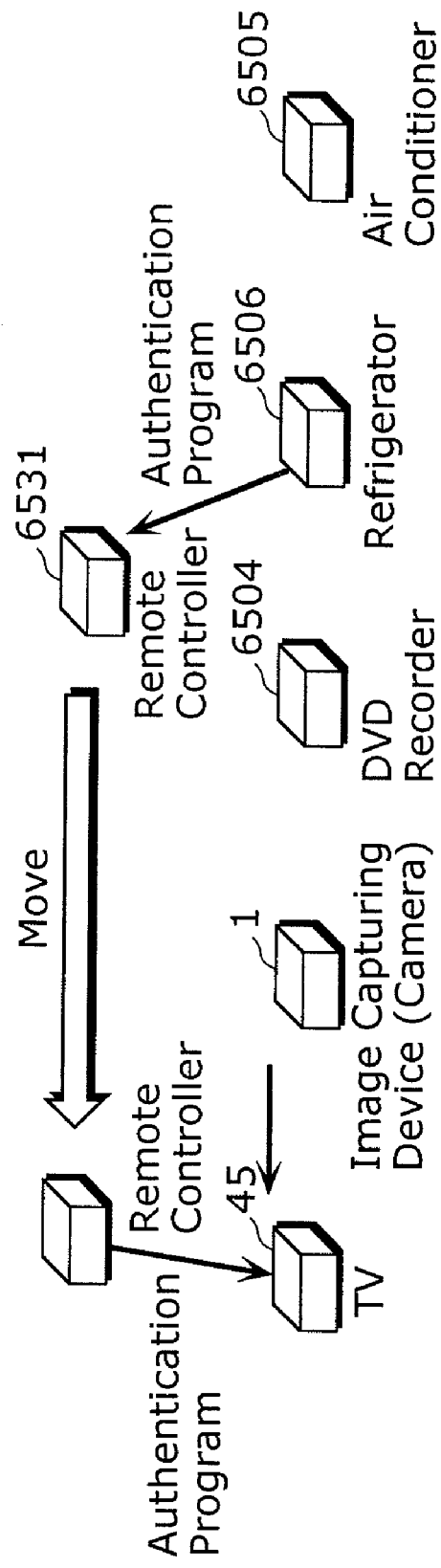
FIG. 31 presents an example of an authentication method used when it is difficult to move a terminal into proximity of another terminal.

FIG. 31 illustrates an authentication method using RF-ID when it is difficult to move a terminal into proximity of another terminal. For example, when the terminals are a refrigerator and a TV which are difficult to move, it is almost impossible to directly exchange an authentication program between the terminals using RF-ID. In such a situation, the first embodiment of the present invention can be implemented by relaying the authentication program between the terminals using a device (such as a remote controller 6531) that is an accessory of the terminal. In more detail, a RF-ID reader/writer embedded in the remote controller 6531 reads the authentication program from a RF-ID unit in the refrigerator. Thereby, the authentication program is stored in a memory in the remote controller 6531. A user moves the remote controller 6531 that is mobile. When the remote controller 6531 is moved into proximity of the TV 45, the remote controller 6531 transfers the authentication program from the memory of the remote controller 6531, to the RF-ID unit of the TV 45. It should be noted that the transfer from the remote controller 6531 to the TV 45 is not limited to use RF-ID technology. Other communication means, such as infrared ray or ZigBee, that is previously set in the remote controller 6531 can be used. Any medium for which security in communication has already been established may be used.

Figure 32:
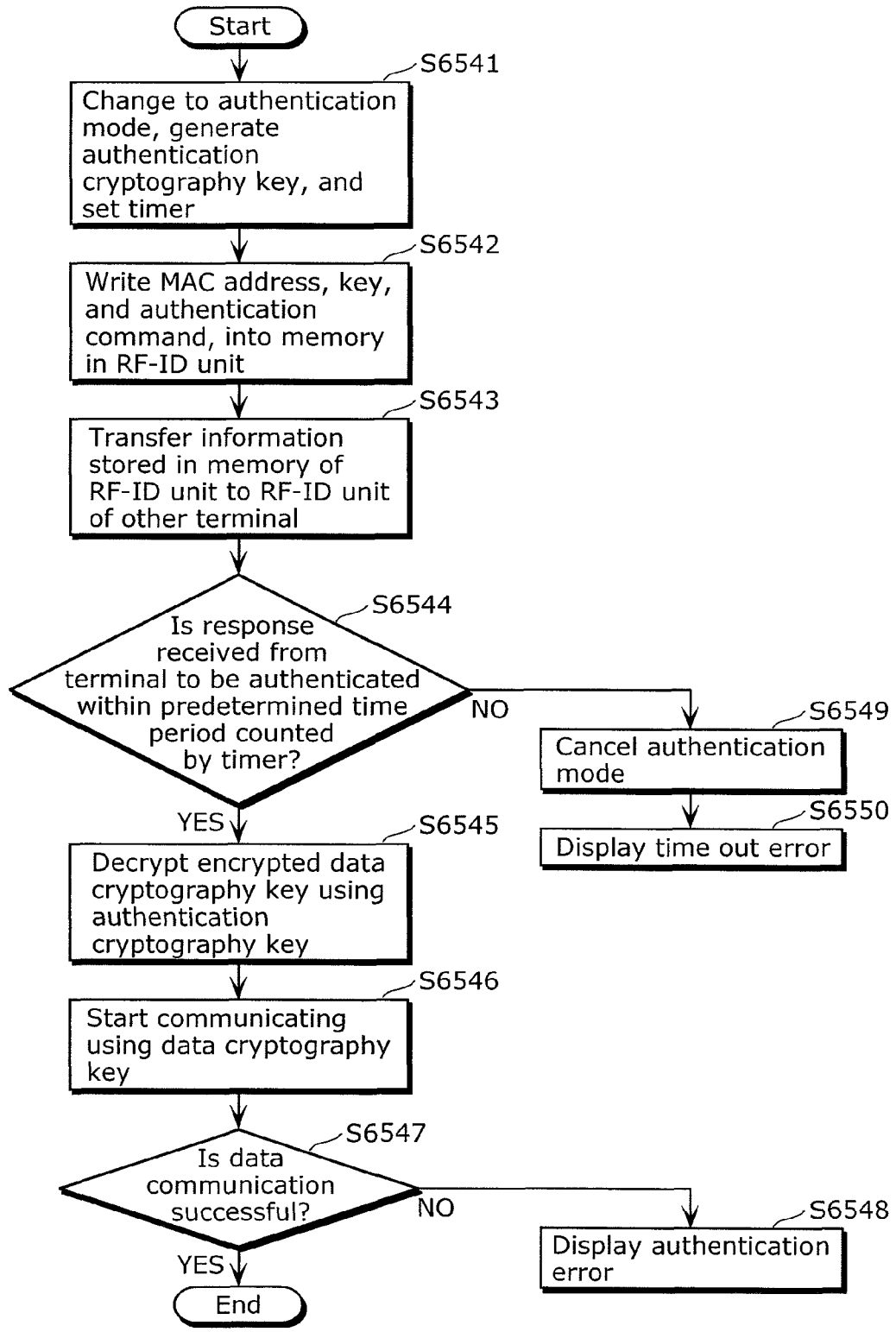
FIG. 32 is a flowchart of an example of processing performed by a camera.

FIG. 32 is a flowchart of authentication performed by the camera (image capturing device 1) side. In an authentication mode, the camera generates an authentication cryptography key and sets a timer (S6541). The camera writes a MAC address of the camera, the generated authentication cryptography key, and an authentication command, into a memory in the RF-ID unit (S6542). When the user moves the camera to bring the RF-ID unit of the camera into proximity of the RF-ID unit of the TV, the camera transfers the information stored in the memory of the RF-ID unit of the camera to the RF-ID unit of the TV (S6543). The camera determines whether or not a response of the transfer is received from the TV within a predetermined time period counted by the timer (S6544). If the response is received within the predetermined time period, then the camera decrypts, by using the authentication cryptography key, encrypted data cryptography key included in the response (S6545). The camera starts communicating with the other device (apparatus) using the data cryptography key (S6546). The camera determines whether or not data communication with the TV is successful (S6547). If the data communication is successful, then the authentication is completed. On the other hand, if data cannot be correctly decrypted (in other words, data communication is not successful), then a notification of authentication error is displayed and the authentication is terminated (S6548). Referring back to Step S6544, if there is no response within the predetermined time period, then the camera cancels the authentication mode (S6549) and then displays a notification of time out error (S6550).

Figure 33:
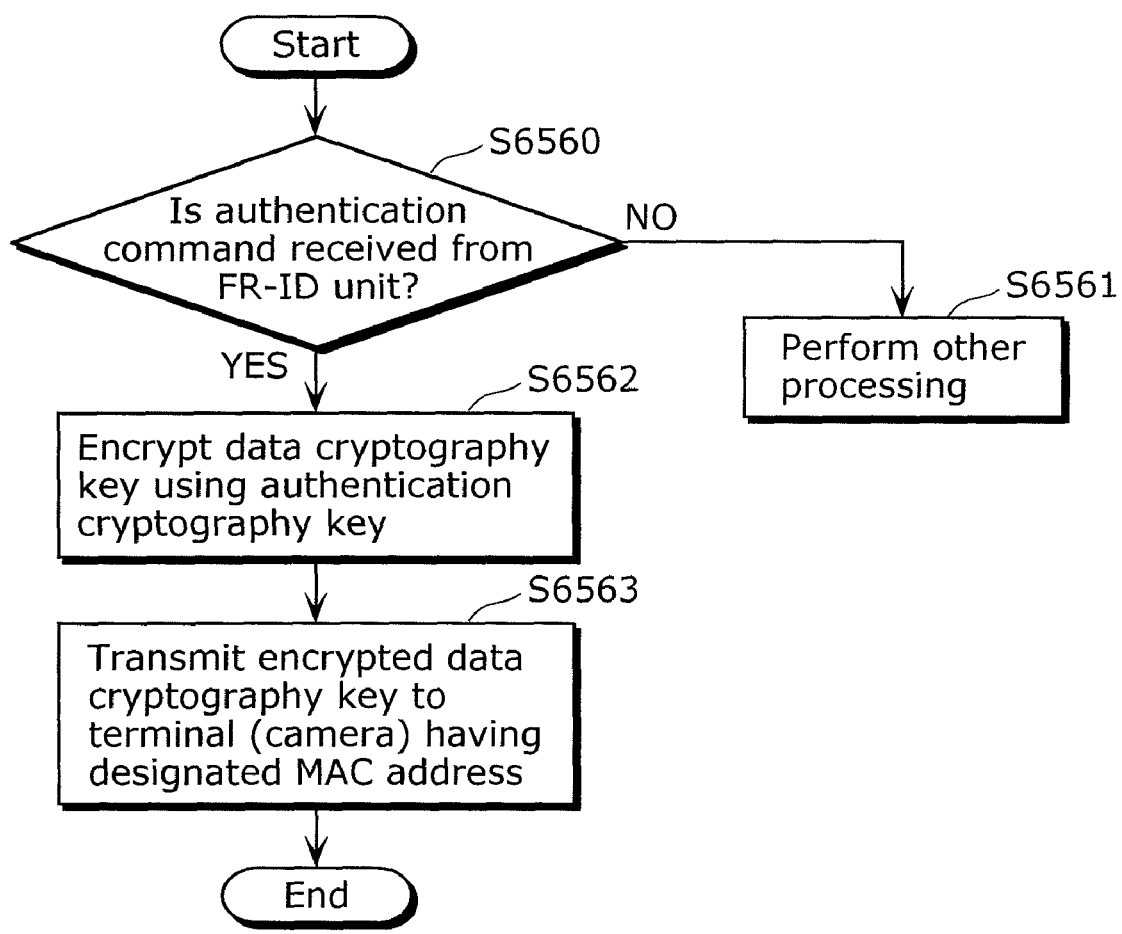
FIG. 33 is a flowchart of an example of processing performed by the TV.

FIG. 33 is a flowchart of authentication performed by the TV 45 side. The TV 45 determines whether or not received information, which is provided from the RF-ID unit of the camera to the RF-ID unit of the TV 45, includes an authentication command (S6560). If the received information does not include the authentication command, then the TV 45 performs other processing according to the received information (S6561). On the other hand, if the received information includes the authentication command, the TV 45 determines that the information received from the RF-ID unit of the camera is an authentication program, and therefore encrypts a data cryptography key in the TV 45 using an authentication cryptography key in the authentication program (S6562). Then, the TV 45 transmits the encrypted data cryptography key to the terminal (the camera) having the MAC address designated in the authentication program (S6563).

Next, the following situation is described in detail with reference to figures. Here, the image capturing device 1 described with reference to FIG. 3 generates or updates a program executable by the TV 45. Then, the image capturing device 1 transmits the program to the TV 45 via the data transmission unit 173. Thereby, the TV 45 executes the program.

Figure 34:
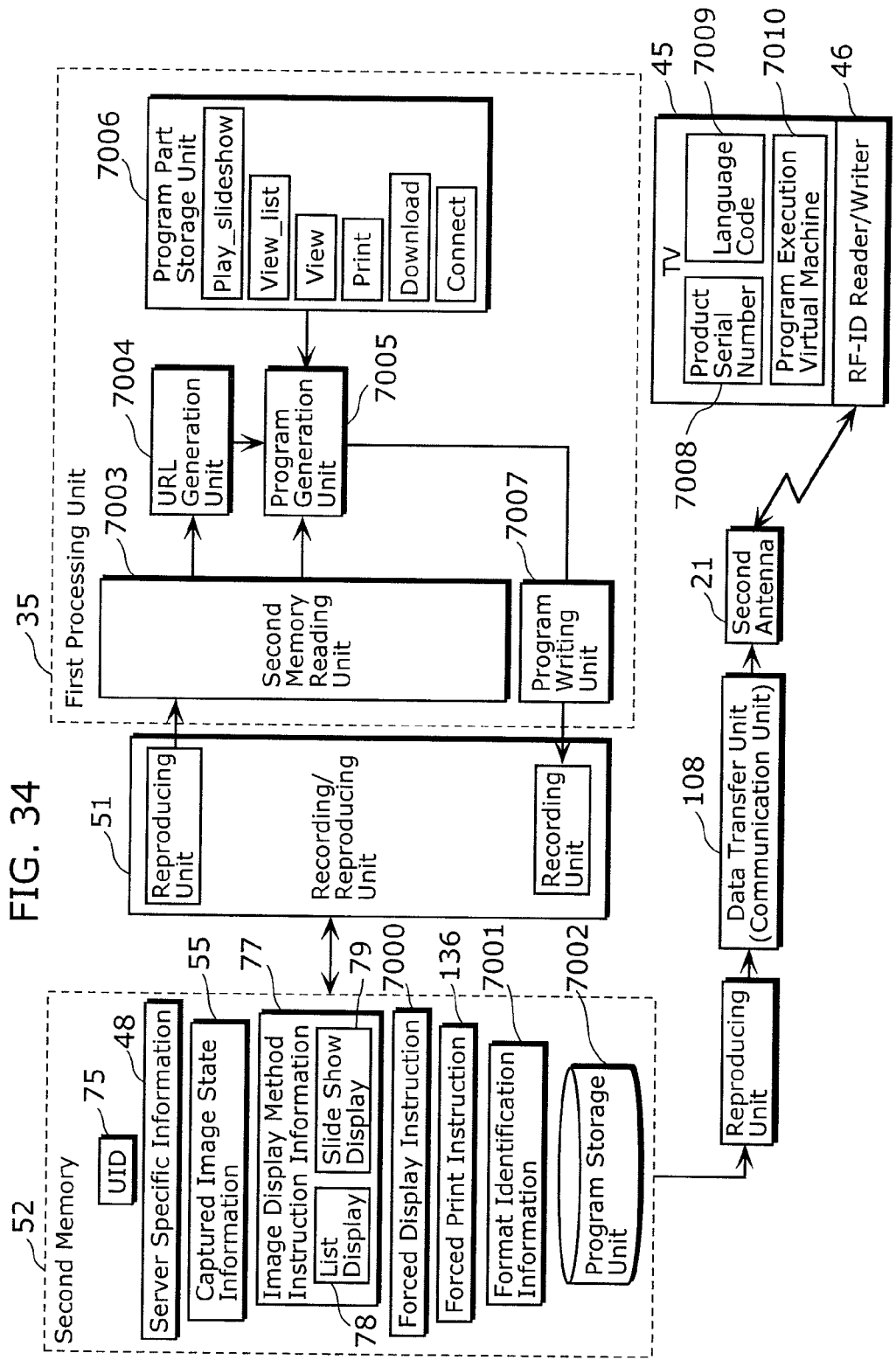
FIG. 34 is a block diagram of (a) a first processing unit generating the operation program in the image capturing device 1 to be executed by the TV, and (b) a second memory unit.

FIG. 34 is a block diagram of the first processing unit 35 and the second memory 52 of the image capturing device 1 according to the first embodiment of the present invention. The first processing unit 35 includes a second memory reading unit 7003, a URL generation unit 7004, a program generation unit 7005, a program part storage unit 7006, and a program writing unit 7007.

The second memory reading unit 7003 reads information from the second memory 52 via the recording/reproducing unit 51.

The URL generation unit 7004 reads the UID 75, the server specific information 48, the captured image state information 55, and the image display method instruction information 77 from the second memory 52 via the second memory reading unit 7003. From the above pieces of information, the URL generation unit 7004 generates a URL that is an address of the server 42 to which images have been uploaded from the image capturing device 1.

The UID 75 is identification information for identifying the image capturing device 1. The UID 75 is unique to each image capturing device 1. The URL generated by the URL generation unit 7004 includes UID. For instance, the image server 42, to which images are uploaded, has an image file in a directory unique to each UID. Thereby, a URL address can be generated for each image capturing device 1.

The server specific information 48 is a server name for identifying the server to which the images are uploaded. Via a Domain Name Server (DNS), an IP address of the server 42 is determined to connect the image capturing device 1 to the server 42. Therefore, the server specific information 48 is included in the generated URL.

The image display method instruction information 77 is information for enabling the user to optionally select the list display 78, the slide show display 79, or the like. The URL generation unit 7004 generates the URL based on the image display method instruction information 77. In other words, since the generated URL includes information indicating the list display 78 or the slide show display 79, the image server (the server 42) can determine based on the URL whether the images are to be displayed as the list display or the slide show display.

As described above, based on the UID 75, the server specific information 48, the captured image state information 55, the image display method instruction information 77, and the like which are stored in the second memory 52, the URL generation unit 7004 generates a URL of the image server in which images to be watched are stored. Then, the URL generation unit 7004 provides the generated URL to the program generation unit 7005.

The program generation unit 7005 generates a program executable by the TV 45, based on (a) the URI generated by the URL generation unit 7004, and (b) forced display instruction 7000, forced print instruction 136, and format identification information 7001 stored in the second memory 52. It should be noted that the program generation unit 7005 can generate a new operation program based on the above-described information, which is a method of generating a new operation program. The program generation unit 7005 can also generate such a new operation program by updating an operation program that has been already generated.

The program generated by the program generation unit 7005 is executable by the TV 45. The program should be compiled into a machine language used in a system controller (not shown) of the TV 45, so that the system controller can execute the program. In this case, the program generation unit 7005 has a compiler to convert the generated program to a program in an executable format.

However, the above-described compiler is not necessary if the program in a text format (script) (for example, a general Java™ script) is executed by a browser in the TV 45.

The URL provided to the program generation unit 7005 is used to connect the TV 45 to the image server (server 42) in which images are stored. By using the URL, the program generation unit 7005 generates or updates a connection program (hereinafter, referred to also as a "server connection program" or "connection program") for connecting the TV 45 to the image server.

The forced display instruction 7000 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced display instruction 7000 is used to automatically set the TV 45 into a browser watching mode so that image data provided from the image server is displayed on the TV 45. If this option is selected, the program generation unit 7005 generates a program for forcing the TV 45 to display image data.

The forced print instruction 136 is optional and used in the following situation. For example, there is the situation where, while the user watches on the TV 45 a TV program provided by general broadcast waves, the RF-ID reader/writer 46 of the TV 45 becomes communicable with the image capturing device 1 via the second antenna 21. In the situation, the forced print instruction 136 is used to automatically print image data stored in the image server by a printer (not shown) connected to the TV 45. If this option is selected, the program generation unit 7005 generates a program for forcing the TV 45 to print image data by the printer.

The format identification information 7001 is information of a format by which image data is to be displayed. When an option of language code optimization selection in the format identification information 7001 is selected, the program generation unit 7005 generates a program for selecting a URL to be connected, based on the language code set in the TV 45. The following is an example in the situation where the option of language code optimization selection in the format identification information 7001 is selected. If the language code of the TV 45 indicates Japanese language, the program generation unit 7005 selects a Japanese site as the URL to be connected. On the other hand, if the language code of the TV 45 does not indicate Japanese language, the program generation unit 7005 selects an English site as the URL to be connected. Or, the URL generation unit 7004 may generate two URLs for the Japanese site and the English site, and provide the two URLs to the program generation unit 7005.

The program part storage unit 7006 holds program command information used by the program generation unit 7005 to generate a program. A program part stored in the program part storage unit 7006 may be a general library or an Application Programming Interface (API). In order to generate a connection command for connecting the TV 45 to the server, the program generation unit 7005 combines a server connection command "Connect" in the program part storage unit 7006 with the URL generated by the URL generation unit 7004. Thereby, the program generation unit 7005 generates or updates a connection program for connecting the TV 45 to the server indicated by the URL.

The program writing unit 7007 is an interface used to write the program generated by the program generation unit 7005 to the second memory 52.

The program provided from the program writing unit 7007 is stored into a program storage unit 7002 in the second memory 52 via the recording/reproducing unit 51.

When the image capturing device 1 is moved to bring the RF-ID unit of the image capturing device 1 into proximity of the RF-ID reader/writer 46 connected to the TV 45, the reproducing unit reads out the program from the program storage unit 7002 in the second memory 52. Then, transmission signals indicating the program are transmitted to the RF-ID reader/writer 46 via the data transfer unit 108 and the second antenna 21. The TV 45 receives the transmission signals via the RF-ID reader/writer 46. The TV 45 executes the receives program.

The TV 45 has the product serial number 7008, the language code 7009, and a program execution virtual machine 7001.

The product serial number 7008 is a product serial number of the TV 45. From the product serial number 7008, it is possible to learn a manufacture date/time, a manufacture location, a manufacturing line, and a manufacturer of the TV 45.

The language code 7009 is predetermined in the TV 45 to be used in displaying a menu, for example. The language code 7009 is not limited to be predetermined, but can be switched to another by the user.

The program execution virtual machine 7010 is a virtual machine that executes a received program. The program execution virtual machine 7010 may be implemented as hardware or software. For example, the program execution virtual machine 7010 may be a Java™ virtual machine. The Java™ virtual machine is a stack or interpreter virtual machine that executes defined instruction sets. If the image capturing device 1 has the virtual machine, the program generated by the program generation unit 7005 in the image capturing device 1 is compliant to any execution platforms. As a result, the program generation unit 7005 can generate a program executable in any platforms.

Figure 35:
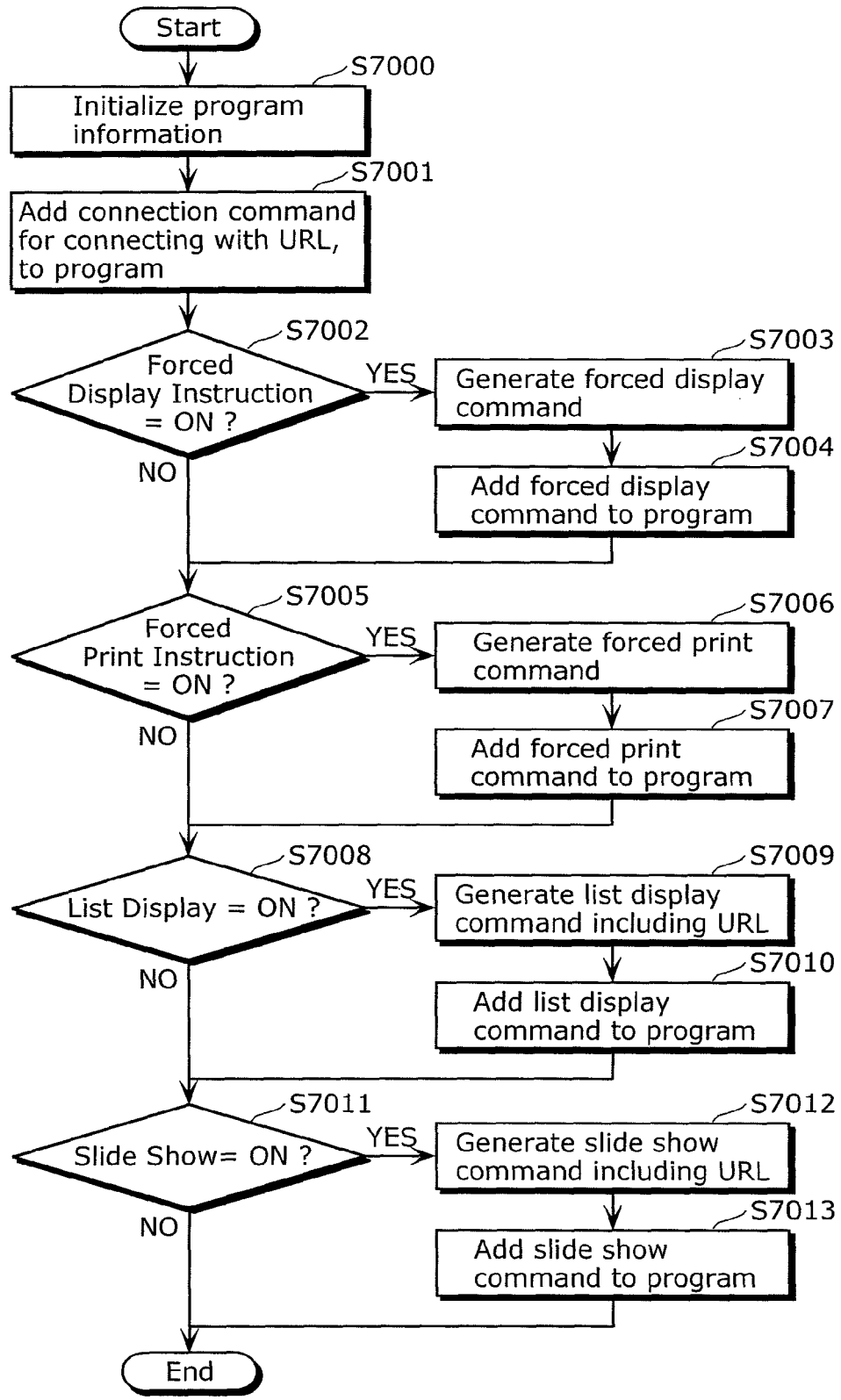
FIG. 35 is a flowchart of processing performed by a program generation unit 7005 in the first processing unit.

FIG. 35 is a flowchart of processing performed by the program generation unit 7005 of the image capturing device 1.

First, the program generation unit 7005 initializes information used to generate a program (S7000).

Next, based on the server specific information 48 stored in the second memory 52, the program generation unit 7005 generates a connection command for connecting the TV 45 to the server 42, by using the URL generated by the URL generation unit 7004 (S7001). In order to generate the connection command, the program generation unit 7005 selects an instruction set (for example, "Connect" in FIG. 25) for a server connection command from the program part storage unit 7006, and combines the selected instruction set with the URL. Thereby, a server connection program (for example, "Connect (URL)") is generated.

Then, the program generation unit 7005 examines the forced display instruction 7000 in the second memory 52 so as to determine whether or not the forced display instruction 7000 is selected (S7002). If the forced display instruction 7000 is selected, then the program generation unit 7005 calls an instruction set for a forced display program from the program part storage unit 7006, and thereby generates a forced display command (S7003). The generated forced display command is added to the program (S7004).

On the other hand, if the forced display instruction 7000 is not selected, then the program generation unit 7005 does not generate the forced display command, but proceeds to S7005.

Next, the program generation unit 7005 makes a determination as to whether the forced print instruction in the second memory 52 is selected (S7005). If the forced print instruction is selected, then the program generation unit 7005 generates a forced print command for forcing the TV 45 to print, by a printer, an image file stored in the server 42 (S7006). The generated print command is added to the program (S7007).

Then, the program generation unit 7005 examines the image display method instruction information 77 in the second memory 52 so as to determine whether or not the list display 78 is selected (S7008). If the list display 78 is selected, then the program generation unit 7005 generates a list display command for causing the TV 45 to display a list of the image file stored in the server 42 (S7009). The generated list display command is added to the program (S7010).

After that, the program generation unit 7005 examines the image display method instruction information 77 in the second memory 52 so as to determine whether or not the slide show 79 is selected (S7011). If the slide show 79 is selected, then the program generation unit 7005 generates a slide show command for causing the TV 45 to display a slide show of the image file stored in the server 42 (S7012). The generated slide show command is added to the program (S7013).

As described above, based on the information set in the second memory 52, the program generation unit 7005 in the image capturing device 1 generates a program used to display images on the TV 45, by using an instruction command set that is stored in the program part storage unit 7006 to generate the program.

It should be noted that, in the first embodiment, there are commands for the forced display instruction, the forced print instruction, the list display, and the slide show display. However, the commands (programs) are not limited to the above. For example, if a command for the forced display instruction is to be generated as a program, the program generation unit 7005 can also generate a determination command for determining whether or not the apparatus (device) executing the program has a display device or display function, and adds the generated determination command to the program. Thereby, the command for the forced display instruction is executed only if the apparatus executing the program has a display device or display function. As a result, the determination command can prevent confusion in the apparatus executing the program. The same goes for a command for the forced print instruction. It is preferable that the program generation unit 7005 also generates a determination command for determining whether or not the apparatus executing the program has or is connected to a printing function, and adds the generated determination command to the program. Thereby, the command for the forced print instruction is executed only if the apparatus executing the program has or is connected to a printing function.

The following describes execution of the program generated or updated by the program generation unit 7005 in the image capturing device 1.

Figure 36:
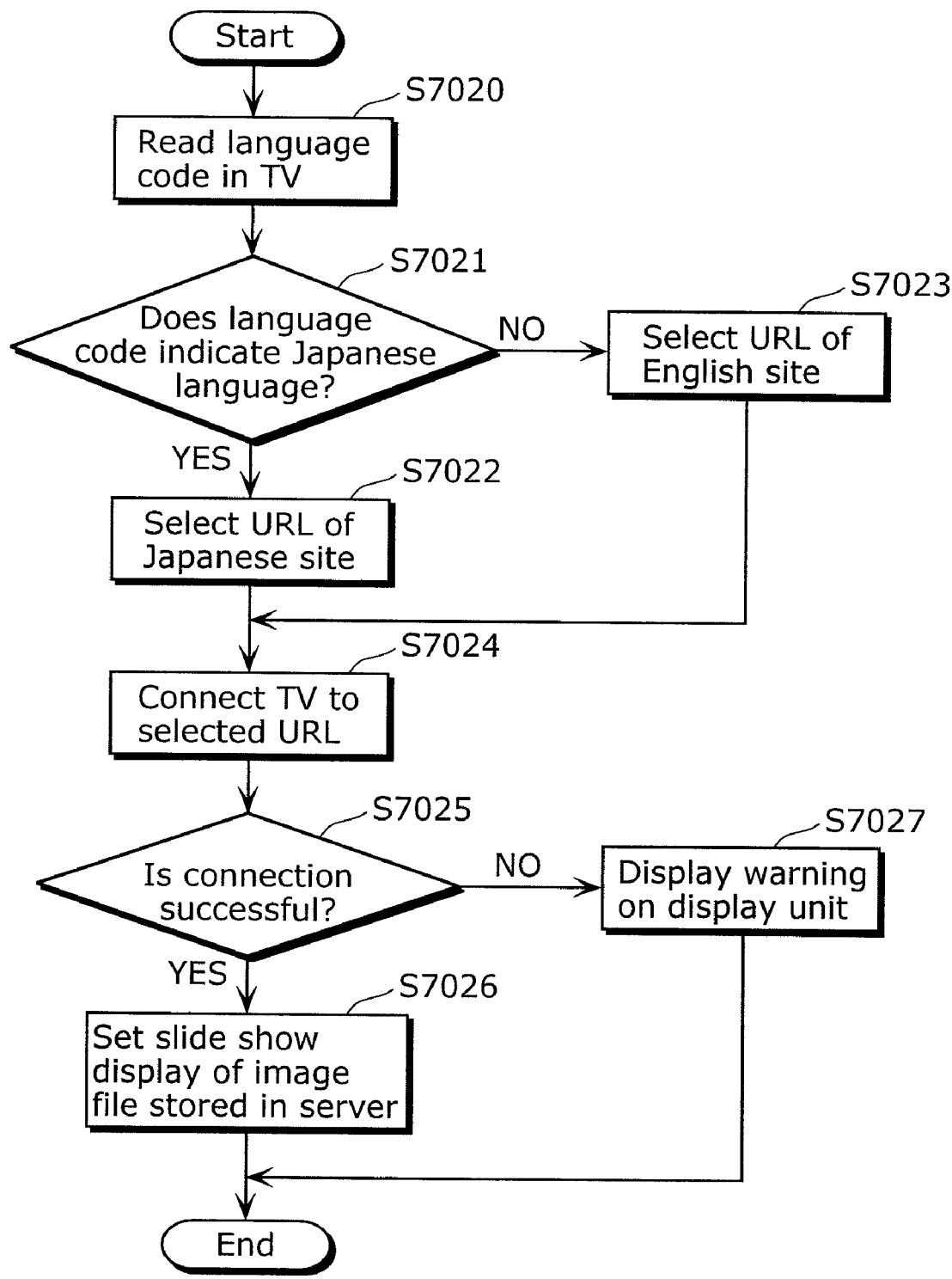
FIG. 36 is a flowchart of an example of a program generated by the program generation unit 7005.

FIG. 36 is a flowchart of execution of the program generated or updated by the program generation unit 7005. The program is transmitted from the image capturing device 1 to a device (apparatus) different from the image capturing device 1 via the second antenna 21 of the image capturing device 1. Then, the program is executed by the different device. In the first embodiment, the different device is the TV 45. The TV 45 receives the program via the RF-ID reader/writer 46 and executes the received program by a controller or virtual machine (not shown) in the TV 45.

First, the program is executed to read the language code set in the TV 45, as unique information of the TV 45 (S7020). The language code is predetermined by the user to be used in displaying a menu and the like on the TV 45.

Next, the program is executed to determine a language indicated in the language code. First, a determination is made as to whether or not the language code indicates Japanese language (S7021). If the determination is made that the language code indicates Japanese language, then a connection command for a Japanese site is selected from the connection commands in the program (S7022). On the other hand, if the determination is made that the language code does not indicate Japanese language, then a connection command for an English site is selected from the connection commands in the program (S7023). It should be noted that it has been described in the first embodiment that a determination is made as to whether or not the language code indicates Japanese language, and thereby a connection command is selected from the connection command for connecting to a Japanese site and the connection command for connecting to an English command. However, it is also possible that the program includes a plurality of connection programs compliant to various language codes. Thereby, the program can be compliant to two or more language codes. As a result, usability is improved. Next, according to the selected connection command, the program is executed to connect the TV 45 to the URL indicted in the connection command (S7024).

Then, a determination is made as to whether or not the connection to the URL indicted in the connection command is successful (S7025). If the connection is failed, then the display unit of the TV 45 displays warning indicating the connection failure (S7027). On the other hand, if the connection is successful, then a command for displaying a slide show of an image file stored in the server is executed to display the slide show (S7026).

It should be noted that the above is the situation where the operation program is for displaying images as a slide show. However, the operation program is not limited to the above. The program may be used for performing list display, forced display, or forced printing. If the operation program is for forced display, a step (command) of automatically changing setting of the TV 45 to setting of displaying an image file stored in the server is added to the program. Thereby, the user does not need to change the setting of the TV 45 by manual in order to display images provided from the image server. In the case of the forced printing, a command for automatically changing setting of the TV 45 to a printable mode is added to the program. Moreover, in the case of each of the forced printing and forced display, a determination command for determining whether or not the TV 45 has a printing function or a displaying function is added to the program. Thereby, the forced print command is not executed in an apparatus (device) without a printing function. Furthermore, the operation program in the first embodiment of the present invention may be a connection program for leading other programs. For example, the operation program may be a loader program, such as a boot-loader for loading other programs to be executed.

As described above, the first embodiment of the present invention is characterized in that the program generation unit 7005 is included in the first processing unit 35 of the image capturing device 1 that is a device having RF-ID communication means (such as the data transfer unit 108 and the second antenna 21). It is also characterized in that the program generated or updated by the program generation unit 7005 is executed by a different device (apparatus) except the image capturing device 1 according to the first embodiment of the present invention that is a communication device having RF-ID.

Conventionally, a device having RF-ID needs to transfer ID information (tag information), which the device has, from a RF-ID communication unit to another device (for example, the TV 45 according to the first embodiment of the present invention). The device (apparatus) receiving the ID information should previously hold operation programs each unique to a corresponding device having RF-ID. Therefore, if new products having RF-ID technology appear, the receiving device needs to install an operation program corresponding to the new products and execute the program. Otherwise, the receiving device is excluded as not being compliant to the new products. The installation of operation programs requires technical knowledge. Not everyone can perform the installation. Therefore, if various new devices having RF-ID are produced, other devices such as the TV 45 of the first embodiment of the present invention become obsolete. As a result, property values of user's devices are damaged.

According to the disclosure of the first embodiment of the present invention, the device having RF-ID technology has the program generation unit 7005 and sends not ID information (tag information) but a program to another device (apparatus) such as the TV 45. The apparatus such as the TV 45 receives and executes the program. Therefore, the receiving apparatus does not need to previously have operation programs for various devices having RF-ID. Even if a new device having RF-ID technology appears, the receiving apparatus does not need to install a new program for the device. Therefore, usability is significantly improved.

Therefore, the terminal such as a TV does not need to previously have application programs for respective items, kinds, or application systems of various objects having RF-ID. Thereby, the terminal such as a TV does not need to previously have a storage device, either, for holding various application programs. In addition, maintenance such as version-up of the programs in the terminal is not necessary.

The program generated by the program generation unit 7005 is useful if it is executable in any execution platforms such as a Java™ language. Therefore, if the device (apparatus) such as the TV 45 executing programs has a Java™ virtual machine, programs generated by any devices (apparatuses) can be executed.

It should be noted that the program generation unit 7005 according to the first embodiment of the present invention may has a function of updating the program previously stored in the program storage unit 7003 of the second memory 52. The situation of updating a program produces the same advantages as that in the situation of generating a program. The generating or updating performed by the program generation unit 7005 may be generating or updating data used in executing a program by the TV 45. In general, the program includes additional initialization setting data. The additional data is used to switch an execution mode or to set a flag. Therefore, generating or updating of the additional data is equivalent to generating or updating of the program, without deviating from the inventive concepts of the present invention. This is because, for execution of a program, it depends on design whether a parameter for mode switching or the like is to be hold and read as data, or is to be included in the program to be executed. Therefore, when the program generation unit 7005 according to the first embodiment of the present invention generates or updates a program, the program generation unit 7005 can also generate data such a parameter sequence used by the program. The parameter is generated based on the forced display instruction 7000, the forced print instruction 136, the image display method instruction information 77, the format identification information 7001, or the like stored in the second memory 52.

The following describes characteristic structures and processing of the second memory 52 and the first processing unit 35 in the image capturing device 1 that is a communication device having RF-ID according to the first embodiment of the present invention. In the first embodiment of the present invention, the image capturing device 1 that is a communication device having RF-ID has a use status detection unit in the first processing unit 35. The use status detection unit detects a trouble related to operation, a power consumption status, or the like. The image capturing device 1 generates a program for displaying the result of the detection (use status) on the TV 45 that is a device (apparatus) different from the image capturing device 1.

Figure 37:
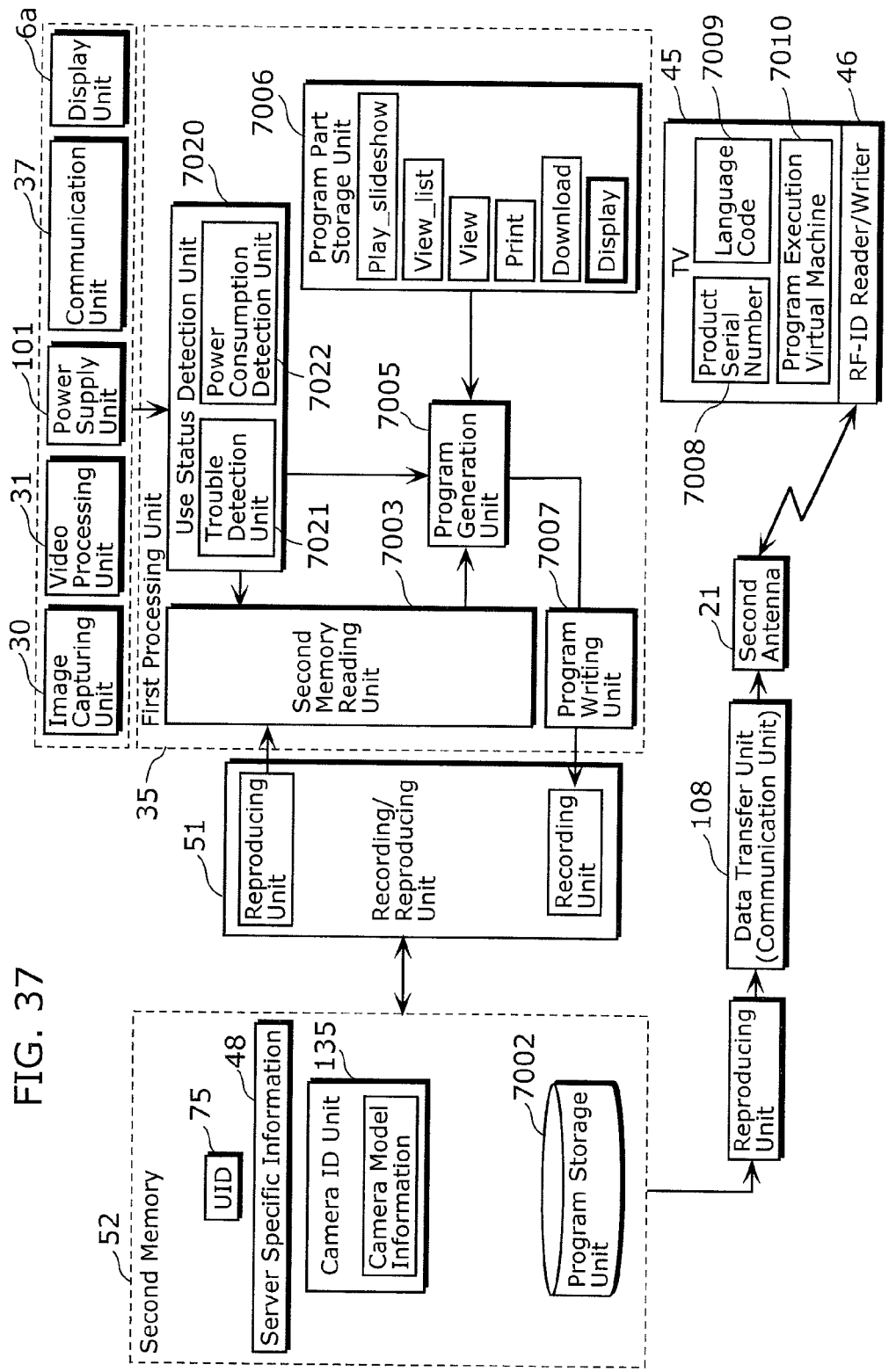
FIG. 37 is a block diagram of (a) the first processing unit generating the operation program in the image capturing device 1 to display a use status of the image capturing device 1, and (b) the second memory unit.

FIG. 37 is a block diagram of characteristic structures of the second memory 52 and the first processing unit 35 in the image capturing device 1 according to the first embodiment of the present invention.

The second memory 52 includes the UID 75, the server specific information 48, the camera ID 135, and the program storage unit 7002.

The UID 75 is a serial number unique to the image capturing device 1, and used to identify the single image capturing device 1.

The server specific information 48 is information for identifying the server 42 to which image data captured by the image capturing device 1 is transmitted by the communication unit 37. The server specific information 48 includes a sever address, a storing directory, a login account, a login passwords, and the like.

The camera ID 135 includes a product serial number, a manufacturing year/month/date, a manufacturer, a manufacturing line, a manufactured location, and the like of the image capturing device 1. The camera ID 135 also includes camera model information for identifying a model of the image capturing device 1.

The first processing unit 35 includes the second memory reading unit 7003, a use status detection unit 7020, the program generation unit 7005, the program part storage unit 7006, and the program writing unit 7007.

The second memory reading unit 7003 reads information from the second memory 52 via the recording/reproducing unit 51. In the first embodiment of the present invention, the second memory reading unit 7003 reads the UID 75, the server specific information 48, and the camera ID 135 from the second memory 52, and provides the pieces of information to the program generation unit 7005. Reading of the pieces of information from the second memory 52 is performed when a readout signal is provided from a use status detection unit 7020 that is described later.

The use status detection unit 7020 detects a use status of each unit included in the image capturing device 1. The use status detection unit 7020 includes sensors each detecting a trouble in operation of a corresponding unit included in the image capturing device 1. Results of the detection of the sensors in respective units are provided to the use status detection unit 7020. The sensors for the respective units provide the use status detection unit 7020 with trouble information, battery duration, a power consumption amount, and the like. For example, the image capturing unit 30 provides the use status detection unit 7020 with information indicating whether or not an image capturing operation of the image capturing unit 30 has any trouble (whether or not the image capturing unit 30 functions correctly, and whether or not the image capturing unit 30 responds to a call from the use status detection unit 7020). The video processing unit 31 provides the use status detection unit 7020 with information indicating whether or not data processing for image data captured by the image capturing unit 30 has any trouble (whether or not the video processing unit 31 functions correctly, and whether or not the video processing unit 31 responds to a call from the use status detection unit 7020). The first power supply unit 101 provides the use status detection unit 7020 with a voltage level of the battery and a total power consumption amount. The communication unit 37 provides the use status detection unit 7020 with information indicating whether or not the communication unit 37 is successfully connected to the server or the Internet (whether or not the communication unit 37 functions correctly, and whether or not the communication unit 37 responds to a call from the use status detection unit 7020). The display unit 6a provides the use status detection unit 7020 with information indicating whether or not display processing has any trouble, whether or not the display unit 6a correctly responds to a call from the use status detection unit 7020, and the display unit 6a functions correctly. Based on the above pieces of status information provided regarding the respective units, the internal trouble detection unit 7021 in the use status detection unit 7020 determines whether or not each of the units has any trouble in its functional operation. If there is a trouble, then the use status detection unit 7020 provides the program generation unit 7005 with information for specifying the trouble. The use status detection unit 7020 has a power consumption detection unit 7022. The power consumption detection unit 7022 generates power consumption information based on the total power consumption information provided form the power supply unit, and then provides the power consumption information to the program generation unit 7005.

The program generation unit 7005 generates a program for displaying, on the TV 45, the information for specifying a trouble or the power consumption information which is provided from the use state detection unit 7020. For generation of a program, instruction sets to be included in the program are previously stored in the program part storage unit 7006. Therefore, the program generation unit 7005 generates (a) a display command ("display" in FIG. 37) for displaying a trouble or a power consumption amount, and (b) a program for displaying information for specifying a location of the trouble and information for specifying the trouble in detail. It should be noted that the power consumption amount may be converted to a carbon dioxide emission amount, and therefore a program may be generated to display the carbon dioxide emission amount.

The program generated by the program generation unit 7005 is stored in the program storage unit 7002 in the second memory 52 via the program writing unit 7007.

The program stored in the program storage unit 7002 in the second memory 52 is transmitted to the RF-ID reader/writer 46 of the TV 45 via the data transfer unit 108 and then the second antenna 21.

The TV 45 executes the received program by the program execution virtual machine 7010.

With the above-described structure, the program generation unit 7005 in the first processing unit 35 generates a program for displaying, on the TV 45, trouble information or use status information detected by the use status detection unit 7020 regarding use of the image capturing device 1. The program is transmitted to the TV 45 that displays the trouble information or the use status information of the image capturing device 1. Thereby, the TV 45 can present the trouble information or the use status information to the user, without installing a plurality of programs compliant to various devices including the image capturing device 1.

In conventional systems, each of devices such as an image capturing device, a camcorder, an electric toothbrush, and a weight scale is provided with a simple display function such as a liquid crystal device, so as to display the trouble information or the use status information on the corresponding display function. Therefore, the display function has a low display capability for merely displaying the trouble information as a symbol sequence or an error code. When the trouble information is presented, the user needs to read instruction manual to check what kind of trouble it is. Some users have lost instruction manual and therefore obtain more information from a website on the Internet.

In the system according to the first embodiment of the present invention, however, a program for displaying trouble information can be executed by the TV 45 not by the image capturing device 1. The TV 45, which displays the trouble information detected by each device such as the image capturing device 1, has a display capability higher than that of the conventional systems. Therefore, the system according to the first embodiment of the present invention can solve the above conventional problem.

The following describes, in detail with reference to figures, the situation where a program generated by the image capturing device 1 described with reference to FIG. 3 is executed by a plurality of apparatuses (devices) including the TV 45.

Figure 38:
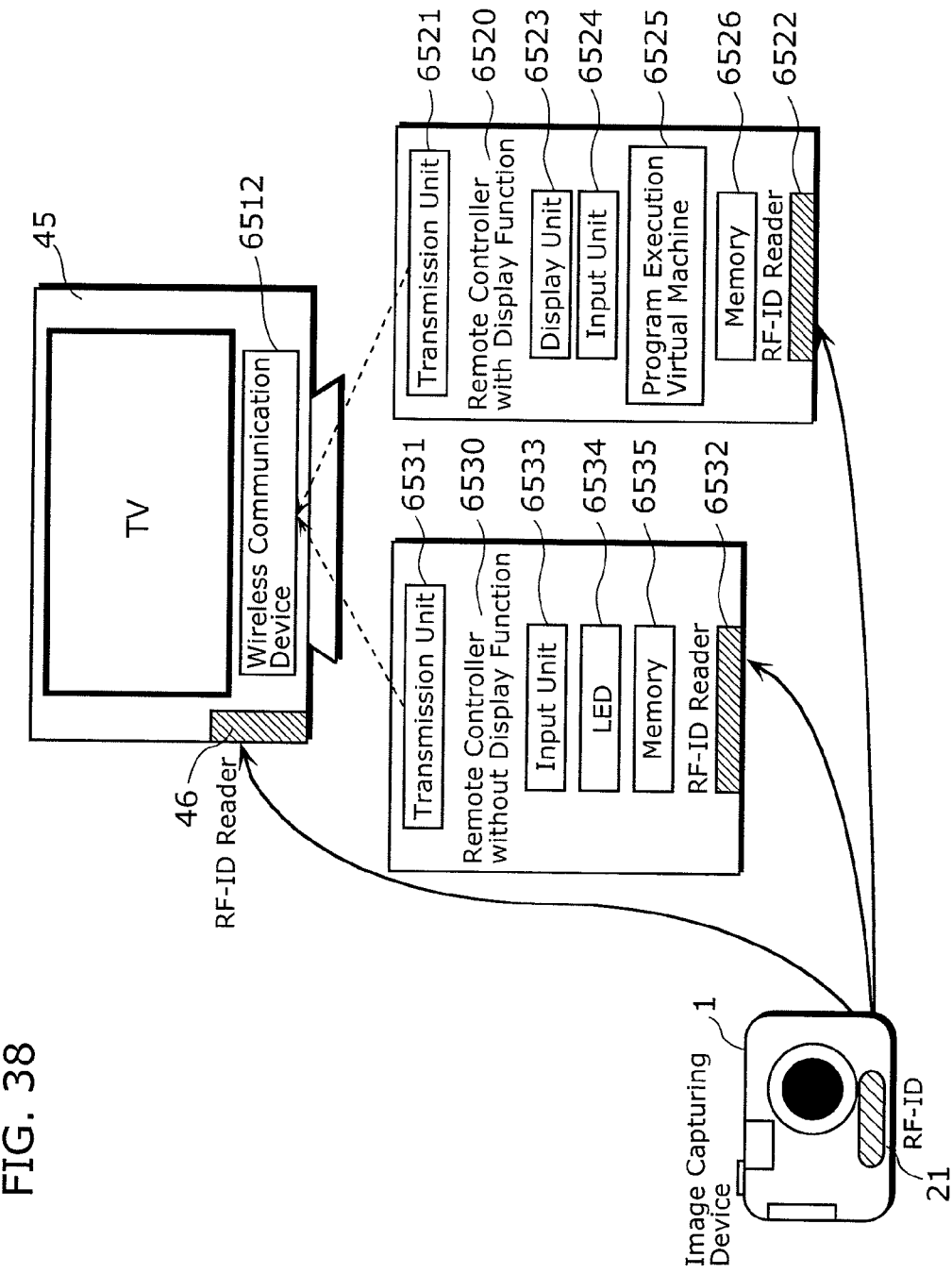
FIG. 38 illustrates a use example where the program generated by the image capturing device 1 is executed by an external device (apparatus).

FIG. 38 illustrates a system in which a program generated by the image capturing device 1 is executed by a plurality of apparatuses. The system includes the image capturing device 1, the TV 45, a remote controller (with display function) 6520, and a remote controller (without display function) 6530.

The TV 45 includes the RF-ID reader/writer 46 and a wireless communication device 6512. The wireless communication device 6512 is, for example, a general infrared communication device currently used as many remote controllers of home appliances, or a short-range wireless communication device used for home appliances using radio waves, such as Bluetooth and ZigBee.

The remote controller (with display function) 6520 includes a transmission unit 6521, a display unit 6523, an input unit 6524, a RF-ID reader 6522, a memory 6526, and a program execution virtual machine 6525. The transmission unit 6521 transmits signals to the wireless communication device 6512 of the TV 45. The display unit 6523 displays video. The input unit 6524 receives key inputs from a user. The RF-ID reader 6522 communicates with the RF-ID unit 47. The memory 6526 stores a program received by the RF-ID reader 6522. The program execution virtual machine 6525 is a virtual machine that executes the program received by the RF-ID reader 6522. For instance, recent mobile phones are example of the remote controller (with display function) 6520, having an infrared communication function, Bluetooth, a RF-ID reader, a liquid crystal display, a key input unit, a Java™ virtual machine, and the like. The display unit 6523 and the input unit 6524 may be a liquid crystal display and a plurality of character input buttons, or may be integrated into a liquid-crystal touch panel, for example.

The remote controller (without display function) 6530 includes a transmission unit 6531, an input unit 6533, a RF-ID reader 6532, and a memory 6535. The transmission unit 6531 transmits signals to the wireless communication device 6512 of the TV 45. The input unit 6533 such as buttons receives key inputs from a user. The RF-ID reader 6532 communicates with the RF-ID unit 47. The memory 6535 temporarily stores data received by the RF-ID reader 6532.

The remote controller (without display function) 6530 is, for example, a general remote controller having a RF-ID reader. Remote controllers are common accessory devices of TVs.

In the first embodiment of the present invention, there are the following four possible situations from which the user selects a preferred one. In the first situation, the program generated by the image capturing device 1 is transmitted directly to the TV 45 via the RF-ID reader/writer 46 of the TV 45, and executed by the TV 45. In the second situation, the program generated by the image capturing device 1 is transmitted indirectly to the TV 45 via the remote controller (without display function) 6530, and executed by the TV 45. In the third situation, the program generated by the image capturing device 1 is transmitted indirectly to the TV 45 via the remote controller (with display function) 6520, and executed by the TV 45. In the fourth situation, the program generated by the image capturing device 1 is transmitted to the remote controller (with display function) 6520, and executed by the remote controller (with display function) 6520.

The first situation has been already described above in the first embodiment. Therefore, the first situation is not described again below.

The following describes the above second to fourth situations.

In the second situation, a program generated by the image capturing device 1 is executed by the TV 45, via the remote controller (without display function) 6530, such as general TV remote controllers, that does not have a graphical display device such as a liquid crystal panel.

When the user moves the image capturing device 1 to bring the RF-ID unit 47 to the RF-ID reader 6532, the RF-ID reader 6532 reads the program generated by the image capturing device 1 to store the program in the memory 6535.

Then, when the user presses the input unit 6533, the program held in the memory 6535 is transmitted from the transmission unit 6531 to the wireless communication device 6512 of the TV 45. The program execution virtual machine 7010 in the TV 45 executes the program. If the wireless communication device 6512 is a directional infrared communication device, the user presses the input unit 6533, facing the remote controller (without display function) 6530 to the TV 45. If the wireless communication device 6512 is a non-directional short-range wireless communication device, such as devices using Bluetooth or ZigBee, the program is transmitted to the TV 45 that is previously paired with the remote controller (without display function) 6530. In the case of the short-range wireless communication device, it is also possible that the program is automatically transmitted to the paired TV 45 when the RF-ID reader 6532 reads the program from the RF-ID unit 47, without user's pressing of the input unit 6533.

The remote controller (without display function) 6530 may have a display unit, such as a LED 6534, for notifying the user of that data read by the RF-ID reader 6532 is stored in the memory 6535. The LED 6534 is lit up to encourage the user to press the input unit 6533, when the program is read by the RF-ID reader 6532 and stored in the memory 6535. The LED 6534 is lit out when the transmission of the program to the TV 45 is completed. Thereby, it is possible to clearly notify the user of that the remote controller (without display function) holds the program. The LED 6534 may be an independent LED or integrated into the input unit 6533.

In the second situation, even if the user is far from the TV 45, the program can be executed by the TV 45 by using the remote controller (without display function) 6530 in the user's hand.

In the third and fourth situations, if the remote controller (with display function) 6520 has a program execution virtual machine as high-function mobile phones called smart phones do, the user can select whether the program generated by the image capturing device 1 is executed on the remote controller (with display function) 6520 or the program is transmitted to the TV 45 to be executed on the TV 45.

When the user moves the image capturing device 1 to bring the RF-ID unit 47 to the RF-ID reader 6522, the RF-ID reader 6522 reads the program generated by the image capturing device 1 to store the program in the memory 6535.

Figure 39:
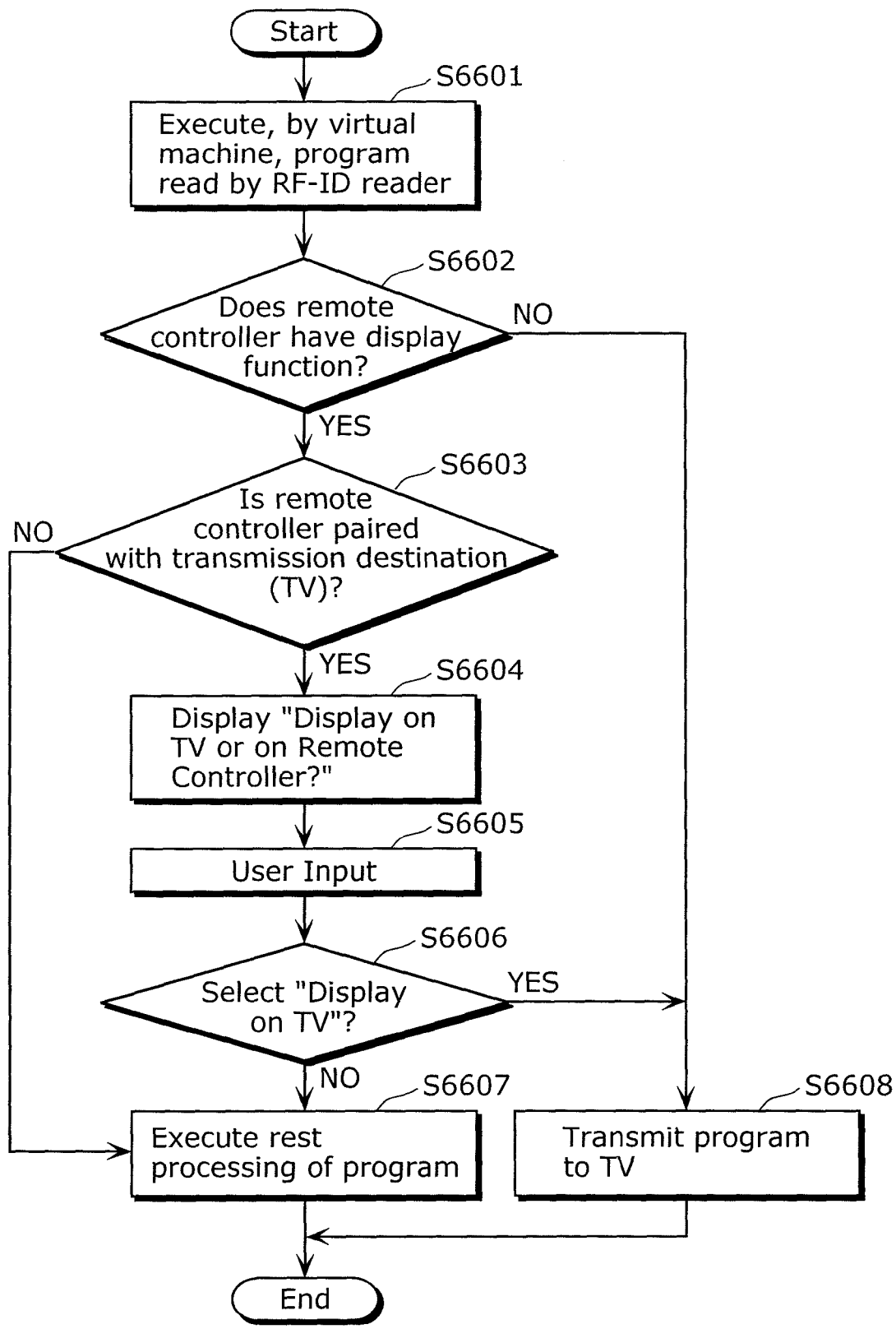
FIG. 39 is a sequence where the program generated by the image capturing device 1 is executed by a remote controller with display function.

The following describes the processing performed by the remote controller (with display function) 6520 in more detail with reference to a flowchart of FIG. 39.

First, a program read by the RF-ID reader 6522 is transmitted to the program execution virtual machine 6525 and executed by the program execution virtual machine 6525 (S6601).

Next, a determination is made as to whether or not the remote controller 6520 has a display function (S6602). If the remote controller 6520 does not have any display function (N at S6602), then the program is transmitted to the TV 45 via the transmission unit 6521 and then the processing is completed. In this situation, the program is executed by the TV 45.

If the remote controller 6520 has a display function (Y at S6602), then a further determination is made as to whether or not the remote controller 6520 is paired with the TV 45 that is a transmission destination (S6603). If the remote controller 6520 is not paired with the TV 45 (N at S6603), then a rest processing of the program is executed by the display unit 6523 of the remote controller 6520. On the other hand, if the remote controller 6520 is paired with the TV 45 (Y at S6603), then the display unit 6523 displays a dialog message "Display on TV or on Remote Controller?" to encourage the user to select one of the options (S6604).

Then, the remote controller 6520 receives user's entry by the input unit 6524 (S6605). A determination is made as to whether or not the user selects to display data on the TV 45 (S6606). If the user selects the TV 45 to display data (Y at S6606), then the program is transmitted to the TV 45 via the transmission unit 6521 and thereby the processing is completed. In this situation, the program is executed by the TV 45. On the other hand, if the user selects the remote controller to display data (N at S6606), then a rest processing of the program is executed by the remote controller 6520 using the display unit 6523 (S6607).

It should be noted that the "rest processing of the program" refers to displaying of a status of a battery, a trouble status, or an instruction manual regarding the image capturing device 1, but, of course, not limited to those described in the first embodiment.

With the above structure, a program generated by the image capturing device 1 is transmitted to the remote controller with display function, then a capability of the remote controller with display function is examined, and a determination is made by the remote controller as to which apparatus (device) is to execute rest processing of the program. Thereby, the remote controller does not need to previously install various programs compliant to a plurality of apparatuses. The user can execute the program in his/her preferred manner.

It should be noted that it has been described in the first embodiment that the determination is made based on whether or not the remote controller has a display function and based on a pairing status of the remote controller. However, it is not limited to the above. A program may execute any determination based on a capability of the apparatus, such as a communication capability, an audio-video reproduction capability, a capability of an input unit, a capability of an output device, and the like.

It should also be noted that it has been described in the first embodiment that the remote controller (without display function) 6530 transmits information to the TV 45 every time one RF-ID (the image capturing device 1 in this example) is read out. However, the remote controller (without display function) 6530 may read two or more pieces of RF-ID and then transmit all of them to the TV 45 at once. This makes it possible, for example, that the remote controller obtains pieces of information sequentially from a RF-ID-attached heat rate meter and also sequentially from RF-ID-attached Pedometer™, and then transmits the pieces of information to the TV 45. Therefore, the TV 45 can display a single graph of a history of steps versus a history of a heart rate. If the heat rate meter and the Pedometer™ store programs individually, a program to be executed by the TV 45 may be set to be a program stored in an apparatus (device) from which information is read last time, or may be selected by a user. Or, the user may select a device executed by the program. Of course, the remote controller (with display function) 6520 may also read two or more pieces of RF-ID and then display all of them on the display unit of the remote controller 6520 at once.

As described above, the storage region of the RF-ID unit holds not only information but also a program describing operations of an apparatus (device). This considerably simplify changing or updating of a program, which has been necessary for conventional techniques to change operations of apparatuses. In addition, it is possible to deal with addition of various new functions and an increase of cooperative apparatuses. Moreover, proximity communication using RF-ID technology is a simple operation achieved by simply bringing a device into proximity of an apparatus, which the user can easily understand. Therefore, conventional bothersome device operations by using buttons and a menu are simplified. As a result, the complicated device operations are changed to be convenient.

Second Embodiment

The following describes the second embodiment of the present invention. In the second embodiment, actual operations of the communication system are described. In the communication system, images captured by a camera are uploaded to a server, and then downloaded by a simple operation to a TV to be displayed. The whole configuration of the communication system according to the second embodiment is the same as that of the communication system according to the first embodiment.

FIGS. 40A to 40E are flowcharts of processing performed by a camera (the image capturing device 1) to upload photographs (images). First, the camera captures images (Step S5101). Then, the captured images are stored into the third memory (Step S5102). Then, the camera updates information stored in the second memory (Step S5103). The second memory updating process will be described later. Next, the camera determines whether or not the communication unit is connectable to the Internet (Step S5104). If connectable, then the camera generates a URL (Step S5105). The URL generation process will be described in more detail later. After generating the URL, the camera uploads the captured images (Step S5106). In completing the uploading process, the camera disconnects the communication unit from the Internet (Step S5107). As a result, the processing is completed. The uploading process will be described in more detail later.

The second memory updating process of Step S5103 enables the server 42 and the camera to share identification information for distinguishing photographs that have already been uploaded to the server 42 from photographs that have not yet been uploaded to the server 42. Examples of the uploading process at Step S5106 are given as following cases 1 to 4.

In case 1, the final capturing time (final capturing date/time) 68 is previously stored in the second memory, and then updated after the captured images are stored into the third memory (Step S5111).

Comparison of a time of uploading the captured images to the final capturing time 68 of the camera allows the server 42 and the camera to share identification information of the uploaded photographs.

In case 2, the above advantages can be produced also by generating existence identifiers 64 of images not yet been uploaded to the server 42, with reference to images uploaded to the server 42 among the captured images, and storing the generated existence identifiers 64 into the second memory (Step S5121).

In case 3, it is also possible that the not-yet-uploaded image information hashed information 67 is stored in the second memory (Step S5131). Thereby, an amount of the information stored in the second memory is reduced, thereby saving a capacity of the second memory.

In case 4, it is further possible that image serial numbers are chronologically generated for captured images, and thereby the final image serial number 69 in the second memory is updated (Step S5141). Thereby, even if a time counted by the camera is not correct, it is possible to synchronize information of uploaded photographs between the server 42 and the camera.

Figure 41:
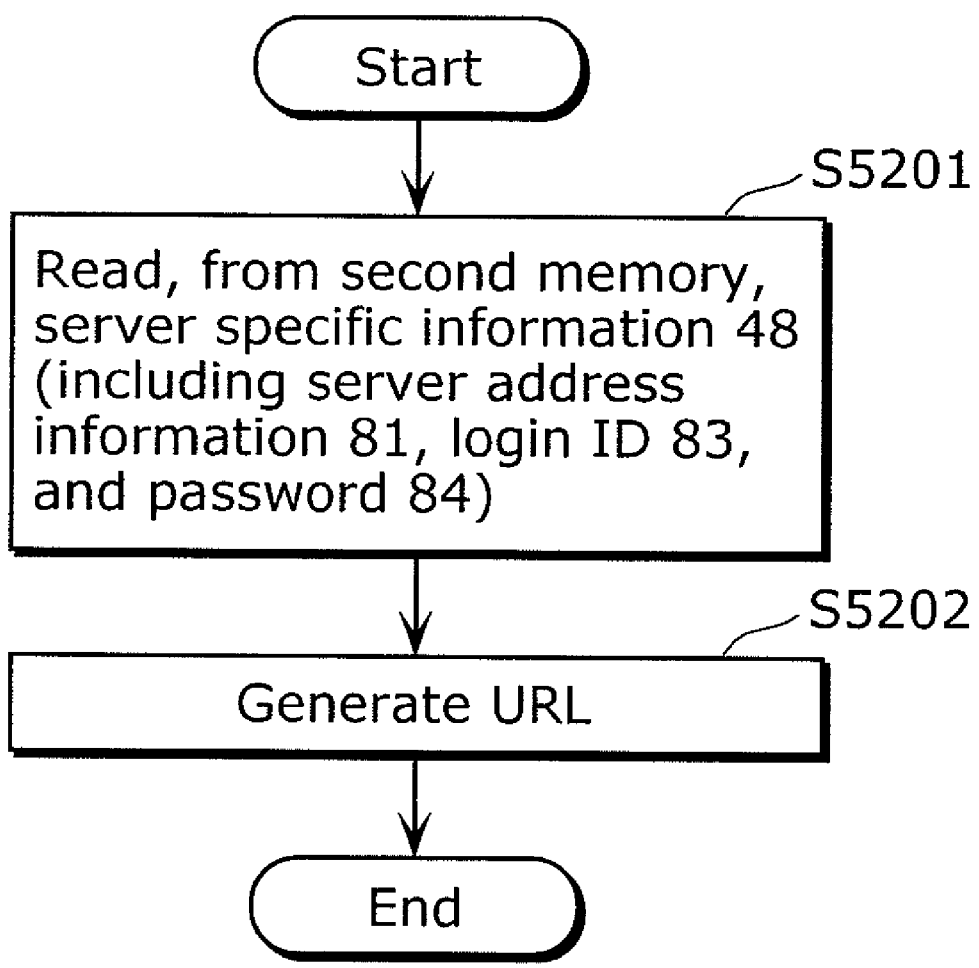
FIG. 41 is a flowchart of uploading steps in the camera according to the second embodiment of the present invention.
Figure 42A:
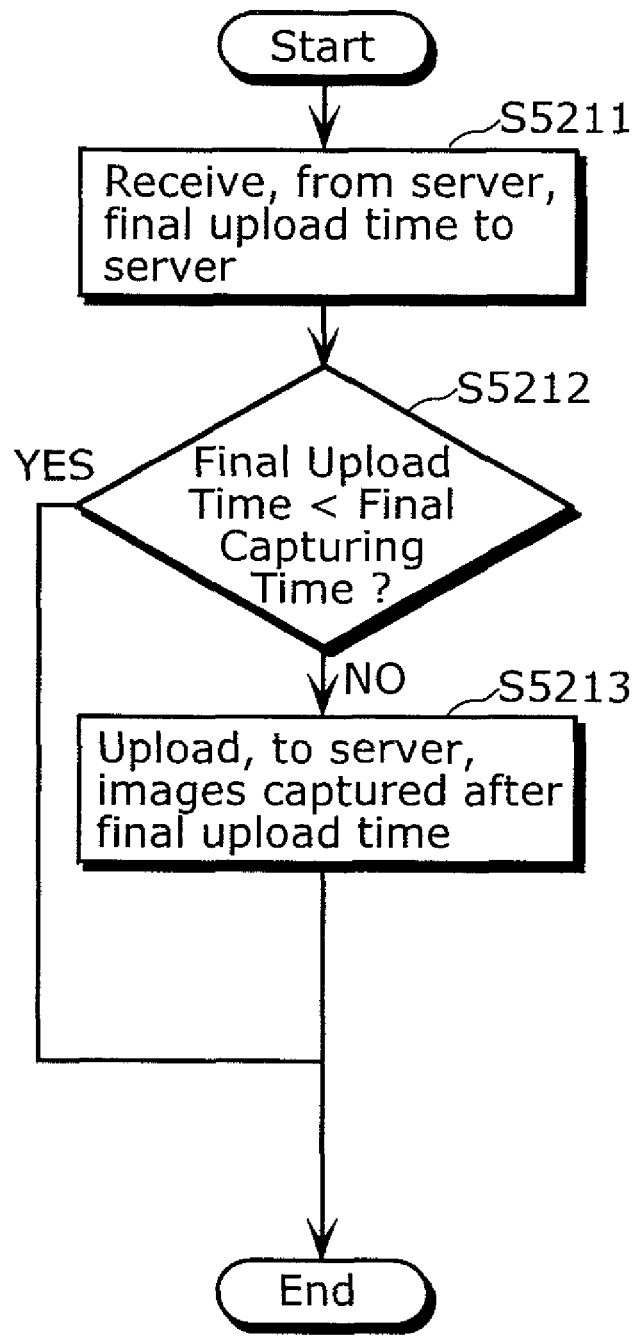
FIG. 42 is a flowchart of uploading steps in the camera according to the first embodiment of the present invention.
Figure 42B:
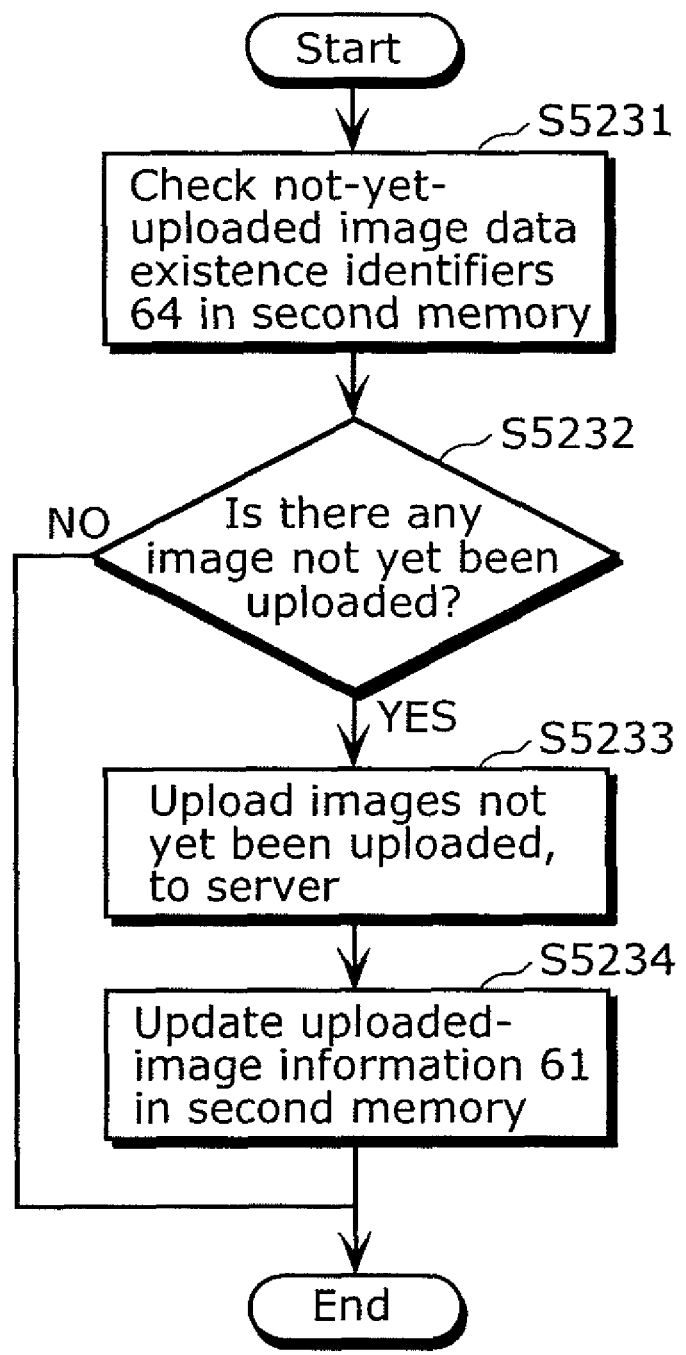
Figure 42D:
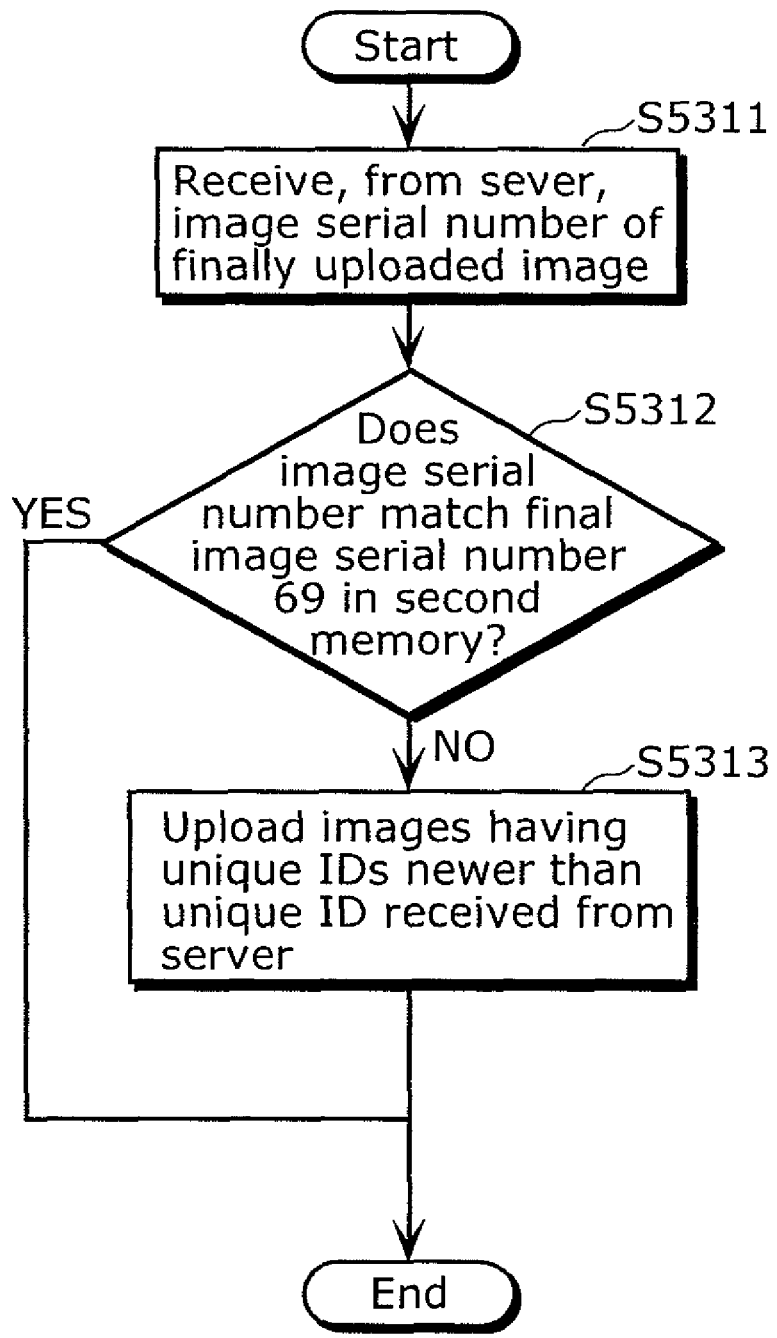

FIG. 41 depicts details of the URL generation process at Step S5105. The camera reads, from the second memory, the server specific information 48 including the server address information 81, the login ID 83, and the password 84 (Step S5201). Based on the server specific information 48, the camera generates a URL (Step S5202)

FIGS. 42A to 42D depict details of the uploading process at Step S5106.

Figure 40A:
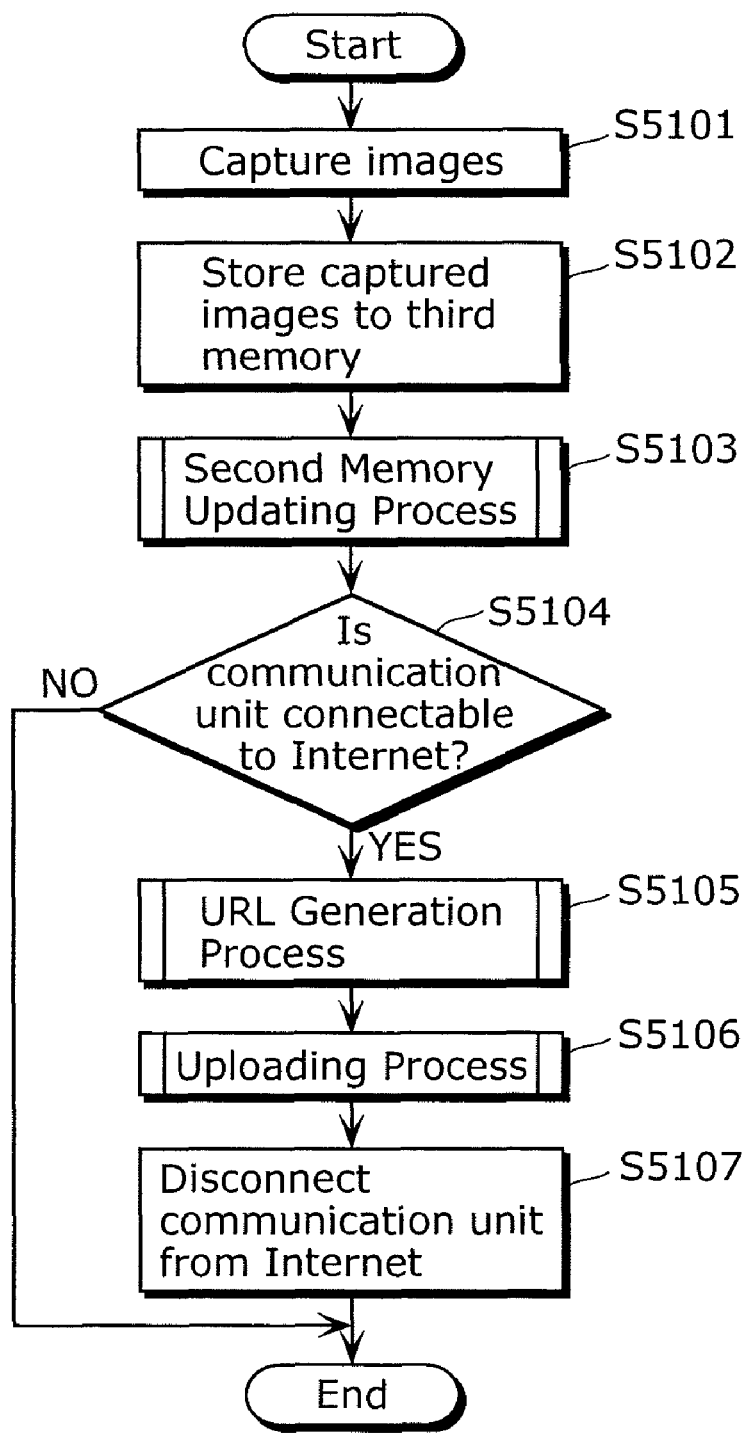
FIG. 40A is a flowchart of uploading steps in a camera according to a second embodiment of the present invention.
Figure 40B:
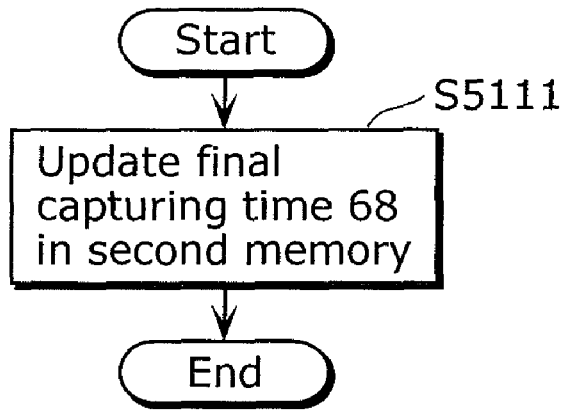
FIG. 40B is a flowchart of uploading steps in the camera according to the second embodiment of the present invention.
Figure 40C:
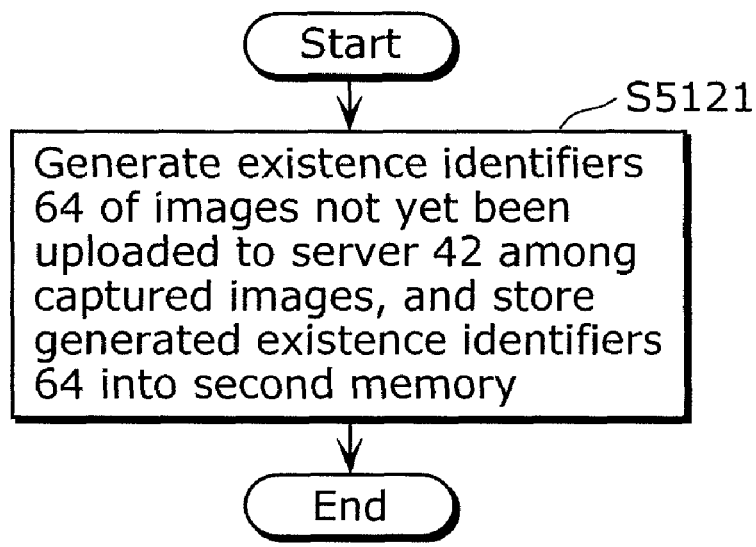
FIG. 40C is a flowchart of uploading steps in the camera according to the second embodiment of the present invention.
Figure 40D:
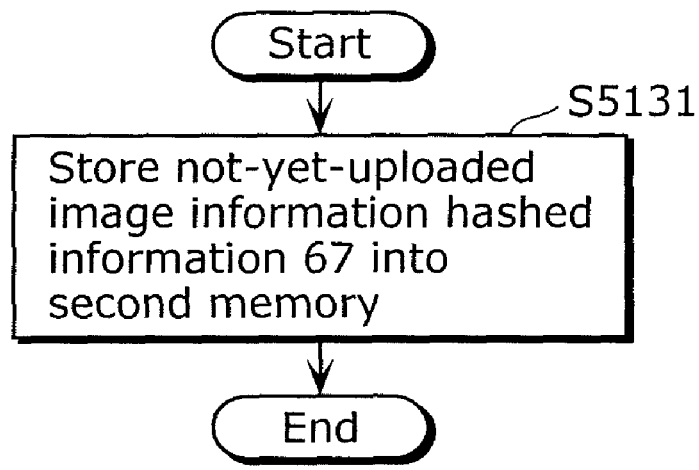
FIG. 40D is a flowchart of uploading steps in the camera according to the second embodiment of the present invention.
Figure 40E:
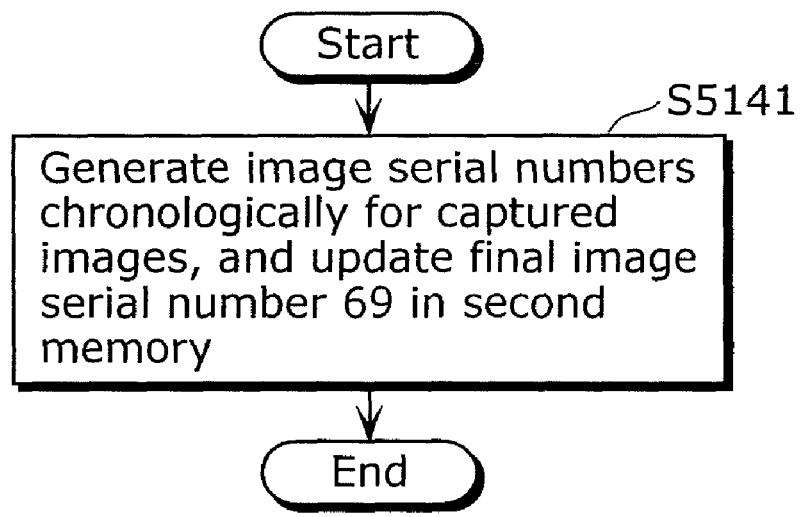
FIG. 40E is a flowchart of uploading steps in the camera according to the second embodiment of the present invention.

The cases 1 to 4 in FIGS. 42A to 42D correspond to the above-described cases 1 to 4 of the second memory updating process in FIGS. 40B to 40D, respectively.

In case 1, the camera receives, from the server 42, a final upload time (final upload date/time) that is a time of finally uploading to the server 42 (Step S5211). Then, the camera compares the final upload time to the final capturing time (Step S5212). If the final capturing time is later than the final upload time (in other words, if there is any image captured after final uploading), then the camera uploads, to the server 42, any images captured after the final upload time (Step S5213).

In case 2, the camera checks not-yet-uploaded image data existence identifiers 64 in the second memory (Step S5231). Thereby, the camera determines whether or not there is any image not yet been uploaded (Step S5232). If there is any image not yet been uploaded, then the camera uploads images not yet been uploaded, to the server 42 (Step S5233). Then, the camera updates the uploaded-image information 61 in the second memory (Step S5234).

In case 3, the camera checks the not-yet-uploaded image information hashed information 67 in the second memory (Step S5301). Thereby, the camera determines whether or not the not-yet-uploaded image information hashed information 67 in the second memory is the same as hashed information that is generated by hashing NULL (Step S5302). If the not-yet-uploaded image information hashed information 67 is not the same as the hashed information regarding NULL, then the camera determines that there is an image not yet been uploaded to the server 42 and therefore uploads, to the server 42, any images that are stored in the third memory but have not yet been uploaded to the server 42 (Step S5303).

In case 4, the camera receives, from the server 42, an image serial number of a finally uploaded image (Step S5311). Then, the camera determines whether or not the image serial number matches the final image serial number 69 in the second memory (Step S5312). If the image serial number does not match the final image serial number 69, then the camera uploads any images having UIDs that are newer than UID of the final image serial number 69 that is received from the server 42 (Step S5313).

FIG. 43 is a flowchart of RF-ID proximity communication between the image capturing device 1 and the TV 45.

First, the second antenna 21 embedded in the image capturing device 1 receives weak radio power from polling of the RF-ID reader/writer 46 of the TV 45, and thereby activates the RF-ID unit 47 operated under the second power supply unit 91 (S5401).

The RF-ID unit 47 of the image capturing device 1, which is activated by receiving weak power at Step S5401, responds to the polling of the RF-ID reader/writer 46 of the TV 45 (Step S5402).

After responding to the polling at Step S5402, mutual authentication is performed to determine whether or not the RF-ID unit 47 of the image capturing device 1 and the RF-ID reader/writer 46 of the TV 45 are legitimate devices, and also to share a cryptography key used for secure information communication between the image capturing device 1 and the TV 45 (Step S5403). The mutual authentication employs a public key cryptography algorism such as elliptic curve cryptography. In general, the employed method for the mutual authentication is the same as that of mutual authentication used in communication via High Definition Multimedia Interface (HDMI) or IEEE1394.

As described earlier, at Step S5403, the mutual authentication is performed between the RF-ID unit 47 of the image capturing device 1 and the RF-ID reader/writer 46 of the TV 45 to generate a common cryptography key. After that, the server URL generation information 80 is read from the server specific 48 stored in the second memory 52 readable from the RF-ID unit 47. The server URL generation information 80 is transmitted to the RF-ID reader/writer 46 of the TV 45 via the second antenna 21 (Step S5404). The server URL generation information 80 includes: the server address information 81 indicating address information of the server 42; the user identification information 82 that is the login ID 83 to the server 42; and the password 84 that is a login password to the server 42. The password 84 is important information for preventing unauthorized acts of a malicious third person. Therefore, the password 84 is sometimes encrypted beforehand as the encrypted password 85 to be stored, and then transmitted to the TV 45.

After the server URL generation information 80 is transmitted to the RF-ID reader/writer 46 of the TV 45 at Step S5404, the captured image state information 55 stored in the second memory 52 is also transmitted to the RF-ID reader/writer 46 of the TV 45 via the second antenna 21 (Step S5405). The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

In case 1, the final capturing time 68 is used as the captured image state information 55. Therefore, the TV 45 compares the final capturing time 68 to the final upload time. If the final capturing time 68 is temporally later than the final upload time that is a time of finally uploading to the server 42, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

After transmitting the captured image state information 55 from the second antenna 21 of the image capturing device 1 to the RF-ID reader/writer 46 of the TV 45 at Step S5405, the image display method instruction information 77 is also transmitted from the second memory 52 of the image capturing device 1 to the RF-ID reader/writer 46 of the TV 45 via the second antenna 21 (Step S5406). The image display method instruction information 77 is identification information indicating how the display unit of the TV 45 is to display the images downloaded from the server 42. The image display method instruction information 77 includes the list display (indicator) 78 indicating that the images are to be displayed in a list, and the slide show (indicator) 79 indicating that the images are to be displayed as a slide show.

As described above, at Steps S5401 to S5406, the image capturing device 1 transmits the server URL generation information 80, the captured image state information 55, and the image display method instruction information 77, which are stored in the second memory 52 of the image capturing device 1, from the second antenna 21 of the image capturing device 1 to the RF-ID reader/writer 46 of the TV 45. Here, it is desirable to encrypt all of the above pieces of information to be transmitted, by using the cryptography key information shared between the image capturing device 1 and the TV 45 at the mutual authentication. The encryption achieves secure information communication between the image capturing device 1 and the TV 45. As a result, intervention of a malicious third person can be prevented.

Since the server URL generation information 80 is transmitted to the TV 45, the server 42 (and directory) to which the first antenna 20 of the image capturing device 1 transmits data is the same as the server (and directory) from which the TV 45 downloads the data. Therefore, the TV 45 can display the images that have been captured by the image capturing device 1 and then uploaded to the server 42.

In addition, the transmission of the captured image state information 55 to the TV 45 makes it possible to examine synchronization between the captured images stored in the third memory 33 of the image capturing device 1 and the images uploaded from the first antenna 20 to the server 42. Therefore, the TV 45 can detect a failure of the synchronization. The display of the warning information indicating the synchronization failure on the TV 45 can prevent unnecessary confusion of the user.

Moreover, the transmission of the image display method instruction information 77 to the TV 45 enables the user to view images by a set image viewing method without designating the image viewing method on the TV 45. The user merely needs to move the image capturing device 1 into proximity of the TV 45. The complicated operations using a remote controller or the like of the TV 45 are not necessary. The images can be automatically displayed by the set viewing method.

Figure 44:
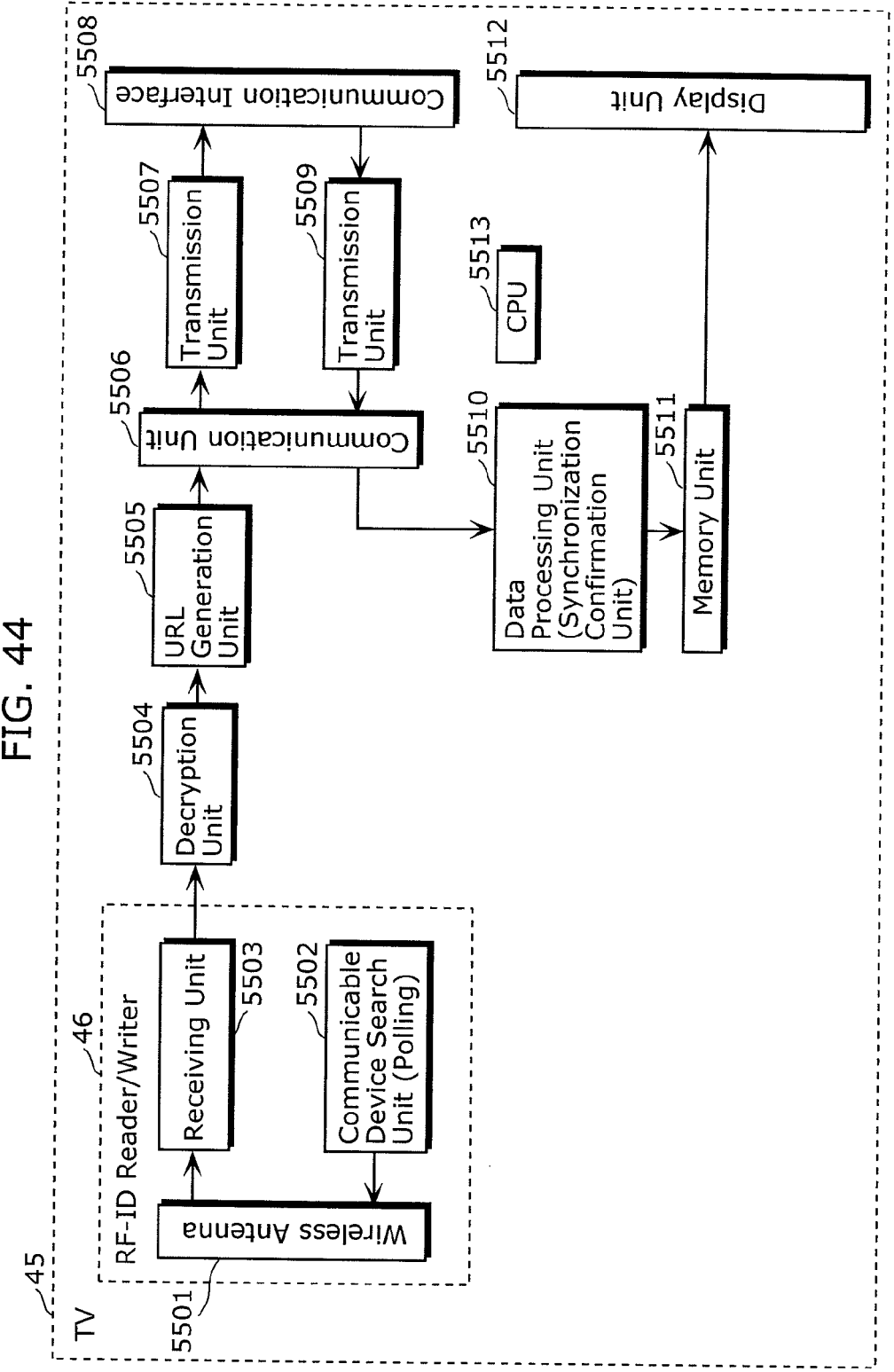
FIG. 44 is a block diagram of a TV according to the second embodiment of the present invention.

FIG. 44 is a block diagram of characteristic functions of a TV system according to the second embodiment of the present invention.

The TV 45 according to the second embodiment includes the RF-ID reader/writer 46, the decryption unit 5504, a URL generation unit 5505, a communication unit 5506, a transmission unit 5507, a communication interface 5508, a receiving unit 5509, a data processing unit 5510, a memory unit 5511, a display unit 5512, and a CPU 5513.

The RF-ID reader/writer 46 communicates with the RF-ID unit 47 of the image capturing device 1 via the second antenna 21. The RF-ID reader/writer 46 includes a wireless antenna 5501, a receiving unit 5503, and a communicable device search unit (polling unit) 5502.

The wireless antenna 5501 performs proximity wireless communication with the second antenna 21 of the image capturing device 1. The wireless antenna 5501 has the same structure as that of wireless antennas of general-purpose RF-ID reader/writers.

The communicable device search unit (polling unit) 5502 performs polling to check a RF-ID unit of each of plural cameras in order to examine whether to have any transmission request (or processing request). If the communicable device search unit 5502 receives a response of the polling from the RF-ID unit 47 of the image capturing device 1 (the corresponding camera), then the mutual authentication is performed to share a common cryptography key between the TV 45 and the image capturing device 1.

When the mutual authentication is completed after receiving the polling response, the receiving unit 5503 receives the server URL generation information 80, the captured image state information 55, and the image display method instruction information 77 from the second memory 52 via the second antenna 21 of the image capturing device 1.

The decryption unit 5504 decrypts the server URL generation information 80, the captured image state information 55, and the image display method instruction information 77 which are received by the receiving unit 5503. The decryption of the server URL generation information 80, the captured image state information 55, and the image display method instruction information 77 which have been encrypted is performed using the cryptography key shared between the image capturing device 1 and the TV 45 after the mutual authentication by the communicable device search unit (polling unit) 5502.

The URL generation unit 5505 generates, based on the server URL generation information 80, a URL to access the server 42, and then transmits the generated URL to the communication unit. The URL includes not only the server specific information, but also the login ID 83 and the password 85 used to login to the server.

The communication unit 5506 communicates with the server 42 via a general-purpose network using the communication interface 5508.

The transmission unit 5507 transmits the URL generated by the URL generation unit 5505 via the communication interface 5508 in order to connect the TV 45 to the server 42.

The communication interface 5508 is a communication interface for connecting the TV 45 to the server 42 via a general-purpose network. The communication interface 5508 is, for example, a wired/wireless LAN interface.

The receiving unit 5509 receives (downloads) image data and an image display cascading style sheet (CSS) from the server 42 connected by the communication interface 5508.

The data processing unit 5510 performs data processing for the image data downloaded by the receiving unit 5509. If the image data to be downloaded is compressed data, the data processing unit 5510 de-compresses the image data. If the image data is encrypted, the data processing unit 5510 decrypts the image data. In addition, the data processing unit 5510 can arrange the downloaded image data by an image display style based on the image display CSS. If it is determined, based on the captured image state information 55 obtained, if necessary, by decryption of the decryption unit, that the image data in the image capturing device 1 is not in synchronization with the image data in the server 42, then the data processing unit 5510 causes the display unit 5512 to display warning information regarding the synchronization failure. Thereby, unnecessary confusion of the user can be prevented. Moreover, the data processing unit 5510 sets a mode of displaying the downloaded image data, according to the image display method instruction information 77 provided from the decryption unit 5504. For example, if the list display (flag) 78 in the image display method instruction information 77 is ON, then the data processing unit 5510 generates a list of the downloaded images and provides the list to the memory unit 5511. If the slide show (flag) 79 in the image display method instruction information 77 is ON, then the data processing unit 5510 generates a slide show of the downloaded images and provides the slide show to the memory unit 5511.

The memory unit 511 is a memory that temporarily holds the image data processed by the data processing unit 5510.

The display unit 5512 displays the image data stored in the memory unit 5511. The image data has been downloaded from the server 42 and applied with data processing by the data processing unit 5510 as described earlier.

As descried above, based on the server URL generation information 80, the captured image state information 55, and the image display method instruction information 77 which are received from the RF-ID unit 47 of the image capturing device 1, the TV 45 according to the second embodiment of the present invention can be connected to the server 42, then download the uploaded image data from the server 42, and display the downloaded image data on the display unit 5512. Thereby, the user does not need to do complicated processes of removing the third memory 33 such as a Secure Digital (SD) card or a flash memory from the image capturing device 1 and equipping the third memory 33 to a card reader of the TV 45 in order to view captured images. In the second embodiment of the present invention, the user can display and view captured image data, by simple operations of simply presenting the RF-ID unit 47 of the image capturing device 1 to the RF-ID reader/writer 46 of the TV 45 for proximity communication. The second embodiment of the present invention can provide a captured image viewing system by which even users who are not familiar with operations of digital devices can easily view image data.

Figure 45:
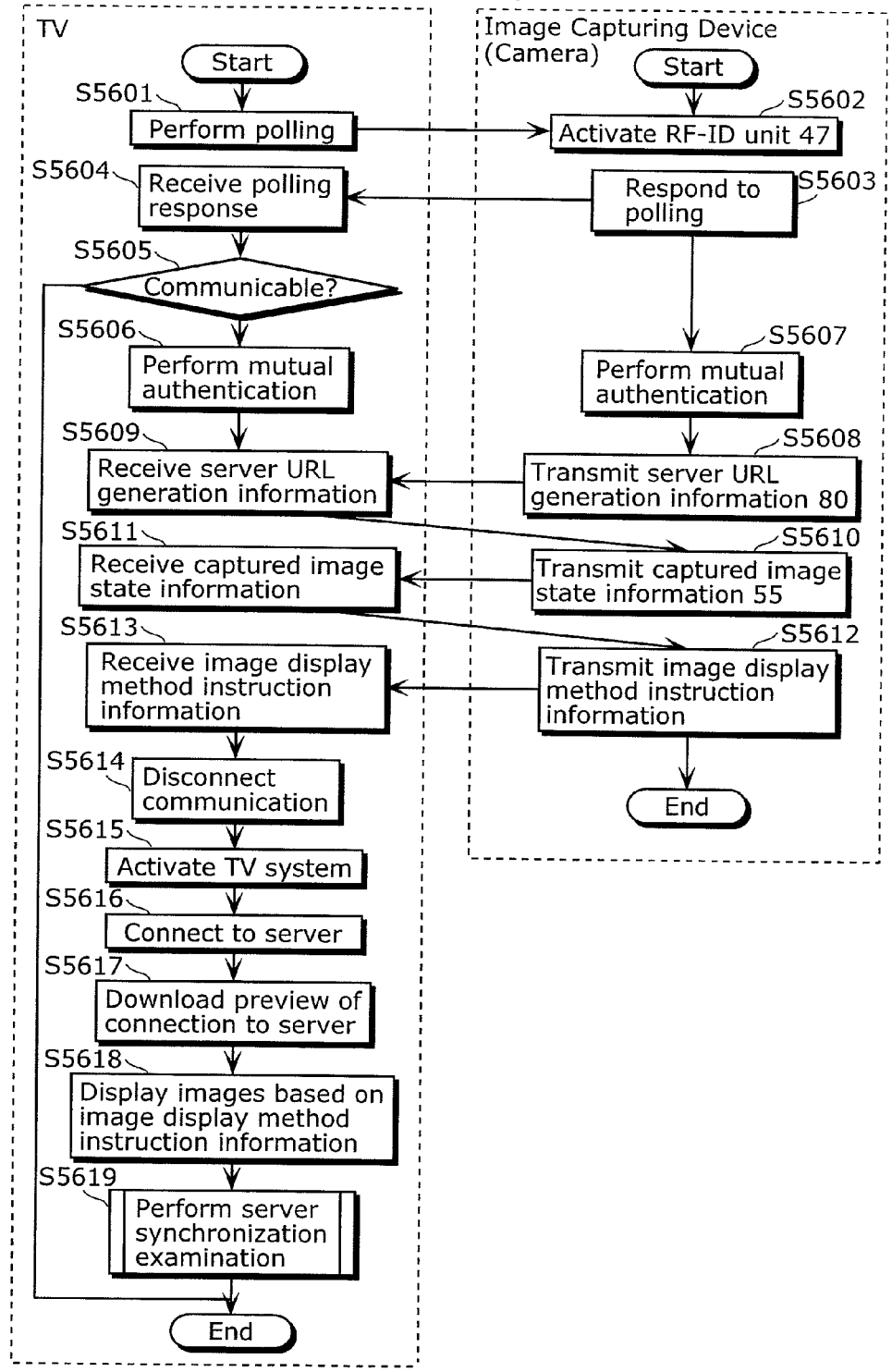
FIG. 45 is a flowchart of RF-ID communication between the camera and the TV, according to the second embodiment of the present invention.

FIG. 45 is a flowchart of RF-ID wireless proximity communication between the image capturing device 1 and the TV 45.

First, the communicable device search unit 5502 in the RF-ID reader/writer 46 of the TV 45 transmits a polling signal to search for the RF-ID unit 47 of the communicable image capturing device 1 (Step S5601).

When the image capturing device 1 receives the polling signal from the communicable device search unit 5502 in the RF-ID reader/writer 46 of the TV 45, the second power supply unit 91 is supplied with power to activate (operate) the RF-ID unit 47 (Step S5602). Here, at least the RF-ID unit 47, which can be operated under the second power supply unit 91, is activated. It is not necessary to activate all functions in the image capturing device 1.

When the activation of the RF-ID unit 47 of the image capturing device 1 is completed at Step S5602, the image capturing device 1 transmits a polling response for the polling to the RF-ID reader/writer 46 of the TV 45 via the second antenna 21 (Step S5603).

After the image capturing device 1 responds to the polling at Step S5603, the TV 45 receives the polling response by the wireless antenna 5501 of the RF-ID reader/writer 46 (Step S5604).

After receiving the polling response at Step S5604, the TV determines whether or not the image capturing device 1 transmitting the polling response is a device mutually communicable with the TV 45 (Step S5605). If the determination is made that the image capturing device 1 cannot mutually communicate with the TV 45, then the processing is completed. On the other hand, if the determination is made that the image capturing device 1 is mutually communicable with the TV 45, then the processing proceeds to Step S5606.

If the determination is made that the image capturing device 1 is mutually communicable with the TV 45 at Step S6505, then the TV 45 performs mutual authentication to determine whether or not the image capturing device 1 and the TV 45 are legitimate devices for communication (Step S5606). The mutual authentication is the same as general mutual authentication using HDMI or IEEE1394. In the mutual authentication, issuing of challenge data and checking of response data are performed plural times between the TV 45 and the image capturing device 1 to eventually generate a common cryptography key. If one of the TV 45 and the image capturing device 1 is not legitimate, the common cryptography key is not generated, thereby disabling future mutual communication.

The image capturing device 1 also performs the same mutual authentication in the RF-ID unit 47. Generation and transmission of challenge data and receiving and checking of response data are performed plural times between the TV 45 and the image capturing device 1 to eventually generate a cryptography key identical to the cryptography key generated by the TV 45 (Step S5607).

When the mutual authentication is completed at Step S5607, the image capturing device 1 reads the server URL generation information 80 as the server specific information 48 from the second memory 52, then encrypts the server URL generation information 80 using the common cryptography key generated at the mutual authentication, and transmits the encrypted server URL generation information 80 to the RF-ID reader/writer 46 of the TV 45 (Step S5608).

The TV 45 receives the encrypted server URL generation information 80 transmitted at Step S5608, by the receiving unit 5503 in the RF-ID reader/writer 46. Then, the decryption unit 5504 decrypts the encrypted server URL generation information 80 using the common cryptography key. Based on the server URL generation information 80, the URL generation unit 5505 generates a URL to access the server 42. Then, the TV 45 transmits, to the image capturing device 1, a notification of completion of receiving the server URL generation information 80 (Step S5609).

After the notification of the receiving completion is transmitted at Step S5609, the image capturing device 1 receives the notification by the second antenna 21. Then, the image capturing device 1 reads the captured image state information 55 from the second memory 52 to transmit the captured image state information 55 to the TV 45 (Step S5610). The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

After the image capturing device 1 transmits the captured image state information 55 at Step S5610, the TV 45 receives the captured image state information 55 by the RF-ID reader/writer 46 and then transmits, to the image capturing device 1, a notification of completion of receiving the captured image state information 55 (Step S5611). Here, the CPU 5513 in the TV 45 performs the following processing depending on kinds of the received captured image state information 55.

In case 1, the final capturing time 68 is used as the captured image state information 55. Therefore, the TV 45 compares the final capturing time 68 to the final upload time that is a time of finally uploading to the server 42. If the final capturing time 68 is temporally later than the final upload time, then it is determined that the image data in the image capturing device 1 is not in synchronization with the image data in the server 42. Therefore, warning information regarding the synchronization failure is displayed on the display unit of the TV 45.

In case 2, the captured image state information 55 is the existence identifiers 64 each of which is assigned to a corresponding one of the captured images so that it is possible to determine whether the image has not yet been uploaded. Therefore, the TV 45 examines the existence identifiers 64 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 3, the not-yet-uploaded image information hashed information 67 is employed as the captured image state information 55. Therefore, the TV 45 examines the not-yet-uploaded image information hashed information 67 to determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

In case 4, the captured image state information 55 is the final image serial number 69 from among image serial numbers chronologically assigned to the captured images. Therefore, the TV 45 compares (a) the final image serial number 69 from among image serial numbers chronologically assigned to the captured images to (b) an image serial number of an image finally uploaded to the server 42. Here, the final image serial number 69 is provided from the image capturing device 1, while the image serial number is provided from the server 42. Based on the comparison, the TV 45 can determine whether or not there is any image not yet been uploaded. If there is any image not yet been uploaded, then it is determined that the image data in the image capturing device 1 is not in synchronization with the image data in the server 42. Therefore, warning information regarding the synchronization failure is displayed on the display unit of the TV 45.

After the TV 45 completes receiving of the captured image state information 55 and transmits the notification of the receipt to the image capturing device 1 at Step S5611, the image capturing device 1 reads the image display method instruction information 77 from the second memory 52 and transmits the image display method instruction information 77 to the TV 45 (Step S5612). The image display method instruction information 77 includes the list display (flag) 78 and the slide show (flag) 79.

After the image display method instruction information 77 is transmitted at Step S5612, the TV 45 receives the image display method instruction information 77 by the RF-ID reader/writer 46 of the TV 45 and transmits a notification of completion of receiving the image display method instruction information 77 to the image capturing device 1 (Step S5613). The data processing unit 5510 of the TV 45 generates a mode of displaying images downloaded from the server 42, based on the received image display method instruction information 77. For example, if the list display flag in the image display method instruction information 77 is ON, the data processing unit 5510 generates a list of the downloaded images and stores the generated list in the memory unit 5511 and causes the display unit 5512 to display the list. On the other hand, if the slide show flag in the image display method instruction information 77 is ON, the data processing unit 5510 generates a slide show of the downloaded images and stores the generated slide show in the memory unit 5511 and causes the display unit 5512 to display the slide show.

After receiving the image display method instruction information 77 at Step S5613, the TV 45 disconnects communication from the RF-ID unit 47 of the image capturing device 1 (Step S5614).

Next, the TV 45 activates a TV system (Step S5615). The activation of the TV system refers to turning the main power of the TV 450N to display the downloaded image data on the display unit 5512. Prior to the activation of the TV system at Step S5615, at least the RF-ID reader/writer 46 of the TV 45 is activated and the display unit 5512 may be turned OFF.

Then, the communication unit 5506 is activated to connect the TV 45 to the server 42 based on the URL generated by the URL generation unit 5505 (Step S5616).

After connecting to the server 42 at Step S5615, the TV 45 downloads uploaded image data from the server 42 (Step S5617).

The data processing unit 5510 generates to-be-displayed image data from the images downloaded at the Step S5617, based on the image display method instruction information 77 obtained from the camera (the image capturing device 1), then stores the generated image data into the memory unit 5511, and displays the image data on the display unit 5512 (Step S5618). The data processing unit 5510 of the TV 45 generates a mode of displaying the images (image data) downloaded from the server 42, based on the received image display method instruction information 77. For example, if the list display flag 78 in the image display method instruction information 77 is ON, the data processing unit 5510 generates a list of the downloaded images and stores the generated list in the memory unit 5511 and causes the display unit 5512 to display the list. On the other hand, if the slide show flag 79 in the image display method instruction information 77 is ON, the data processing unit 5510 generates a slide show of the downloaded images and stores the generated slide show in the memory unit 5511 and causes the display unit 5512 to display the slide show.

After displaying of the images downloaded from the server 42 is completed at Step S5617, the TV 45 performs synchronization examination to determine whether or not the captured images recorded in the third memory 33 of the image capturing device 1 are in synchronization with the images downloaded from the server 42 (Step S5619). The synchronization examination is performed based on the captured image state information provided at Step S5611 from the image capturing device 1. The captured image state information 55 is: the final capturing time 68 (case 1); the existence identifiers 64 which are existence identification information regarding images not yet been uploaded and each of which is assigned to a corresponding one of the captured images so that it is possible to determine whether the image has not yet been uploaded (case 2); the not-yet-uploaded image information hashed information 67 (case 3); or the final image serial number 69 from among image serial numbers chronologically assigned to captured images (case 4). The captured image state information 55 is important for examining synchronization between captured images in the image capturing device 1 and captured images in the server 42.

FIGS. 46A to 46D are flowcharts of details of the server synchronization examination (Step S5619) of FIG. 45 when the captured image state information 55 are cases 1 to 4, respectively.

Figure 46A:
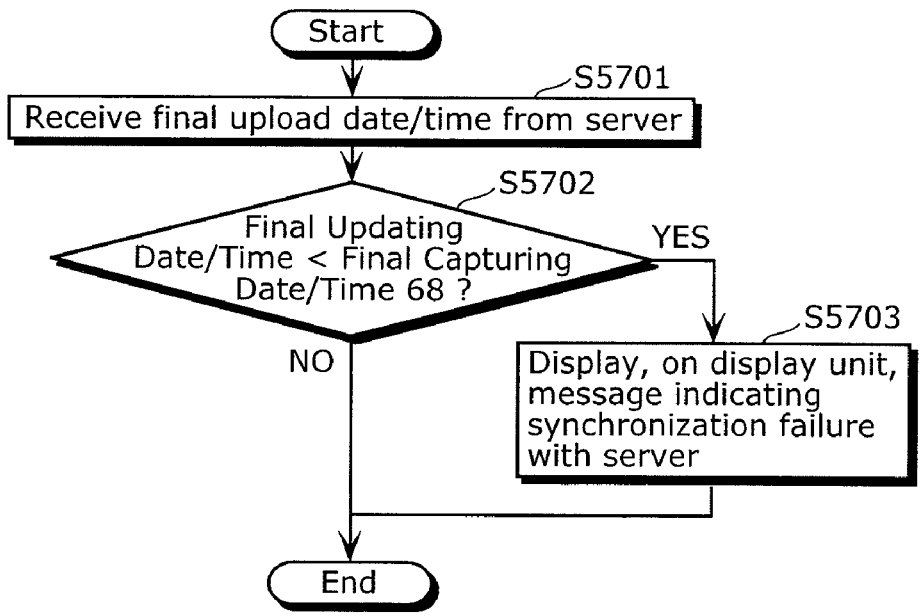
FIG. 46A is a flowchart presenting details of FIG. 45.

FIG. 46A is a flowchart of case 1 where the captured image state information 55 is the final capturing time 68.

First, the communication unit 5506 of the 45 receives, from the server 42, date/time of finally uploading to the server 42 (hereinafter, referred to also as a "final upload date/time" that may be date/time of capturing a final image among uploaded images to produce the same advantages) (Step S5701).

Next, the TV 45 compares the final upload date/time to a final capturing date/time 68 (Step S5702). The final capturing date/time 68, which is date/time of final capturing of the image capturing device 1, is indicated in the captured image state information 55 provided from the image capturing device 1 to the RF-ID reader/writer 46. If the final upload date/time is prior to the final capturing date/time 68, it is determined that there is an image captured after the final upload and not yet been uploaded to the server 42. Therefore, a determination is made that the images in the image capturing device 1 are not in synchronization with the images in the server 42. Then, warning information is displayed at Step S5703. On the other hand, if the final upload date/time is equal to the final capturing date/time 68, it is determined that the images in the image capturing device 1 are in synchronization with the images in the server 42. Then, the synchronization examination is completed without displaying warning information.

If it is determined at Step S5702 that the images in the image capturing device 1 are not in synchronization with the images in the server 42, the display unit 5512 displays warning information indicating the synchronization failure. Here, if time information is generated by comparing the final upload date/time to the final capturing date/time 68 in order to indicate from when captured images are not uploaded, and the generated time information is presented as a message together with the warning information, the warning information is convenient for the user.

Figure 46B:
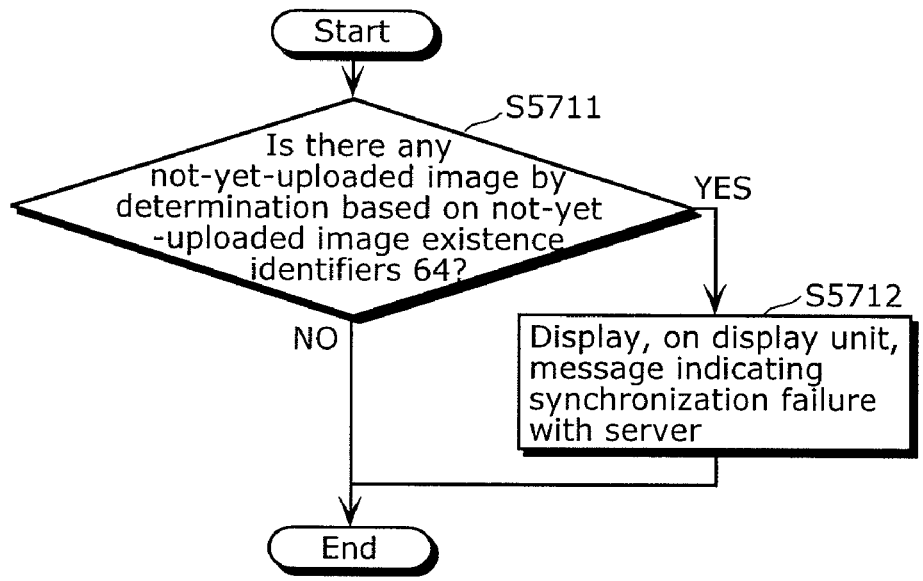
FIG. 46B is a flowchart presenting details of FIG. 45.

FIG. 46B is a flowchart of case 2 where the captured image state information 55 is the existence identifiers 64 each of which is assigned to a corresponding one of the captured images so that it is possible to determine whether the image has not yet been uploaded.

First, it is determined, based on the existence identifiers of the not-yet-uploaded image existence identification information, whether or not there is any image not yet been uploaded to the server 42 from among the captured images stored in the third memory 33 of the image capturing device 1 (Step S5711). Here, the existence identifiers are indicated in the captured image state information 55 provided from the image capturing device 1 to the RF-ID reader/writer 46. If it is determined that there is an image not yet been uploaded to the server 42 at Step S5711, then the processing proceed to Step S5712 to display warning information. On the other hand, if there is not image not yet been uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5712.

Figure 46C:
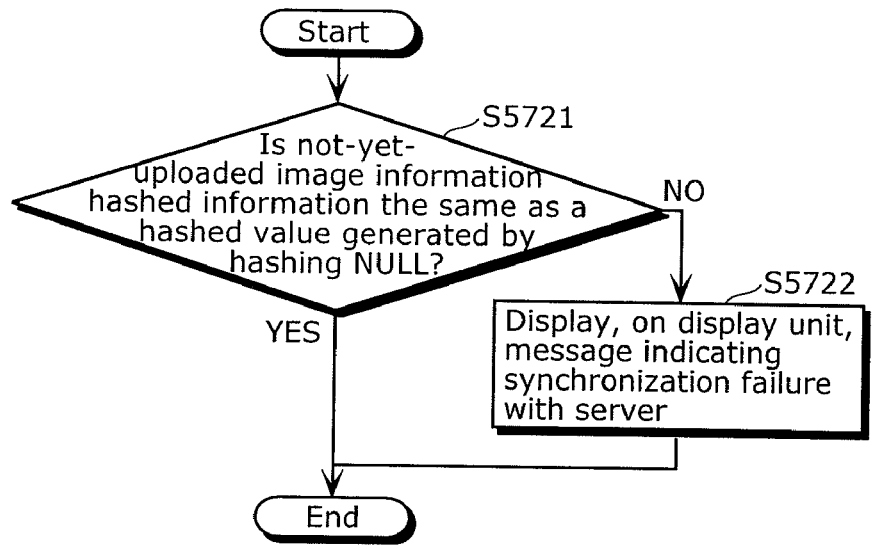
FIG. 46C is a flowchart presenting details of FIG. 45.

FIG. 46C is a flowchart of case 3 where the captured image state information 55 is the not-yet-uploaded image information hashed information 67.

First, it is determined, based on the not-yet-uploaded image information hashed information 67, whether or not there is any image not yet been uploaded to the server 42 from among the captured images stored in the third memory 33 of the image capturing device 1 (Step S5721). Here, the not-yet-uploaded image information hashed information 67 is indicated in the captured image state information 55 provided from the image capturing device 1 to the RF-ID reader/writer 46. The determination of Step S5721 is performed by comparing the not-yet-uploaded image information hashed information 67 to a hashed value generated by hashing NULL. If it is determined that there is an image not yet been uploaded at Step S5721, then the processing proceed to Step S5722 to display warning information. On the other hand, if there is no image not yet been uploaded, it is determined that the images in the image capturing device 1 are in synchronization with the images in the server 42. Then, the synchronization examination is completed without displaying warning information.

If it is determined that the images in the image capturing device 1 are not in synchronization with the images in the server 42, the display unit 5512 displays warning information indicating the synchronization failure at Step S5722.

Figure 46D:
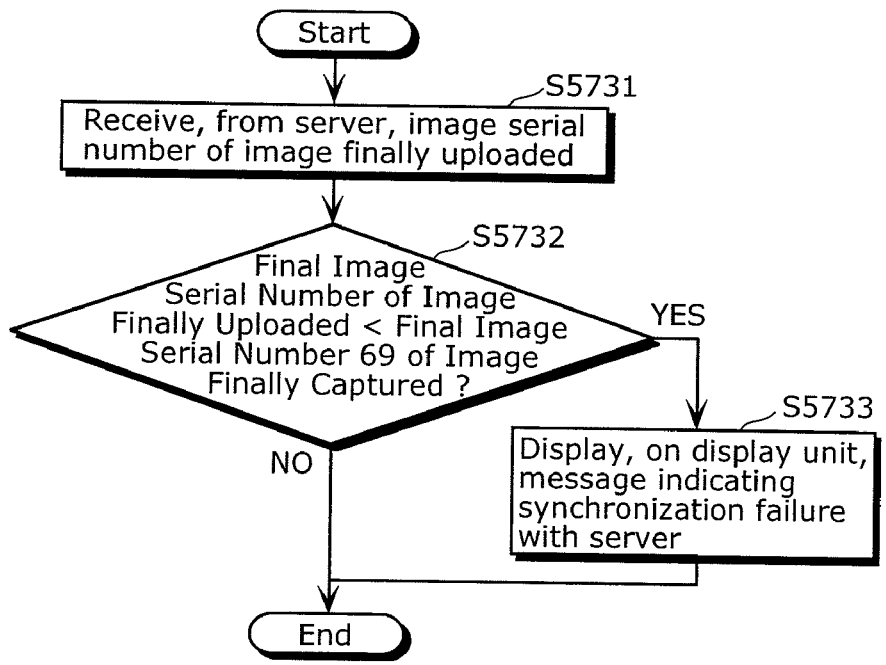
FIG. 46D is a flowchart presenting details of FIG. 45.

FIG. 46D is a flowchart of case 4 where the captured image state information 55 is a final image serial number from among image serial numbers assigned to captured images.

First, the communication unit 5506 of the TV 45 receives, from the server 42, an image serial number of an image finally uploaded to the server 42 (Step S5731).

Next, the TV 45 compares (a) the image serial number 69 of the image finally uploaded which is provided form the server 42 to (b) a final image serial number 69 of an image finally captured which is indicated in the captured image state information 55 provided from the image capturing device 1 by the RF-ID reader/writer 46 (Step S5732). If the mage serial number 69 of the image finally uploaded is smaller than the mage serial number 69 of the image finally captured, it is determined that there is an image captured after the final upload and not yet been uploaded to the server 42. Therefore, a determination is made that the images in the image capturing device 1 are not in synchronization with the images in the server 42. Then, the processing proceeds to Step S5733 to display warning information. On the other hand, if the mage serial number 69 of the image finally uploaded is identical to the mage serial number 69 of the image finally captured, it is determined that the images in the image capturing device 1 are in synchronization with the images in the server 42. Then, the synchronization examination is completed without displaying warning information.

If it is determined at Step S5732 that the images in the image capturing device 1 are not in synchronization with the images in the server 42, the display unit 5512 displays warning information indicating the synchronization failure.

When all of images captured by the image capturing device 1 are not uploaded to the serve 42 (in other words, when images captured by the image capturing device 1 are not in synchronization with images uploaded to the server 42), any of above cases 1 to 4 makes it possible to detect the synchronization failure. Thereby, although all of the captured images cannot be displayed on the display unit 5512, a convenient message can be displayed to the user to inform the synchronization failure. As a result, unnecessary confusion of the user can be prevented.

FIG. 47A is (1) a data format used in uploading captured images from the image capturing device 1 to the server 42. FIG. 47B is (2) a data format used in RF-ID communication between the image capturing device 1 and the TV 45.

First, (1) a data format 5940 in uploading captured images from the image capturing device 1 to the server 42 is described. The data format 5940 includes camera ID 5901, a sever address 5902, a server login ID 5903, a server login password 5904, an image directory 5905, and an uploading-image number 5906.

The camera ID 5901 is camera UID uniquely assigned to each camera (image capturing device 1). The camera ID 5901 is ID information recorded in the camera ID 76 in the second memory 52 of the image capturing device 1. Use of the camera ID 5901 as login ID to the server 42 can provide a server address unique to each image capturing device 1 so that the image capturing device 1 can access the server 42 without user's entry of login ID. In addition, the camera ID 5901 enables the server 42 to manage captured images for each capturing camera.

The sever address 5902 is included in the server address information 81 in the server specific information 48 stored in the second memory 52 of the image capturing device 1. The sever address 5902 enables the TV 45 to identify the server to which target image data is uploaded.

The server login ID 5903 is included in the login ID 83 in the user identification information 82 in the server specific information 58 stored in the second memory 52 of the image capturing device 1. The server login ID 5903 allows the TV 45 to login, by using the same account, to the server to which the image capturing device 1 uploads image data.

The server login password 5904 is included in the password 84 in the server specific information 58 stored in the second memory 52 of the image capturing device 1. The server login password 5904 allows the TV 45 to login, by using the same account, to the server to which the image capturing device 1 uploads image data.

The uploading-image number 5906 is the number of images to be uploaded to the server. The uploading-image number 5906 is equal to the number of images which is stored as the not-yet-uploaded-image number 65 in the second memory 52 of the image capturing device 1. After capturing images, the number of images not yet been uploaded is indicated in the uploading-image number 5906.

After transmitting the data format 5940, the image capturing device 1 uploads, to the server 42, the images that are stored in the third memory 33 of the image capturing device 1 but not yet been uploaded to the server 42.

Next, (2) a data format 5950 used in RF-ID communication between the image capturing device 1 and the TV 45 is described. The data format 5950 includes camera ID 5911, a sever address 5912, a server login ID 5913, a server login password 5914, a final capturing date/time (final capturing time) 5915, and not-yet-uploaded image data existence identifiers 5916, not-yet-uploaded image information hashed information 5917, a final image serial number 5918, and image display method instruction information 5919.

The camera ID 5911 is a camera UID uniquely assigned to each camera (image capturing device 1). The camera ID 5911 is ID information recorded in the camera ID 76 in the second memory 52 of the image capturing device 1. Use of the camera ID 5911 as login ID to the server 42 from the TV 45 can provide a server address unique to each image capturing device 1 so that the TV 45 can access the server 42 without user's entry of login ID. The camera ID 5901 may be used in the mutual authentication between the RF-ID unit 47 of the image capturing device 1 and the RF-ID reader/writer 46 of the TV 45.

The sever address 5912 is included in the server address information 81 in the server specific information 58 stored in the second memory 52 of the image capturing device 1. The sever address 5912 enables the TV 45 to identify the server to which target image data is uploaded.

The server login ID 5913 is included in the login ID 83 in the user identification information 82 in the server specific information 58 stored in the second memory 52 of the image capturing device 1. The server login ID 5913 allows the TV 45 to login, by using the same account, to the server to which the image capturing device 1 uploads image data.

The server login password 5914 is included in the password 84 in the server specific information 58 stored in the second memory 52 of the image capturing device 1. The server login password 5914 allows the TV 45 to login, by using the same account, to the server to which the image capturing device 1 uploads image data.

The final capturing date/time 5915 corresponds to the final capturing time 68 in the captured image state information 55 stored in the second memory 52 of the image capturing device 1. The TV 45 uses the final capturing date/time 5915 for the synchronization examination between captured images in the image capturing device 1 and captured images in the server 42.

The not-yet-uploaded image data existence identifiers 5916 correspond to the not-yet-uploaded image data existence identification information in the captured image state information 55 stored in the second memory 52 of the image capturing device 1. TV 45 uses the not-yet-uploaded image data existence identifiers 5916 for the synchronization examination between captured images in the image capturing device 1 and captured images in the server 42. In order to implement each of the not-yet-uploaded image data existence identifiers 5916, each image ID 5928 for identifying a corresponding one of captured images is assigned with an upload flag 5926 indicating whether or not the corresponding image has been uploaded to the server 42. Thereby, it is possible to determine whether or not each of the captured images has been uploaded to the server 42.

The not-yet-uploaded image information hashed information 5917 corresponds to the not-yet-uploaded image information hashed information 67 in the captured image state information 55 stored in the second memory 52 of the image capturing device 1. The TV 45 uses the not-yet-uploaded image information hashed information 5917 for the synchronization examination between captured images in the image capturing device 1 and captured images in the server 42.

The final image serial number 5918 corresponds to the final image serial number 69 in the captured image state information 55 stored in the second memory 52 of the image capturing device 1. The TV 45 uses the final image serial number 5918 for the synchronization examination between captured images in the image capturing device 1 and captured images in the server 42.

The image display method instruction information 5919 corresponds to the image display method instruction information 77 in the captured image state information 55 stored in the second memory 52 of the image capturing device 1. The image display method instruction information 5919 includes identification information by which the TV 45 designates a method of viewing images downloaded from the server 42.

For each image ID 5927, the image display method instruction information 5919 includes a list display flag 5920, a slide show flag 5921, a print flag 5922, a video reproduction flag 5923, a download flag 5924, and a security password 5925.

The image ID 5927 is information unique to a captured image. The pieces of image ID 5927 are chronologically assigned to captured images by the image capturing device 1 in capturing the images.

The list display flag 5920 corresponds to the list display (flag) 78 stored in the second memory 52 of the image capturing device 1. The TV 45 uses the list display flag 5920 to determine whether or not image data downloaded from the server 42 is to be displayed in a list format. If the list display flag 5920 indicates "yes", the data processing unit 5510 of the TV 45 generates a list of the downloaded images, stores the list to the memory unit 5511, and then displays the list on the display unit 5512.

The slide show flag 5921 corresponds to the slide show (flag) 79 stored in the second memory 52 of the image capturing device 1. The TV 45 uses the slide show flag 5921 to determine whether or not image data downloaded from the server 42 is to be displayed as a slide show. If the slide show flag 5921 indicates "automatic", the data processing unit 5510 of the TV 45 generates a slide show of the downloaded images, stores the slide show to the memory unit 5511, and then displays the slide show on the display unit 5512. If the slide show flag 5921 indicates "manual", the TV 45 permits execution of the slide show according to instructions from the user. If the slide show flag 5921 indicates "disable", the TV 45 inhibits display of the slide show.

The print flag 5922 indicates whether or not images to be downloaded to the TV 45 and then displayed on the display unit 5512 are permitted to be printed by a printer (not shown) connected to the TV 45. The print flag 5922 is not shown in the image display method instruction information 77 stored in the second memory 52 of the image capturing device 1. However, if the print flag 5922 is added, it is possible to set whether or not image data is printable. As a result, usability related to use of images can be improved.

The video reproduction flag 5923 indicates whether or not video data captured by the image capturing device 1 and then uploaded to the server 42 is permitted to be downloaded by the TV 45 and then viewed. If the image capturing device 1 has a video capturing function, addition of the video reproduction flag 5923 to the image display method instruction information 77 stored in the second memory 52 can add setting of whether or not video reproduction is permitted. As a result, the video reproduction can be managed without complicated operations by the user.

The download flag 5924 is an identifier indicating whether or not image or video uploaded to the server 42 is permitted to be downloaded (copied) to a memory in the TV 45. The download flag 5924 can prevent that the image or video is copied by the third person to which image capturing is not permitted. Thereby, copy-right protection is also achieved.

The security password 5925 is password information that permits only the authorized user to perform the above-described image viewing, printing, and downloading processes. In the second embodiment, the same password is set for each of the above-described image viewing, printing, and downloading processes. It is preferable, however, to set a different password to each of image viewing, printing, and downloading processes, so that a level of security can be set independently.

As described above, in the system according to the second embodiment of the present invention, the image capturing device 1 uploads captured images to the server connected to the image capturing device 1 via the first antenna. When the image capturing device 1 is prevented to the RF-ID reader/writer 46 of the TV 45, the image capturing device 1 transmits the server URL generation information 80, the captured image state information 55, and the image display method instruction information 77 from the RF-ID unit 47 to the TV 45 by the RF-ID communication. Then, the TV 45 connects to the server to which the image capturing device 1 has uploaded the captured images, then downloads the captured images from the server, and displays the captured images. Here, it is determined whether or not the captured images in the server 42 are in synchronization with the captured images in the image capturing device 1. If the synchronization is failure, the TV 45 displays notification of the synchronization failure on the display unit 5512. Thereby, the user can display the captured images only by presenting the image capturing device 1 to the TV 45, although the user conventionally has to remove a recording memory from the camera (the image capturing device 1) to be equipped to the TV 45 in order to view the images. Thereby, even the user who is not familiar with operations of digital devices can easily display the images on the TV 45.

Third Embodiment

The third embodiment according to the present invention is described below.

Figure 48:
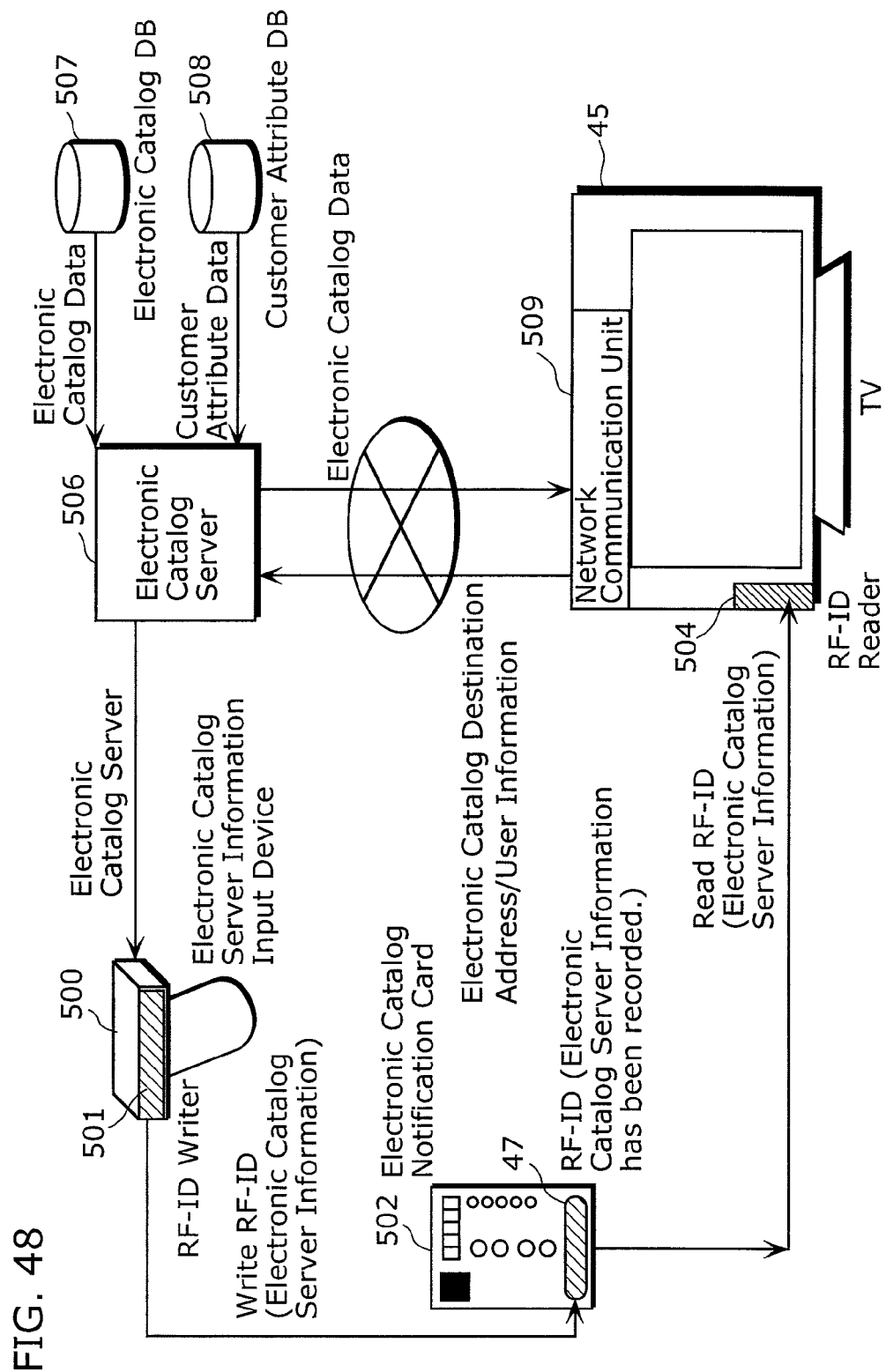
FIG. 48 is a schematic diagram of an electronic catalog display system.

First, the third embodiment is explained in summary. FIG. 48 is a schematic block diagram of an electronic catalog display system according to the third embodiment. The electronic catalog display system according to the third embodiment includes an electronic catalog server information input device 500, an electronic catalog notification card 502, the TV 45, and an electronic catalog server 506. The electronic catalog server information input device 500 includes a RF-ID writer 501. The electronic catalog notification card 502 includes a RF-ID unit 47. The TV 45 includes a RF-ID reader 504 and a network communication unit 509. The electronic catalog server 506 includes an electronic catalog database 507 and a customer attribute database 508.

The electronic catalog server information input device 500 writes electronic catalog server information from the RF-ID writer 501 to the RF-ID unit 47 attached to the electronic catalog notification card 502. The electronic catalog server information is provided from a user who provides services of an electronic catalog (hereinafter, referred to as a "provider user"). When a user who receives the services of the electronic catalog (hereinafter, referred to as a "customer user") brings the electronic catalog notification card 502, in which the electronic catalog server information is written, into proximity of the TV 45, the RF-ID reader 504 in the TV 45 reads the electronic catalog server information from the RF-ID unit 47. In addition, the TV 45 transmits, based on the readout electronic catalog server information, a request for obtaining an electronic catalog to the electronic catalog server 506 set on a network via the network communication unit 509. Furthermore, when transmitting the request to the electronic catalog server, the TV 45 transmits also user information, which is previously inputted in the TV 45, to the electronic catalog server 506. The electronic catalog server 506 receives the request for the electronic catalog and the user information from the TV 45. First, the electronic catalog server 506 obtains customer attribute data from the customer attribute database 508 based on the user information. Next, from the electronic catalog database 507, the electronic catalog server 506 obtains electronic catalog data associated with the customer attribute data. Then, the electronic catalog server 506 transmits the obtained electronic catalog data to the TV 45 from which the request for the electronic catalog has been transmitted. The TV 45 displays the electronic catalog data received from the electronic catalog server 506, and thereby receives purchase operations from the customer user to purchase products in the electronic catalog data.

The following describes the electronic catalog display system according to the third embodiment in more detail.

Figure 49:
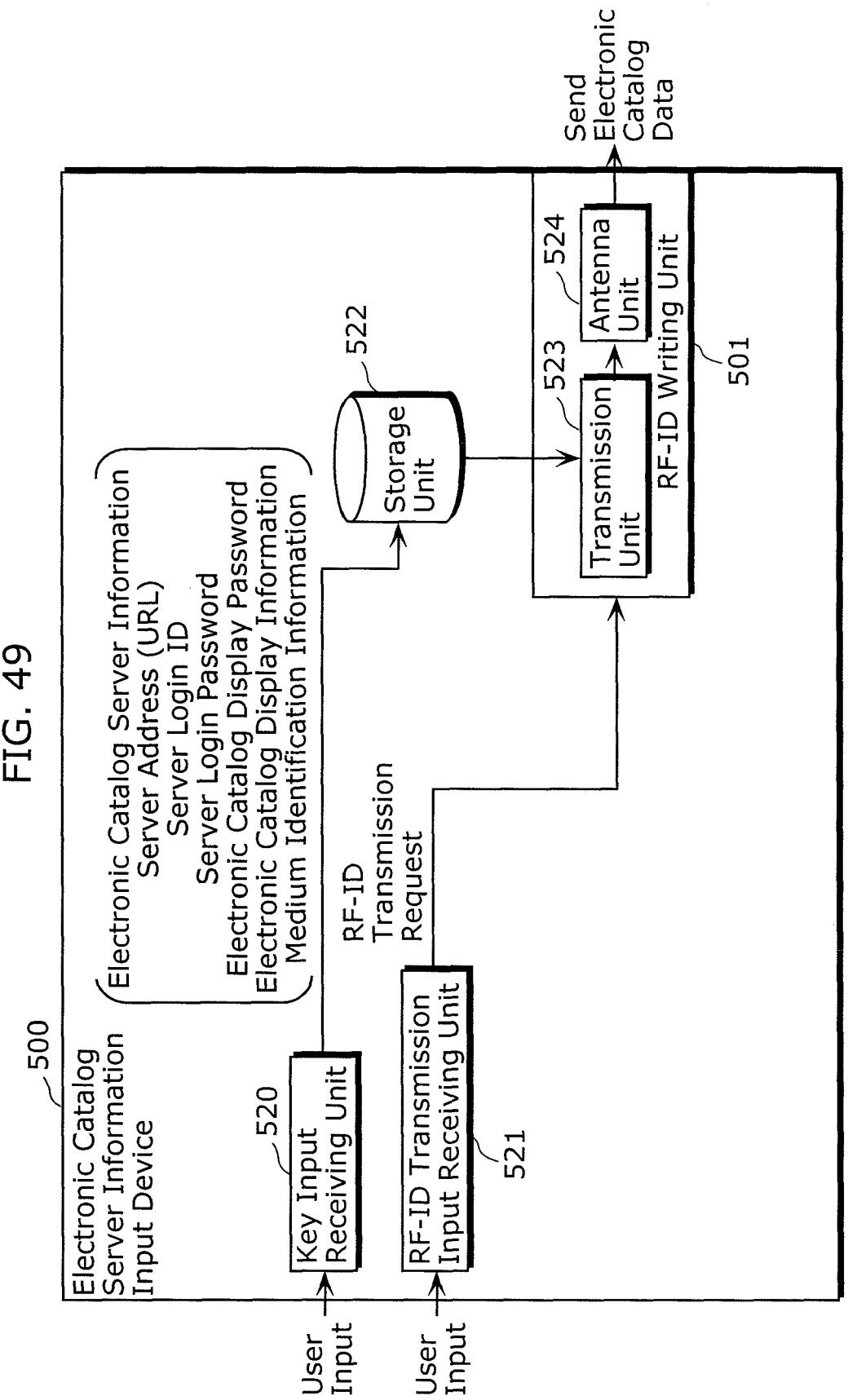
FIG. 49 is a block diagram of an electronic catalog server information input device.
Figure 50:
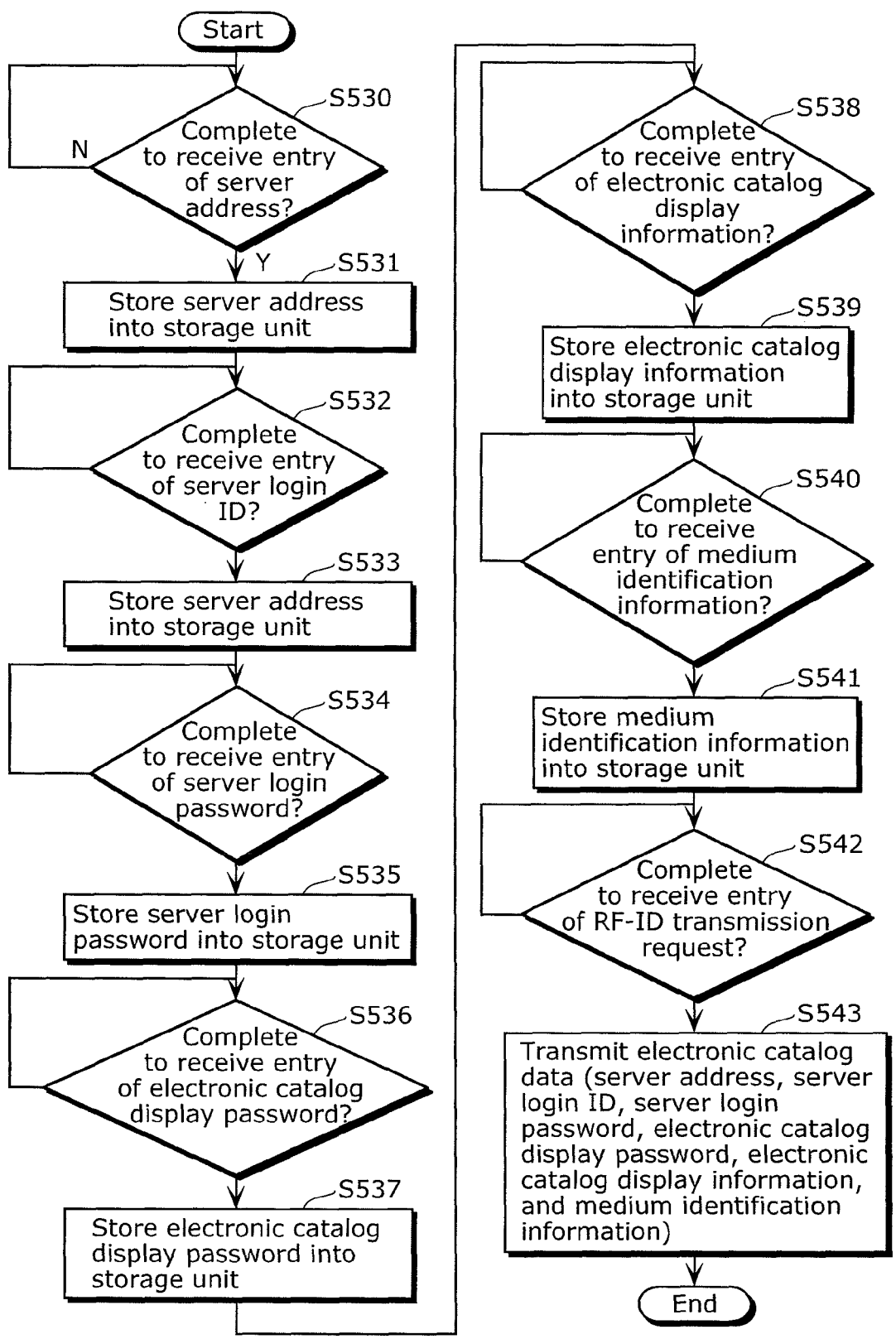
FIG. 50 is a flowchart of steps of processing performed by the electronic catalog server information input device.

FIG. 49 is a functional block diagram illustrating a structure of the electronic catalog server information input device according to the third embodiment. First, a key input receiving unit 520 receives an input by input keys operated by the provider user, in order to obtain the electronic catalog server information. The electronic catalog server information obtained by the key input receiving unit 520 includes: a sever address such as a URL; server login ID; a server login password; an electronic catalog display password; electronic catalog display information; and a medium identification information. The electronic catalog display information indicates whether images of products/services in the electronic catalog are to be displayed in a list (as thumbnails) or sequentially (as a slide show). The medium identification information is used for identifying a medium such as a card or a postcard to which RF-ID is attached. The electronic catalog server information obtained by the key input receiving unit 520 is stored into a storage unit 522. Next, when a RF-ID transmission key and the like are received after receiving of the electronic catalog server information, a RF-ID transmission input receiving unit 521 notifies a transmission unit 523 of a transmission request. Then, the transmission unit 523 reads the electronic catalog server information from the storage unit 522. An antenna unit 524 transmits the electronic catalog server information. The processing performed by the electronic catalog server information input device is presented in more detail with reference to a flowchart of FIG. 50.

Figure 51:
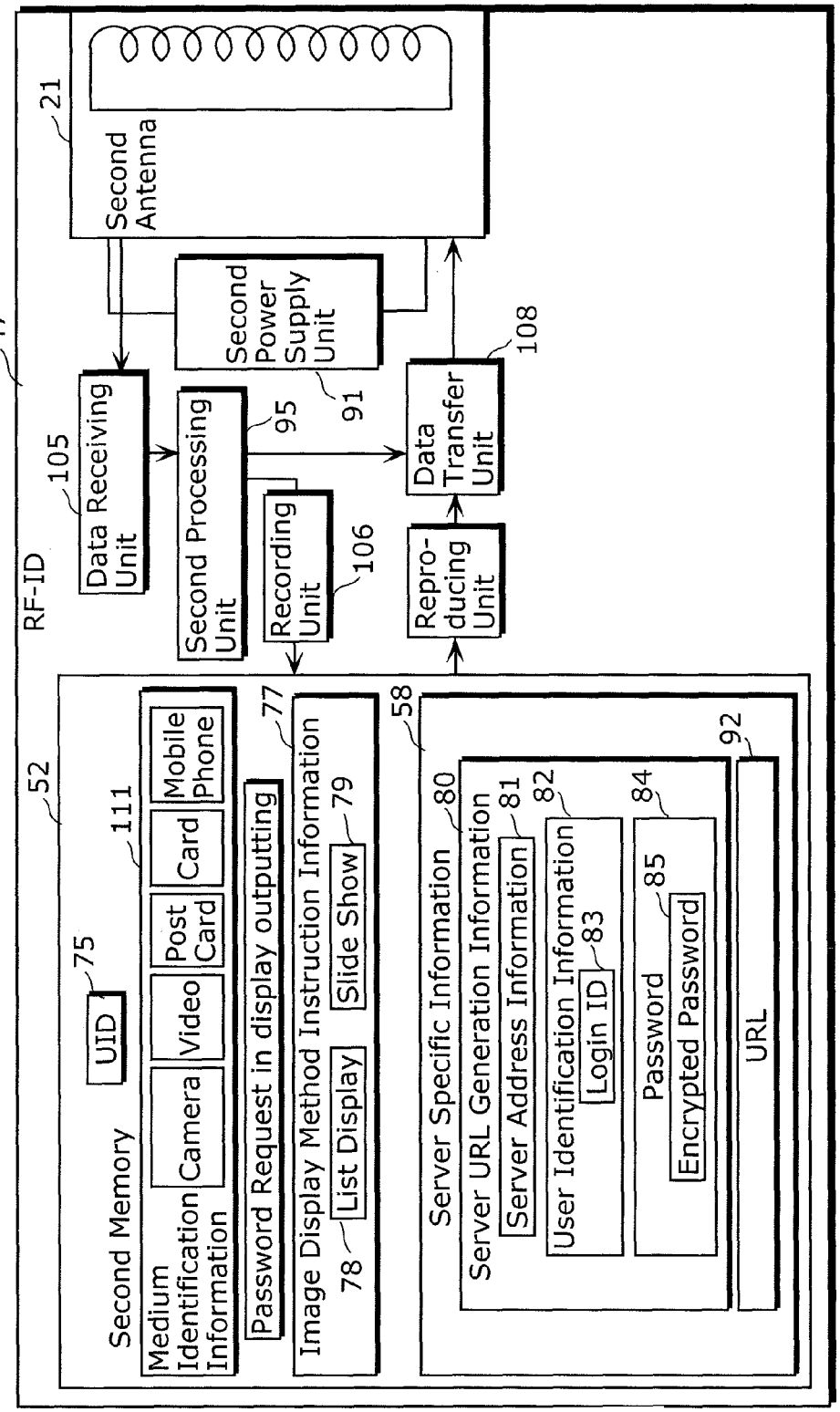
FIG. 51 is a block diagram of a RF-ID unit of an electronic catalog notification card.

FIG. 51 is a block diagram of a structure of the RF-ID unit 47 included in the electronic catalog notification card 502. A structure and processing of the RF-ID unit 47 are the same as those described in the first and second embodiments. The second power supply unit 91 obtains current from signals received by the second antenna 21, and provides power to each unit in the electronic catalog notification card 502. Received information is recorded into the second memory 52 via the data receiving unit 105, the second processing unit 95, and the recording unit 106.

Figure 52:
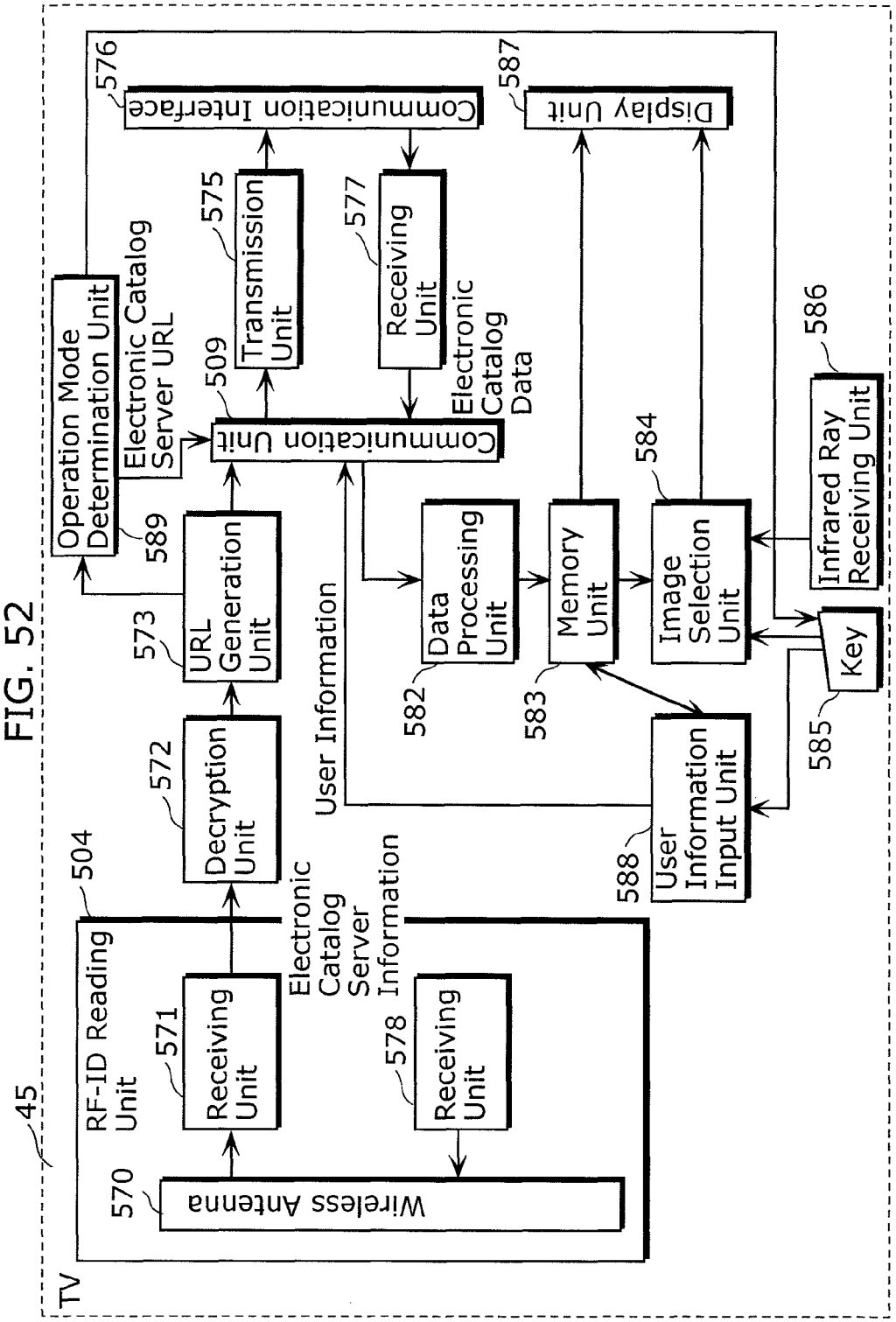
FIG. 52 is a block diagram of a TV displaying an electronic catalog.

FIG. 52 is a functional block diagram of a structure of the TV 45. The structure of the TV 45 according to the third embodiment differs from the structure of the TV 45 according to the second embodiment in that a user information input unit 588 is added. The user information input unit 588 receives the user information and stores the user information into a memory unit 583 temporarily. The user information is an attribute of the customer user and previously inputted by the customer user himself/herself. The user information is preferably gender or age information of the customer user. The user information may be other information, such as a residence or a family structure, which is private information for selecting product/service data in the electronic catalog. The user information is transmitted to the electronic catalog server via the communication unit 509, together with the URL of the electronic catalog server generated by the URL generation unit. In the same manner as described in the first embodiment, in the third embodiment, when the customer user moves the electronic catalog notification card 502 into proximity of a RF-ID reader 504 of the TV 45, the TV 45 receives the electronic catalog server information and thereby generates a URL of the server to connect to the server. The details of this processing are the same as those described in the first embodiment with reference to FIGS. 7 to 20.

Figure 53:
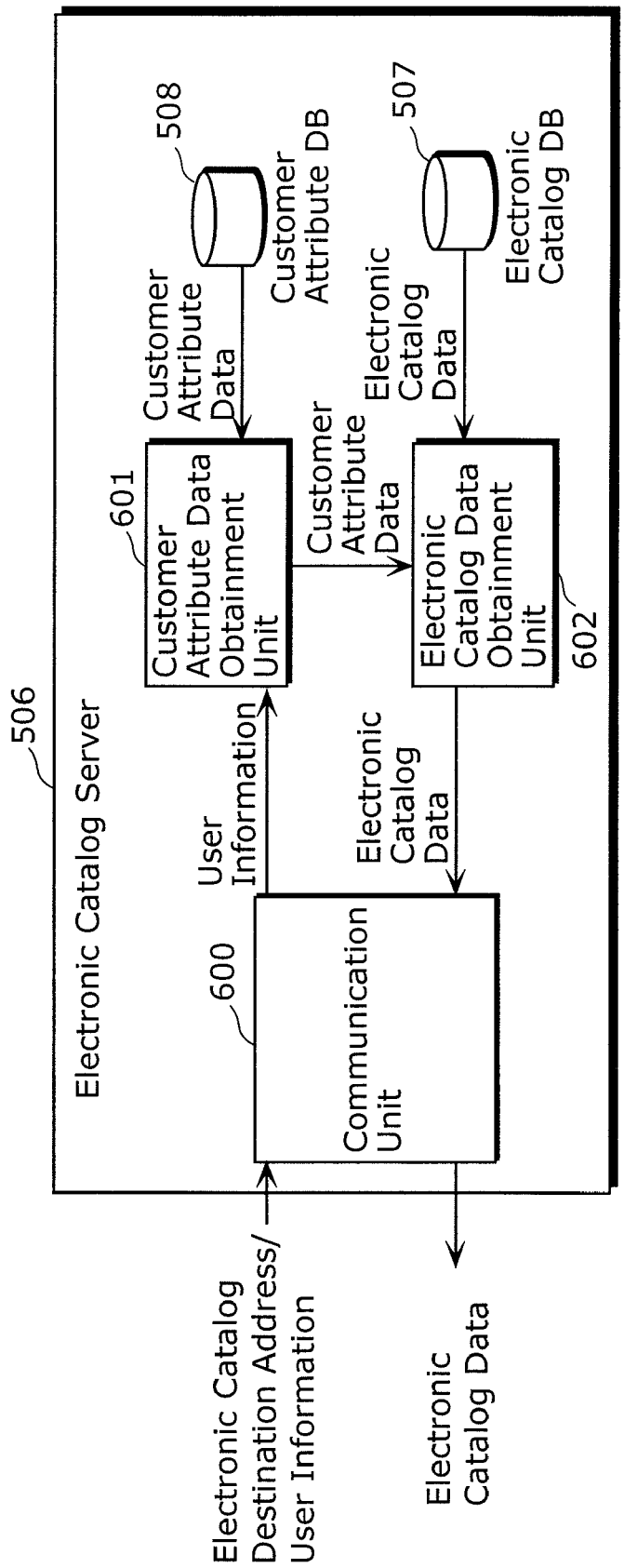
FIG. 53 is a block diagram of an electronic catalog server.
Figure 54:
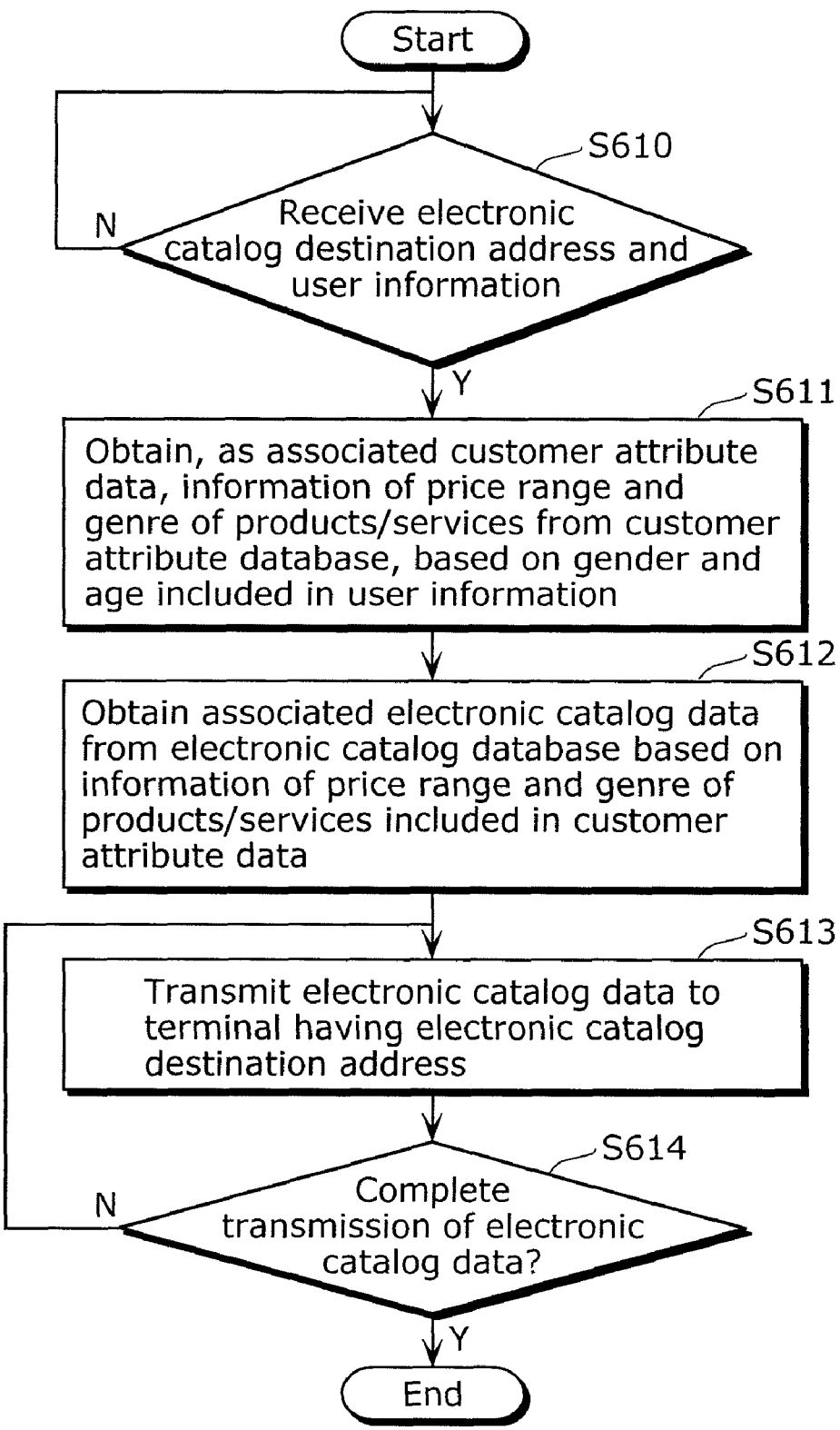
FIG. 54 is a flowchart of steps of processing performed by the electronic catalog server.

FIG. 53 is a functional block diagram of a structure of the electronic catalog server 506. The electronic catalog server 506 receives an electronic catalog destination address and the user information from the TV 45 via a communication unit 600. The electronic catalog destination address is a network address of the TV 45 on a network to which the TV 45 and the electronic catalog server 506 belong. Next, based on the user information received by the customer attribute data obtainment unit, the electronic catalog server 506 obtains customer attribute data from the customer attribute database 508. For instance, if the user information includes a gender and an age of the customer user using the TV 45, the electronic catalog server 506 obtains, as the customer attribute data, information of a product/service genre and a product/service price range which are in association with the age and gender of the customer user, based on the customer attribute database 508 having a data structure illustrated in FIG. 57. Then, the electronic catalog data obtainment unit 602 obtains the electronic catalog data from the electronic catalog database 507 based on customer attribute data. For example, if the customer attribute data includes product/service genres and product/service price ranges, the electronic catalog server 506 obtains, as the electronic catalog data, all of product/service data corresponding to the product/service genres and the product/service price ranges, from the electronic catalog database 507 having a data structure illustrated in FIG. 58. The electronic catalog server 506 transmits the electronic catalog data obtained by the electronic catalog data obtainment unit 602 to the TV 45 having the electronic catalog destination address, via a communication unit 600. The processing performed by the electronic catalog server 506 is presented in more detail in a flowchart of FIG. 54.

Figure 55:
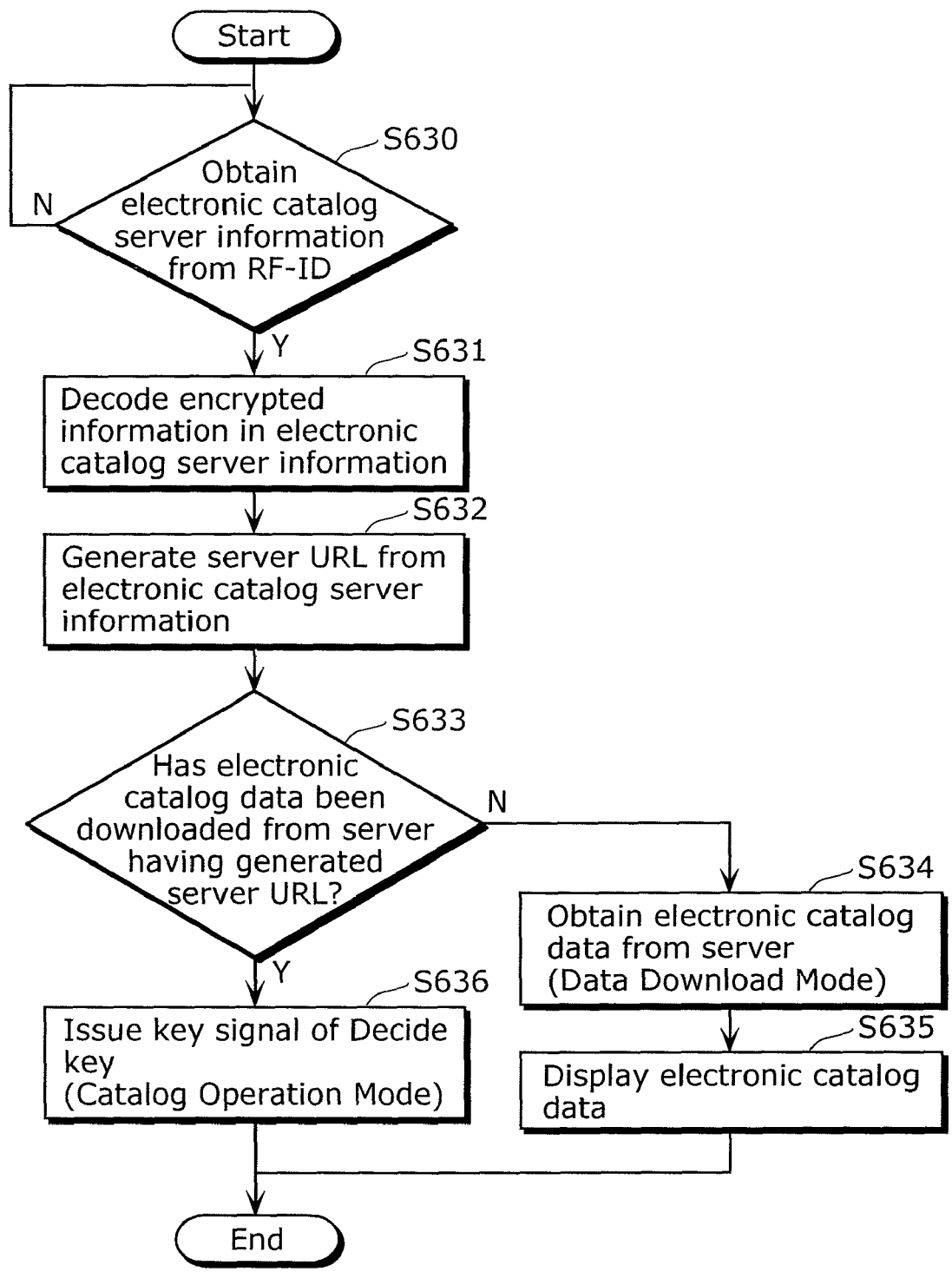
FIG. 55 is a flowchart of steps of processing performed by a TV displaying the electronic catalog.

The following describes processing of the TV 45 after downloading the electronic catalog data, with reference to a flowchart of FIG. 55. The processing regarding obtaining of the electronic catalog server information from the RF-ID unit at Steps S630 to S632 is the same whichever the electronic catalog data is downloaded or not. At S633, it is determined whether or not the electronic catalog data associated with the electronic catalog server information received from the RF-ID unit has already been downloaded and displayed. If the electronic catalog data has not yet been downloaded, then the TV 45 downloads the electronic catalog data from the server at S634 and displays the electronic catalog data at S635. The download processing is the same as the download processing described in the first embodiment.

Figure 56:
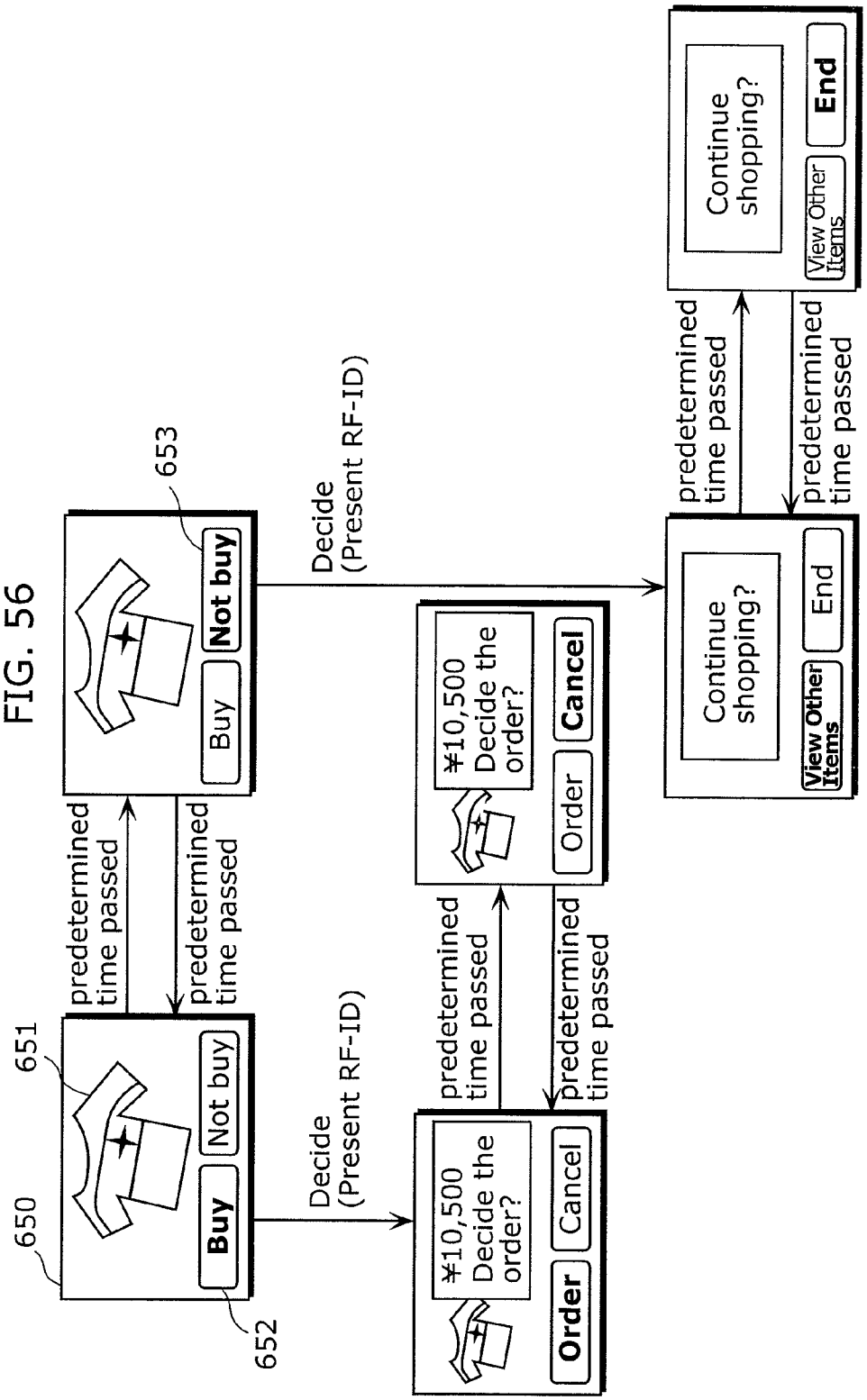
FIG. 56 is a diagram illustrating screen display of the electronic catalog.

If it is determined at S633 that the electronic catalog data has already been downloaded, then the TV 45 issues a signal of a predetermined key (for example, a signal of a Decide key) to execute operations for the displayed electronic catalog data (S636). Here, as illustrated in an example of a screen display of the electronic catalog data in FIG. 56, a screen presents the customer user with a few of options for a next operation to be executed by the customer user for the displayed electronic catalog data. Then, a focus circulates among the options on the screen (as illustrated as options 652 and 653 in FIG. 56) to indicate one of them as a selection candidate every time a predetermined time period passes. This allows the customer user to execute an operation for selecting or purchasing each product in the electronic catalog data, for example, only by presenting the electronic catalog notification card 502 having the RF-ID unit 47 to the TV 45, when the focus indicates a desired option of the customer user.

The second memory 52 according to the third embodiment, which is embedded in the RF-ID unit 47 on the electronic catalog notification card 502, may be a Read Only Memory (ROM). In this aspect, the electronic catalog server information input device 500 serves as a RF-ID memory data input unit in manufacturing the RF-ID unit, or a RF-ID memory data input means in a RF-ID manufacturing system. In general, a RF-ID unit having a ROM unit is inexpensive more than a RF-ID unit having a rewritable memory. Therefore, the RF-ID unit having a ROM allows the provider user sending a great number of electronic catalog notification cards to reduce a cost.

It should be noted that it has been described in the third embodiment that, a focus circulates among the options on the screen (as illustrated as options 652 and 653 in FIG. 56) to indicate one of them as a selection candidate every time a predetermined time period passes. However, the method of operating the electronic catalog data displayed on the screen by using the electronic catalog notification card 502 having the RF-ID unit 47 is not limited to the above. For example, it is also possible that the receiving unit 571 of the TV 45 sequentially receive pieces of information from the RF-ID unit and counts the sequential receiving processes, then thereby calculates a time period (RF-ID proximity time period) during which the RF-ID unit is in proximity of the TV 45, and eventually moves a focus indicating a selection candidate displayed on the screen based on the RF-ID proximity time period. With the above structure, the following operation for the electronic catalog is possible. Only when the RF-ID unit is in proximity of the TV, the focus displayed on the screen is circulated to change the selection candidate. If the RF-ID unit is away from the TV, the focus is stopped. After a predetermined time period after stopping of the focus, the selection candidate on which the focus is stopped is decided as selection. In this operation for the electronic catalog, the customer user can actively operate the electronic catalog by using the RF-ID unit, without waiting for the focus, which automatically circulates among options every predetermined time period, to arrive at a user's desired option.

It should also be noted that it has been described in the third embodiment that the electronic catalog server information input device 500 receives inputs by the input keys operated by the provider user, in order to obtain the electronic catalog server information. However, the following configuration is also possible. That is, the electronic catalog server information input device 500 has a communication interface to communicate with the image server. The image server holds the server information to be transmitted to the electronic catalog server information input device 500. The electronic catalog server information input device 500 receives the server information from the image server, in order to obtain the server information. This configuration in which the server information is stored in the image server allows the electronic catalog server information input device 500 to eliminate inputting to the image server. Especially, when a plurality of the electronic catalog server information input devices 500 are operated for a single image server, this configuration is highly convenient.

The conventional techniques have a program that users who are not familiar with operations of digital devices such as personal computers should learn operations of the devices to do online shopping. However, the system according to the third embodiment enables users using electronic catalogs to do online shopping and the like, simply by bringing received cards or post cards into proximity of TVs. Therefore, even users who are not familiar with online terminals such as personal computers and mobile phones can easily enjoy shopping on TV screens.

Fourth Embodiment

The fourth embodiment according to the present invention is described below.

Figure 59:
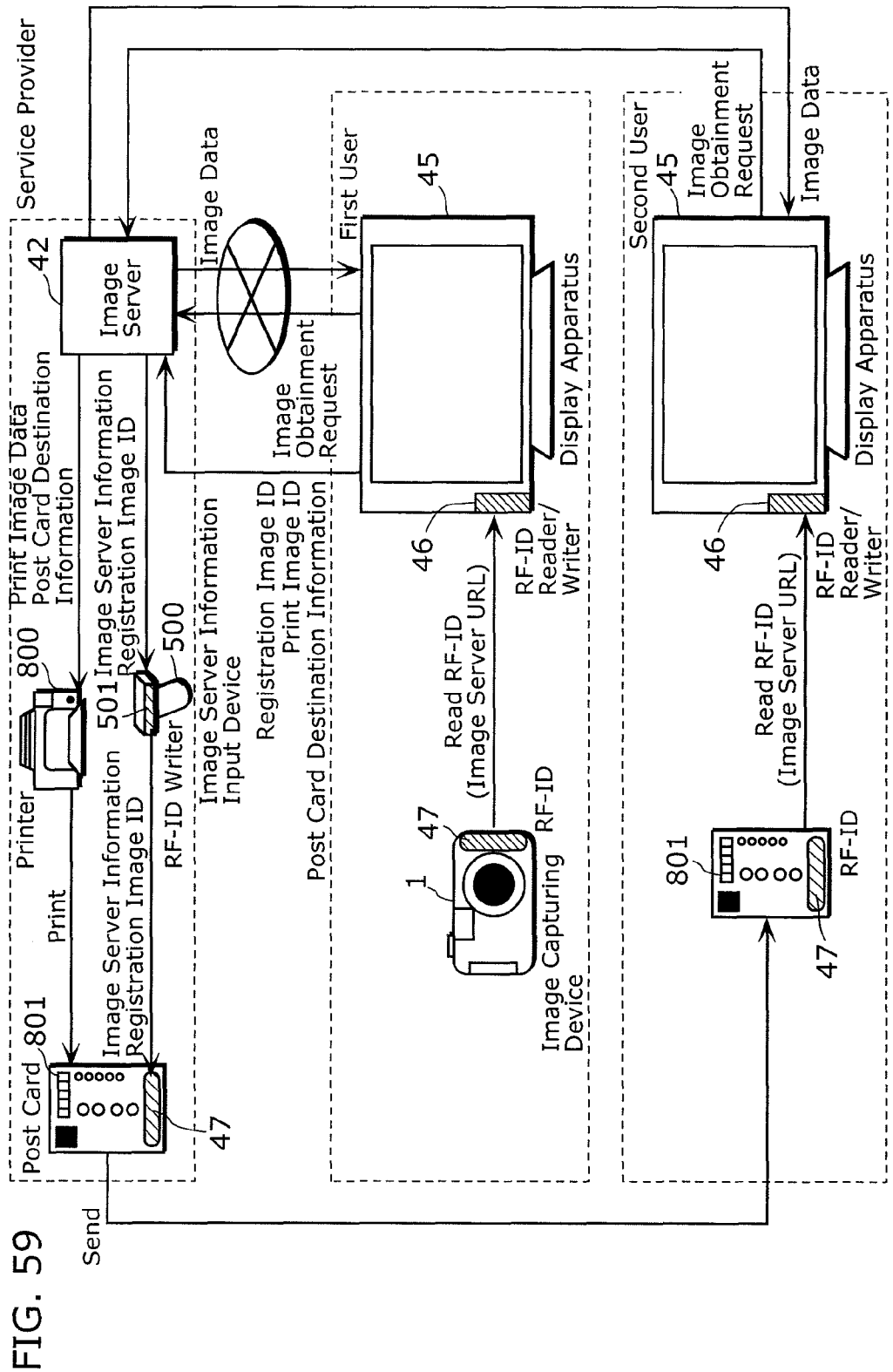
FIG. 59 is a schematic diagram of a RF-ID-attached post card mailing system.

FIG. 59 is a schematic diagram of the fourth embodiment. In the fourth embodiment, it is described a method of sending, to a remote location, a post card attached with RF-ID used to access an image server. First, a first user, who is a sender of a post card, brings the image capturing device 1 having the RF-ID unit 47 into proximity of the RF-ID reader/writer 46 of the TV 45. Thereby, the TV 45 generates a server URL used to connect the TV 45 to the image server 42, thereby obtains image data from the image server 42, and eventually displays the image data on a screen. This processing is the same as described in the first embodiment. Next, by using an input means such as a remote controller of the TV 45, the first user selects an image(s) to be printed on a post card and images to be registered in association with the post card (in other words, images to be shown to a second user living in a remote location), from among the image data displayed by the TV 45. In addition, the first user inputs address information such as a destination address of the post card by using the remote controller or the like. The TV 45 transmits, to the image server 42, ID of the image selected by the first user to be printed on the post card (hereinafter, referred to as "print image ID"), ID of the images to be registered for the post card (hereinafter, referred to as "registration image ID"), and the destination information of the post card (hereinafter, referred to as "post card destination information"). The image server 42 retrieves the image data identified by the print image ID and then transmits the image data and the post card destination information to a printer 800. The printer 800 prints the image data and the post card destination information on the post card. In addition, to the image server information input unit 500, the image server 42 transmits the registration image ID received from the TV 45, together with image server information. The image server information includes: a sever address such as a URL; server login ID; a server login password; an image display password, image display information indicating whether the image data (images) is to be displayed in a list (as thumbnails) or sequentially (as a slide show); and medium identification information indicating a medium, such as a card or post card, to which RF-ID is to be attached. The image server information input device 500 writes the image server information and the registration image ID to the RF-ID unit 47 of the post card on which the image and the destination information are printed by the printer 800. The post card 801 applied with printing and RF-ID writing is mailed to the printed destination. Thereby, the second user, who is designated by the first user as being the destination, receives the post card 801. When the second user brings the mailed post card 801 into proximity of a RF-ID reader/writer 46 of a TV 45 of the second user, the TV 45 of the second user obtains the image server information and the registration image ID from the RF-ID unit 47, downloads the images identified by the registration image ID, and displays the downloaded images.

The structure and processing of the image capturing device 1 according to the fourth embodiment are the same as described in the first embodiment.

Figure 60:
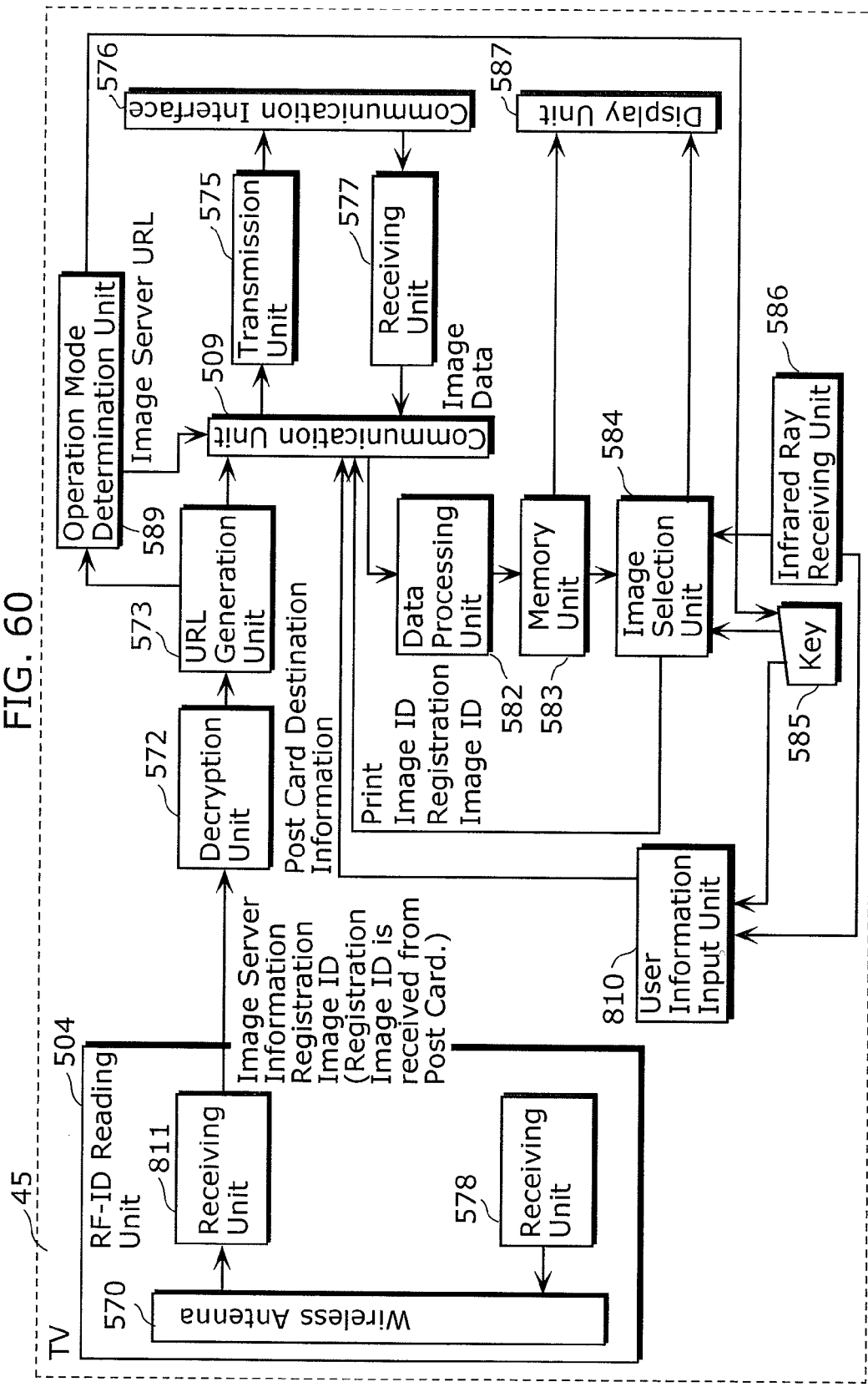
FIG. 60 is a block diagram of a TV in the RF-ID-attached post card mailing system.
Figure 61:
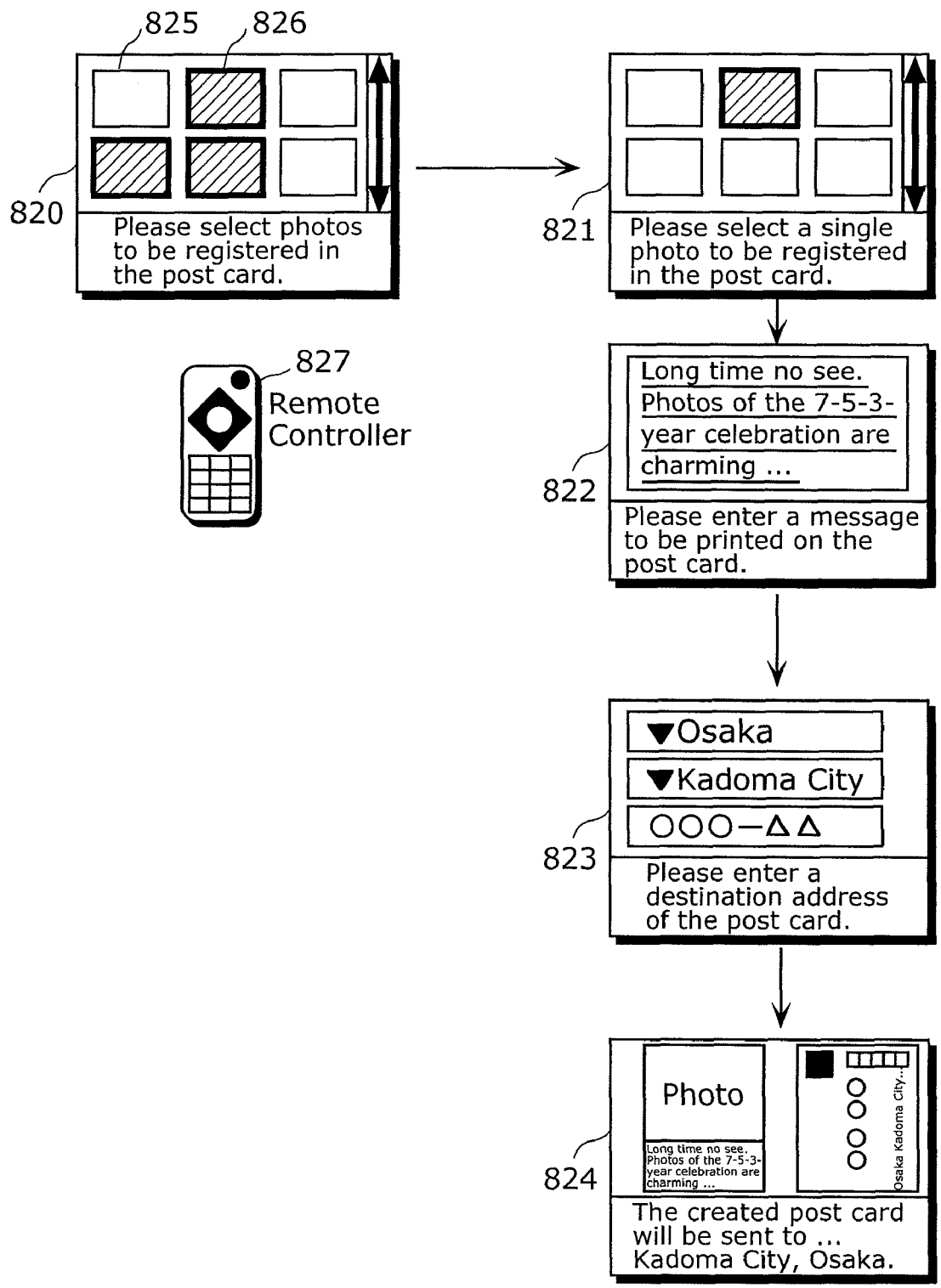
FIG. 61 is a diagram illustrating screen display in image selection operation by the RF-ID-attached post card mailing system.

FIG. 60 is a block diagram of a structure of the TV 45 according to the fourth embodiment. A receiving unit 811 receives the image server information from the RF-ID unit 47 of the image capturing device 1 or the post card 801 via a wireless antenna 570. If the RF-ID unit 47 of the post card 801 holds the registration image ID, the receiving unit 811 receives also the registration image ID. An image selection unit 584 receives an image selection operation from the user via a key unit 585 and an infrared ray receiving unit 586, and thereby obtains ID of an image which the first user has selected to be printed on the post card (namely, the print image ID) and ID of images which the first user has selected to be registered for the post card (namely, the registration image ID). Then, the image selection unit 584 provides the obtained IDs to the communication unit 509 (the network communication unit 509). FIG. 61 illustrates an example of a screen display on the TV 45 in the image selection operation. In FIG. 61, 821 is a screen display from which the first user selects an image to be printed on the post card. 820 in FIG. 61 is a screen display from which the first user selects images to be registered for the post card. A post card destination information input unit 810 receives a character input operation of the first user via the key unit 585 and the infrared ray receiving unit 586. Thereby, the post card destination information input unit 810 obtains the post card destination information including an address and a name of the destination of the post card. Then, the post card destination information input unit 810 provides the post card destination information to the communication unit 509. 823 in FIG. 61 is an example of a screen display on which the post card destination information is inputted. The communication unit 509 transmits the post card destination information, the print image ID, and the registration ID to the image server via a transmission unit 575 and a communication interface 576.

Figure 62:
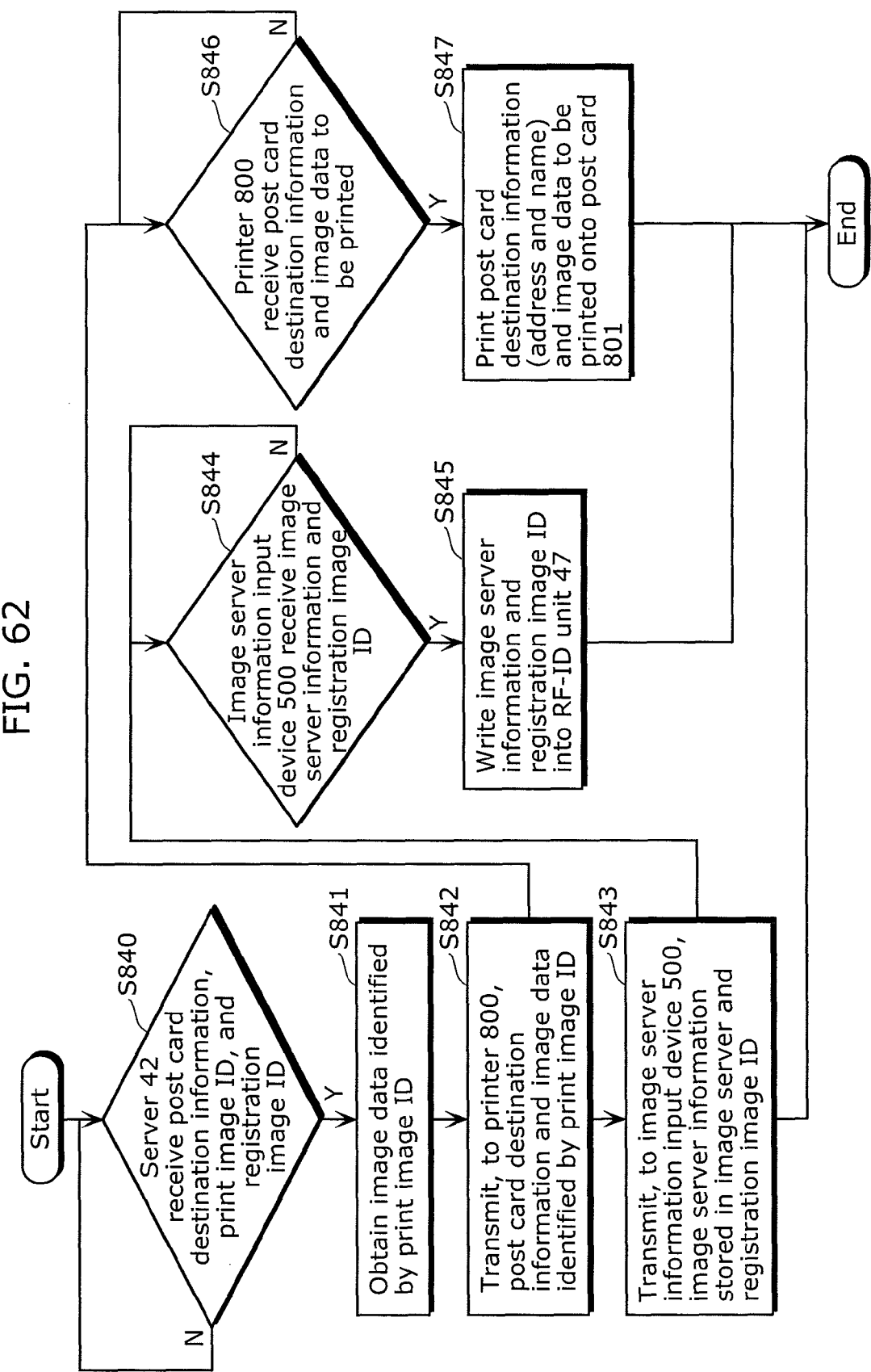
FIG. 62 is a flowchart of steps of processing performed by an image server in the RF-ID-attached post card mailing system.

FIG. 62 is a flowchart of processing performed prior to mailing of the post card 801, by the image server 42, the printer 800, and the image server information input device 500. When the post card 801 is applied with printing and RF-ID writing, the post card 801 is mailed to the printed destination. The second user, who is designated by the first user as being the destination, receives the post card 801. When the second user presents the received post card 801 to the TV 45, the receiving unit 811 receives the image server information and the registration image ID from the RF-ID unit 47 via the wireless antenna 570. A decryption unit 572 decrypts encrypted information in the image server information and the registration image ID. Next, the URL generation unit 573 generates a URL from which only images identified by the registration image ID from among images stored in the image server 42 are downloaded to the TV 45. More specifically, the URL generation unit 573 may designate an internal directory of the server in the generated URL or may use a method of embedding the registration image ID to the URL as a URL option. By using the URL generated by the URL generation unit 573 to designate the server, the TV 45 accesses the image server to obtain the images, which is the same as described in more detail in the first embodiment.

It should be noted that it has been described in the fourth embodiment that the user inputs the destination information to the TV 45, but the user may input not only the destination information such as an address and a name but also a message to be printed with an image on a post card. The TV 45 receives the input message together with the destination information and provides them to the image server 42. The printer 800 prints them on the post card. 822 in FIG. 61 illustrates an example of a screen of the TV 45 on which a message to be printed is inputted. If the user can select an image to be printed on the post card and also input an message added to the image, a flexibility in generating a post card with RF-ID is increased.

It should also be noted that the TV 45 according to the fourth embodiment may allow the user to perform operations for images displayed on the TV 45 by using the post card with RF-ID, in the same manner as described in the third embodiment for the processing in which the user operates an electronic catalog displayed on a screen by using RF-ID.

As described above, the system according to the fourth embodiment enables the user to mail a post card with RF-ID to a person living in a distant location, without creating a post card attached with RF-ID by the user himself/herself. In addition, when the user wishes to print the image(s) stored in the image server onto the post card to be mailed, the system allows the user to perform operation on a TV screen to select an image(s) to be printed. As a result, high usability is achieved.

Conventionally, if the user intends to show images, on a large screen display device, to a different user living in a remote location, the user in the remote location needs to learn operations of the device (apparatus), an operation acquirer has to go to the remote location to operate the device, or the display device in the remote location should be remotely controlled. The system according to the fourth embodiment, however, enables such a user in a remote location to easily view images by a simple operation, for example, by bringing a physical medium such as a post card with RF-ID into proximity of a display device.

Fifth Embodiment

Figure 63:
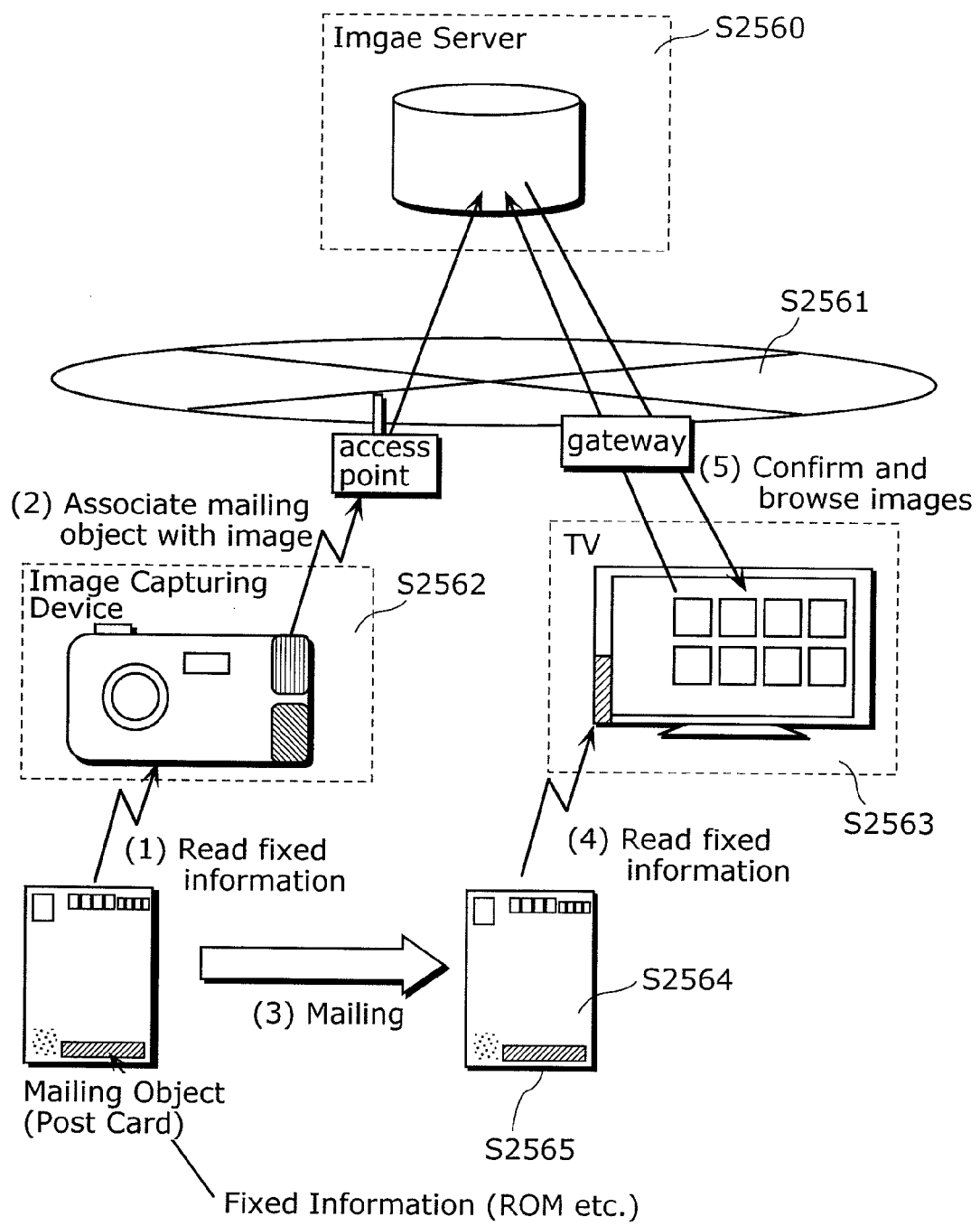
FIG. 63 is a block diagram of a system according to a fifth embodiment of the present invention.

The fifth embodiment of the present invention has the following configuration. A mailing object such as a post card is written with fixed information. The image capturing device associates the fixed information with an image or a group of images (image data) stored in the server. A reproduction side reads the fixed information from the RF-ID attached to the post card or the like in order to display the image data associated with the fixed information. The configuration is illustrated in FIG. 63. Referring to FIG. 63, first, the image capturing device reads the fixed information from the mailing object, then associates the fixed information with an image(s), and registers information of the association (hereinafter, referred to as "association information) into the server. When the user receives the mailing object for which the registration is completed, the user brings the mailing object into proximity of a RF-ID reader of a TV to read the fixed information from the mailing object. The TV queries the server using the fixed information, and thereby displays the image(s) associated with the mailing object.

The fifth embodiment is characterized in that the RF-ID information in the mailing object is not rewritable (ROM) or in non-rewritable environments so that image data in the server is associated with the mailing object without rewriting the fixed information in the mailing object.

<Image Uploading and Mailing Object Associating by Image Capturing Device>

The images captured by the image capturing device are uploaded to the server using the method described in the prior embodiments. Here, an identifier is assigned to an uploaded image or image group. The identifier makes it possible to identify the image or an group of images stored in the server.

The following describes a method of associating (i) an image or image group which is captured and uploaded to the server by the image capturing device with (ii) fixed information recorded in a RF-ID tag of a mailing object. FIGS. 64A to 64C illustrate examples of the fixed information recorded in the RF-ID tag of the mailing object. FIG. 64A illustrates fixed information including: mailing object UID unique to the mailing object; and information such as an address for accessing the image server. FIG. 64B illustrates fixed information including: the mailing object UID; and information such as an address for accessing a relay server. FIG. 64C illustrates fixed information including the mailing object UID only. The fixed information may also include a login ID, password information, and the like for accessing the server. It is assumed in the fifth embodiment that such information necessary to access the server is included in a URL including the address information.

Figure 65:
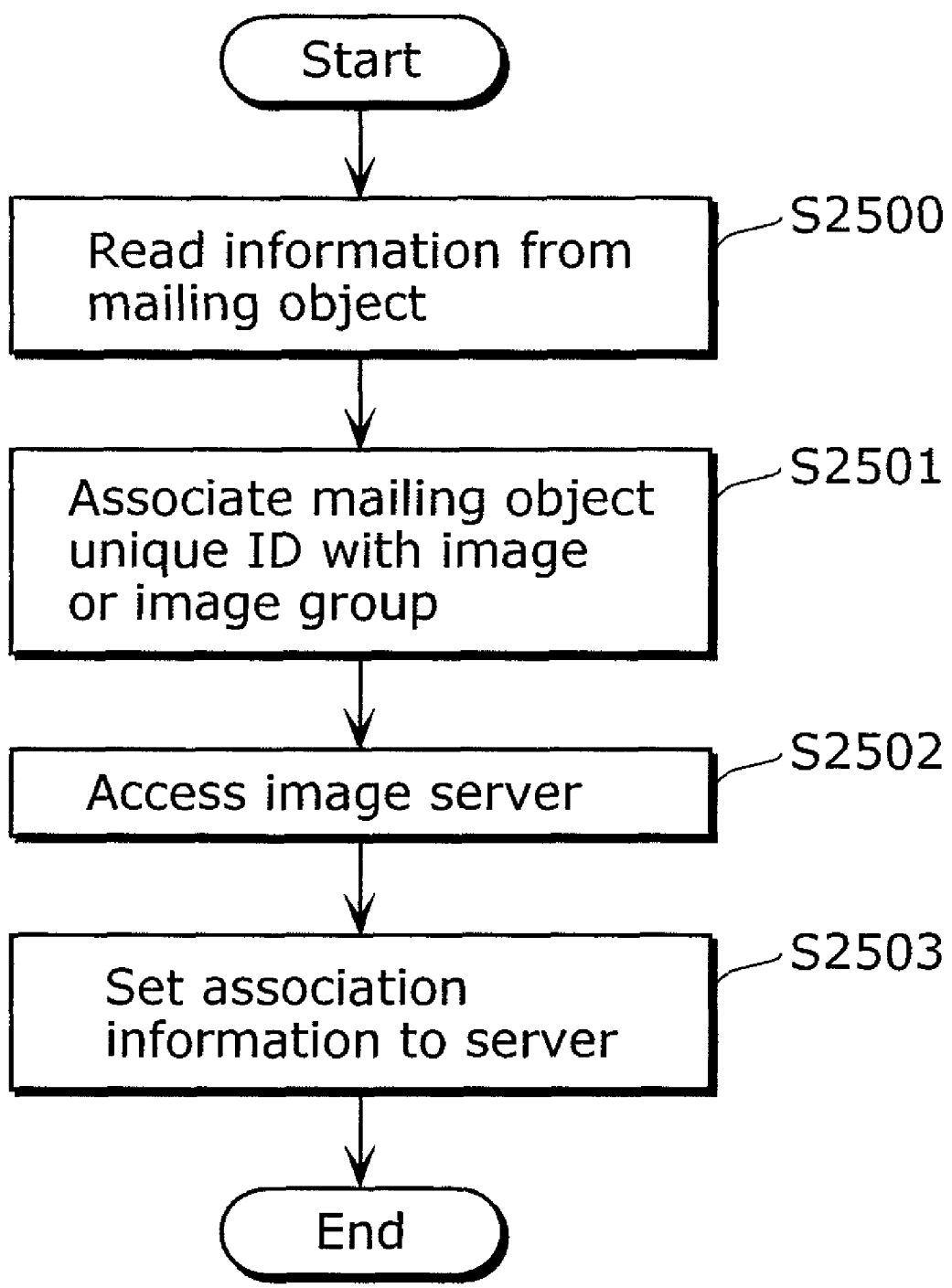
FIG. 65 is a flowchart of processing for associating an image capturing device with an image server, according to the fifth embodiment of the present invention.

FIG. 65 is a flowchart of processing performed by the image capturing device to associate the RF-ID with image data stored in the server, when the image capturing device has a RF-ID reader function.

First, the image capturing device reads information from the RF-ID of the mailing object by using the RF-ID reader (S2500). In more detail, the second antenna 21 illustrated in FIG. 3 communicates with the RF-ID of the mailing object, and thereby the data receiving unit 105 receives the fixed information from mailing object. Then, the second processing unit 95 performs processing to provide the fixed information of the mailing object to the first processing unit 35 via the recording unit 106, the second memory 52, and the recording/reproducing unit 51. The first processing unit 35 associates the mailing object UID read from the mailing object with an image or image group, according to designation from the user (S2501). Then, the image capturing device accesses the server 42 via the first antenna 20 (S2502). Thereby, the image capturing device registers, to the server 42, the association information regarding the association between the mailing object UID and the image data stored in the server 42 (S2503).

Figure 66:
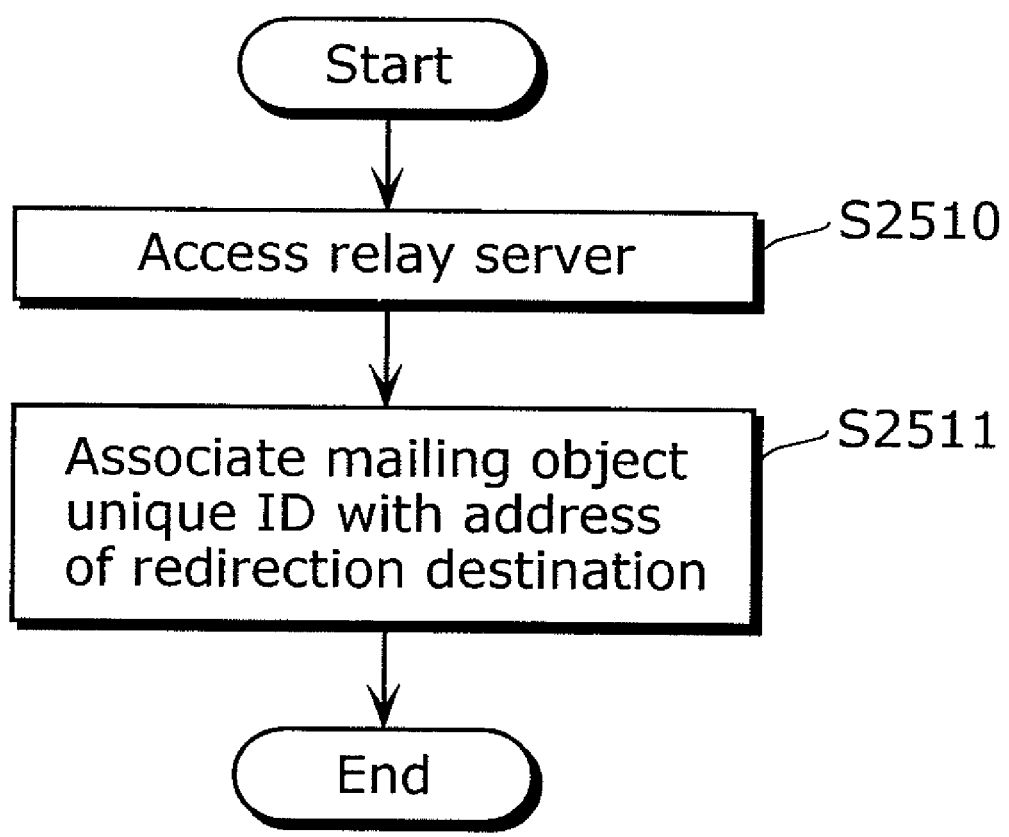
FIG. 66 is a flowchart of processing for registering the image capturing device with a relay server, according to the fifth embodiment of the present invention.

If the fixed information read from the mailing object includes an address of the image server or a URL including the address, then the processing is completed. On the other hand, if the fixed information read from the mailing object does not include an address of the image server or a URL including the address, the image capturing device sets a relay server (FIG. 66).

In order to set a relay server, the image capturing device accesses the relay server (S2510). In more detail, if the fixed information read from the mailing object includes an address of a relay server or a URL including the address, then the image capturing device accesses the relay server. Otherwise, the image capturing device accesses a relay server that is previously set for the image capturing device.

After accessing the relay server, the image capturing device sets, in a database of the relay server, association information regarding association between the mailing object UID and the server that is a redirection destination (transfer destination) (S2511). Thereby, association between the mailing object UID and an address of the transfer destination is registered in the database of the relay server.

If the image capturing device does not have a RF-ID reader function and the mailing object is printed with a two-dimensional code or the like indicating information of the RF-ID reader, the image capturing device captures an image of the two-dimensional code using an image capturing unit to read information from the code so that the image capturing device can obtain the same information as the fixed information recorded in the RF-ID unit of the mailing object. The two-dimensional code may be a QR Code™, a PDF417, Veri Code, Maxi Code, or the like. Any other code can be used if the image capturing device can read information from the code by capturing an image of the code. In addition, the same advantages as described in the fifth embodiment can be produced by using a bar-code in a one-dimensional direction only, although a printing area is increased.

Figure 67:
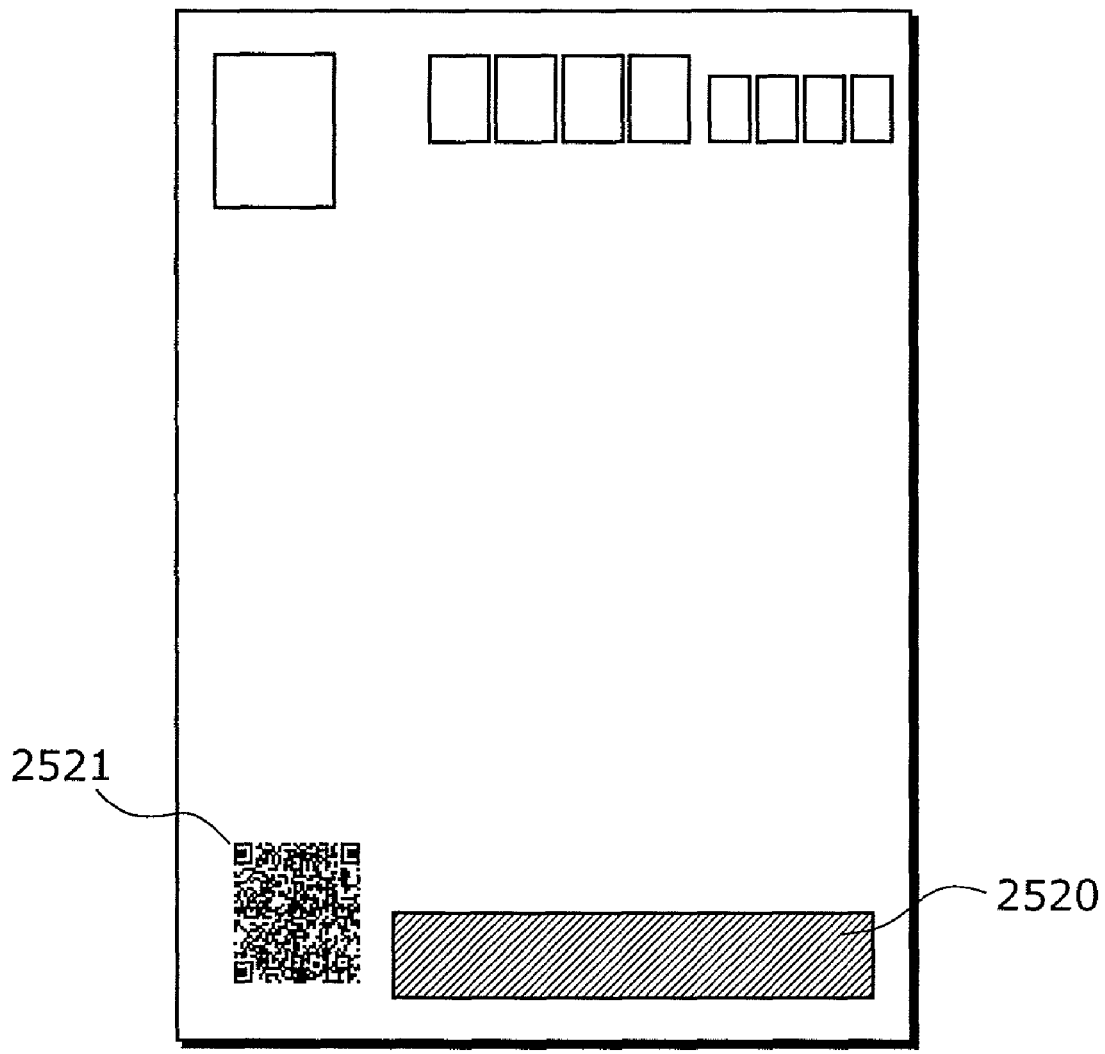
FIG. 67 is a diagram illustrating an example of a mailing object attached with a 2-dimensional code.
Figure 68:
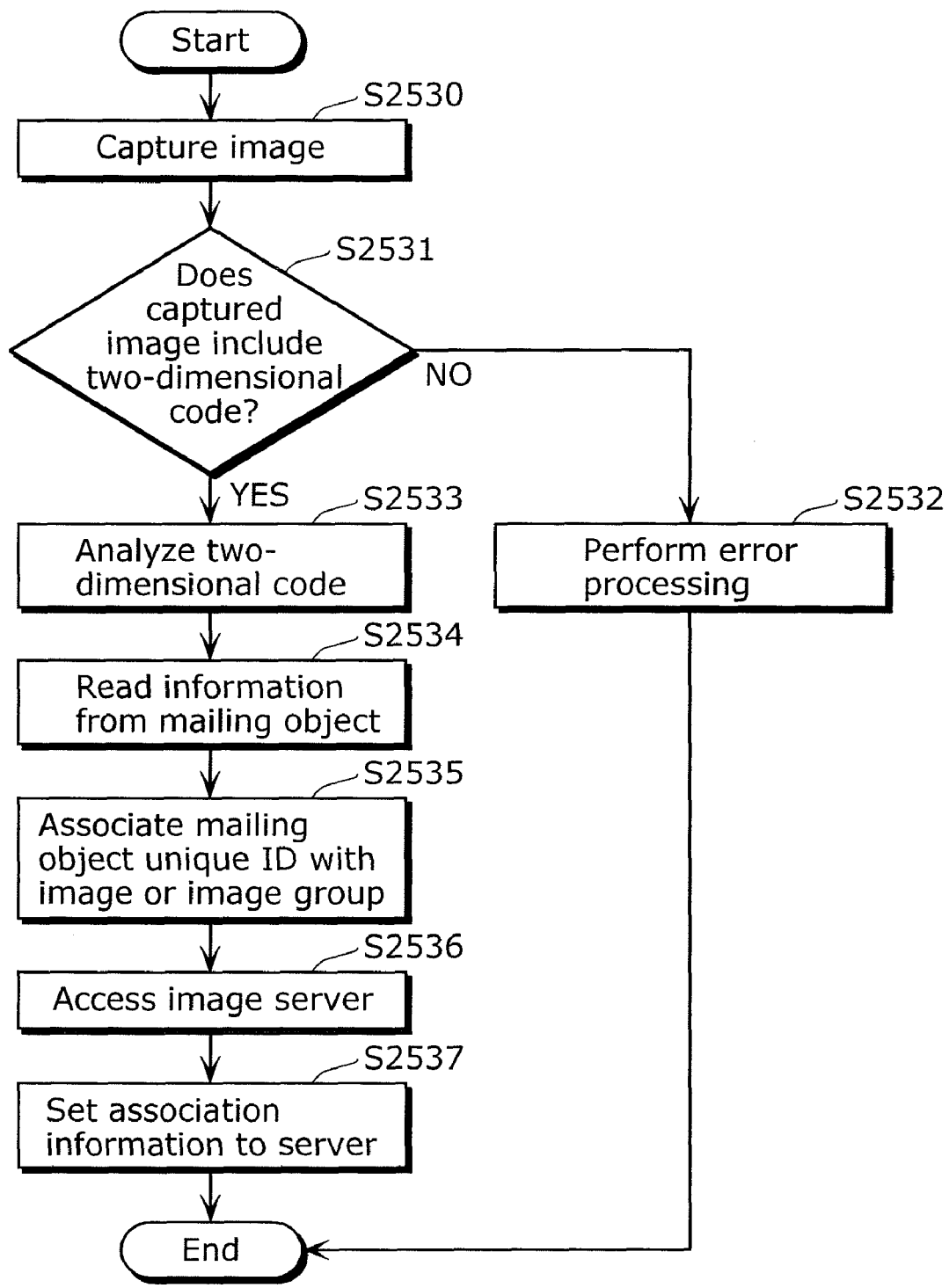
FIG. 68 is a flowchart of processing using a 2-dimensional bar-code of the image capturing device according to the fifth embodiment of the present invention.

FIG. 67 is an example of the mailing object attached with a RF-ID unit 2520 and printed with a two-dimensional code 2521 indicating the same information as that recorded on the RF-ID unit 2520. A flow of processing data when the two-dimensional code is read by the image capturing device is described with reference to the block diagram of FIG. 3. The two-dimensional code printed on the mailing object is captured by the image capturing unit 30, then converted into an imaged by the video processing unit 31, and provided to the first processing unit 35 via the recording/reproducing unit 32. The first processing unit 35 analyzes the captured two-dimensional code and retrieves the information from the two-dimensional code. The information indicated by the two-dimensional code is basically the same as the information recorded in the RF-ID unit. The information indicated by the two-dimensional code includes at least the mailing object UID.

The following describes a flow of the processing from reading the information of the two-dimensional code to associating the information with an image or image group in the server.

Firstly, the image capturing unit captures an image of the two-dimensional code (S2530). Then, it is determined whether or not the captured image is a two-dimensional code (S2531). If the captured image is not a two-dimensional code, then error processing is performed (S2532). Or, normal image capturing processing may be performed. On the other hand, if the captured image is a two-dimensional code, then the two-dimensional code is analyzed (S2533). Thereby, information is read from the mailing object based on the result of the analysis (S2534). After reading the fixed information from the mailing object, the image capturing device associates the mailing object UID with image data stored in the server (S2535). Then, the image capturing device accesses the server (S2536). Then, the image capturing device sets the association information to the server (S2537). The Steps S2535 to S2537 are the same as the Steps S2501 to S2503 in FIG. 65. Here, if the readout information does not include an address of the image server or a URL including the address, then the image capturing device performs transfer setting to a relay server. The transfer setting to the relay server has been previously described with reference to FIG. 66.

As described above, by reading information from the two-dimensional bar-code printed on the mailing object, it is possible to complete to associate the information recorded on the RF-ID unit with image data stored in the server.

If the image capturing device does not have a RF-ID reader function and the mailing object is not printed with a code such as a two-dimensional code, the image capturing device can read information from the mailing object if the user manually inputs, to the image capturing device, the mailing object UID and the URL such as a sever address which are printed on the mailing object. The user inputs the information using buttons 7 to 15 illustrated in FIG. 2. In this aspect, the URL and the mailing object UID may be printed directly as a plane text or coded to be a code which the user easily inputs.

As described above, even if the image capturing device does not have a RF-ID reader function and the mailing object is not printed with a two-dimensional code, it is possible to associate the mailing object with image data stored in the server.

<Image Reproducing and Viewing by Using RF-ID on Mailing Object>

Next, the steps for viewing images stored in the server on the TV using the mailing object for which association is completed.

Figure 69:
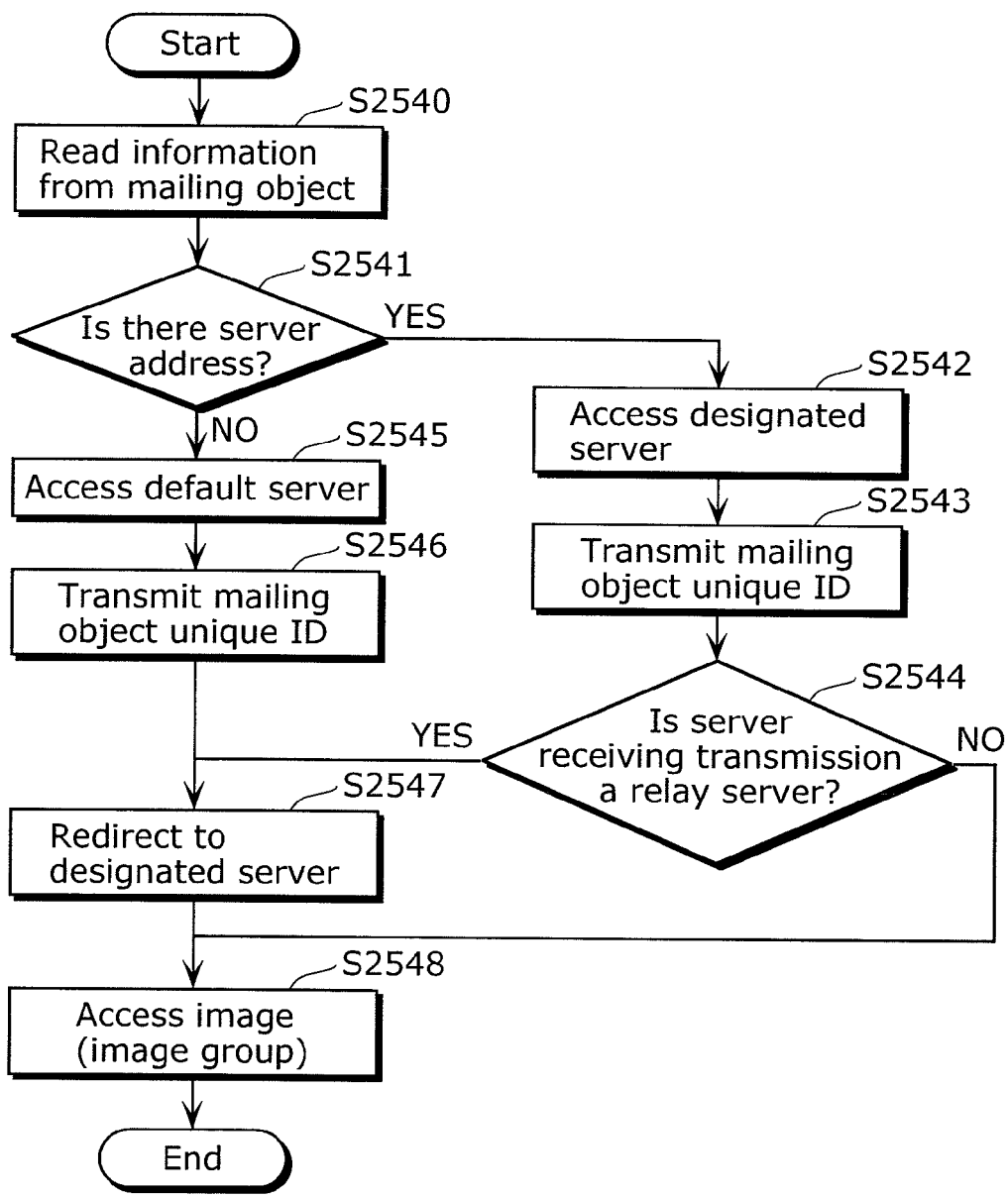
FIG. 69 is a flowchart of processing performed by a TV according to the fifth embodiment of the present invention.

FIG. 69 is a flowchart of processing performed by the TV to read RF-ID from the mailing object and eventually access the image server.

When the user brings the mailing object into proximity of the RF-ID reader of the TV, the TV reads information of the RF-ID on the mailing object (S2540). Then, a determination is made as to whether or not the readout information includes a sever address or a URL including the server address (S2541). If the readout information includes a sever address or a URL including the sever address, then the TV accesses the designated server (S2542). Then, the TV transmits the mailing object UID (S2543). Then, a determination is made as to whether or not the server receiving the transmission is a relay server (S2544). If the server is a relay server, then the relay server redirects to a server (the image sever) designated in the relay server (S2547). Thereby, the TV accesses an image or image group in the image server (S2548). On the other hand, if it is determined at S2541 that the readout information does not include a sever address, then the TV accesses a server set by a predetermined default (S2545). Then, the TV transmits the mailing object UID to the default server (S2546). The default server redirects to a server (the image server) designated in the default server (S2547) to access the image server.

Figure 70:
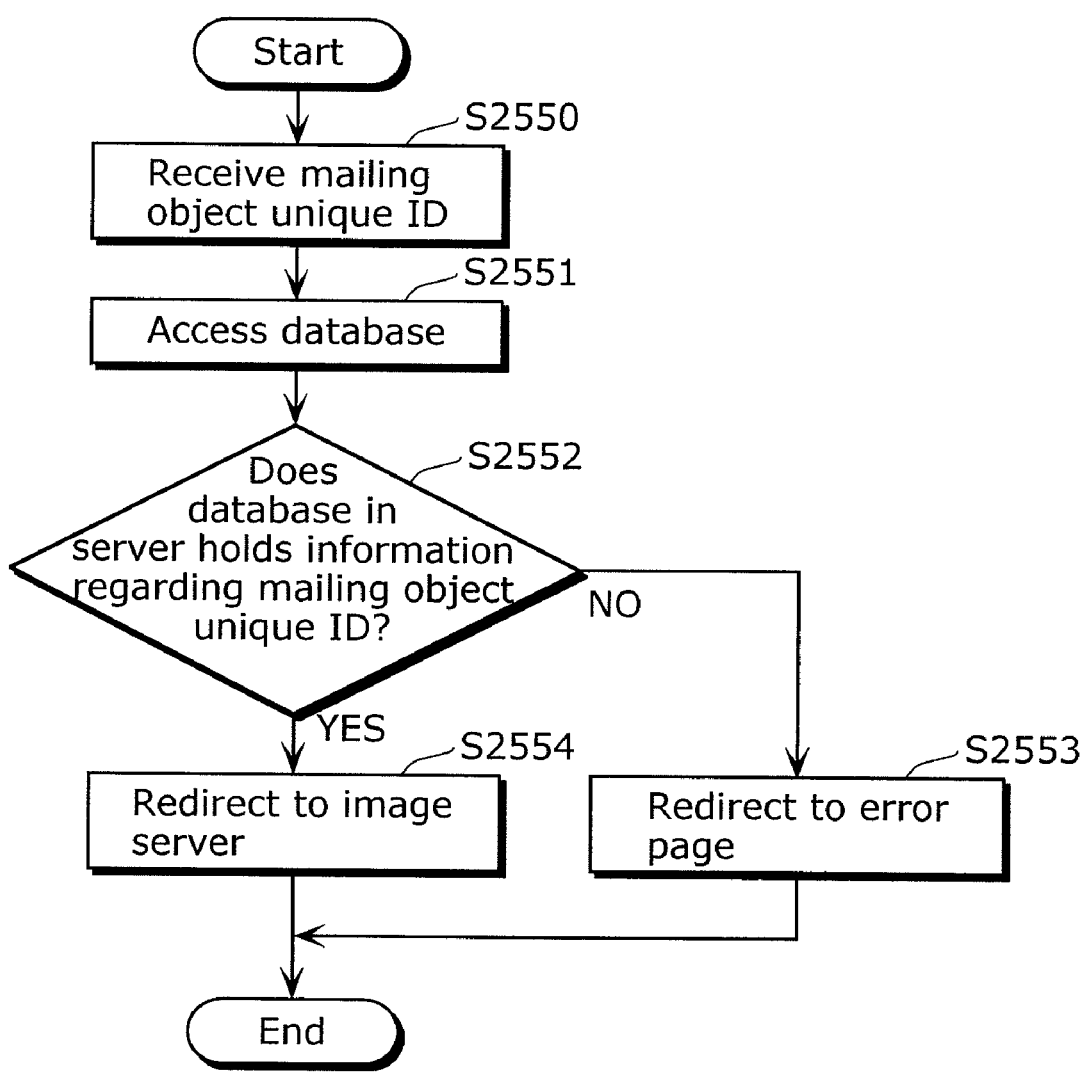
FIG. 70 is a flowchart of processing performed by the relay server according to the fifth embodiment of the present invention.

Here, if association between the mailing object UID and the designated server as a destination of the relay is not registered in a database of the relay or default server, the relay or default server redirects to an error page. FIG. 70 is a flowchart of processing performed by the relay or default server after receiving the mailing object UID. When the relay or default server receives the mailing object UID (S2550), the server searches its database for information regarding the mailing object UID (S2551). Then, the relay or default server determines whether or not the database holds information regarding the mailing object UID (S2552). If the database holds the information, then the relay or default server redirects to a server associated with the mailing object UID in the database (S2554). On the other hand, if the database does not hold the information (in other words, if there is no association), then the relay or default server redirects to an error page (S2553).

As described above, the mailing object having fixed information in the RF-ID is previously associated with image data stored in the image server. Thereby, when the mailing object with the association is presented to the TV, the user can view an image or image group in the server which is associated with the mailing object UID, without rewriting of the RF-ID of the mailing object. Therefore, even if the user is away from home and cannot rewrite the RF-ID of the mailing object, or even if the RF-ID of the mailing object is not rewritable, the user can associate images in the server with the mailing object. As a result, the user allows a person receiving the mailing object to view the images associated with the mailing object.

It should be noted that it has been described in the fifth embodiment that the mailing object UID is transmitted after accessing the server. However, it is also possible to generate a URL from the mailing object UID and the sever address recorded on the mailing object in order to access the server. In this aspect, it is possible to perform the access to the server and the transmission of the mailing object UID at the same time.

According to the fifth embodiment, even in an environment where the RF-ID cannot be rewritten, such as in a sight-seeing location, for example, the user can associate captured images with a post card and send the post card to a friend. Thereby, the friend receiving the post card presents the post card to a TV to view the images the user captured in the sight-seeing location. As explained above, even in an environment where the RF-ID cannot be rewritten, the user can create a mailing object associated with images in the server and then send the mailing object to a person to which the user desires to show the images.

If the image capturing device has a RF-ID writer function to rewrite the RF-ID of the mailing object, the processing is the same as processing performed by the TV for associating the mailing object with image data in the server, which will be described below in the sixth embodiment. Therefore, the processing is not described in the fifth embodiment.

Sixth Embodiment

In the sixth embodiment, the following configuration is described. The image capturing device captures images and uploads the images to the image server. Then, a user transmitting the images (hereinafter, referred to as a "sending user") selects an image group from the images in the server. Information for accessing the selected image group is recorded in the RF-ID on the mailing object. The mailing object is mailed to a user receiving the images (hereinafter, referred to as a "receiving user"). The receiving user accesses the image group in the image server by using the RF-ID on the mailing object.

Figure 71:
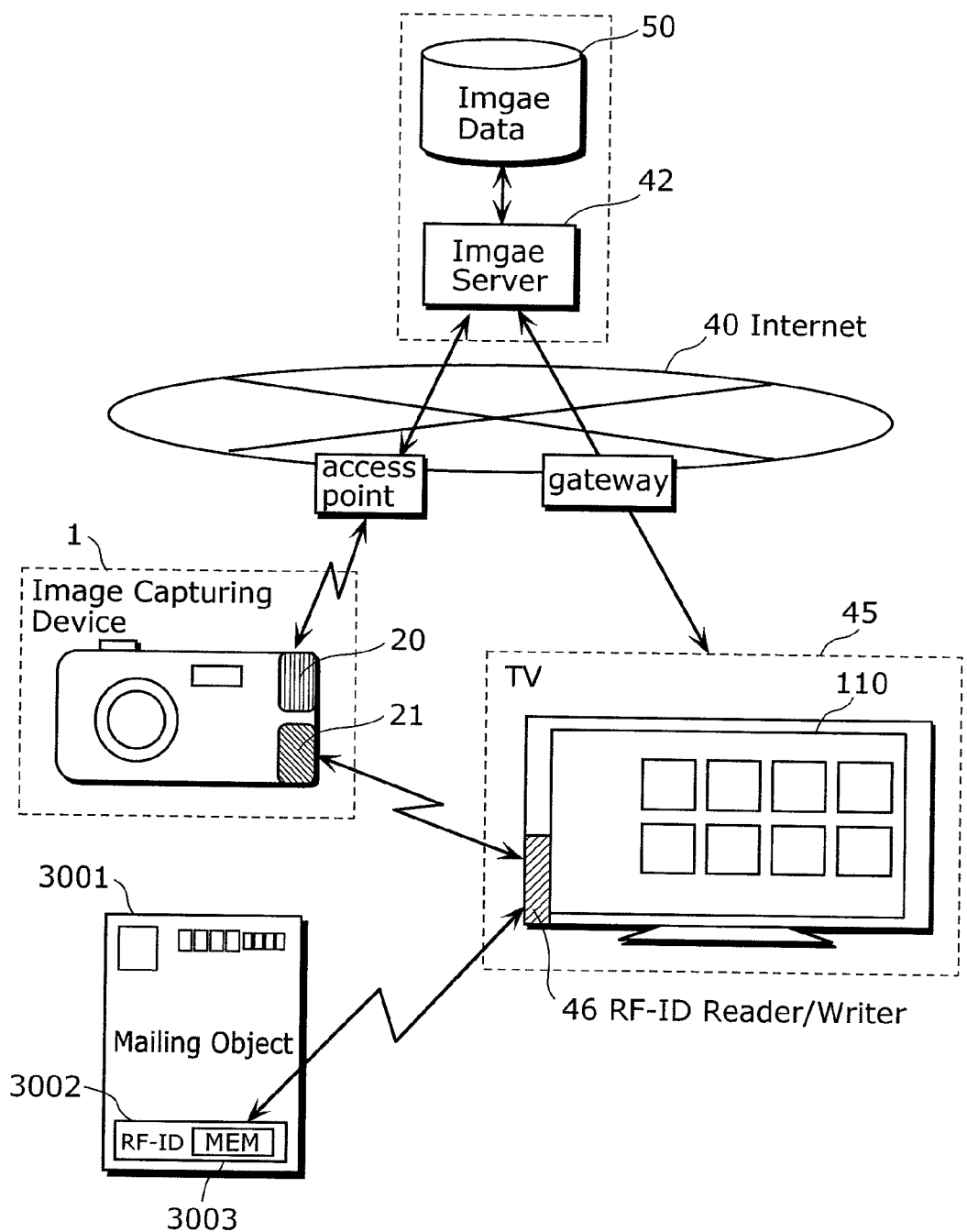
FIG. 71 is a schematic diagram of an image transmitting side according to a sixth embodiment of the present invention.
Figure 72:
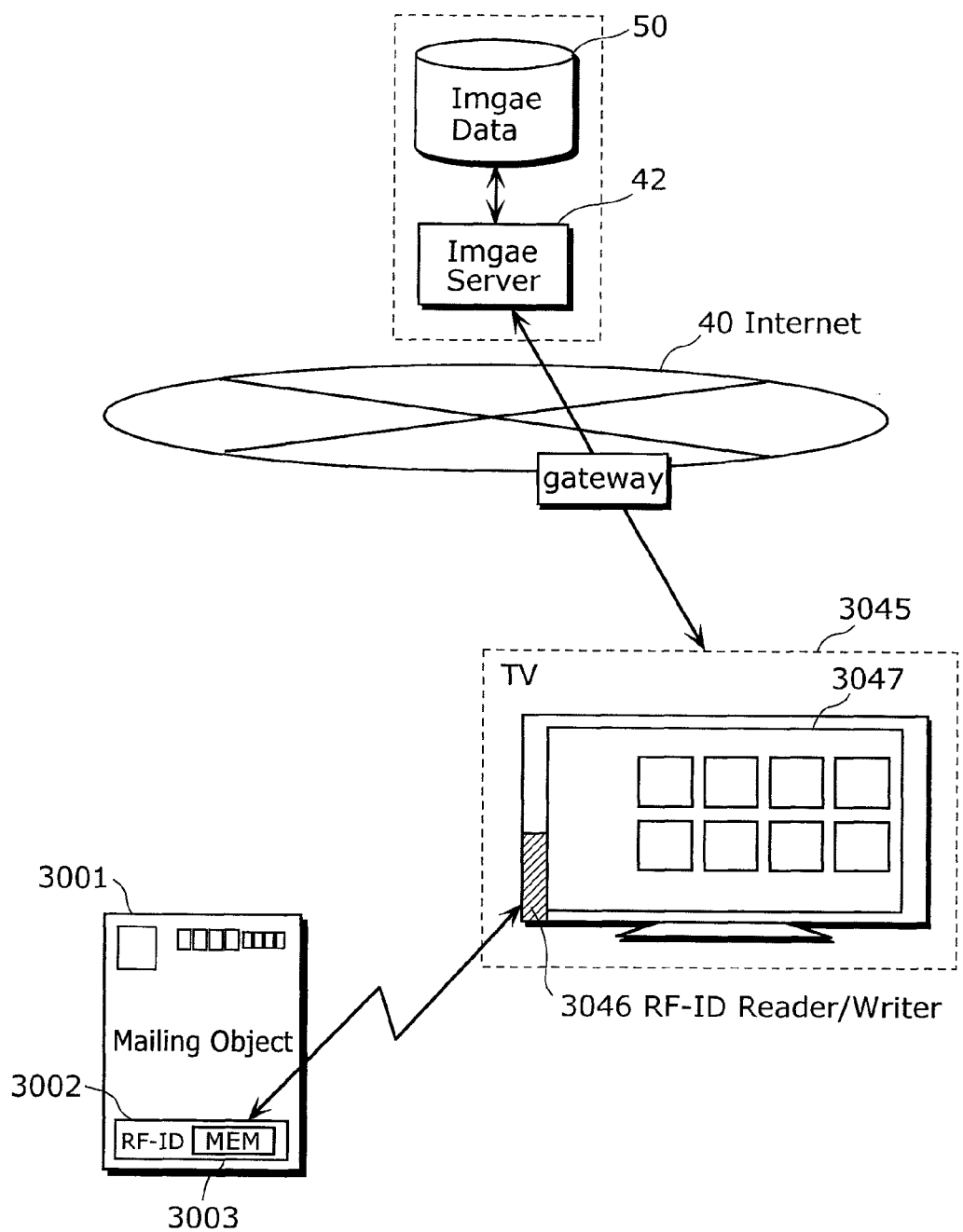
FIG. 72 is a schematic diagram of an image receiving side according to the sixth embodiment of the present invention.

FIG. 71 is a schematic diagram of a configuration of an image transmission side according to the sixth embodiment of the present invention. FIG. 72 is a schematic diagram of a configuration of an image receiving side according to the sixth embodiment of the present invention. Here, the same reference numerals of FIGS. 1 and 3 are assigned to the identical elements of FIGS. 71 and 72, so that the identical elements are not explained again below.

In FIGS. 71 and 72, a mailing object 3001 is a post card, envelope, or letter paper which is mailed from the image transmission side to the image receiving side. A RF-ID unit 3002 is a rewritable RF-ID. At least part of the RF-ID unit 302 is a rewritable memory unit 3003. The RF-ID unit 3002 is attached to or incorporated into the mailing object 3001 in order to be sent to the image receiving side together with the mailing object.

As described in the prior embodiments, the memory unit 3003 in the RF-ID unit 3002 holds the medium identification information for identifying that the medium having the RF-ID unit 3002 is a mailing object.

Referring to FIG. 72, a TV 3045 is a TV display device provided in the image receiving side. The TV 3045 has the same function as that of the TV 45 in FIG. 71 described in the prior embodiments. Like the TV 45 in FIG. 71, the TV 3045 includes a RF-ID reader/writer 3046 (corresponding to the RF-ID reader/writer 46 in FIG. 71) and a display unit 3047 (corresponding to the display unit 110 in FIG. 71). The TV 3045 is connected to the Internet 40 via a network connection means not shown.

Next, the processing performed by the above configuration is described.

<Image Group Selecting and Mailing Object Writing by Image Transmission Side>

In the image transmission side in FIG. 71, images captured by the image capturing device 1 are transmitted to a wireless access point via the second antenna 20 in the image capturing device 1 used for wireless communication, such as a wireless LAN or WiMAX. The images are recorded as the image data 50 onto the image server 42 via the internet 40. Then, the image capturing device 1 is moved into proximity of the RF-ID reader/writer 46 of the TV 45 in order to establish connection with the TV 45 by wireless communication via the first antenna 21 of the image capturing device 1 used for RF-ID. The TV 45 obtains, from the image capturing device 1, information for accessing the image data 50 in the image server 42. Then, the TV 45 downloads the images of the image data 50 to be displayed on the display unit 110. The above processing is the same as described in the prior embodiments. The above is just a summary.

Next, the sending user checks the images displayed on the display unit 110 of the TV 45 in order to set transmission image selection information indicating whether or not each of the images is to be transmitted to the receiving user (in other words, whether or not each of the images is to be permitted to be viewed by the receiving user). The sending user can set also restriction on display for the receiving user, utility form information such as a slide show and printing, which is described in the prior embodiments. The transmission image selection information and the utility form information are transmitted to and recorded onto the image server. The image server manages, as an image group, a set of images selected as transmission images in the transmission image selection information.

Figure 73:
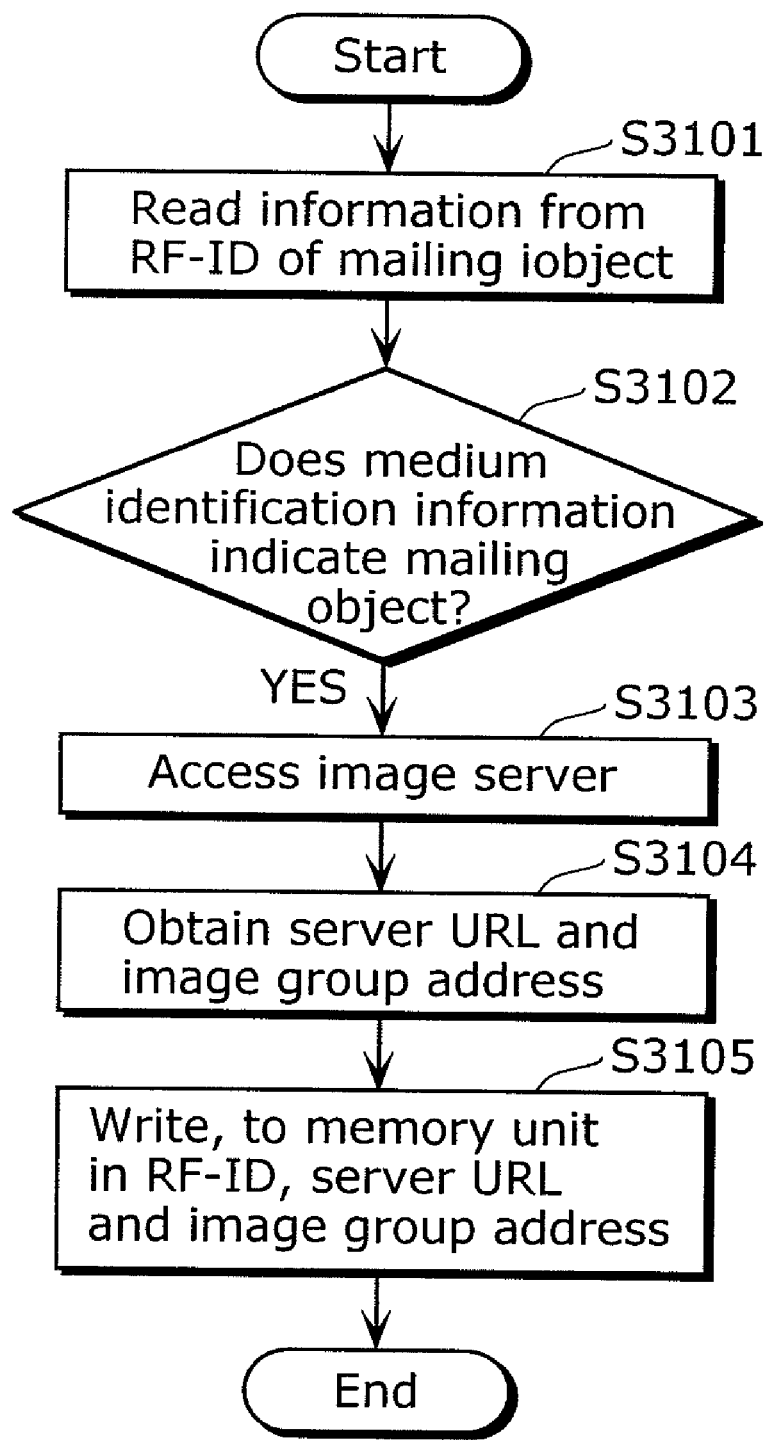
FIG. 73 is a flowchart of processing performed by a TV transmitting image according to the sixth embodiment of the present invention.

The following describes steps performed by the TV 45 for recording, onto the mailing object 3001, information regarding the image group selected by the sending use, with reference to a flowchart of FIG. 73.

It is assumed that transmission images have been selected and an image group set with the utility form information has been generated. Under the assumption, the sending user brings the mailing object 3001 having the RF-ID unit 3002 into proximity of the RF-ID reader/writer 46 of the TV 45 in order to establish wireless communication between the RF-ID unit 3002 and the RF-ID reader/writer 46.

When the TV 45 becomes able to communicate with the RF-ID unit 3002 on the mailing object 3001 via the RF-ID reader/writer 46, the TV 45 reads information from the memory unit 3003 (S3101). Then, the TV 45 determines whether or not the medium identification information indicates that the current communication partner is a mailing object (S3102). If the current communication partner is a mailing object, then the TV 45 proceeds to steps for writing to the mailing object. Here, if it is determined at Step S3102 that the current communication partner is not a mailing object, then the subsequent steps are not described here but the TV 45 proceeds to steps depending on a medium indicated by the medium identification information.

In order to write to the mailing object 3001, first, the TV accesses the image server 42 via the internet 40 (S3103). Thereby, the TV 45 obtains, from the image server 42, image group designation information, such as a server URL and an image group address, for allowing the image receiving side to access the image group in the image server 42 (S3104).

The TV 45 transmits the obtained image group designation information to the RF-ID unit 3002 on the mailing object 3001 via the RF-ID reader/writer 46 of the TV 45 in order to write the image group designation information to the memory unit 3003 in the mailing object 3001, and the RF-ID unit 3002 on the mailing object 3001 records the image group designation information to a rewritable region of the memory unit 3003 (S3105).

As described above, the mailing object 3001 on which the image group designation information is recorded is mailed by the sending user to a user of the image receiving side.

<Image Reproducing and Viewing by Image Receiving Side>

Figure 74:
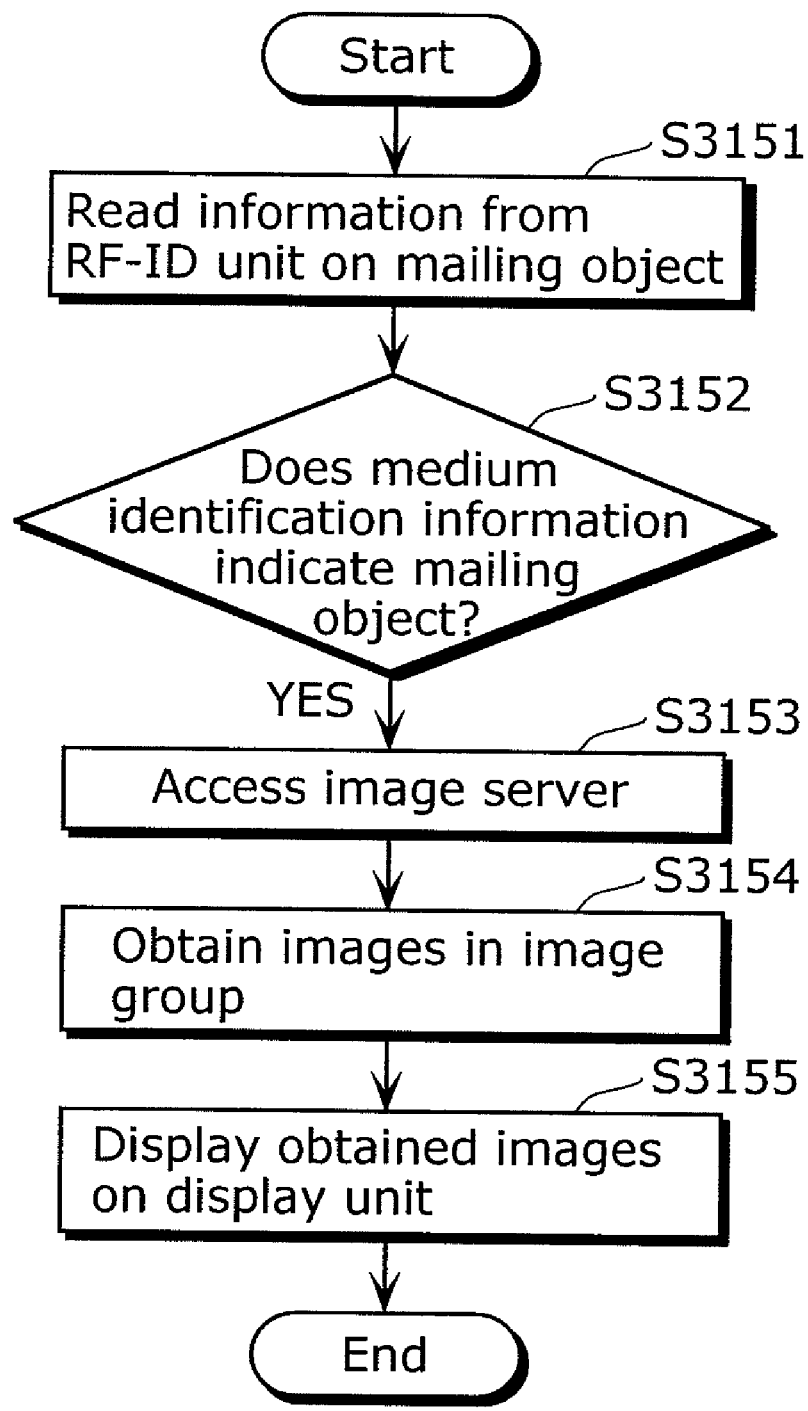
FIG. 74 is a flowchart of processing performed by a TV receiving image according to the sixth embodiment of the present invention.

Next, the image receiving side is described with reference to FIG. 72 illustrating the schematic block diagram of the image receiving side and FIG. 74 illustrating a flowchart of processing performed by the TV in the image receiving side.

Referring to FIG. 72, the receiving user receives the mailing object 3001 from the sending user. Then, the receiving user checks the RF-ID unit 3002 or characters or design indicated on the mailing object 3001 to determine whether the mailing object is incorporated with a means for accessing images. Here, the receiving user needs only to understand that the receiving user can access to the images by using the mailing object 3001. The receiving user does not need to care about the image group designation information and the like in the RF-ID unit 3002.

In order to reproduce and view the images, the receiving user brings the mailing object 3001 into proximity of the RF-ID reader/writer 3046 of the TV 3045 in the image receiving side so as to start viewing of the images.

If the RF-ID unit 3002 on the mailing object 3001 is in enough proximity of the RF-ID reader/writer 3046 of the TV 3045, the RF-ID reader/writer 3046 supplies power to the RF-ID unit 3002 of the mailing object 3001 via antennas (not shown) of both the RF-ID reader/writer 3046 and the RF-ID unit 3002 in order to activate the RF-ID unit 3002. Thereby, wireless communication between the TV 3045 and the RF-ID unit 3002 of the mailing object 3001 starts. When the wireless communication starts, the TV 3045 reads information from the memory unit 3003 of the RF-ID unit 3002 (S3151).

A determination is made as to whether or not the medium identification information in the readout information indicates that the current communication partner is a mailing object (S3152). If the current communication partner is a mailing object, then the TV 3045 proceeds to processing of reading the image group designated by the sending user from the image server 42 (S3152).

The access to the image server 42 makes it possible to generate an URL for accessing the image group in the image server 42 by using the image group designation information in the information read by the RF-ID unit 3002 at Step S3151, such as an image group address, and thereby to access the image server 42 via the internet 40 (S3153).

The TV 3045 connected to the image server 42 at the above step obtains the images (the image group) which are permitted to be displayed, from among the image data 50 in the image server 42, based on the transmission image selection information indicating the image group managed by the image server 42 (S3154). Then, the TV 3045 displays the images on the display unit 110 (S3155).

Furthermore, according to the transmission image selection information indicating the image group managed by the image server 42 and the utility form information, the receiving user can use functions of, for example, reproducing the images as a slide show, printing the images, and downloading the images to a recording medium (not shown) attached to the TV 3045 or connected to the outside.

In addition, for image printing, the user can print the images by the printer on a LAN (not shown), and also ask, via the internet 40, a photograph print service provider to print the images.

As described above, with the above configuration according to the sixth embodiment of the present invention, the image group designation information is provided from the RF-ID unit 3002 on the mailing object 3001 to the TV 3045 in the image receiving side. Therefore, the receiving user does not need to input characters of a network access destination to obtain images, for example. In other words, the intuitive and simple operation of simply bringing the mailing object 3001 into proximity of the TV 3045 enables the receiving user to access the image data 50 stored in the image server 42. As a result, the receiving user can obtain images from the image server, without knowledge of complicated operations such as menu selection and character inputs.

It should be noted that it has been described in the sixth embodiment that the mailing object 3001 is previously attached or incorporated with the RF-ID unit 3002. However, the mailing object may be a general post card or letter paper attached with an independent RF-ID unit 3002 that is provided separately. In this aspect, the above effect can be produced by later attaching the RF-ID unit to the mailing object. This produces further advantages that the sending user can use the sixth embodiment for any desired mailing object.

It should also be noted that, if the access to the image server 42 requires a login operation, a server login ID and a server login password may also be written at Step S3105 into the rewritable region of the memory unit 3003 in the RF-ID unit 3002 on the mailing object 3001. Here, it is desirable that the login ID and the login password are not plane texts but are written in an encrypted format for security.

It should also be noted that it has been described in the sixth embodiment that the TV 45 in the image transmission side performs selection of transmission images, setting of the utility form information, and writing of the image group designation information to the RF-ID unit 3002 on the mailing object 3001. However, it is also possible that the image capturing device 1 having a RF-ID reader/writer function performs setting of the transmission image selection information and the utility form information and writing of the image group designation information, in order to produce the same effect as described above for obtaining images by the simple operation of the receiving user.

Variation of Sixth Embodiment

Figure 75A:
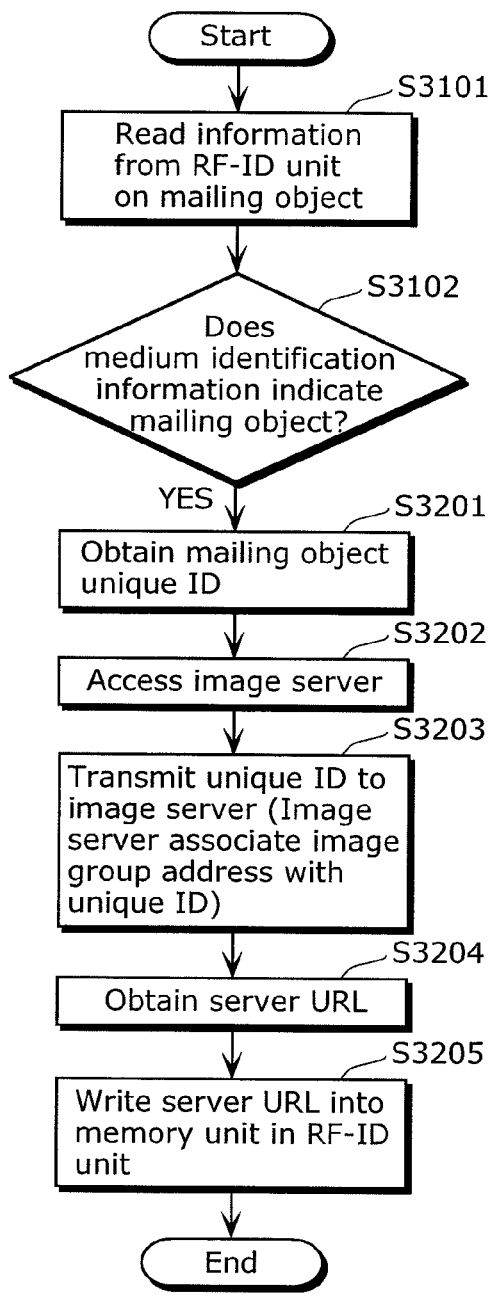
FIG. 75A is a flowchart of another example of processing performed by the TV transmitting image according to the sixth embodiment of the present invention.
Figure 75B:
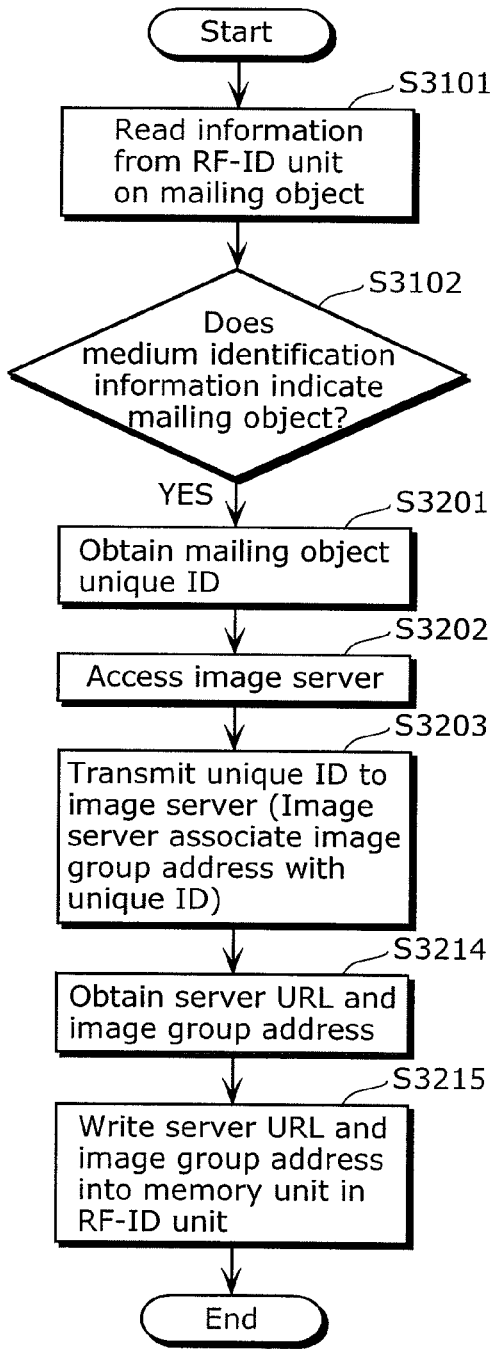
FIG. 75B is a flowchart of another example of processing performed by the TV transmitting image according to the sixth embodiment of the present invention.

FIGS. 75A and 75B are flowcharts of processing performed by the TV 45 in the image transmission side according to a variation of the sixth embodiment of the present invention. Here, the same step numerals of FIG. 73 are assigned to the identical steps of FIGS. 75A and 75B, so that the identical steps are not explained again below.

Figure 76:
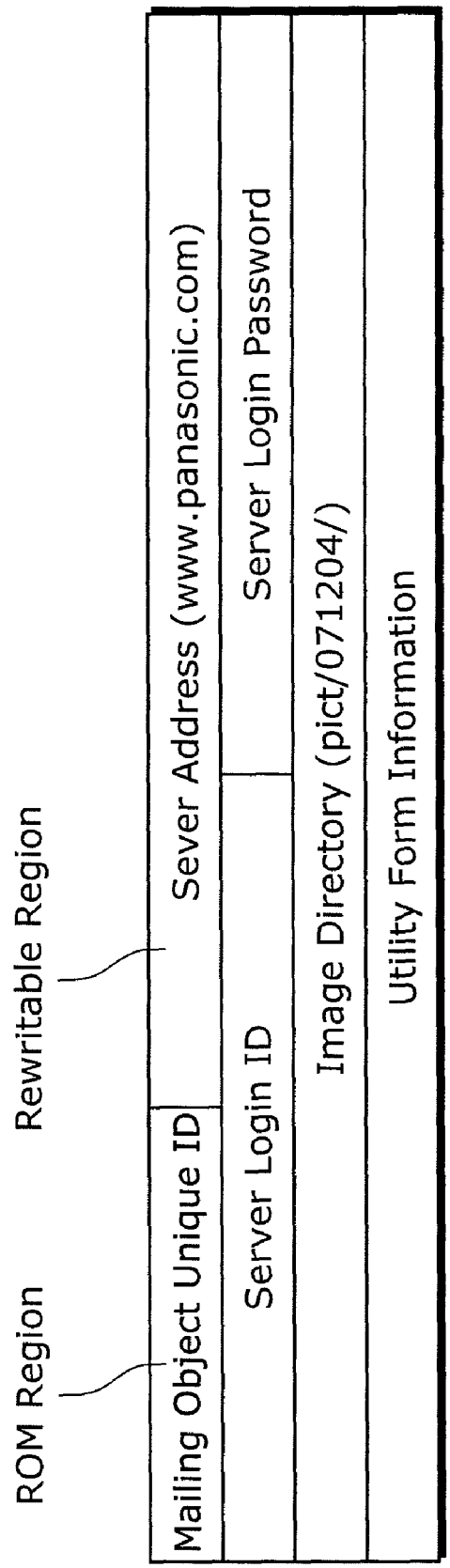
FIG. 76 is a table of an example of information recorded in a mailing object memory unit according to the sixth embodiment of the present invention.

According to the variation of the sixth embodiment, the mailing object UID is previously recorded on the memory unit 3003 of the RF-ID unit 3002 on the mailing object 3001. Here, it is desirable to record the mailing object UID on a ROM region of the memory unit 3003 in order to reduce risks of data damages or data manipulation caused by accidental operations. FIG. 76 illustrates a diagram of an example of a data structure of the memory unit 3003.

The TV 45 in the image transmission side sets the transmission image selection information and the utility form information into the above-described RF-ID unit in order to designate an image group in the image serve 42. In this situation, the TV 45 performs processing according to the flowchart of FIG. 75A.

The TV 45 reads information from the RF-ID unit 3002 on the mailing object 3001 (S3101) and determines based on the medium identification information that the communication partner is a mailing object (S3102). After that, the TV 45 obtains the mailing object UID (S3201). The mailing object UID may be the information read at Step S3101 or be newly obtained from the RF-ID unit 3002. Next, the TV 45 accesses the image server 42 via the Internet 40 (S3202). The TV 45 transmits the mailing object UID to the image server 42, and thereby the image server 42 associates with the transmitted mailing object UID with an address of the image group and then stores the manages information of the association (association information) (S3203).

The TV 45 obtains, from the image server 42, the server URL enabling the image receiving side to access the image server 42 (S3204). The obtained server URL is written into the rewritable region of the memory unit 3003 in the RF-ID unit 3002 on the mailing object 3001 via the RF-ID reader/writer 46 (S3205).

As described above, if the image server associates the image group with the mailing object UID and then stores and manages the association information, the utility form information can be managed separately for each mailing object UID. Therefore, in the situation where there are a plurality of the mailing objects 3001, it is possible to change an operation for receiving images for each mailing object, namely, for each different receiving user.

If, in the configuration described in the sixth embodiment, the image receiving side designates an image group for each mailing object, generates a different image group address for each designated image group, and writes the image group address into a corresponding RF-ID unit, the image transmission side needs complicated operations for designating image groups separately although the same advantages as those of the sixth embodiment can be obtained.

Therefore, when the sending user selects the same transmission image group for a plurality of mailing objects, it is preferable that the sending user records and manages different utility form information for each mailing object by using the mailing object UID as described earlier. Thereby, it is possible to reduce operations of the sending user, and to reduce a memory capacity of the image server because it is not necessary to hold pieces of the transmission image selection information separately, thereby producing further advantages.

The processing of FIG. 75B differs from the processing of FIG. 75A in that Steps S3204 and S3205 are replaced by Steps S3214 and 3215. At Step 3214, the TV 45 obtains an image group address in addition to the server URL. At Step S3215, the TV 45 writes the image group address together with the server URL into the memory unit 3003 of the RF-ID unit 3002.

Thereby, when the image receiving side is to receive images, the image receiving side accesses the designated image group in the image server 42. Here, the access is permitted only when the mailing object UID of the image group stored and managed in the image server matches the mailing object UID used by the receiving server requesting the access. Thereby, security is increased.

Conventionally, if the user intends to show images, on a large screen display device (apparatus), to a different user living in a remote location, the user in the remote location needs to learn operations of the device, an operation acquirer has to go to the remote location to operate the device, or the display device in the remote location should be remotely controlled. However, like the fourth embodiment, the system according to the sixth embodiment enables such a user in a remote location to easily view images by a simple operation, for example, by bringing a physical medium such as a post card with RF-ID into proximity of a display device. In the fourth embodiment, generation of the post card with RF-ID and writing of data into the RF-ID is not performed by the user (who captures and sends images or who views the images), but by a service provider. In the sixth embodiment, however, the sending user in the image transmission side performs generation of the post card with RF-ID and writing of data into the RF-ID.

Seventh Embodiment

In the seventh embodiment of the present invention, a method of changing setting for a device (apparatus) by using a RF-ID card according to the seventh embodiment of the present invention is described.

Figure 77:
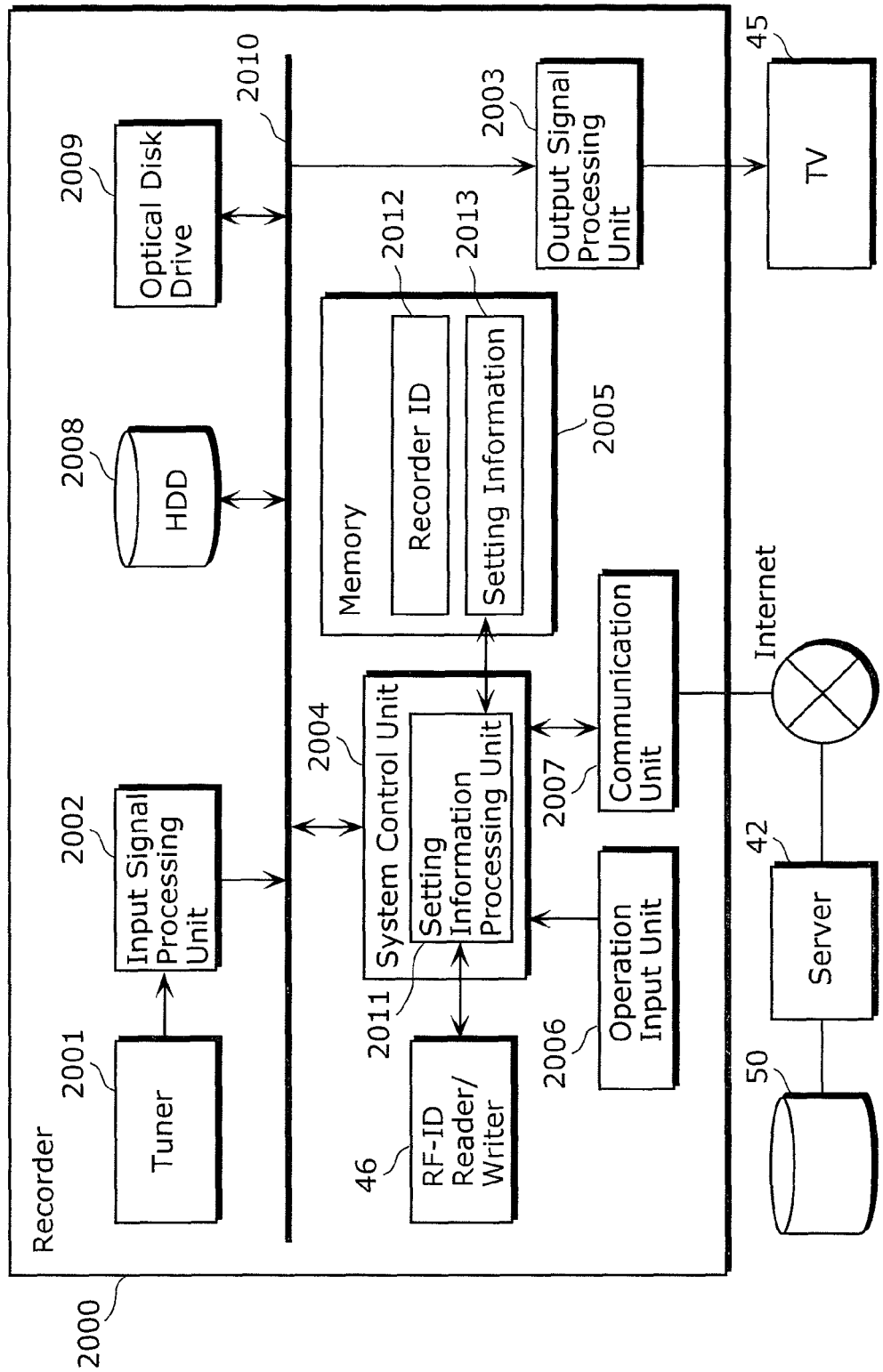
FIG. 77 is a block diagram of a recorder according to an embodiment of the present invention.
Figure 78:
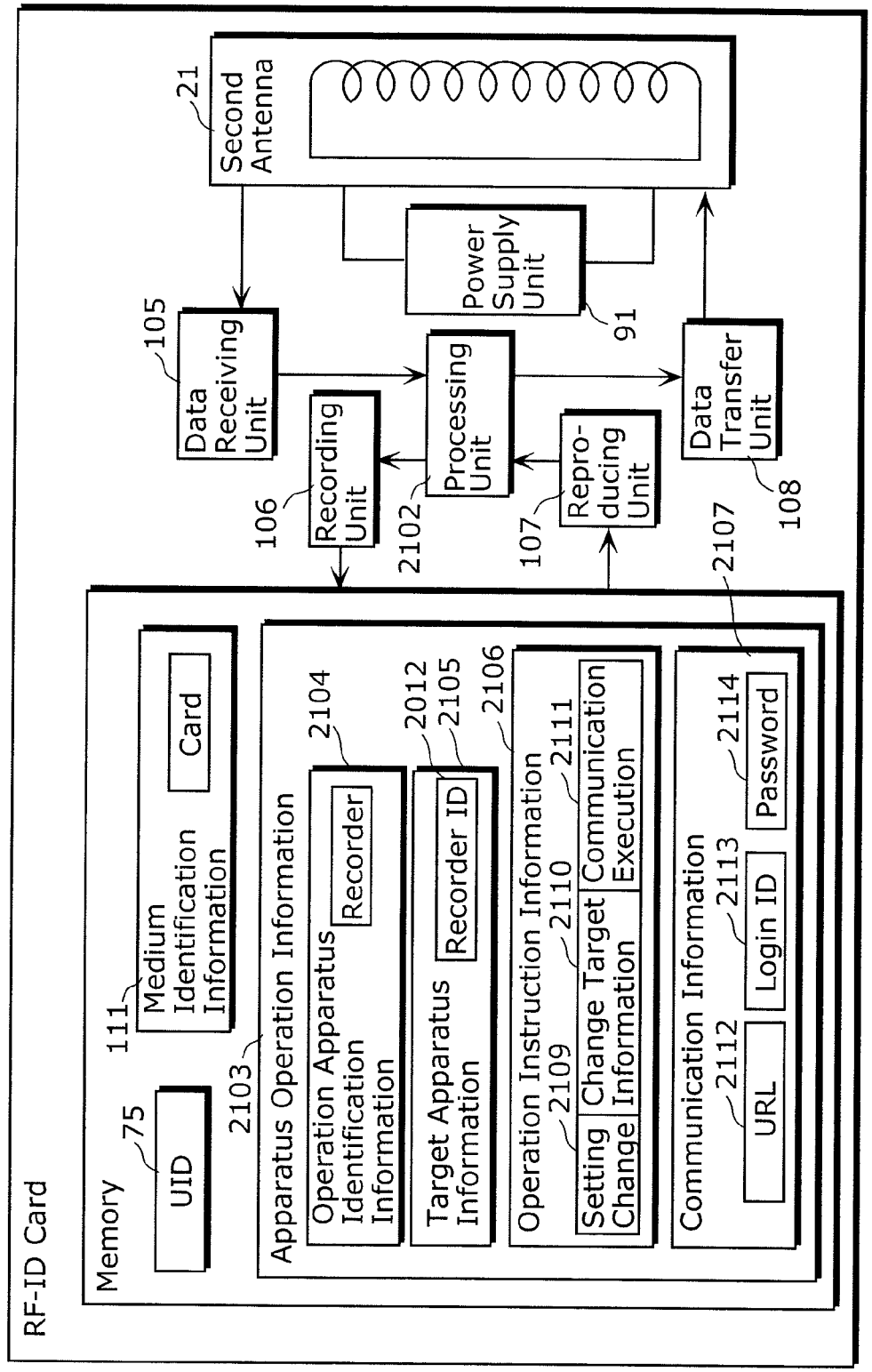
FIG. 78 is a block diagram of a RF-ID card according to an embodiment of the present invention.

The following describes a method of changing setting for a recorder by using a RF-ID card with reference to FIGS. 77 and 78.

FIG. 77 is a block diagram of a structure of a recorder according to the seventh embodiment.

A recorder 2000 records broadcast contents obtained by a tuner 2001, onto a Hard Disk Drive (HDD) 2008 or an optical disk drive 2009. In addition, the recorder 200 reproduces, on the TV 45, the recorded contents or video/audio contents ready by the optical disk drive 2009.

An input signal processing unit 2002 includes an Analog/Digital (A/D) converter, a decoder, and an encoder, in order to convert input video/audio signals into data in a predetermined video/audio format. The A/D converter converts analog signals obtained by the tuner 2001 into digital signals. The decoder decodes scrambled contents. The encoder converts data into data in a video format according to MPEG-2, for example.

An output signal processing unit 2003 includes a Digital/Analog (D/A) converter and a decoder in order to provide video and audio to the TV 45. The D/A converter converts digital signals to analog signals. The decoder decodes data in a data format according to MPEG-2, for example.

A system control unit 2004 controls operations of the recorder 2000. The system control unit 2004 includes a setting information processing unit 2011 that switches setting for the recorder 2000. The setting information processing unit 2011 will be described in detail later.

A memory 2005 holds recorder ID 2012 for identifying the recorder 2000, and setting information 2013 for the recorder 2000.

An operation input unit 2006 receives inputs from a user using buttons of a remote controller, a front panel, or the like (not shown).

A communication unit 2007 connects the recorder 2000 to the server 42 via the internet or a LAN.

The HDD 2008 has an area in which recorded contents and content lists provided from the input signal processing unit 2002 are stored.

The optical disk drive 2009 is a disk drive that performs recording or reproducing for an optical disk such as a Digital Versatile Disc (DVD) or a Blue-ray Disc. The optical disk drive 2009 records recorded contents and content lists provided from the input signal processing unit 2002 onto the optical disc, and reproduces video/audio contents in the optical disk.

The input signal processing unit 2002, the output signal processing unit 2003, the system control unit 2004, the HDD 2008, and the optical disk drive 2009 of the recorder 2000 are connected one another via a bus 2010.

Here, the setting information processing unit 2011 is described in more detail below.

According to the setting information 2013 stored in the memory 2005, the setting information processing unit 2011 sets displaying of a menu screen, a recording/reproducing mode, chapters of recorded contents, TV program recommendation based on user's preference, and the like regarding the recorder 2000. In more detail, the setting information processing unit 2011 reads an identifier indicating, for example, "menu screen background color: Black" from the setting information 2013, and thereby issues a request for menu screen display to the output signal processing unit 2003 together with an instruction for displaying a background of a menu screen in black.

Here, the setting information 2013 may be stored in an external storage unit such as a SD card not shown. Especially, it is efficient to store, in the HDD 2008, the setting information regarding chapters of recorded contents stored in the HDD 2008, information having a large size, and the like.

Conventionally, the setting information 2013 has been set prior to purchase of the recorder 2000, or set by operations of the user using the operation input unit 2006. In the seventh embodiment of the present invention, however, the setting information 2013 can be changed based on information obtained from the RF-ID reader/writer 46.

FIG. 78 is a block diagram of a structure of the RF-ID card from which information is read by the RF-ID reader/writer 46 of the recorder 2000 to be used to change the settings of the recorder 2000.

The RF-ID card 2100 includes a memory 2101, the antenna (second antenna) 21, the power supply unit (second power supply unit) 91, the data receiving unit 105, the data transfer unit 108, a processing unit 2102, the recording unit 106, and the reproducing unit 107.

When the RF-ID card 2100 is moved to bring the antenna 21 into proximity of the RF-ID reader/writer 46 of the recorder 2000, the RF-ID reader/writer 46 supplies power to the power supply unit 91 via the antenna 21 in order to provide power to the respective units in the RF-ID card 2100.

Information regarding data recording/reproducing is read from the RF-ID card 2100 to the recorder 2000 via the RF-ID reader/writer 46. In the recorder 2000, the information is received by the data receiving unit 105 and then provided to the processing unit 2102.

In the RF-ID card 2100, the processing unit 2102 causes the recording unit 106 to record information onto the memory 2101, and causes the reproducing unit 107 to reproduce the information stored in the memory 2101.

The data transfer unit 108 transmits the information provided from the processing unit 2102 to the RF-ID reader/writer 46 of the recorder 2000 via the antenna 21.

The memory 2101 in the RF-ID card 2100 stores the UID 75, the medium identification information 111, and apparatus operation information 2103.

The UID 75 and the medium identification information 111 are used to identify the RF-ID card 2100.

The UID 75 is identification unique to the RF-ID card 2100.

The medium identification information 111 holds an identifier indicating that the RF-ID card 2100 is a card.

The apparatus operation information 2103 holds pieces of information regarding an apparatus (device) to perform an operation using the RF-ID card 2100 and regarding the operation. The following describes the pieces of information included in the apparatus operation information 2103.

Operation apparatus identification information 2104 indicates a type of the apparatus (device) to perform the operation using the RF-ID card 2100. The operation apparatus identification information 2104 indicates the type by an identifier in the similar manner as described for the medium identification information 111. In FIG. 78, the operation apparatus identification information 2104 holds an identifier indicating that a type of the apparatus to perform the operation is a recorder.

Target apparatus information 2105 holds information so that only a specific apparatus (device) can perform the operation using the RF-ID card 2100. In the example of FIG. 78, the target apparatus information 2105 holds recorder ID 2012 for identifying the recorder 2000. It should be noted that, if an apparatus that can use the RF-ID card 2100 according to the seventh embodiment of the present invention is limited, for instance, if only recorders can use the RF-ID card 2100, the operation apparatus identification information 2104 and the target apparatus information 2105 may not be included in the apparatus operation information 2103. In addition, if the setting information processing unit 2011 in the recorder 2000 has a structure to change settings of the recorder 2000 by using the information in cards, the medium identification information 111 may not be included in the memory 2101.

Operation instruction information 2106 indicates details of the operation to be performed by the apparatus designated in the apparatus operation information 2103. In the example of FIG. 78, the operation instruction information 2106 includes information 2109 indicating that setting is to be changed (setting change), information 2110 indicating a target for which the setting change is to be performed (change target information), and information 2111 indicating that communication is to be executed in obtaining the setting information (communication execution).

It should be noted that the operation instruction information 2106 is not limited for a single operation, but may include plural pieces of information for plural operations, or may be a program in which the plural operations are combined.

Communication information 2107 is information regarding a server or the like. When the recorder 2000 is instructed based on the operation instruction information 2106 to access the server or the like to obtain data, the recorder 2000 accesses the server or the like using the communication information 2107. In the example of FIG. 78, the communication information 2107 includes a URL 2112, login ID 2113, and a password 2114 of the server or the like. The URL 2112 may be replaced by an IP address. If the recorder 2000 is to access a different apparatus (device) via an office or home network, the URL 2112 may be information for identifying the apparatus, such as a MAC address.

Figure 79:
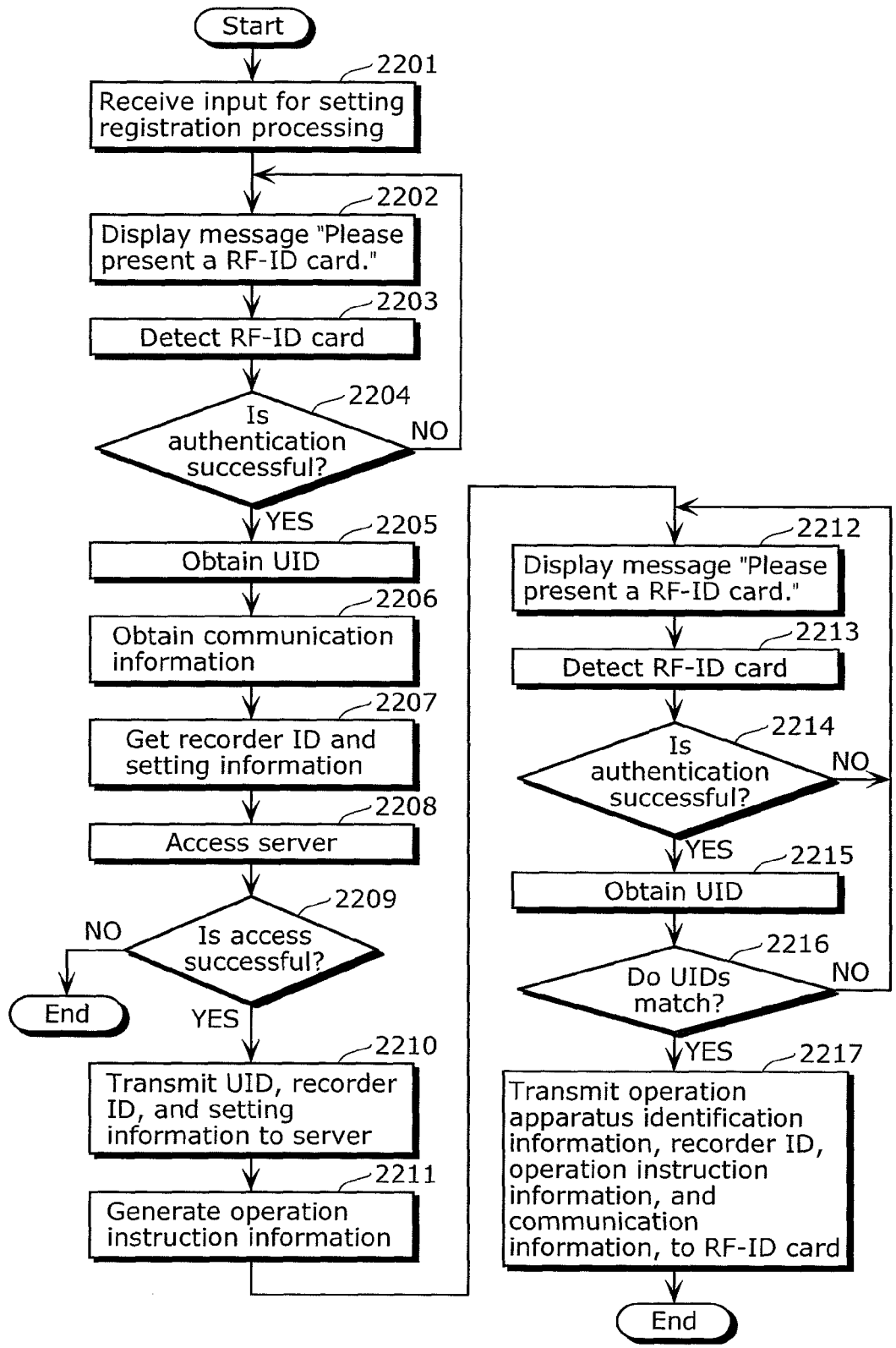
FIG. 79 is a flowchart of steps of registering setting information to a server.

The following describes processing by which the recorder 2000 registers the setting information from the recorder 2000 to a server by using the RF-ID card 2100 with reference to FIG. 79.

At Step 2201, when the recorder 2000 receives an input from the user using the operation input unit 2006, the setting information processing unit 2011 issues, to the TV 45, a request for message display. In response to the request, the TV 45 displays a message "Please present a RF-ID card" on its screen at Step 2202. The message may be displayed on a console (not shown) of the recorder 2000. It is also possible that the recorder 2000 requests the user for authentication such as a password or biometric authentication when the user performs the input operation, and after the authentication, proceeds to the setting registration processing. It is further possible that the recorder 2000 does not request the TV 45 for the message display, but the user needs to present the RF-ID card 2100 to the RF-ID reader/writer 46 when using the recorder 2000 in order to perform steps of and after 2203. It is still further possible that an enquiry message is displayed to enquire where the setting information 2013 is to be registered, and the setting information 2013 is registered into the location the user designates. For example, the setting information 2013 may be registered into the RF-ID card 2200, or into a sever different from the server 42.

At Step 2203, the recorder 2000 detects the RF-ID card. After that, mutual authentication between the recorder 2000 and the RF-ID card 2100 is performed at Step 2204.

If the mutual authentication at Step 2204 is successful, then the processing proceeds to Step 2205. Otherwise, the processing returns to Step 2202 to repeat the detection of the RF-ID card.

At Step 2205, the recorder 2000 obtains the UID 75 from the memory 2101 in the RF-ID card 2100.

At Step 2206, the recorder 2000 obtains the communication information 2107 from the memory 2101 in the RF-ID card 2100. If the memory 2101 in the RF-ID card 2100 does not hold the communication information, the recorder 2000 may issue, to the user, a request for providing the communication information. Moreover, if the user instructs at Step 2201 the recorder 2000 to register the setting information 2013 into a location that is not designated in the RF-ID card 2100, Step 2206 is not performed. If plural pieces of the communication information 2107 are stored in the RF-ID card 2100, it is possible to display a list of the plural pieces of the communication information 2107 from which the user can select a desired one.

At Step 2207, the recorder 2000 gets the recorder ID 2012 and the setting information 2013 from the memory 2005. The setting information 2013 is not limited to information currently stored, but may be information inputted by the user in the setting registration processing.

At Step 2208, in the recorder 2000, the setting information processing unit 2011 issues, to the communication unit 2007, a request for access to a server or the like having the URL 2112 included in the obtained communication information 2107. The communication unit 2007 accesses the server using the login ID 2113 and the password 2114.

At Step 2209, it is determined whether or not the access to the server 42 is successful. If the access is successful, then the processing proceeds to Step 2210. Otherwise, the setting registration processing is terminated.

At Step 2210, the recorder 2000 transmits, to the server 42, the UID 75, and the recorder ID 2012 and the setting information 2013 which are obtained from the memory 2005, thereby registering the setting information 2013 into the server 42.

At Step 2211, the recorder 2000 generates the operation instruction information 2106, using (a) the operation designated at Step 2201 or a storage location of the setting information 2013 selected at Step 2201, (b) the setting information 2013 obtained at Step 2207, and (c) the communication information 2107 obtained at Step 2206.

At Step 2212, the recorder 2000 performs the same step as Step 2202 to cause the TV 45 to displays a message "Please present a RF-ID card" on its screen.

At Step 2213, the recorder 2000 detects the RF-ID card.

After that, mutual authentication between the recorder 2000 and the RF-ID card 2100 is performed at Step 2214.

If the mutual authentication at Step 2214 is successful, then the processing proceeds to Step 2215. Otherwise, the processing returns to Step 2212 to repeat the detection of the RF-ID card 2100.

At Step 2215, the recorder 2000 obtains the UID from the memory 2101 in the RF-ID card 2100.

At Step 2216, it is determined whether or not the UID 75 obtained at Step 2205 matches the UID obtained at Step 2215. If the UIDs match, then the processing proceeds to Step 2217. Otherwise, the processing returns to Step 2211 to repeat the detection of the RF-ID card 2100.

At Step 2217, the recorder 2000 transmits, to the RF-ID card 2100, the operation apparatus identification information 2104 (not shown in FIG. 77) stored in the memory 2005, the recorder ID 2012, the operation instruction information 2106 generated at Step 2211, and the communication information 2107, in order to record (register) these pieces of information onto the memory 2101 of the RF-ID card 2100. As a result, the setting registration processing is completed.

Referring to FIG. 80, the setting information registered into the server 42 by the above-described processing of FIG. 79 is described.

Each of the setting information registered in the server 42 is hereinafter referred to as setting information 2250. Each setting information 2250 is registered in association with a corresponding one of the UID 75 and a corresponding one of the target apparatus information 2105. In more detail, the setting information 2250 holds an identifier indicating, for example, "menu screen background color: Black". In the example of FIG. 80, a letter "A" or "B" at the end of pieces of the setting information 2250 indicates that the setting is different from another.

It is also possible that plural pieces of setting information are registered for a single UID such as UID0001 in FIG. 80. It is further possible that a single piece of the target apparatus information 2105, such as REC-0001, is registered for plural pieces of setting information associated with different UID. Here, the setting information may include the change target information 2110.

Next, referring to FIG. 81, the apparatus operation information 2103 registered in the memory 2101 of the RF-ID card 2100 by the above-described processing of FIG. 79 is described.

It is assumed in the example of FIG. 81 that the UID 75 designates "UID0001" and the medium identification information 111 designates a "card".

The apparatus operation information 2103 includes sets each including the operation apparatus identification information 2104, the target apparatus information 2105, the operation instruction information 2106, and the communication information 2107. Here, it is possible that the communication information 2107 is not registered as being information not related to the other pieces of information. For instance, it is possible that only a piece of the communication information 2107 is registered to always access the same server in using the RF-ID card 2100.

The operation instruction information 2106 includes instruction detail information 2260, instruction target information 2261, and communication execution information 2262. The instruction detail information 2260 holds an identifier indicating an operation to be performed by the device designated by the target apparatus information 2105. The instruction target information 2261 holds an identifier indicating a setting, such as a menu screen mode or recording mode, of the apparatus to perform the operation, such as REC-0001. The communication execution information 2262 holds an identifier indicating whether or not communication is to be executed in performing the operation indicated in the instruction detail information 2260. It should be noted that the apparatus operation information 2103 may include only the communication information 2107 if the operating to be performed using the RF-ID card 2100 is limited to changing of setting.

The communication information 2107 holds a URL, login ID, a password, and the like for accessing a server that is a partner of communication, if the communication execution information 2262 indicates that the communication is to be executed.

Next, the description is given for processing of changing the setting of the recorder 2000 by using the RF-ID card 2100 with reference to FIG. 82. FIG. 82 is a flowchart of processing by which the setting information processing unit 2011 in the recorder 2000 updates the setting information 2013 by using the RF-ID card 2100.

First, at Step 2301, the recorder 2000 detects the RF-ID card 2100. After that, at Step 2302, the recorder 2000 performs mutual authentication with the RF-ID card 2100.

At Step 2303, the recorder 2000 determines whether or not the mutual authentication is successful. If the mutual authentication is successful, then the processing proceeds to Step 2304. Otherwise, the setting update processing is terminated.

At Step 2304, the recorder 2000 obtains the UID 75 and the apparatus operation information 2103 from the memory 2101 of the RF-ID card 2100.

At Step 2305, the recorder 2000 searches the apparatus operation information 2103 for the operation apparatus identification information 2104. At Step 2306, the recorder 2000 compares the searched-out operation apparatus identification information 2104 to apparatus identification information (not shown) in the memory 2005 of the recorder 2000.

If it is determined at Step 2306 that the operation device identification information 2104 matches the device identification information, then the processing proceeds to Step 2307. Otherwise, the processing proceeds to Step 2314.

At Step 2314, the recorder 2000 determines whether or not all pieces of the operation apparatus identification information 2104 in the apparatus operation information 2103 have been examined. If all pieces of the operation apparatus identification information 2104 have been examined, then the setting update processing is terminated.

At Step 2307, the recorder 2000 searches the device operation information 2103 for the target apparatus information 2105. At Step 2308, the recorder 2000 compares the searched-out target apparatus information 2105 to the recorder ID 2012 in the memory 2005 of the recorder 2000.

If it is determined at Step 2308 that the target device information 2105 matches the recorder ID 2012, then the processing proceeds to Step 2309. Otherwise, the setting update processing is terminated.

At Step 2309, the recorder 2000 obtains the operation instruction information 2106 associated with the target device information 2105 from the apparatus operation information 2103.

At Step 2310, the recorder 2000 obtains the operation instruction information 2107 associated with the target apparatus information 2105 from the apparatus operation information 2103.

At Step 2311, the recorder 2000 determines, based on the instruction detail information 2260 in the operation instruction information 2106 in the device operation information 2103, that an operation to be performed is updating of setting, and thereby accesses the server 42 to obtain the setting information 2250 from the server 42. The step will be described in more detail with reference to FIG. 83.

At Step 2312, the recorder 2000 determines whether or not the obtainment of the setting information 2250 is successful. If the obtainment of the setting information 2250 is successful, then the processing proceeds to Step 2313. At Step 2313, the setting information processing unit 2011 in the recorder 2000 updates the setting information 2013 in the memory 2005 of the recorder 2000 by the setting information 2250. On the other hand, if the obtainment of the setting information 2250 fails, then the setting update processing is terminated.

Figure 83:
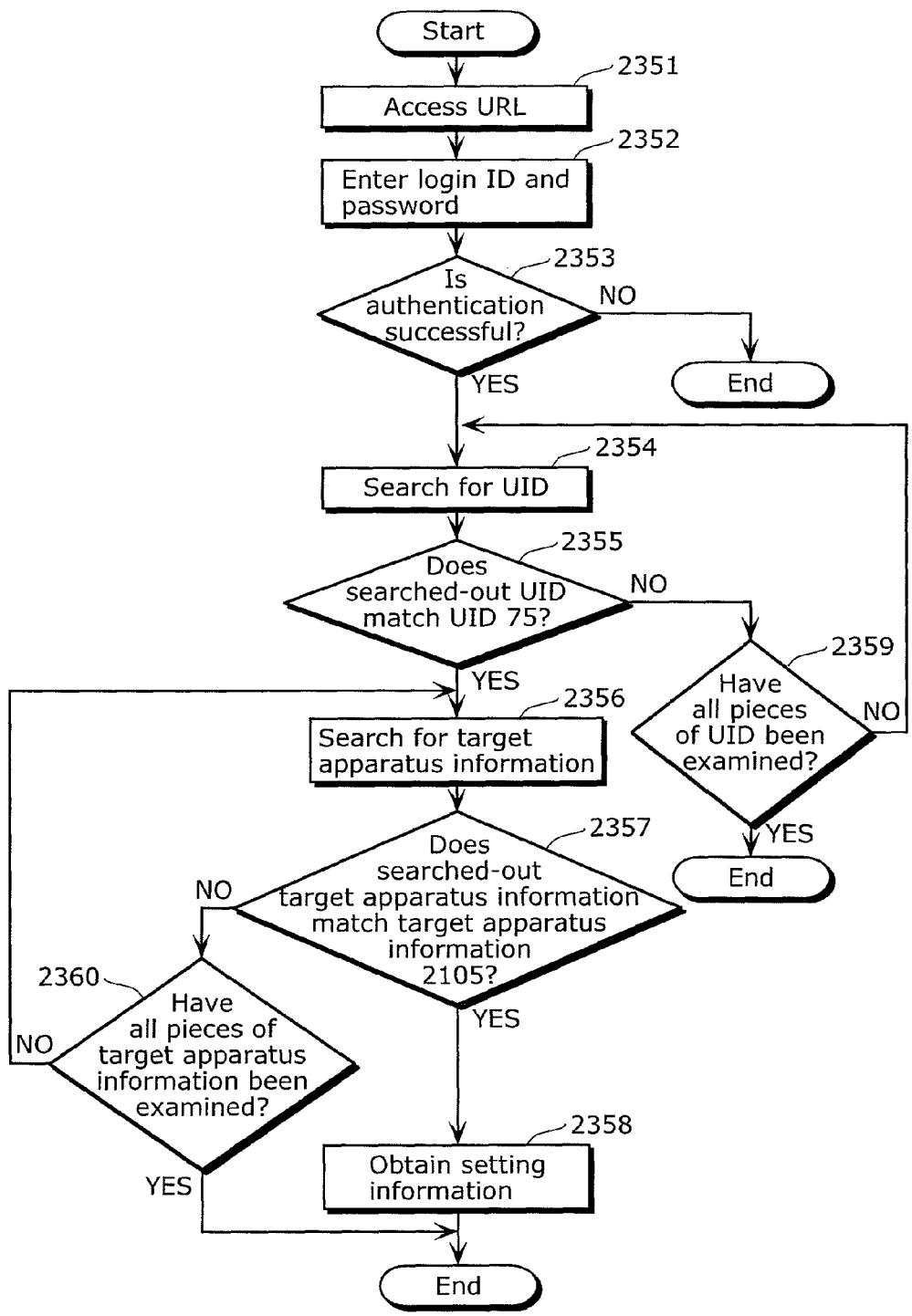
FIG. 83 is a flowchart of steps of obtaining the setting information from the server.

The following describes Step 2311 in FIG. 82 in more detail with reference to FIG. 83. FIG. 82 is a flowchart of processing by which the setting information processing unit 2011 in the recorder 2000 accesses the server 42 to obtain the setting information 2250 from the server 42.

At Step 2351, the communication unit 2007 in the recorder 2000 accesses the server 42 having the URL 2112 included in the communication information 2107.

At Step 2352, the setting information processing unit 2011 provides the communication unit 2007 with the login ID 2113 and the password 2114 which are included in the communication information 2107, and thereby the communication unit 2007 logins to the server 42.

At Step 2353, it is determined whether or not authentication (namely, the login) is successful. If the authentication is successful, then the processing proceeds to Step 2354. Otherwise, the processing is terminated as being failure of obtaining the setting information 2250.

At Step 2354, the recorder 2000 searches the server 42 for UID. At Step 2355, the recorder 2000 determines whether or not the searched-out UID matches the UID 75 obtained at Step 2304 in FIG. 82. If the searched-out UID matches the UID 75, then the processing proceeds to Step 2356. Otherwise, the processing returns to Step 2354 to repeat the search for UID until it is determined at Step 2359 that all pieces of UID in the server 42 have been examined. If it is determined at Step 2359 that all pieces of UID in the server 42 have been examined, then the processing is terminated as being failure of obtaining the setting information 2250.

At Step 2356, the recorder 2000 searches the server 42 for the target apparatus information associated with the UID 75. At Step 2357, the recorder 2000 determines whether or not the searched-out target apparatus information matches the target apparatus information 2105 obtained at Step 2305 in FIG. 82. If the searched-out target apparatus information matches the target apparatus information 2105, then the processing proceeds to Step 2358. On the other hand, if the searched-out target apparatus information does not match the target apparatus information 2105, then the processing proceeds to Step 2358, then the processing returns to Step 2354 to repeat the search for the target apparatus information until it is determined at Step 2360 that all pieces of the target apparatus information in the server 42 have been examined. If it is determined at Step 2360 that all pieces of the target apparatus information have been examined, then the processing is terminated as being failure of obtaining the setting information 2250.

At Step 2258, the recorder 2000 obtains, from the server 42, the setting information 2250 associated with the UID 75 and the target apparatus information 2105.

As described above, the use of the RF-ID card 2100 enables the user to perform setting of the recorder 2000 without complicated operations. Even if the user is not familiar with operations of apparatuses (devices) the user can easily change the setting of the recorder 2000 by using the RF-ID card 2100. Moreover, the operation executable for the recorder 2000 by using the RF-ID card 2100 is not limited to the setting change. For example, the instruction detail information can designate an operation of obtaining a list of recorded contents in the recorder. In this case, the list is registered in the RF-ID card or the server. Thereby, the user can check the list on a different apparatus (device) other than the recorder by using the RF-ID card. In addition, the RF-ID card holding information illustrated in the FIG. 84 allows the user to perform timer recording in the recorder simply by presenting the RF-ID card to the recorder. In more detail, if the change target information associated with Index 1 in FIG. 84 is applied, the recorder can perform timer recording according to setting of "TV program ID" and "recording mode" designated in the instruction target information, simply by presenting the RF-ID card to the recorder. Thereby, the timer recording can be performed without accessing the server. In addition, if the change target information associated with Index 2 in FIG. 84 is applied, the recorder can perform timer recording according to "TV program code" designated in the instruction target information, simply by presenting the RF-ID card to the recorder. Here, the recorder can obtain, from the server, (a) program ID or a start time and end time, and (b) channel information. As a result, the time recording can be performed according to the setting of the "recording mode". Furthermore, it is also possible that "recommended TV program" is designated in the instruction target information in the RF-ID card. After presenting the RF-ID card to the recorder, the recorder obtains ID of the recommended TV program from the server. Thereby, the recorder can obtain a content of the recommended TV program from the server and performs timer recording of the content. The above functions may be used as service for providing the RF-ID card as being a supplement of a TV program guide magazine, for example. This RF-ID card can reduce user's bothersome procedures for timer recording. For another service, it is also possible in the RF-ID card that the instruction detail information designates a download operation, the instruction target information designates video or software in a version where a function is restricted, and the communication information designates a URL of a download website. Such RF-ID cards are provided for free to users. The users can use the video or software as trial, and purchase it if the user likes it.

It should be noted that the description in the seventh embodiment has been given for the recorder, but the present invention is not limited to the recorder.

For example, the seventh embodiment of the present invention may be implemented as a TV having a reader/writer for the RF-ID card and the setting information processing unit. The TV can register, as the change target information, (a) setting of an initial display channel or initial sound volume immediately after power-on, (b) setting of child lock for excluding adult broadcasts and violence scenes, (c) setting of zapping for favorite channels, (d) setting of contrast and brightness of a screen, (e) setting of a language, (f) setting of a continuous use time, and the like, simply by presenting the RF-ID card to the TV. Thereby, the TV can perform settings according to usability. Furthermore, the seventh embodiment may be implemented also as a vehicle navigation system having a reader/writer for the RF-ID card and the setting information processing unit. In this aspect, the instruction detail information designates "highlighted display" and the instruction target information designates "landmark information". Thereby, by using the RF-ID card, the vehicle navigation system can display the designated landmark as being highlighted, by changing a character font, character size, or color. The landmark information may be obtained from a server. In this case, the RF-ID cards, on which the apparatus operation information illustrated in FIG. 85 is recorded, are offered to users at rest areas or interchanges on expressways, sightseeing spots, and the like. Thereby, the RF-ID cards allow vehicle navigation systems of the users to display a recommended landmark, where an even is currently held for example, as highlighted display. In addition, the seventh embodiment may be implemented as a laptop having a reader/writer for the RF-ID card and the setting information processing unit. The laptop can designate (a) setting of a resolution of a screen, (b) setting of a position of an icon or the like on a display, (c) setting of a wallpaper, (d) setting of a screen saver, (e) setting of start-up of resident software, (f) setting of employed peripheral devices, (g) setting of a dominant hand for a mouse or the like, and the like, by simply by presenting the RF-ID card to the laptop. Therefore, if the user brings the RF-ID card in a business trip, the user can operate a different personal computer at the business trip location, with the same settings as those the user usually uses. The seventh embodiment may be implemented further as a game machine having a reader/writer for the RF-ID card and the setting information processing unit. The user visiting a friend's house uses a RF-ID card in which the instruction detail information designates setting change. By presenting the RF-ID card to the game machine at the friend's house, the user can change (a) setting of positions of keys on a remote controller and (b) setting of a structure of a menu screen. In addition, the user can save data in the game machine by using the RF-ID card. Moreover, the following service using the RF-ID card is also possible. The RF-ID card holds the instruction detail information designating a download operation. Such RF-ID cards are offered to users as supplements of magazines or the like. The users can use the RF-ID cards to download an additional scenario, a rare item, or the like.

The RF-ID card according to the seventh embodiment of the present invention can be also applied to home appliances connected to one another via a network. In this aspect, the RF-ID card previously holds (a) setting of a temperature of an air conditioner, (b) setting for a temperature of hot water in a bus tab, and the like, depending of the user's preference. Thereby, the user presents the RF-ID card to RF-ID reader/writers in the user's house so as to manage settings of the home appliances at once. In addition, the RF-ID card may designate an operation for checking foods stored in a refrigerator. Here, information of the foods which is registered in the refrigerator is obtained by using RF-ID tags previously attached to the foods. Or, video of the inside of the refrigerator is captured by using camcorder. Thereby, the user can check a list of the foods on a TV by using a RF-ID reader/writer to obtain information from the RF-ID card. As described above, the RF-ID card according to the seventh embodiment of the present invention can be applied for various usages. It is also possible to combine (a) RF-ID cards for designating apparatuses (such as four different cards indicating "heating appliance", "cooling appliance", "stove", and "fan", respectively) and (b) RF-ID cards for designating setting of the apparatuses (such as three different cards indicating "weak", "medium", and "strong", respectively). It is further possible that such RF-ID cards having the apparatus-designating and setting-designating functions are integrated into a single RF-ID card. And, the settings of the apparatuses can be customized.

Although only some exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

For example, if two users (hereinafter, referred to as a user A and a user B) exchanges photographs between them, the user B can view photographs taken by the user A by the following method. The user B has a TV having an apparatus ID and a relay server having a URL. The apparatus ID and the URL are previously stored in a RF-ID (hereinafter, referred to as a RF tag B). The user B generates information (hereinafter, referred to as device generation information B) from the information in the RF tag B and stores the generated device generation information B into the RF tag B. The user B transmits the device generation information B to the user A via e-mail or the like. The user A stores a URL of a server holding the photographs into the relay server, in association with the received device generation information B. Thereby, the user B simply presents the RF tab B to a RF-ID reader/writer of the TV in order to view the photographs taken by the user A. Here, it is assumed that the RF tag B previously holds an e-mail address of the user A. When the user B simply presents the RF tag B to the RF-ID reader/writer of the TV, the device generation information B may be automatically written into the TV and a notification of the device generation information B may be automatically transmitted to the e-mail address of the user A. Thereby, even if the user B is not familiar with operations of the devices, the user B can exchange photographs with the user A. Furthermore, it is also possible that the user A encrypts at least one of a URL, login ID, and a password by using the device generation information B and sends, to the user B, a post card with RF-ID on which the encrypted information is recorded. This makes it possible to restrict an apparatus permitted to display the photographs, only to the TV of the user B. It is further possible that the user A sends, to the user B, a post card with two RF-IDs that are a RF-ID for sending and a RF-ID for returning. In this aspect, the user A records, onto the RF-ID for returning, device generation information A that is previously generated by a TV or the like of the user A. This can restrict an apparatus permitted to display photographs stored by the user B. More specifically, when the user B receives the post card with the two RF-IDs and returns the post card to the user A, the user B encrypts, by using the device generation information A, a URL, a login ID, or a password of a server storing the photographs of the user B, and then records the encrypted data onto the RF-ID for returning. Or, when the user B stores the photographs, the user B associates the photographs with the device generation information A. Therefore, an apparatus permitted to display photographs stored by the user B can be restricted.

Moreover, the mailing object UID of the RF-ID on the mailing object may be a combination of (a) a group ID that is common among a plurality of mailing objects and (b) a UID unique that is unique to each mailing object. Thereby, image data in the server is associated not with every mailing object UID but with the group ID. Therefore, when post cards with RF-ID on which the image data is associated with a plurality of targets are mailed, it is possible to eliminate user's bothersome procedures for performing registration for each of the UIDs. It is also possible that the image data stored in the server in association with the group ID is switched to be permitted or inhibited to be viewed for each of the UID. Thereby, if, for example, a printer prints destination addresses on the mailing objects, the printer having a RF-ID reader/writer reads the UIDs on the mailing objects and thereby associates the UIDs with addresses in an address list, respectively. Thereby, the address list can be used to manage the permission/inhibition of viewing the images stored in the server.

It is also possible that a post card or card is provided with a plurality of RF-ID tags having various different functions. In this aspect, the single post card or card can switch the functions by disconnecting communication of a part of the RF-ID tags which are not currently used. For example, a post card has (a) an upper portion on which a RF-ID tag having a function of displaying a slide show of photographs is attached and (b) a lower portion on which a RF-ID tag having a function of reproducing video. A user can switch the display function or the reproduction function, by selecting the upper portion or the lower portion to be brought into proximity of a RF-ID reader/writer. The RF-ID tags having different functions can be provided to a front side and a back side of the post card. It is also possible that covers made of a material blocking communications are applied on the RF-ID tags so that the user can select a RF-ID tag to be used by opening the cover on it.

It is further possible that photographs are stored in a plurality of servers, and a RF-ID tag holds URLs of the servers. Thereby, a user can access the servers to obtain the photographs to display them in a list.

Moreover, the RF-ID reader/writer may be provided not only to an apparatus (device) such as the TV or the recorder but also to the input means such as a remote controller for operating the apparatus. For instance, if a plurality of apparatuses are connected to one another via a network, an input means for collectively operating the apparatuses may be provided with a RF-ID reader/writer to operate the respective apparatuses. Furthermore, an input means such as a remote controller may be provided with an individual authentication means for biometric authentication such as fingerprint authentication or face authentication, password, or the like. In this aspect, the input means having a RF-ID reader/writer exchanges data with a RF-ID tag, only when the individual authentication is successful. It is also possible that the individual authentication information is previously stored in the RF-ID tag, and individual authentication is performed by the apparatus or the remote controller using the RF-ID tag.

It should be noted that the definition of the term "RF-ID" frequently used in the description of the present invention is not limited to narrow meaning. In general, the term "RF-ID" narrowly refers to a "tag having a nonvolatile memory on which identification information is recorded". RF-ID having a dual interface function or a security function seems commonly called as a "IC card" or the like. However, in the embodiments of the present invention, the "RF-ID" widely refers to an "electronic circuit which has a nonvolatile memory on which individual identification information is recorded and which can transmit the individual identification information to the outside via an antenna".

Conventionally, if a user who is not familiar with operations of an apparatus (device) wishes to perform complicated settings for the apparatus, it is necessary that a seller, repairer, or serviceperson of the apparatus visits a location of the apparatus to perform the settings or controls the apparatus remotely. Even in remotely controlling the apparatus, the seller, repairer, or serviceperson has to visit the location for setting of the remote control. In the seventh embodiment of the present invention, however, the RF-ID card 2100 enables the user to perform the settings of the apparatus (the recorder 2000) without complicated operations. Therefore, even the user not familiar with operations of the recorder can easily change the settings of the recorder.

The present invention can be implemented also as an image presentation method of presenting image related to a communication device on an apparatus (device) having a display screen, in a communication system having (a) the apparatus having the display screen, (b) a reader device connected to the apparatus via a communication path, and (c) the communication device performing proximity wireless communication with the reader device. The present invention can be implemented further as a program stored in the communication device with identification information of the communication device, the program being described by codes executed by a virtual machine included in a device performing proximity wireless communication with the communication device, and being for executing: accessing a server connected via a communication network; downloading, form the server, image associated with the identification information from among image stored in the accessed server; and displaying the downloaded image. In addition, the present invention can be implemented as a computer-readable recording medium such as a CD-ROM on which the above program is recorded.

The communication device according to the present invention may be used, of course, as various devices having a RF-ID unit in which identification information and a virtual machine program are stored. For example, the communication device may be electronic devices such as a camera, home appliances such as a rice cooker and a refrigerator, and daily commodities such as a toothbrush.

Here, an embodiment in which a RF-ID reader is provided to a remote controller of a TV or the like is described with reference to diagrams (a) and (b) in FIG. 86, a flowchart (c) in FIG. 86, and a flowchart of FIG. 87.

First, as described earlier, a child device (or child communicator) 5050 such as a camera has the memory (second memory) 52 and the antenna (second antenna) 21. When an antenna 5063 of a remote controller 5051 is moved into proximity of the antenna 21, the antenna 5063 supplies power to the antenna 21. Thereby, data in the memory 52 is transmitted from the antenna 21 to the antenna 5063. The remote controller 5051 converts the received data into digital data by a communication circuit 5064, and then stores the digital data into a memory 5061 (Step 5001$a$ in FIG. 87). Then, a transmission unit of the remote controller 5051 is faced to the TV 45 and a transmission switch 6065 on the remote controller 5051 is pressed (Step 5001$b$). Thereby, the data in the memory 5061 is transmitted as light to a light receiving unit 5058 of the parent device (apparatus) 45 (the TV 45) via a light emitting unit 5062 (Step 5001$c$). The communication may be not light but wireless.

Referring back to a flowchart (c) in FIG. 86, the embodiment of the present invention used in social systems should be applicable even in twenty or thirty years. An example of the program described in a virtual machine language or the like is known Java™. However, such programs are expected to be extended or replaced by totally different programs described in more efficient languages. In order to address the above situation, in the embodiment of the present invention, the parent device 45 such as the TV holds parent device version information 5059 (or parent device version information $n_1$)

that indicates a language type or version of a virtual machine language or the like (Step 5060i in (c) of FIG. 86). In the beginning of the memory 52 of the child device 5050, child device version information 5052 (or child device version information $n_2$) indicating a version of a program language or the like for the child device is recorded ((a) in FIG. 86). Following to the child device version information 5052, a program region 5053 is recorded in the memory 52. The program region 5053 stores a program 5056a in a version 5055a, a program 5056b in a version 5055b, and a program 5056c in a version 5055c. Following to the program region 5053, a data region 5054 is recorded in the memory 52.

At Step 5060i in the flowchart of FIG. 86, the parent device 45 stores the parent device version information $n_1$ of the parent device 45 is stored. Then, the parent device 45 obtains the child device version information $n_2$ from the memory of the child device (Step 5060a). Then, the parent device 45 selects an execution program n having a maximum value of $n_1 \geqq n_2$ (Step 5060b). The parent device 45 executes the selected execution program (Step 5060c). Then, it is determined whether or not the parent device 45 is connected to the Internet (Step 5060d). If the parent device 45 is connected to the Internet, then the parent device 45 is connected to the server via the Internet (Step 5060e). The parent device 45 thereby transmits language information 5065, which is set in the parent device 45, to the server (Step 5060f). The server provides the parent device 45 with a program in the language indicated in the transmitted language information 5065, for example in French, and causes the parent device 45 to execute the program. Alternatively, the server may execute the program on the server itself.

On the other hand, if it is determined at Step 5060d that the parent device 45 is not connected to the Internet, then the processing proceeds to Step 5060h. At Step 5060h, the parent device 45 executes a local program in order to display, on a screen of the parent device 45, attribute information of the child device 5050. The attribute information is, for example, information for notifying a trouble or information regarding the number of stored photographs. As described above, the memory 52 in the child device 5050 holds the child device version information 5052. The memory 52 stores a program, procedure, URL, or the like of each generation. The program, procedure, URL, or the like will be developed every 10 years. Such data format on which information is recorded for each generation can be kept being used even in twenty or thirty years in order to operate the parent device 45. (a) of FIG. 86 illustrates an example of information on which versions or generations of a program are recorded. However, the same advantages are also offered in another example illustrated in (b) of FIG. 86. In (b) of FIG. 86, addresses of data stored in the server are recorded in associated with respective different versions. In this example, a URL 5057a in a version 5055d, a URL 5057b in a version 5055e, and a URL 5057c in a version 5055f are recorded. The above can achieve backward compatibility for many years. For example, it is assumed that a user purchases a product (the parent device 45) in version 1 this year and the product has RF-ID. Under the assumption, it is expected that, in twenty or thirty years, programs described in virtual machine languages or the like such as Java™, which are compliant to versions 1, 2, and 3, will be installed into the parent device 45. In the situation, the child device 5050 can provide the parent device 45 with the child device version information 5052. Based on the child device version information 5052, the parent device 45 can select a program to be compliant to an appropriate version. It is also expected that, in thirty years, the child device will hold information of programs in all versions 1, 2, and 3. Therefore, a different parent device 45 in version 3 employs the best function of a version among them. On the other hand, the former parent device 45 in version 1 employs a rather limited function of a version older than the version employed by the parent device 45 in version 3. As a result, perfect compatibility can be achieved.

Figure 87:
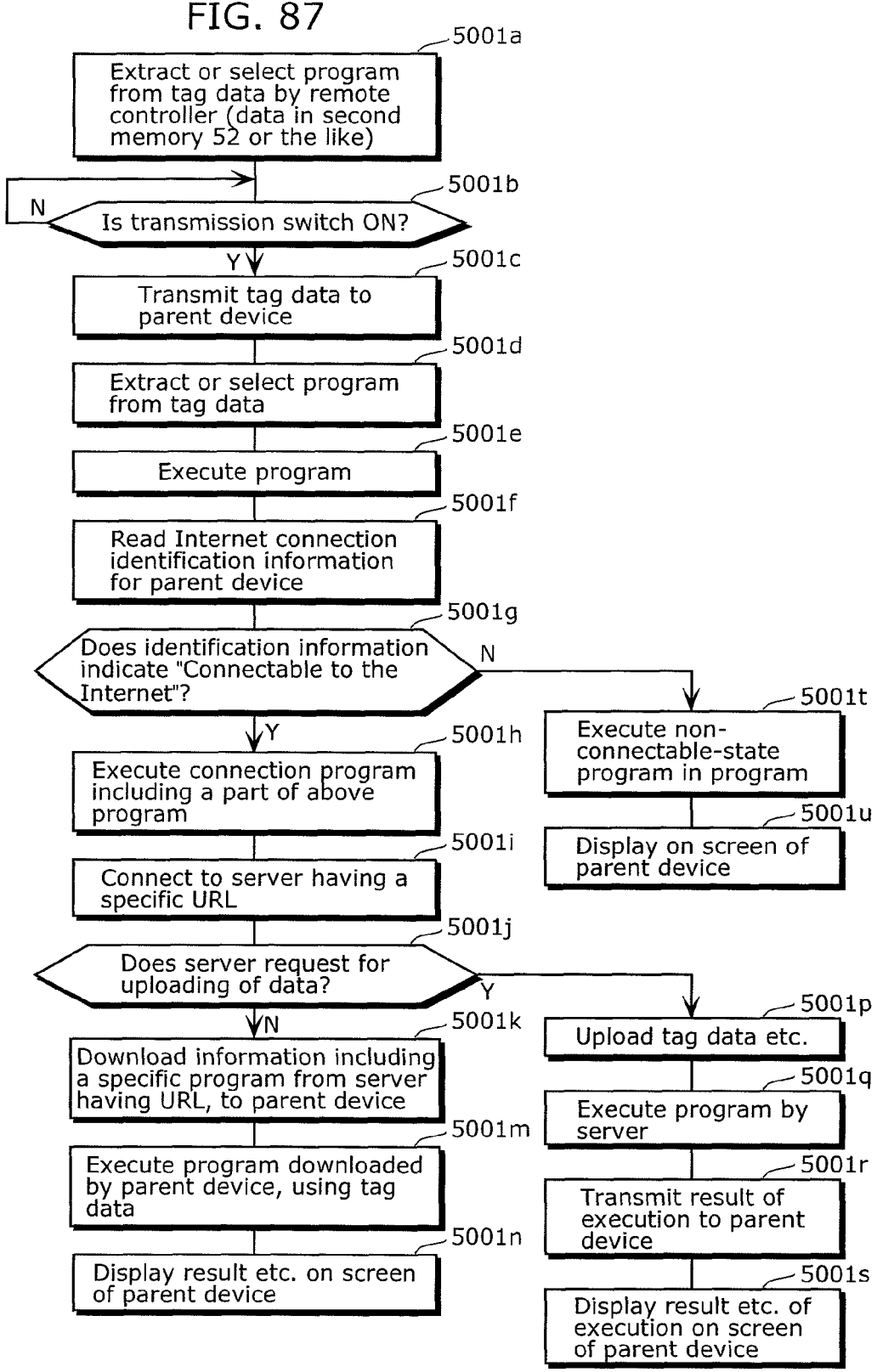
FIG. 87 is a flowchart of processing performed by the above configuration according to the above embodiment of the present invention.

The flowchart of FIG. 87 is explained below. At Step 5001a, pressing a read switch 6066 on the remote controller 5051, a user brings the remote controller 5051 into proximity of the antenna 21 of the child device 5050. Thereby, data in the memory 52 of the child device 5050 is transmitted to the memory 5061 of the remote controller 5051. Next, at Step 5001b, facing the remote controller 5051 to the parent device 45 such as a TV, the user presses a transmission switch 6065 (Step 5001b). Thereby, the data in the memory 5061 is transmitted as light to the parent device 45 (Step 5001c). In the embodiment of the present invention, the data is referred to as "tag data" for convenience. The parent device 45 extracts or selects an execution program from the tag data (Step 5001d). The parent device 45 executes the extracted or selected execution program by a virtual machine language set in the parent device 45 (Step 5001e). The parent device 45 reads Internet connection identification information for the parent device 45 (Step 5001f). At Step 5001g, it is determined whether or not the identification information does not indicate "Connectable to the Internet" (in other words, it is determined based on the identification information whether or not the parent device 45 is connectable to the Internet. If the identification information does not indicate "Connectable to the Internet" until Step 5001g, then the parent device 45 executes a non-connectable-state program in the execution program (Step 5001t). The non-connectable-state program is to be executed when the parent device 45 is not connectable to the Internet. Then, the parent device 45 displays a result of the execution on its screen (Step 5001u). In the embodiment of the present invention, the memory 52 stores not only the information regarding connection to the Internet, but also the non-connectable-state program to be executed when the parent device 45 is not connectable to the Internet. Therefore, the parent device 45 can display a result of a minimum required operation when the parent device 45 is not connectable to the Internet.

On the other hand, if it is determined at Step 5001g that the identification information indicates "Connectable to the Internet", then the parent device 45 executes a connection program (Step 5001h). The connection program includes a part of the above execution program.

The connection program may be generated by adding, into the execution program in the tag data, data such as a URL of the server, user ID, and a password. More specifically, the added such as a URL of the server, user ID, and a password are added in the data region 5054 illustrated in (a) of FIG. 86. Such connection program can extend the execution program in the tag data, and also reduce a capacity of the nonvolatile memory in the memory 52. In this case, it is also possible that the connection program in the memory 52 is recorded onto a memory such as a non-rewritable ROM in the program region 5053, while the URL of the server and the like are recorded onto the data region 5054 that is rewritable. As a result, a tip area and a cost can be reduced.

At Step 5001i, the parent device 45 connects to a server having a specific URL. At Step 5001j, it is determined whether or not the server requests the parent device 45 to upload data to the server. If the server requests for uploading of data, then at Step 5001p, the parent device 45 uploads data and/or a program to the server. The server executes a program using the data (Step 5001q). The server provides a result of the execution to the parent device 45 (Step 5001*r*). The parent device 45 displays the result and the like of the execution on its screen (Step 5001*s*).

On the other hand, if it is determined at Step 5001*j* that the server does not request for uploading of data, then, the parent device 45 downloads information including a specific program from the server having the URL (Step 5001*k*). The parent device 45 executes the downloaded program (Step 5001*m*). Then, the parent device 45 displays the result of the execution on its screen (S5001*n*).

The memory in the RF-ID unit or the child device has a limited capacity due to restriction on power consumption, a volume, or a cost. Therefore, a common program cannot be stored in the memory. However, the use of the connection program and the server as described in the embodiment of the present invention allows an infinitely large program to be executed.

A huge program may be executed on the server. Or, such a program may be downloaded from the server to be executed. These aspects are in the scope of the present invention.

The embodiment described with reference to FIG. 86 has been described to use a remote controller of a TV. In this example, the remote controller has a battery, buttons for switching TV channels, an antenna for reading RF-ID, a communication circuit, and an infrared light emitting unit. The remote controller can be replaced by a mobile phone to produce the same effects as described above. Since mobile phones generally have an infrared light emitting unit, they are easily used instead of remote controllers. In addition, mobile phones have a communication line. Therefore, mobile phones can offer the same capability of that of remote controller, being directly connected to the server. However, a communication cost of a mobile phone is burden of a user. A display screen of a mobile phone is significantly smaller than that of a TV. Therefore, a mobile phone may have the transmission switch 6065 as illustrated in FIG. 86. Thereby, if there is a TV near the mobile phone, the user faces the light emitting unit of the mobile phone to the TV to transmit tag data in the memory 52 of the mobile phone directly to the TV. As a result, the user can view data on a large screen of the TV having a high resolution. The above method does not incur a cost, which is greatly advantageous for the user. The communication using the readout tag data via the mobile phone line is stopped in cooperation with the transmission switch.

In this case, in the same manner as described for as the remote controller with reference to FIG. 86, the mobile phone has at least a reader for RF-ID or a Near Field Communication (NFC) unit. In the future, mobile phones are expected to have a reader function for reading RF-ID or the like. If RF-ID readers are provided to mobile phones, the present invention can be implemented with a much lower additional cost, which is greatly advantageous for the user. Moreover, the present invention can be easily implemented not only as a remote controller or a mobile phone, but also as a Personal Digital Assistance (PDA) terminal, a laptop, or a mobile media player.

INDUSTRIAL APPLICABILITY

The present invention allows a receiving device (apparatus) such as a TV to receive data such as images from a server by simple procedures. The present invention is useful in any systems for simplifying operations of a display device (apparatus) such as a TV or personal computer for obtaining data via the Internet. The communication device according to an aspect of the present invention may be implemented as various devices having a RF-ID unit in which identification information and a virtual machine program are stored. For example, the communication device may be electronic devices such as a camera, home appliances such as a rice cooker and a refrigerator, and daily commodities such as a toothbrush.

The invention claimed is:

1. A communication device that performs proximity wireless communication with a reader device connected via a communication path to an apparatus, said communication device comprising:
    an antenna unit configured to be used for the proximity wireless communication;
    a receiving unit configured to receive an input signal from said reader device via said antenna unit;
    a use status detection unit configured to detect a use status of said communication device and generate use status information indicating the use status;
    a program data generation unit configured to generate one of a program and data to be used in the program, based on the use status information, the program being executed by one of the apparatus and a server device connected to the apparatus to communicate with the apparatus;
    an identification information storage unit configured to store at least identification information for identifying said communication device;
    a memory unit which is nonvolatile and capable of updating stored data, said memory unit configured to store the one of the program and the data which is generated by said program data generation unit;
    a transmission unit configured to transmit (a) the identification information stored in said identification information storage unit and (b) the one of the program and the data which is stored in said memory unit, to the reader device via said antenna unit according to the input signal received by said receiving unit;
    a first power supply unit to which power is supplied via said antenna unit; and
    a second power supply unit different from said first power supply unit,
    wherein said program data generation unit is configured to generate the one of the program and the data which is used by the apparatus to display the use status information generated by said use status detection unit,
    at least said antenna unit, said receiving unit, said identification information storage unit, and said transmission unit are operated under said first power supply unit,
    at least said memory unit and said program data generation unit are operated under said second power supply unit, and
    (a) the identification information and (b) the one of the program and the data which are transmitted by said transmission unit are transferred from said transmission unit to the apparatus via said antenna unit, the reader device, and the communication path.

2. The communication device according to claim 1,
    wherein said memory unit is further configured to store operation device identification information for identifying the apparatus, and
    said program data generation unit is configured to (i) obtain, based on the operation device identification information, one of a capability and a function of the apparatus, and (ii) generate or update the one of the program and the data according to the one of the capability and the function.

3. The communication device according to claim 1,
wherein said use status detection unit is configured to detect a trouble related to an operation of said communication device, and
the use status information includes at least information for specifying the trouble.

4. The communication device according to claim 1,
wherein said use status detection unit is configured to detect a power consumption amount related to an operation of said communication device, and
the use status information includes at least information indicating the power consumption amount.

5. The communication device according to claim 1,
wherein said transmission unit is further configured to (i) perform communication connection authentication between said communication device and the apparatus using the identification information, and (ii) transmit (a) the identification information stored in said identification information storage unit and (b) the one of the program and the data which is stored in said memory unit, to the reader device via said antenna unit according to the input signal received by said receiving unit.

6. A communication system comprising: an apparatus having a remote controller for receiving a remote control instruction from an operator; a reader device connected to said device via a communication path; and a communication device performing proximity wireless communication with said reader device,
wherein said communication device includes:
an antenna unit configured to be used for the proximity wireless communication;
a receiving unit configured to receive an input signal from said reader device via said antenna unit;
a use status detection unit configured to detect a use status of said communication device and generate use status information indicating the use status;
a program data generation unit configured to generate one of a program and data to be used in the program, based on the use status information, the program being executed by one of said device and a server device connected to said device to communicate with said device;
an identification information storage unit configured to store at least identification information for identifying said communication device;
a memory unit which is nonvolatile and capable of updating stored data, said memory unit configured to store the one of the program and the data which is generated by said program data generation unit;
a transmission unit configured to transmit (a) the identification information stored in said identification information storage unit and (b) the one of the program and the data which is stored in said memory unit, to said reader device via said antenna unit according to the input signal received by said receiving unit;
a first power supply unit to which power is supplied via said antenna unit; and
a second power supply unit different from said first power supply unit,
said program data generation unit is configured to generate or update the one of the program and the data, according to the use status information generated by said use status detection unit,
at least said antenna unit, said receiving unit, said memory unit, and said transmission unit are operated under said first power supply unit,
at least said memory unit and said program data generation unit are operated under said second power supply unit,
said reader device is included in said remote controller remotely controlling said device, and said reader device (i) receiving (a) the identification information and (b) the one of the program and the data from said transmission unit, and (ii) transferring (a) the identification information and (b) the one of the program and the data to said device, and
said device (i) receives (a) the identification information and (b) the one of the program and the data, which are transferred from said reader device, and (ii) executes the program.

* * * * *